(12) United States Patent
Thieberger et al.

(10) Patent No.: US 11,970,104 B2
(45) Date of Patent: Apr. 30, 2024

(54) UNMANNED PROTECTIVE VEHICLE FOR PROTECTING MANNED VEHICLES

(71) Applicant: Atnomity Ltd., Kiryat Tivon (IL)

(72) Inventors: Gil Thieberger, Kiryat Tivon (IL); Ari M Frank, Haifa (IL)

(*) Notice: Subject to any disclaimer, the term of this patent is extended or adjusted under 35 U.S.C. 154(b) by 30 days.

(21) Appl. No.: 17/717,076

(22) Filed: Apr. 10, 2022

(65) Prior Publication Data

US 2022/0227280 A1     Jul. 21, 2022

Related U.S. Application Data

(63) Continuation of application No. 16/898,368, filed on Jun. 10, 2020, now Pat. No. 11,332,061, which is a continuation-in-part of application No. 16/042,849, filed on Jul. 23, 2018, now Pat. No. 10,710,608, which is a continuation-in-part of application No.
(Continued)

(51) Int. Cl.
    *B60P 3/073*      (2006.01)
    *B60R 11/04*      (2006.01)
    *B62D 21/15*      (2006.01)
    *G05D 1/00*      (2006.01)
    *G05D 1/02*      (2020.01)

(52) U.S. Cl.
CPC ............ *B60P 3/073* (2013.01); *B60R 11/04* (2013.01); *B62D 21/152* (2013.01); *B62D 21/157* (2013.01); *G05D 1/0088* (2013.01); *G05D 1/0214* (2013.01); *G05D 2201/0213* (2013.01)

(58) Field of Classification Search
None
See application file for complete search history.

(56) References Cited

U.S. PATENT DOCUMENTS

| 2,592,573 | A | 4/1952 | Joncas |
| 2,843,420 | A | 7/1958 | Arthur |

(Continued)

FOREIGN PATENT DOCUMENTS

| EP | 2607152 A1 | 6/2013 |
| EP | 2913228 A1 | 9/2015 |
| WO | WO2015114437 A1 | 8/2015 |

OTHER PUBLICATIONS

Ashish Gedamkar, CES 2015: Mercedes' futuristic self-driving car has No Windows, Feb. 5, 2015, https://www.linkedin.com/pulse/ces-2015-mercedes-futuristic-self-driving-car-has-gedamkar-lion.
(Continued)

*Primary Examiner* — Todd Melton
(74) *Attorney, Agent, or Firm* — Active Knowledge Ltd.

(57) ABSTRACT

One embodiment of an unmanned protective vehicle (UPV) includes a chassis, wheels, an engine, a barrier fixed to the chassis, and an autonomous driving system. The UPV has an opening which enables a manned vehicle to enter a space that is protected by the barrier. And the autonomous driving system is configured to drive the UPV in cooperation with the manned vehicle, while the manned vehicle is located inside the space. Having the manned vehicle inside the space of the UPV improves the survivability of the manned vehicle following a collision, while the manned vehicle is located inside the space, compared to the survivability of the manned vehicle following a collision, while the manned vehicle is not located inside the space.

20 Claims, 43 Drawing Sheets

Related U.S. Application Data

15/376,237, filed on Dec. 12, 2016, now Pat. No. 10,059,347, which is a continuation-in-part of application No. 15/335,404, filed on Oct. 26, 2016, now Pat. No. 9,988,008.

(60) Provisional application No. 62/369,127, filed on Jul. 31, 2016, provisional application No. 62/246,187, filed on Oct. 26, 2015.

(56) References Cited

U.S. PATENT DOCUMENTS

| | | |
|---|---|---|
| 3,721,468 A | 3/1973 | Burgess |
| 3,814,459 A | 6/1974 | Eckels |
| 4,931,714 A | 6/1990 | Yamamoto |
| 5,026,006 A | 6/1991 | Tinder et al. |
| 5,098,124 A | 3/1992 | Breed et al. |
| 5,375,879 A | 12/1994 | Williams et al. |
| 5,382,051 A | 1/1995 | Glance |
| 5,536,042 A | 7/1996 | Williams et al. |
| 5,690,355 A | 11/1997 | Kleinberg |
| 5,992,877 A | 11/1999 | Gray |
| 6,027,159 A | 2/2000 | Baumann |
| 6,050,631 A | 4/2000 | Suzuki et al. |
| 6,909,947 B2 | 6/2005 | Douros et al. |
| 7,070,030 B2 | 7/2006 | Etcheverry |
| 7,143,856 B2 | 12/2006 | Takahashi et al. |
| 7,180,476 B1 | 2/2007 | Guell et al. |
| 7,246,050 B2 | 7/2007 | Sheridan |
| 7,832,762 B2 | 11/2010 | Breed |
| 7,961,117 B1 | 6/2011 | Zimmerman et al. |
| 8,041,483 B2 | 10/2011 | Breed |
| 8,102,586 B2 | 1/2012 | Albahri |
| 8,118,286 B2 | 2/2012 | Chong |
| 8,259,178 B2 | 9/2012 | Basso et al. |
| 8,376,451 B2 | 2/2013 | Todd |
| 8,386,103 B2 | 2/2013 | Tran |
| 8,491,045 B2 | 7/2013 | Ameloot et al. |
| 8,544,585 B2 | 10/2013 | Ballard |
| 8,547,298 B2 | 10/2013 | Szczerba et al. |
| 8,713,215 B2 | 4/2014 | Wade et al. |
| 8,733,938 B2 | 5/2014 | Sachdev et al. |
| 8,780,174 B1 | 7/2014 | Rawdon |
| 8,874,284 B2 | 10/2014 | Sanders-Reed |
| 8,886,023 B2 | 11/2014 | Satoh |
| 8,950,735 B2 | 2/2015 | Reynolds et al. |
| 9,272,708 B2 | 3/2016 | Cuddihy et al. |
| 9,340,231 B1 | 5/2016 | Minahan et al. |
| 9,446,735 B1 | 9/2016 | Jayasuriya et al. |
| 2002/0091473 A1 | 7/2002 | Gardner et al. |
| 2003/0002180 A1 | 1/2003 | Nielsen et al. |
| 2003/0209893 A1 | 11/2003 | Breed et al. |
| 2003/0221584 A1 | 12/2003 | Huss et al. |
| 2004/0040463 A1 | 3/2004 | Yamamoto et al. |
| 2004/0100073 A1 | 5/2004 | Bakhsh et al. |
| 2007/0013206 A1 | 1/2007 | Huttsell et al. |
| 2007/0102126 A1 | 5/2007 | Yamamura et al. |
| 2007/0125417 A1 | 6/2007 | Johanson et al. |
| 2009/0174774 A1 | 7/2009 | Kinsley |
| 2009/0189831 A1 | 7/2009 | Chevion et al. |
| 2009/0195652 A1 | 8/2009 | Gal |
| 2010/0084888 A1 | 4/2010 | Ishitobi et al. |
| 2010/0253594 A1 | 10/2010 | Szczerba et al. |
| 2011/0001311 A1 | 1/2011 | Hofferberth |
| 2011/0115990 A1 | 5/2011 | Bhaktiar |
| 2012/0169861 A1 | 7/2012 | Szczerba et al. |
| 2012/0212613 A1 | 8/2012 | Yamaguchi et al. |
| 2012/0256945 A1 | 10/2012 | Kidron et al. |
| 2013/0004920 A1 | 1/2013 | Pabst et al. |
| 2013/0162639 A1 | 6/2013 | Muench et al. |
| 2014/0020596 A1 | 1/2014 | Graf et al. |
| 2014/0340287 A1 | 11/2014 | Achilefu et al. |
| 2014/0361976 A1 | 12/2014 | Osman et al. |
| 2014/0362113 A1 | 12/2014 | Benson et al. |
| 2015/0054933 A1 | 2/2015 | Wasiek et al. |
| 2015/0054953 A1 | 2/2015 | Frank |
| 2015/0077337 A1 | 3/2015 | Coto-Lopez et al. |
| 2015/0264256 A1 | 9/2015 | Lehtiniemi et al. |
| 2015/0294505 A1 | 10/2015 | Atsmon |
| 2016/0001781 A1 | 1/2016 | Fung |
| 2016/0091877 A1 | 3/2016 | Fullam et al. |
| 2016/0267335 A1 | 9/2016 | Hampiholi |
| 2016/0282618 A1 | 9/2016 | Kon et al. |
| 2019/0389359 A1* | 12/2019 | Liburdi ............... G05D 1/0088 |

OTHER PUBLICATIONS

Perazzi, F., Sorkine-Hornung, A., Zimmer, H., Kaufmann, P., Wang, O., Watson, S., & Gross, M. (May 2015). Panoramic video from unstructured camera arrays. In Computer Graphics Forum (vol. 34, No. 2, pp. 57-68).

Tanimoto, M. (2012). FTV: Free-viewpoint television. Signal Processing: Image Communication, 27(6), 555-570.

Bailey, R. E., Shelton, K. J., & Arthur III, J. J. (May 2011). Head-worn displays for NextGen. In SPIE Defense, Security, and Sensing (pp. 80410G-80410G). International Society for Optics and Photonics.

Doehler, H. U., Schmerwitz, S., & Lueken, T. (Jun. 2014). Visual-conformal display format for helicopter guidance. In SPIE Defense+Security (pp. 90870J-90870J). International Society for Optics and Photonics.

Wang, X. (2013). Intelligent multi-camera video surveillance: A review. Pattern recognition letters, 34(1), 3-19.

González, D., Pérez, J., Milanés, V., & Nashashibi, F. (2016). A review of motion planning techniques for automated vehicles. IEEE Transactions on Intelligent Transportation Systems, 17(4), 1135-1145.

Paden, B., Čáp, M., Yong, S. Z., Yershov, D., & Frazzoli, E. (2016). A Survey of Motion Planning and Control Techniques for Self-driving Urban Vehicles. IEEE Transactions on Intelligent Vehicles, 1(1), 33-55.

Ernst, J. M., Doehler, H. U., & Schmerwitz, S. (May 2016). A concept for a virtual flight deck shown on an HMD. In SPIE Defense+ Security (pp. 983909-983909). International Society for Optics and Photonics.

Wang, J. T. (Jun. 2005). An extendable and retractable bumper. In 19 th ESV conference (pp. 05-0144).

Aearo Company, Confor Foams brochure, E-A-R Product Guide, 2001.

Woodford, Chris. (2009) Energy-absorbing plastics. Retrieved from http://www.explainthatstuff.com/energyabsorbingmaterials.html.

Trelleborg Applied Technology, CONFOR foams cushioning and impact absorbing safety foam.

SPD Control Systems Corporation, Spd-Smartglass Automotive Applications.

Dr. Peter Schuster, American Iron and Steel Institute, Current Trends in Bumper Design for Pedestrian Impact: A Review of Design Concepts from Literature and Patents, Dec. 31, 2004.

Schuster, P. J. (2006). Current trends in bumper design for pedestrian impact (No. 2006-01-0464). SAE Technical Paper.

Heim, R., Naughton, P., & Koelman, H. (Jun. 2001). Design engineering with foams and plastics to enhance vehicle safety. In The17th International Technical Conference on the Enhanced Safety of Vehicles, Amsterdam.

Horton Emergency vehicles, HOPS, We didn't get here overnight, What you'll find in a HOPS equipped ambulance.

Friedman, D., & Friedman, K. (Oct. 1998). Upper interior head, face and neck injury experiments. In Proceedings of the 16th International Technical Conference on the Enhanced Safety of Vehicles, Windsor, Ontario, Canada.

McLean, A. J., Fildes, B. N., Kloeden, C. N., Digges, K. H., Anderson, R. W. G., Moore, V. M., & Simpson, D. A. (1997). Prevention of Head Injuries to Car Occupants. An Investigation of Interior Padding Options (No. CR 160).

* cited by examiner

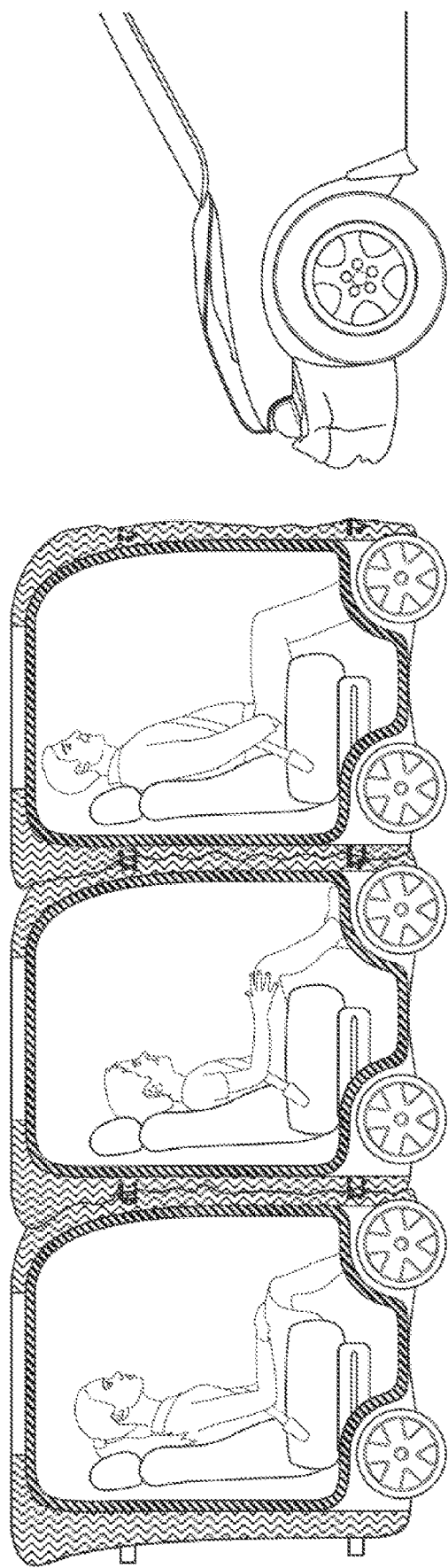
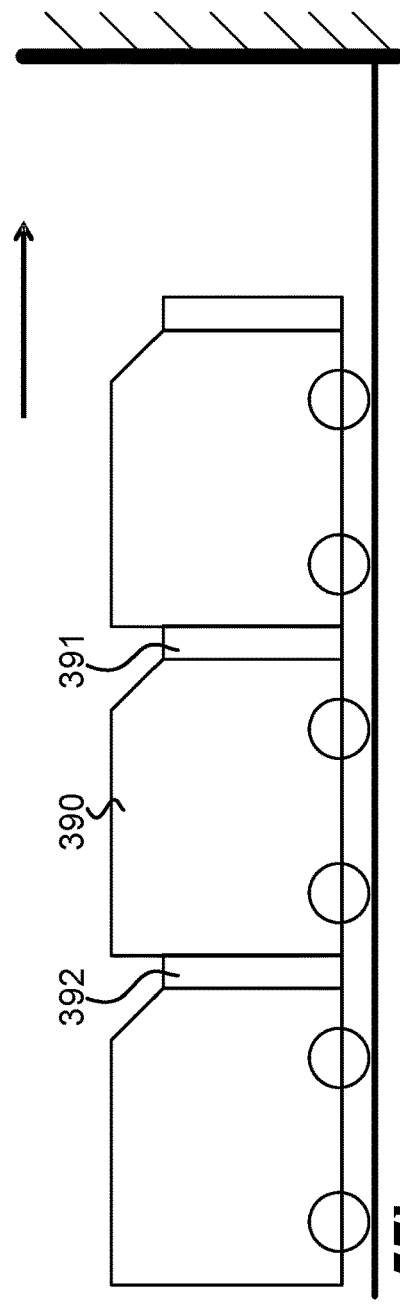
FIG. 57a
FIG. 57b

UNMANNED PROTECTIVE VEHICLE FOR PROTECTING MANNED VEHICLES

CROSS-REFERENCE TO RELATED APPLICATIONS

This application is a Continuation of U.S. application Ser. No. 16/898,368, filed Jun. 10, 2020, that is herein incorporated by reference in its entirety. U.S. Ser. No. 16/898,368 is a Continuation-In-Part of U.S. application Ser. No. 16/042,849, filed Jul. 23, 2018, that is herein incorporated by reference in its entirety. U.S. Ser. No. 16/042,849 is a Continuation-In-Part of U.S. application Ser. No. 15/376,237, filed Dec. 12, 2016, that is herein incorporated by reference in its entirety. U.S. Ser. No. 15/376,237 is a Continuation-In-Part of U.S. application Ser. No. 15/335,404, filed Oct. 26, 2016, now U.S. Pat. No. 9,988,008 that is herein incorporated by reference in its entirety. U.S. Ser. No. 15/335,404 claims priority to U.S. Provisional Application No. 62/246,187, filed on 26 Oct. 2015, and U.S. Provisional Application No. 62/369,127, filed on 31 Jul. 2016.

BACKGROUND

Crash statistics show that the likelihood of death due to crashed varies among vehicle types according to size. Small/light vehicles have less structure and size to absorb crash energy, so crash forces on occupants are higher. Occupants in lighter vehicles are usually at a disadvantage in collisions with heavier vehicles, and occupant deaths in lighter vehicles are usually more likely to occur in crashes. Because lightweight vehicles are usually less expensive and consume less energy than heavier vehicles, which are usually also more expensive, there is a need for a transportation system that combines lightweight manned vehicles with larger and stiffer unmanned protective vehicles.

SUMMARY

Herein is disclosed an embodiment of an unmanned protective vehicle that protects maimed vehicles. One embodiment of an unmanned protective vehicle (UPV) includes a chassis, wheels, an engine, a barrier fixed to the chassis, and an autonomous driving system. The UPV has an opening which enables a maimed vehicle to enter a space that is protected by the barrier. And the autonomous driving system is configured to drive the UPV in cooperation with the manned vehicle, while the maimed vehicle is located inside the space. Having the manned vehicle inside the space of the UPV improves the survivability of the maimed vehicle following a collision, while the maimed vehicle is located inside the space, compared to the survivability of the maimed vehicle following a collision, while the manned vehicle is not located inside the space.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings:

FIG. 57a illustrates a front collision where the front and rear crumple zones of the first two vehicles deform while the safety cages of the compartments did not break; FIG. 57b is a schematic illustration of a 1D finite element method simulation of a system modeled using nonlinear stiffness and mass distribution;

DETAILED DESCRIPTION

Figure 1:
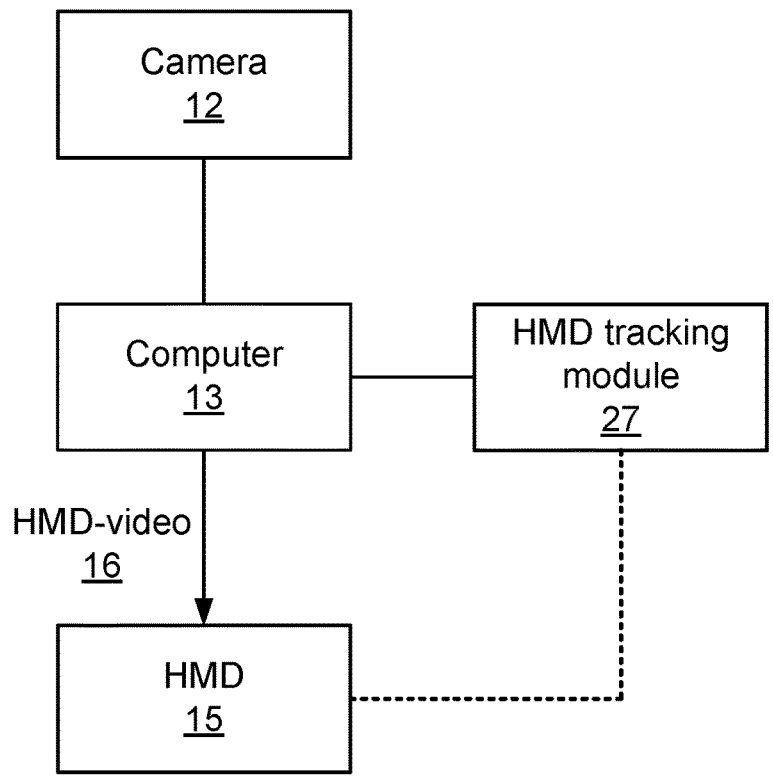
FIG. 1 is a schematic illustration of components of a system configured to combine video see-through (VST) with video-unrelated-to-the-VST (VUR)

The following are definitions of various terms that may be used to describe one or more of the embodiments in this disclosure. The terms "autonomous on-road vehicle" and "autonomous on-road manned vehicle" refer to cars and motorcycles designed to drive on public roadways utilizing automated driving of level 3 and above according to SAE International standard J3016 "Taxonomy and Definitions for Terms Related to On-Road Motor Vehicle Automated Driving Systems". For example, the autonomous on-road vehicle may be a level 3 vehicle, in which within known, limited environments, drivers can safely turn their attention away from driving tasks; the autonomous on-road vehicle may be a level 4 vehicle, in which the automated system can control the vehicle in all but a few environments; and/or the autonomous on-road vehicle may be a level 5 vehicle, in which no human intervention is required and the automatic system can drive to any location where it is legal to drive. Herein, the terms "autonomous on-road vehicle" and "self-driving on-road vehicle" are equivalent terms that refer to the same. The term "autonomous on-road vehicle" does not include trains, airplanes, boats, and armored fighting vehicles.

An autonomous on-road vehicle utilizes an autonomous-driving control system to drive the vehicle. The disclosed embodiments may use any suitable known and/or to be invented autonomous-driving control systems. The following three publications describe various autonomous-driving control systems that may be utilized with the disclosed embodiments: (i) Paden, Brian, et al. "A Survey of Motion Planning and Control Techniques for Self-driving Urban Vehicles." arXiv preprint arXiv:1604.07446 (2016); (ii) Surden, Harry, and Mary-Anne Williams "Technological Opacity, Predictability, and Self-Driving Cars." Predictability, and Self-Driving Cars (Mar. 14, 2016) (2016); and (iii) Gonzalez, David, et al. "A Review of Motion Planning Techniques for Automated Vehicles." IEEE Transactions on Intelligent Transportation Systems 17.4 (2016): 1135-1145.

Autonomous-driving control systems usually utilize algorithms such as machine learning, pattern recognition, neural network, machine vision, artificial intelligence, and/or probabilistic logic to calculate on the fly the probability of an imminent collision, or to calculate on the fly values that are indicative of the probability of an imminent collision (from which it is possible to estimate the probability of an imminent collision). The algorithms usually receive as inputs the trajectory of the vehicle, measured locations of at least one nearby vehicle, information about the road, and/or information about environmental conditions. Calculating the probability of an imminent collision is well known in the art, also for human driven vehicles, such as the anticipatory collision system disclosed in U.S. Pat. No. 8,041,483 to Breed.

The term "automated driving system" refers to a Level 2 and higher Levels of autonomous driving (Level3, Level 4, and/or Level 5), such as defined in SAE J3016_201609 "Taxonomy and Definitions for Terms Related to Driving Automation Systems for On-Road Motor Vehicles". "Automated driving system" also refers to any kind of autonomous driving system for vehicles that will be developed in the future. Examples of automated driving system include Advanced Driver-Assistance Systems (ADAS) from manufacturers such as: Tesla, Mobileye, NVIDIA, Autoliv, Continental, Delphi, and Denso.

The term "automated on-road vehicle" refers to cars and/or motorcycles designed to drive on public roadways utilizing automated driving of level 2 and above according to SAE J3016_201609. The term "automated on-road vehicle" does not include trains, airplanes, boats, and armored fighting vehicles.

Automated driving systems usually use algorithms such as machine learning, pattern recognition, neural network, machine vision, artificial intelligence, and/or probabilistic logic to calculate probability of an imminent collision and/or a Sudden Decrease in Ride Smoothness (SDRS) event. The term "calculate probability of an imminent collision" also refers to "calculate values indicative of probability of an imminent collision", from which it is possible to estimate the probability of the imminent collision and the probability of the SDRS event. The algorithms usually receive as inputs the trajectory of the vehicle, measured locations of at least one nearby vehicle, information about the road, and/or information about environmental conditions. Calculating the probability of an imminent collision (and/or an SDRS event) is known in the art, both for human driven vehicles and autonomous vehicles, and is widely used in Advanced Driver-Assistance Systems (ADAS). For example, the following US Patent Applications describe driver-assistance systems that calculate probability of an imminent collision: US 2017/0217431, US 2009/0292468, US 2018/0052005, US 2018/0141545, US 2018/0141544, US 2009/0192710, U.S. Pat. No. 8,868,325, and US 2013/0030686.

In order to calculate whether an SDRS event is imminent, the automated driving system may compare parameters describing the state of the vehicle at time $t_1$ with parameters describing the state of the vehicle at time $t_2$ that is shortly after $t_1$. If the change in one or more of the parameters reaches a threshold (such as deceleration above a certain value, change of height in the road above a certain value, and/or an angular acceleration above a certain value) then it may be determined that an SDRS event is imminent.

An "occupant" of a vehicle, as the term is used herein refers to a person that is in the vehicle when it drives. The term "occupant" refers to a typical person having a typical shape, such as a 170 cm tall human (herein "cm" refers to centimeters). An occupant may be a driver, having some responsibilities and/or control regarding the driving of the vehicle (e.g., in a vehicle that is not completely autonomous), or may be a passenger. When an embodiment refers to "the occupant of the vehicle", it may refer to one of the occupants of the vehicle. Stating that a vehicle has an "occupant" should not be interpreted that the vehicle necessarily accommodates only one occupant at a time, unless that is explicitly stated, such as stating that the vehicle is "designed for a single occupant".

Herein, a "seat" may be any structure designed to hold an occupant travelling in the vehicle (e.g., in a sitting and/or reclining position). A "front seat" is a seat that positions an occupant it holds no farther from the front of the vehicle than any other occupants of the vehicle are positioned. Herein, sitting in a seat also refers to sitting on a seat. Sitting in a seat is to be interpreted in this disclosure as occupying the space corresponding the seat, even if the occupant does so by assuming a posture that does not necessarily correspond to sitting. For example, in some vehicles the occupant may be reclined or lying down, and in other vehicles the occupant may be more upright, such as when leaning into the seat in a half standing half seating position similar to leaning into a Locus Seat by Focal Upright LLC.

The interchangeable terms "environment outside the vehicle" and "outside environment" refer to the environment outside the vehicle, which includes objects that are not inside the vehicle compartment, such as other vehicles, roads, pedestrians, trees, buildings, mountains, the sky, and outer space.

A sensor "mounted to the vehicle" may be connected to any relevant part of the vehicle, whether inside the vehicle, outside the vehicle, to the front, back, top, bottom, and/or to a side of the vehicle. A sensor, as used herein, may also refer to a camera.

The term "camera" refers herein to an image-capturing device that takes images of an environment. For example, the camera may be based on at least one of the following sensors: a CCD sensor, a CMOS sensor, a near infrared (NIR) sensor, an infrared sensor (IR), and a device based on active illumination such as a LiDAR. The term "video" refers to a series of images that may be provided in a fixed rate, variable rates, a fixed resolution, and/or dynamic resolutions. The use of a singular "camera" should be interpreted herein as "one or more cameras". Thus, when embodiments herein are described as including a camera that captures video and/or images of the outside environment in order to generate a representation of the outside environment, the representation may in fact be generated based on images and/or video taken using multiple cameras.

Various embodiments described herein involve providing an occupant of the vehicle with representation of the outside environment, generated by a computer and/or processor, based on video taken by a camera. In some embodiments, video from a single camera (e.g., which may be positioned on the exterior of the vehicle at eye level), may be sent to presentation to the occupant by the processor and/or computer following little, if any, processing. In other embodiments, video from a single camera or multiple cameras is processed in various ways, by the computer and/or processor, in order to generate the representation of the outside environment that is presented to the occupant.

Methods and systems for stitching live video streams from multiple cameras, stitching live video streams with database objects and/or other video sources, transforming a video stream or a stitched video stream from one point of view to another point of view (such as for generating a representation of the outside environment for an occupant at eye level, or for generating a compartment view for a person standing outside the compartment), tracking the position of an HMD relative to a compartment, and presenting rendered images that are perfectly aligned with the outside world— are all known in the art of computer graphics, video stitching, image registration, and real-time 360° imaging systems. The following publications are just a few examples of reviews and references that describe various ways to perform the video stitching, image registration, tracking, and transformations, which may be utilized by the embodiments disclosed herein: (i) Wang, Xiaogang. "Intelligent multi-camera video surveillance: A review." Pattern recognition letters 34.1 (2013): 3-19. (ii) Szeliski, Richard. "Image alignment and stitching: A tutorial." Foundations and Trends® in Computer Graphics and Vision 2.1 (2006): 1-104. (iii) Tanimoto, Masayuki. "FTV: Free-viewpoint television." Signal Processing: Image Communication 27.6 (2012): 555-570. (iv) Ernst, Johannes M., Hans-Ullrich Doehler, and Sven Schmerwitz. "A concept for a virtual flight deck shown on an HMD." SPIE Defense+ Security. International Society for Optics and Photonics, 2016. (v) Doehler, H-U., Sven Schmerwitz, and Thomas Lueken. "Visual-conformal display format for helicopter guidance." SPIE Defense+ Security. International Society for Optics and Photonics, 2014. (vi) Sanders-Reed, John N., Ken Bernier, and Jeff Güell. "Enhanced and synthetic vision system (ESVS) flight demonstration." SPIE Defense and Security Symposium. International Society for Optics and Photonics, 2008. And (vii) Bailey, Randall E, Kevin J. Shelton, and J. J. Arthur III. "Head-worn displays for NextGen." SPIE Defense, Security, and Sensing. International Society for Optics and Photonics, 2011.

A video that provides "representation of the outside environment" refers to a video that enables the average occupant, who is familiar with the outside environment, to recognize the location of the vehicle in the outside environment from watching the video. In one example, the average occupant is a healthy 30 years old human who is familiar with the outside environment, and the threshold for recognizing a video as a "representation of the outside environment" is at least 20 correct recognitions of the outside environment out of 30 tests.

Herein, sentences such as "VST that represents a view of the outside environment from the point of view of the occupant", or "VST representation of the outside environment, which could have been seen from the point of view of the occupant" refer to a video representing at least a portion of the outside environment, with a deviation of less than ±20 degrees from the occupant's point of view of the outside environment, and zoom in the range of 30% to 300% (assuming the occupant's unaided view is at 100% zoom level).

The VST may be generated based on at least one of the following resources: a video of the outside environment that is taken in real-time, a video of the outside environment that was taken in the past and is played/processed according to the trajectory of the vehicle, a database of the outside environment that is utilized for rendering the VST according to the trajectory of the vehicle, and/or a video that is rendered as function of locations of physical objects identified in the outside environment using detection and ranging systems such as RADAR and/or LIDAR.

Moreover, the term "video see-through (VST)" covers both direct representations of the outside environment, such as a video of the outside environment, and/or enriched video of the outside environment, such as captured video and/or rendered video of the outside environment presented together with one or more layers of virtual objects, as long as more than 20% of the average vehicle occupants, who are familiar with the outside environment, would be able to determine their location in the outside environment, while the vehicle travels, without using a map, and with a margin of error below 200 meters. However, it is noted that showing a map that indicates the location of the vehicle on the driving path (such as from the start to the destination) is not considered herein as equivalent to the VST, unless the map includes all of the following properties: the map shows images of the path, the images of the path capture at least 5 degrees of the occupant's FOV at eye level, and the images of the path reflect the dynamics of the vehicle and change in a similar manner to a video taken by a camera mounted to the vehicle and directed to the outside environment.

Herein, "field of view (FOV) of the occupant to the outside environment" refers to the part of the outside environment that is visible to the occupant of a vehicle at a particular position and orientation in space. In one example, in order for an occupant-tracking module to calculate the FOV to the outside environment of an occupant sitting in a vehicle compartment, the occupant-tracking module determines the position and orientation of the occupant's head. In another example, in order for an occupant-tracking module to calculate the FOV of an occupant sitting in a vehicle compartment, the occupant-tracking module utilizes an eye tracker.

It is noted that sentences such as "a three dimensional (3D) video see-through (VST) that represents a view of the outside environment, which could have been seen from the point of view of the occupant had the FOV not been obstructed by at least a portion of the nontransparent element" cover also just one or more portions of the FOV, and are to be interpreted as "a three dimensional (3D) video see-through (VST) that represents a view of at least a portion of the outside environment, which could have been seen from the point of view of the occupant had at least some of the FOV not been obstructed by at least a portion of the nontransparent element".

The term "display" refers herein to any device that provides a human user with visual images (e.g., text, pictures, and/or video). The images provided by the display may be two-dimensional or three-dimensional images. Some non-limiting examples of displays that may be used in embodiments described in this disclosure include: (i) screens and/or video displays of various devices (e.g., televisions, computer monitors, tablets, smartphones, or smartwatches), (ii) headset- or helmet-mounted displays such as augmented-reality systems/mixed-reality systems (e.g., HoloLens), and virtual-reality systems (e.g., Oculus rift, HTC Vive, or Samsung GearVR), and (iii) image projection systems that project images on a occupant's retina, such as: Virtual Retinal Displays (VRD) that create images by projecting low power light directly onto the retina, and/or light-field technologies that project light rays directly into the eye.

Various embodiments may include a reference to elements located at eye level. The "eye level" height is determined according to an average adult occupant for whom the vehicle was designed, who sits straight and looks to the horizon. Sentences in the form of "an element located at eye level of an occupant who sits in a vehicle" refer to the element and not to the occupant. The occupant is used in such sentences in the context of "eye level", and thus claims containing such sentences do not require the existence of the occupant in order to construct the claim.

Sentences such as "SAEDP located at eye level", "stiff element located at eye level", and "crumple zone located at eye level" refer to elements that are located at eye level, but may also extended to other levels, such as from sternum level to the roof level, from floor level to eye level, and/or from floor level to roof level. For example, an SAEDP located at an eye level can extend from sternum level to above the occupant's head, such that at least a portion of the SAEDP is located at the eye level.

Herein, "normal driving" refers to typical driving conditions, which persist most of the time the autonomous vehicle is in forward motion. During normal driving, the probability of a collision is expected to be below a threshold. When the threshold is reached, at least one of the following activities may be taken: deployment of safety devices that are not usually deployed (e.g., inflating airbags), taking evasive action to avoid a collision, and warning occupants of the vehicle about an imminent event that may cause a Sudden Decrease in Ride Smoothness (SDRS).

A Shock-Absorbing Energy Dissipation Padding (SAEDP) is an element that may be used to cushion impact of a body during a collision or during SDRS events. Various types of SAEDPs may be used in embodiments described herein, such as passive materials, airbags, and pneumatic pads.

Some examples of passive materials that may be used for the SAEDP in one or more of the disclosed embodiments include one or more of the following materials: Crushable Foam, DAX foam, polymeric foams (for example, as described in the reference Avalle, Massimiliano, Giovanni Belingardi, and R. Montanini "Characterization of polymeric structural foams under compressive impact loading by means of energy-absorption diagram." International Journal of Impact Engineering 25.5 (2001): 455-472), Styrofoam by The Dow Chemical Company, Micro-Lattice Materials and/or Metallic Microlattices (such as by HRL Laboratories in collaboration with researchers at University of California and Caltech), non-Newtonian energy Absorbing materials (such as D3O® by D3O lab, and DEFLEXION™ by Dow Corning®), Sorbothane® by Sorbothane Incorporated, and padding that includes compression cells and/or shock absorbers of the Xenith LLC type (such as described in U.S. Pat. No. 8,950,735 and US patent application num. 20100186150), and materials that include rubber such as a sponge rubber.

The term "stiff element" refers to a material having stiffness and impact resistance equal or greater than that of glazing materials for use in motor vehicles as defined in the following two standards: (i) "American National Standard for Safety Glazing Materials for Glazing Motor Vehicles and Motor Vehicle Equipment Operating on Land Highways-Safety Standard" ANSI/SAE Z26.1-1996, and (ii) The Society of Automotive Engineers (SAE) Recommended Practice J673, revised April 1993, "Automotive Safety Glasses" (SAE J673, rev. April 93). The term "stiff element" in the context of low speed vehicles refers to a material having stiffness and impact resistance equal or greater than that of glazing materials for use in low speed motor vehicles as defined in Federal Motor Vehicle Safety Standard 205—Glazing Materials (FMVSS 205), from 49 CFR Ch. V (10-1-04 Edition). The stiff element may be transparent (such as automotive laminated glass, or automotive tempered glass) or nontransparent (such as fiber-reinforced polymer, carbon fiber reinforced polymer, steel, or aluminum).

Herein, a nontransparent element is defined as an element having Visible Light Transmittance (VLT) between 0% and 20%, which does not enable the occupant to recognize what lies on the other side of it. For example, a thick ground glass usually allows light to pass through it but does not let the occupant recognize the objects on the other side of it, unlike plain tinted glass that usually lets the occupant recognize the objects on the other side of it, even when it features VLT below 10%. The nontransparent element includes an opaque element having VLT of essentially 0% and includes a translucent element having VLT below 20%. VLT is defined as the amount of incident visible light that passes through the nontransparent element, where incident light is defined as the light that strikes the nontransparent element. VLT is also known as Luminous Transmittance of a lens, a light diffuser, or the like, and is defined herein as the ratio of the total transmitted light to the total incident light. The common clear vehicle windshield has a VLT of approximately 85%, although US Federal Motor Vehicle Safety Standard No. 205 allows the VLT to be as low as 70%.

Sentences such as "video unrelated to the VST (VUR)" mean that an average occupant would not recognize the video as a representation of the outside environment. In some embodiments, the content of the VUR does not change as function of the position of the occupant's head, which means that the point of view from which the occupant watches the VUR does not change essentially when the occupant's head moves. Herein, stabilization effects, image focusing, dynamic resolution, color corrections, and insignificant changes to less than 10% of the frame as function of the position of the occupant's head—are still considered as content that does not change as function of the position of the occupant's head. Examples of such content (common in the year 2016) include cinema movies, broadcast TV shows, standard web browsers, and Microsoft Office 2016 applications (such as Word, Excel and PowerPoint).

Herein, a "crumple zone" refers to a structure designed to slow down inertia and absorb energy from impact during a traffic collision by controlled deformation. The controlled deformation absorbs some of the impact within the outer parts of the vehicle, rather than being directly transferred to the occupants, while also preventing intrusion into and/or deformation of the compartment. Crumple zone may be achieved by various configurations, such as one or more of the following exemplary configurations: (i) by controlled weakening of sacrificial outer parts of the vehicle, while strengthening and increasing the stiffness of the inner parts of the vehicle, such as by using more reinforcing beams and/or higher strength steels for the compartment; (ii) by mounting composite fiber honeycomb or carbon fiber honeycomb outside the compartment; (iii) by mounting an energy absorbing foam outside the compartment; and/or (iv) by mounting an impact attenuator that dissipates impact.

Figure 26A:
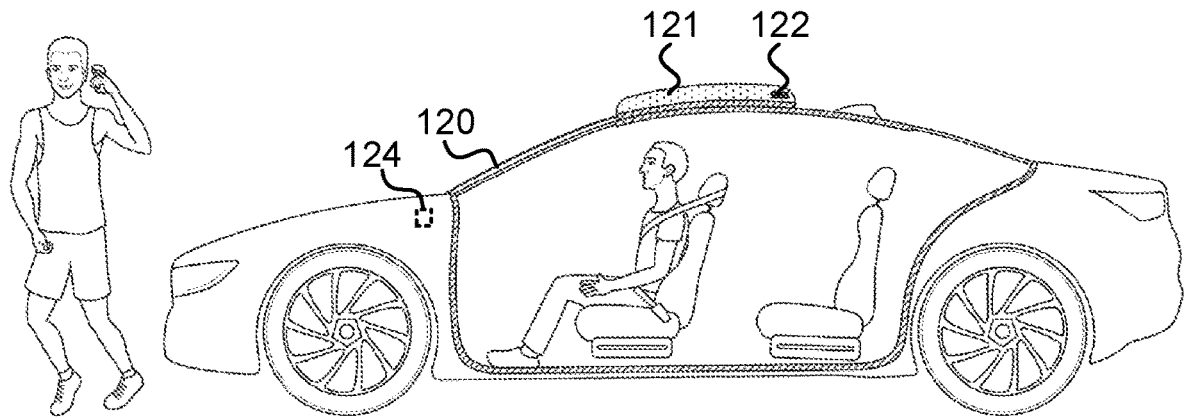
FIG. 26a and FIG. 26b illustrate a motorized external SAEDP that can move between first and second states multiple times.
Figure 26B:
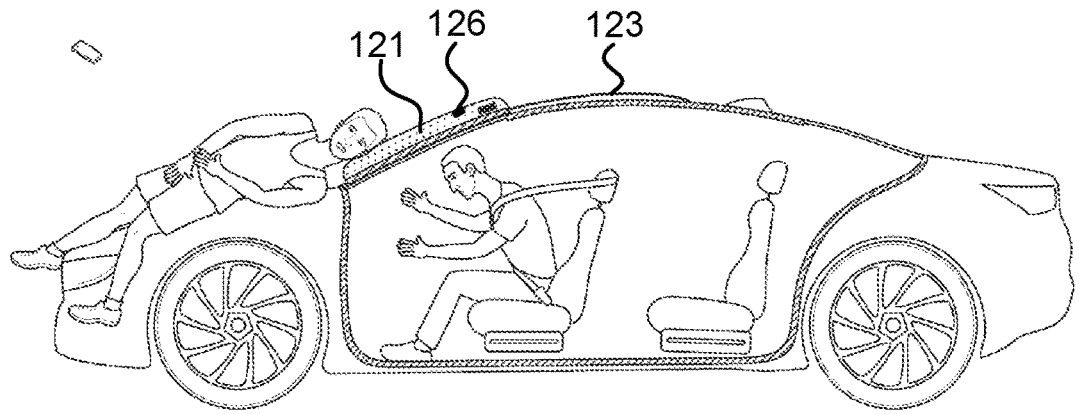
Figure 26C:
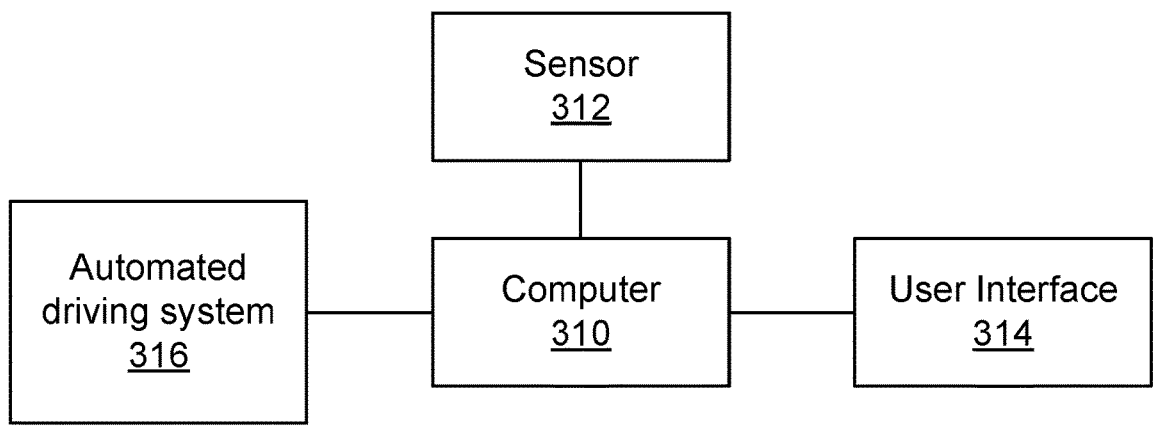
FIG. 26c is a schematic illustration of an embodiment of a safety system that provides specific warnings.

FIG. 26c is a schematic illustration of an embodiment of a safety system that provides specific warnings that can serve to warn an occupant of a vehicle who is engaged in a certain activity that may have an adverse outcome (e.g., be dangerous) if an SDRS event occurs. In one embodiment, the safety system includes at least a sensor 312 and a computer 310. Optionally, the safety system also includes additional elements such as a user interface 314 and/or an automated driving system 318.

The sensor 312 is configured to take measurements of at least a portion of the vehicle compartment. Optionally, the sensor 312 may be physically coupled to the compartment. Alternatively, the sensor 312 may be physically coupled to a head-mounted display (HMD) that is worn by an occupant of the vehicle. Optionally, the measurements of at least a portion of the vehicle compartment comprise measurements of a region in the compartment in which one or more occupants are present, such that the measurements capture at least some portions of the body of an occupant from among the one or more occupants. There are various types of sensors that may be utilized to take the aforementioned measurements, such as video cameras, radar systems, thermal cameras, head-mounted camera systems, and motion controls systems. Additional discussion regarding the various types of sensors is given further below.

Figure 35:
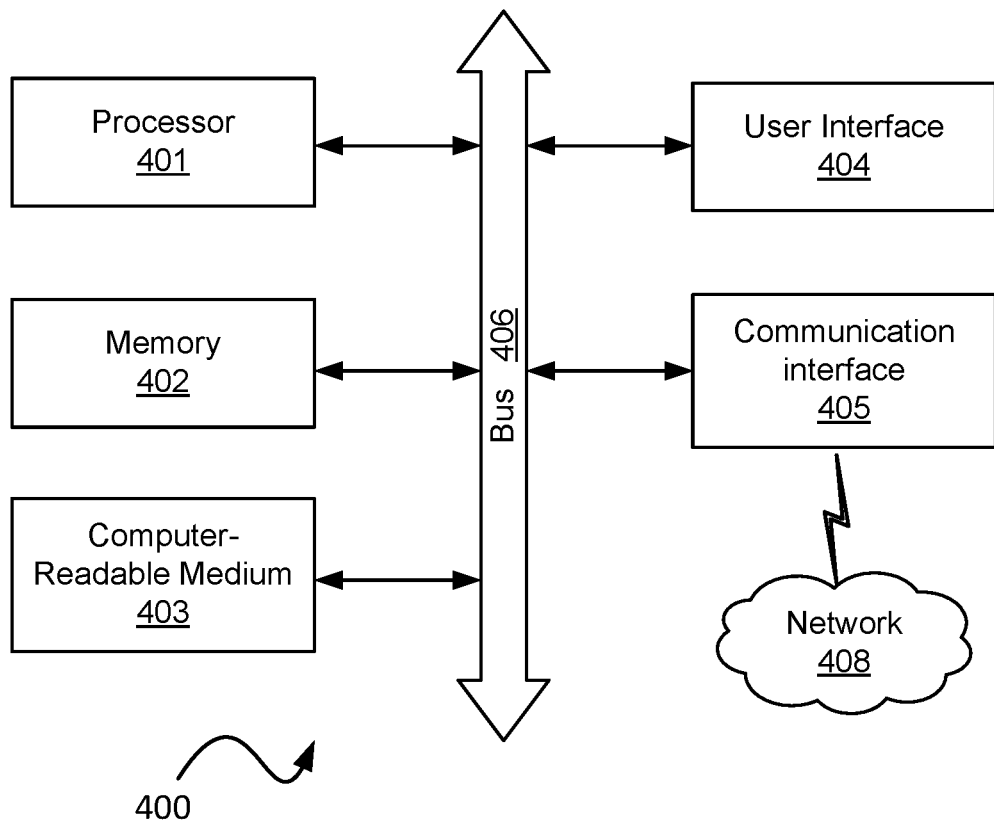
FIG. 35 and FIG. 36 are schematic illustrations of computers able to realize one or more of the embodiments discussed herein.
Figure 36:
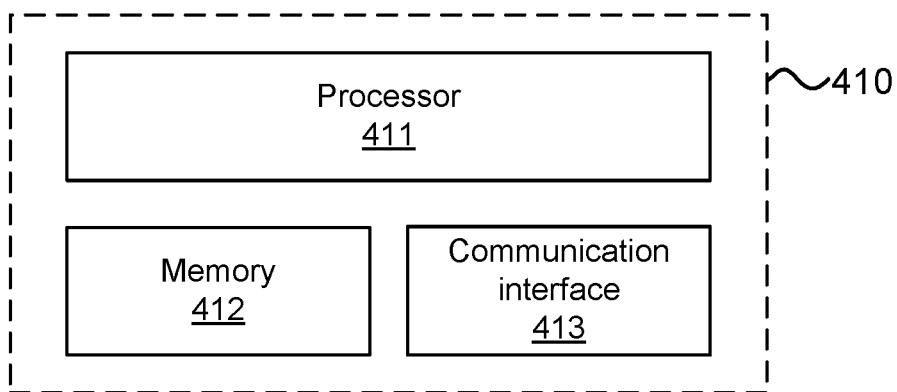

The computer 310 may be any of the computers described in this disclosure, such as the computers illustrated in FIG. 35 or FIG. 36. The computer 310 is configured, in one embodiment, to estimate, based on the measurements taken by the sensor 312, whether the occupant is engaged in a certain activity that may result in an adverse outcome in a case of an intense and/or unexpected movement of the vehicle, such an SDRS event. Examples of such activities include applying makeup, drinking a beverage from an open cup, or manipulating a sharp tool. Optionally, estimating whether the occupant is engaged in the certain activity is done using a machine learning-based model that classifies the occupant's actions into various types of activities. Optionally, the computer 310 calculates for one or more different types of activities, based on the measurements taken by the sensor 312, probabilities that the occupant is conducting each of the one or more different types of activities. Optionally, if for a particular activity from among the one or more different types of activities, a calculated probability reaches a predetermined threshold, the occupant is determined to be engaged in that particular activity.

In addition to estimating whether an occupant is engaged in a certain activity, the computer 310 is further configured to receive indications indicative of whether SDRS events are imminent. In one embodiment, such indication may be received from an automated driving system 318. In another embodiment, the indication may be received from an external source, e.g., a cloud-based navigation service, automated roadside assistance systems, or systems installed in other vehicles in proximity to the vehicle. The computer 310 processes data involving indications of imminent SDRS events and the type of occupant activities in order to determine when and/or how to warn an occupant of the vehicle who is conducting a certain activity that may have an adverse outcome in the case of an SDRS event. Optionally, the computer 310 provides the warning to the occupant via the user interface 314.

In one embodiment, responsive to receiving an indication indicative of an imminent SDRS event, and estimating that the occupant is engaged in the certain activity (which may have an adverse outcome), the computer provides a specific warning to the occupant; where the specific warning describes a specific action related to the certain activity, which the occupant should take. Optionally, responsive to receiving an indication indicative of an imminent SDRS event and not estimating that the occupant is engaged in the certain activity, the computer does not provide the occupant with the specific warning, or it provides a second warning to the occupant, shortly before the SDRS event. In this case, the second warning is less noticeable than the specific warning mentioned above. For example, the second warning may be softer, involve less visible cues, etc.

In some embodiments, an SDRS event takes place at least 2 minutes after starting to travel and it is not directly related to the act of starting to travel. Additionally, the SDRS event takes place at least 2 minutes before arriving to the destination and is not directly related to the act of arriving at the destination. In one example, a sentence such as "an SDRS event is imminent" refers to an SDRS event that is: (i) related to traveling in the vehicle, and (ii) expected to happen in less than 30 seconds, less than 20 seconds, less than 10 seconds, less than 5 seconds, or less than 2 seconds. In another example, a sentence such as "an SDRS event is imminent" may refer to an event that starts at that instant, or is about to start within less than one second.

The user interface 314 may include, in some embodiments, an element that provides the occupant with an auditory indication (e.g., by providing a verbal warning, a sound effect, and/or a visual effect, which are supposed to draw the occupant's attention). For example, in one embodiment, the user interface 314 may include a speaker which may be coupled to the compartment of the vehicle or worn by the occupant (e.g., as part of earphones). In another embodiment, the user interface 314 may include an element that can provide the occupant with a visual cue, such as an element that projects a certain image in the field of view of the occupant and/or creates a visual effect that may be detected by the occupant (e.g., flashing lights). Optionally, the user interface 314 includes a display that is coupled to the compartment of the vehicle, or is part of a head mounted display (HMD) worn by the occupant. In still another embodiment, the user interface 314 may include a haptic feedback device that may attract an occupant's attention, such as a vibrating chair or a vibrating hand rest.

Different sensors may be utilized in different embodiments in order to provide measurements to the computer 310 in order to determine what activities an occupant is conducting in the vehicle. Optionally, the sensor 312 may include one or more sensors of the types of sensors described below.

In one embodiment, the sensor 312 includes a video camera configured to take images of the compartment (i.e., images that capture at least some of the inside of the compartment), and the computer 310 is configured to estimate whether the occupant is engaged in the certain activity based on analysis of the images. For example, detecting whether the occupant is engaged in the certain activity can be done utilizing various object detection and/or activity detection algorithms. These algorithms typically employ various image analysis algorithms known in the art. For example, some of the approaches that may be utilized to detect moving objects are described in Joshi, et al. "A survey on moving object detection and tracking in video surveillance system." International Journal of Soft Computing and Engineering 2.3 (2012): 44-48. Additionally, various examples of approaches that may be used to detect human activity are described in the following references: Aggarwal, et al., "Human activity analysis: A review", ACM Computing Surveys (CSUR) 43.3 (2011): 16, Weinland, el al. "A survey of vision-based methods for action representation, segmentation and recognition", Computer vision and image understanding 115.2 (2011): 224-241, and Ramanathan, et al., "Human action recognition with video data: research and evaluation challenges", IEEE Transactions on Human-Machine Systems 44.5 (2014): 650-663. Some additional approaches for identifying objects and/or activities in the compartment are described in U.S. Pat. No. 9,101,459, assigned to OrCam Technologies Ltd.

In another embodiment, the sensor 312 may include a thermal camera configured to take thermal images, and the computer 310 is configured to estimate whether the occupant is engaged in the certain activity based on analysis of the thermal images. Optionally, the computer 312 may utilize variations of some of the approaches described above for analysis of visible-light images in order to analyze the thermal images.

In some embodiments, when the sensor 312 includes a camera (e.g., a visible-light camera or a thermal camera), the camera may be a head-mounted camera that is coupled to a frame worn by an occupant of the vehicle. For example, the frame may belong to smart glasses, an augmented reality headset, a mixed reality headset, or a virtual reality headset. Optionally, the head-mounted camera may be an inward-facing camera. In one example, images of an inward-facing head-mounted camera capture at least some parts of the person wearing the frame to which the inward-facing head-mounted camera is coupled. Optionally, the head-mounted camera may be an outward-facing camera. In one example, images of an outward-facing head-mounted camera capture at least some parts of a person who is not wearing the frame to which the outward-facing head-mounted camera is coupled. In another example, images of an outward-facing head-mounted camera capture at least some parts of a person who is wearing the frame to which the outward-facing head-mounted camera is coupled.

In yet another embodiment, the sensor 312 may include a radar configured to transmit electromagnetic waves and to receive their reflections, and the computer 310 is configured to estimate whether the occupant is engaged in the certain activity based on signal processing of the reflections. For example, US Patent App. No. 2016/0356877, titled "System and method for measuring an object location and/or orientation using radio frequency propagation measurements" describes a radar system for measuring objects' locations and orientations in space using multi-RF units.

In still another embodiment, the sensor 312 may include a sensor of a motion control device that does not require a physical contact with the occupant, such as the motion control device sold by Leap Motion®, Inc. of San Francisco, Calif., as the Leap Motion® Controller. Optionally, the motion control device creates three-dimensional images of the compartment to permit input to a computing device without the need for physical contact. For example, the Leap Motion® Controller includes a pair of cameras for acquiring images of an object, a number of LED light sources used to illuminate the object, and a computer for processing the images to identify and/or characterize the object.

An adverse outcome due to performing a certain activity during an SDRS event may involve harm or discomfort to an occupant of the vehicle, or may damage property inside the compartment (e.g., damage objects in the compartment or damage the compartment itself). Below are examples of various scenarios involving certain activities that may have an adverse outcome and specific warnings that may be provided to an occupant conducting such activities, while an SDRS event is imminent Such warnings may be provided shortly before, and/or while, the SDRS event occurs. Herein, "shortly before" refers to at most 30 seconds before the SDRS event. Optionally, warning the occupant is done at least one second before the SDRS event, or within some other time that may be required for the occupant to safely comply with an instruction given in the warning. In some cases, if only little time is available and/or it is important for the occupant to comply (e.g., in order to avoid serious bodily harms), the warning may be given with a sense of urgency (e.g., using a loud commanding voice).

In some embodiments, a warning provided to an occupant conducting in a certain activity that may have an adverse outcome if an SDRS event occurs includes specific details and/or instructions related to the certain activity. Such details can be helpful for an occupant who is unaware of the driving conditions (e.g., the occupant may be viewing digital content while conducting the activity); the specific instructions will enable the occupant to follow a simple command without requiring the occupant to analyze the situation (which may take time and lead to an incorrect action taken by the occupant). Additionally, the warning may optionally include a description of the SDRS event so the occupant has context as to why the warning is given. Optionally, the length of the description of the SDRS event, or whether a description is given at all, may depend on the amount of time until the SDRS event is expected to occur. For example, if five seconds or more are available, the warning may include a description of the SDRS event, such as "bumpy road ahead, please cover your beverage". But if only two seconds are available, the warning may be "Cover your beverage!".

In one example, the certain activity involves the occupant holding an object close to the face, and the specific action involves moving the object away from the face. In this example, the adverse outcome may be injury to the occupant, for instance, due to the SDRS causing the occupant's hand to jerk and the tool may hit the occupant's face. Examples of specific warnings that may be given, which are related to this certain activity, may include "Sharp turn ahead, please stop applying makeup" or "Put the tweezers down!".

In another example, the certain activity involves the occupant utilizing a sharp tool, and the specific action involves stopping the certain activity to reduce the probability of the sharp tool harming the occupant. In this example, the adverse outcome may be injury to the occupant, for instance, due to the SDRS causing the occupant's hand to jerk and the tool may hit the occupant's other hand Examples of specific warnings that may be given, which are related to this certain activity, may include "Slowing down, please stop your needle work!" or "Put the knitting needles away, immediately!".

In yet another example, the certain activity involves the occupant holding an object, and the specific action involves tightening the grip on the object. In this example, an "object" may refer to an inanimate object or to a live being such as an infant or pet. In this example, the adverse outcome may be damage to the object (or harm to the infant or pet). Examples of specific warnings that may be given, which are related to this certain activity, may include "Windy road ahead, make sure to hold on tight to Mr. Whiskers!" or "Hold on tight to your laptop!".

In yet another example, the certain activity involves the occupant eating or drinking from a receptacle, and the specific action involves covering the receptacle. In this example, the adverse outcome may be being scorched (from a hot beverage) or soiling the vehicle or the occupant (from a spilled beverage or spilled food). Examples of specific warnings that may be given, which are related to this certain activity, may include "Bumpy road ahead, please cover your coffee cup with the lid!" or "Cover your rice bowl!".

Given that the warnings provided by the safety system are related to the type of identified activities, the computer 310 may provide different specific warnings to the same occupant, for the same type of SDRS event, when different types of certain activities are detected. For example, given that an SDRS event involving a bumpy road is detected, in one instance, when an occupant is holding a hot beverage, the system may provide the occupant with a warning that goes along the lines "bumpy road ahead, please cover your beverage". In another instance, the same occupant (possibly even at the same location) may be warned "bumpy road ahead, please stop applying makeup", when a different activity is detected.

Figure 31A:
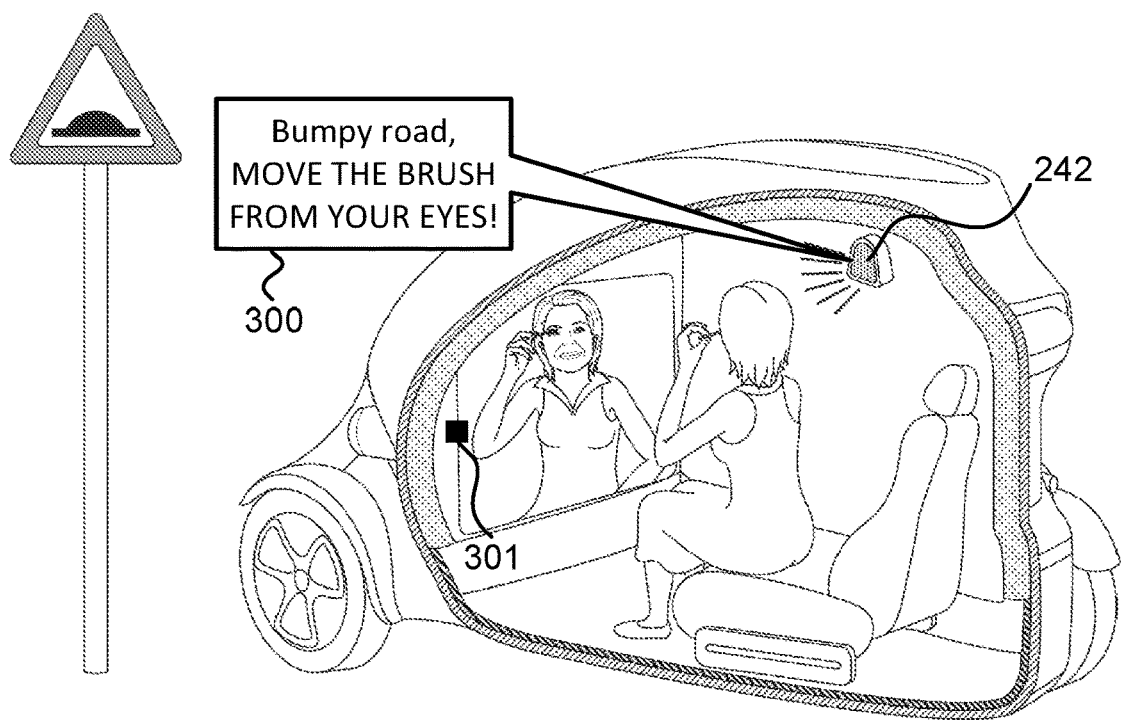
FIG. 31a illustrate cross sections of a vehicle with safety system configured to provide the specific warning "Bumpy road, MOVE THE BRUSH FROM YOUR EYES!" to an occupant engaged in a dangerous activity.
Figure 31B:
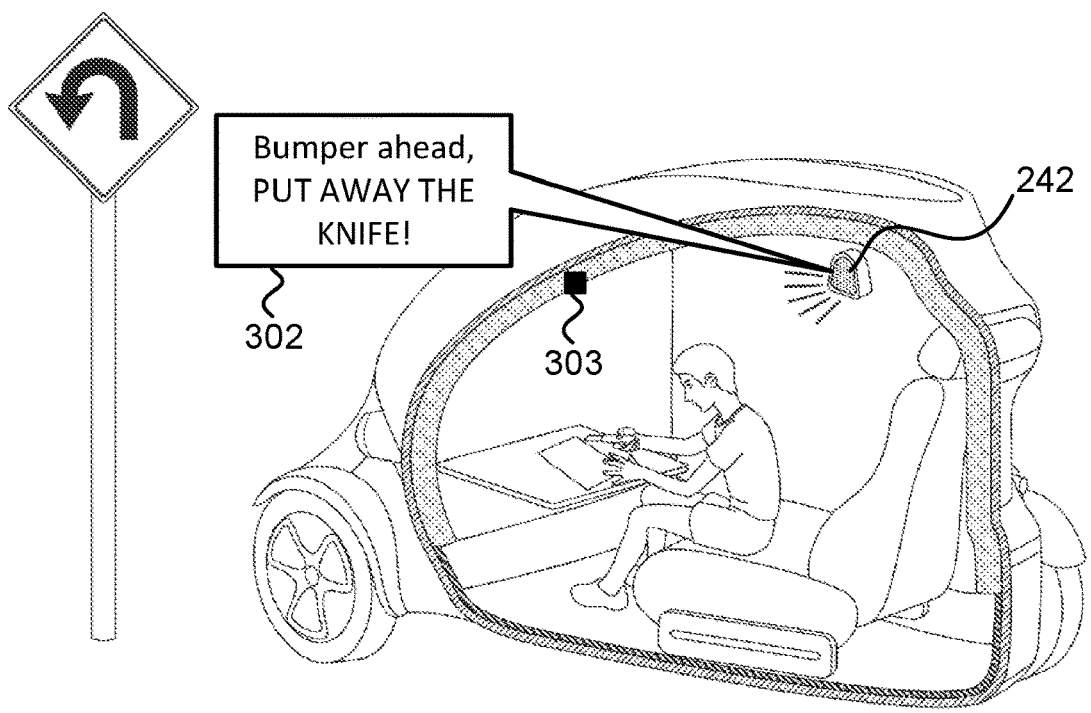
FIG. 31b illustrate cross sections of a vehicle with safety system configured to provide the specific warning "Bumper ahead, PUT AWAY THE KNIFE!" to an occupant engaged in a dangerous activity.

FIG. 31a and FIG. 31b each illustrate scenarios in which an occupant is provided with a specific warning based on a certain activity the occupant is engaged in when an SDRS event is imminent FIG. 31a illustrates an occupant that is estimated, based on measurements of a camera 301, to be engaged in an activity (applying cosmetics) that may be dangerous in the case of an SDRS event. The user interface 242, provides an audio warning 300: "Bumpy road, move the brush from your eyes!". FIG. 31b illustrates an occupant that is estimated, based on measurements of a camera 303, to be engaged in an activity (using a knife), which may have an adverse outcome in the case of an SDRS event. In this case, the safety system provides a different audio warning via the user interface 242, which is audio warning 302: "Bumper ahead, put away the knife!".

In some embodiments, at least some of the warnings provided due to detecting certain activities when an SDRS event is imminent may be predetermined warnings. For example, for some activities, the system may have a table of predetermined formats for warnings to provide for different detected activities. In other embodiments, the computer 310 may add to at least some of the warnings details extracted from analysis of the measurements of the sensor 312. For example, the computer 310 may utilize image analysis to identify what an occupant is holding or identities of the occupants of the vehicle. This can enable the computer 310 to generate warnings that have specific details related to the current identified activity. Thus, a warning may be a command to "put down the fork" (and not merely "put down the tool" or "put down what you are holding").

In some embodiments, the computer 310 is configured to detect a predetermined set of activities that are considered to have an adverse outcome in the case of an SDRS event. In other embodiments, the computer 310 may analyze the dynamics and physical environment in the compartment (e.g., location of objects, movements of occupants, etc.) in order to determine whether an occupant is engaging in a certain activity that may have an adverse outcome if conducted while an SDRS event occurs. In such a case, the computer 310 may need not be limited to a specific set of activities; rather, using domain knowledge (e.g., models of the relevant laws of physics) the computer 310 can detect and warn against various unanticipated activities.

In one embodiment, a method for providing specific warnings includes at least the following steps: In Step 1, receiving measurements of at least a portion of a vehicle compartment. In Step 2, estimating, based on the measurements, whether an occupant of the vehicle is engaged in a certain activity that can lead to an adverse outcome in case of a Sudden Decrease in Ride Smoothness (SDRS). And in Step 3, providing a specific warning to the occupant responsive to: receiving an indication indicative of an imminent SDRS event and estimating that the occupant is engaged in the certain activity. The specific warning describes a specific action related to the certain activity, which the occupant should take. In one embodiment, the method optionally includes the following steps: In Step 4, estimating that the occupant is engaged in a second certain activity that can lead to a second adverse outcome in case of a second SDRS event. And in Step 5, providing a second specific warnings to the occupant. The certain activity and the second certain activity are of different types, the imminent SDRS event and the second SDRS event are of the same type, and the specific warning and the second specific warning describe different specific actions to take.

In one example, the certain activity that warranted the specific warning in Step 3 involves the occupant holding an object close to the face, and the specific action described in the specific warning involves moving the object away from the face. In another example, the certain activity that warranted the specific warning in Step 3 involves the occupant eating or drinking from a receptacle, and the specific action described in the specific warning involves covering the receptacle.

In one embodiment, a non-transitory computer-readable medium is used in a computer to provide specific warnings; the computer comprises a processor, and the non-transitory computer-readable medium includes: program code for receiving measurements of at least a portion of a vehicle compartment; program code for estimating, based on the measurements, whether an occupant of the vehicle is engaged in a certain activity that can lead to an adverse outcome in case of an SDRS event; and program code for providing a specific warning to the occupant responsive to: receiving an indication indicative of an imminent SDRS event and estimating that the occupant is engaged in the certain activity (where the specific warning describes a specific action related to the certain activity, which the occupant should take). Optionally, the non-transitory computer-readable medium stores program code for estimating that the occupant is engaged in a second certain activity that can lead to a second adverse outcome in case of the a second SDRS, and provide a second specific warnings to the occupant; the certain activity and the second certain activity are of different types, the imminent SDRS event and the second SDRS event are of the same type, and the specific warning and the second specific warning describe different specific actions to take.

It has become more and more common for vehicle occupants to engage in various work- or entertainment-related activities. The activities typically involve various forms of displays which the occupants can view, e.g., instead of looking out of the vehicle. This can be a productive or entertaining way to pass the time spent traveling. And while the occupants may be mostly engaged in their work or entertainment, at times they might want to view the outside environment.

Traditionally, a vehicle occupant views the outside of the vehicle through physical windows. Most on-road vehicles, including autonomous and non-autonomous vehicles, include as part of the vehicle body one or more windows, such as a windshield, side windows, or a rear window. The purpose of these windows is to offer vehicle occupants a view of the outside world. However, this feature comes at a cost; there are several drawbacks to using windows in vehicles.

Vehicle windows are typically made of glass or other transparent stiff materials. This makes most windows heavy and often expensive to manufacture. In addition, windows are typically poor thermal insulators, which can greatly increase the energy demands of a vehicle's climate control systems, especially when the sun beats down. Furthermore, in the case of a collision, windows may put a vehicle's occupants at a risk such as being hit by external objects due to intrusion of foreign objects, being thrown out of the vehicle, or being struck by parts of the vehicle they are traveling in. Thus, there is a need for vehicles that can offer an advantage offered by windows (e.g., a view of the outside), which do not suffer from at least some of the shortcomings of vehicle windows, such as the increased safety risk that windows often pose. In order to enable an occupant of a vehicle to view the outside environment, without needing to look out of a physical window, some aspects of this disclosure involve systems that combine video see-through (VST) with video-unrelated-to-the-VST (VUR).

In one embodiment, a system configured to combine video see-through (VST) with video-unrelated-to-the-VST (VUR) includes a head-mounted display (HMD), a camera, an HMD tracking module and a computer. The HMD is configured to be worn by an occupant of a compartment of a moving vehicle and to present an HMD-video to the occupant. The camera, which is mounted to the vehicle, is configured to take video of the outside environment ($V_{out}$). The HMD tracking module is configured to calculate position of the HMD relative to the compartment, based on measurements of a sensor. The computer is configured to receive a location of a video see-through window (VSTW) in relation to the compartment, and to calculate, based on the position of the HMD relative to the compartment, a window-location for the VSTW on the HMD-video. Additionally, the computer is further configured to generate, based on the window-location and the $V_{out}$, the VST that represents a view of the outside environment from the point of view of the occupant. The computer is also configured to generate the HMD-video based on combining the VUR with the VST in the window-location. It is to be noted that the content of the VUR is unrelated to the video taken by the camera.

In one embodiment, a system configured to combine video see-through (VST) with video-unrelated-to-the-VST (VUR) includes at least the following components: a head-mounted display (HMD), such as HMD 15, a camera (e.g., camera 12), an HMD tracking module 27, and a computer 13. FIG. 1 provides a schematic illustration of at least some of the relationships between the components mentioned above.

The HMD 15 is configured to be worn by an occupant of a compartment of a moving vehicle and to present an HMD-video 16 to the occupant. In one embodiment, the HMD 15 is an augmented-reality (AR) HMD. In another embodiment, the HMD 15 is a virtual reality (VR) HMD. Optionally, in this embodiment, the system further comprises a video camera mounted to the VR HMD, and the VST video comprises video of the compartment received from the video camera mounted to the VR HMD. In yet another embodiment, the HMD 15 is a mixed reality HMD. The term "Mixed Reality" (MR) as used herein involves a system that is able to combine real world data with virtual data. Mixed Reality encompasses Augmented Reality and encompasses Virtual Reality that does not immerse its user 100% of the time in the virtual world. Examples of mixed reality HMDs include, but are not limited to, Microsoft HoloLens HMD and MagicLeap HMD.

The camera 12, which is mounted to the vehicle, is configured to take video of the outside environment ($V_{out}$). Optionally, the data captured by the camera comprises 3D data. For example, the camera may be based on at least one of the following sensors: a CCD sensor, a CMOS sensor, a near infrared (NIR) sensor, an infrared sensor (IR), and a device based on active illumination such as a LiDAR.

The HMD tracking module 27 is configured to calculate position of the HMD 15 relative to the compartment, based on measurements of a sensor. In different embodiments, the HMD tracking module 27 may have different configurations.

In one embodiment, the sensor comprises first and second Inertial Measurement Units (IMUs). In this embodiment, the first IMU is physically coupled to the HMD 15 and is configured to measure a position of the HMD 15, and the second IMU is physically coupled to the compartment and is configured to measure a position of the compartment. The HMD tracking module 27 is configured to calculate the position of the HMD 15 in relation to the compartment based on the measurements of the first and second IMUs.

In another embodiment, the sensor comprises an Inertial Measurement Unit (IMU) and a location measurement system. In this embodiment, the IMU is physically coupled to the HMD 15 and is configured to measure an orientation of the HMD 15. The location measurement system is physically coupled to the compartment and is configured to measure a location of the HMD in relation to the compartment. The HMD tracking module 27 is configured to calculate the position of the HMD 15 in relation to the compartment based on the measurements of the IMU and the location measurement system. Optionally, the location measurement system measures the location of the HMD 15 in relation to the compartment based on at least one of the following inputs: a video received from a camera that captures the HMD 15, a video received from a stereo vision system, measurements of magnetic fields inside the compartment, wireless triangulation measurements, acoustic positioning measurements, and measurements of an indoor positioning systems.

Figure 2:
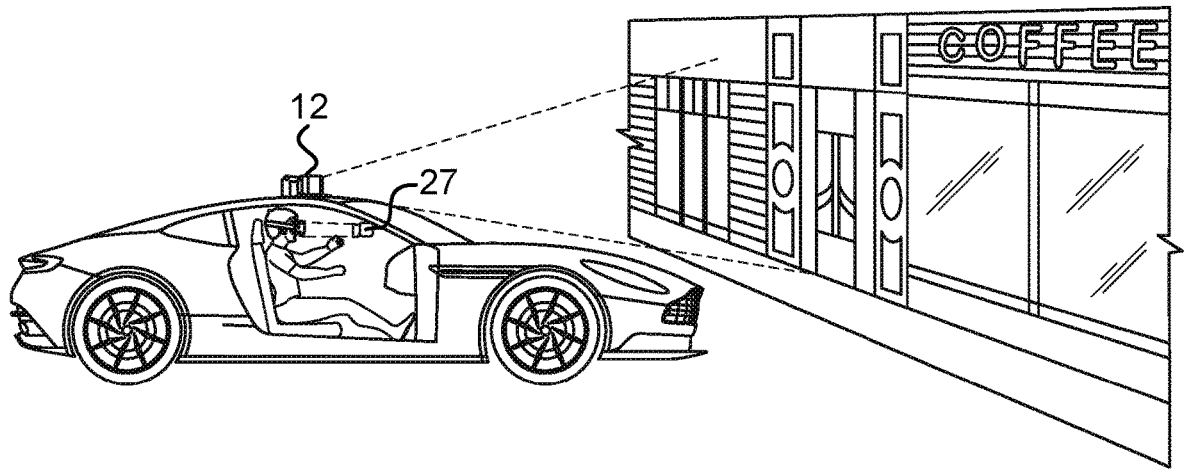
FIG. 2 illustrates an HMD tracking module that measures the position of the HMD relative to the compartment.

FIG. 2 illustrates one embodiment in which the HMD tracking module 27 is physically coupled to the compartment and is configured to measure the position of the HMD relative to the compartment. The HMD tracking module 27 may utilize a passive camera system, an active camera system that captures reflections of a projected grid, and/or a real-time locating systems based on microwaves and/or radio waves. The computer 13 is configured to receive a location of a video see-through window (VSTW) in relation to the compartment, and to calculate, based on the position of the HMD relative to the compartment, a window-location for the VSTW on the HMD-video. The computer 13 is also configured to generate, based on the window-location and the $V_{out}$, the VST that represents a view of the outside environment from the point of view of the occupant. Optionally, the VST is rendered as a 3D video content. Additionally, the computer 13 is further configured to generate the HMD-video 16 based on combining the VUR with the VST in the window-location. The computer 13 may use various know in the art computer graphics functions and/or libraries to generate the VST, transform the VST to the occupant's point of view, render the 3D video content, and/or combine the VUR with the VST.

In one embodiment, the content of the VUR does not change when the occupant moves the head, and the content of the VUR is unrelated to the video taken by the camera. Additionally, the content of the VUR is generated based on data that was received more than 2 seconds before the HMD-video 16 is displayed to the occupant. Some examples of the VUR include a video stream of at least one of the following types of content: a recorded television show, a computer game, an e-mail, and a virtual computer desktop.

Figure 3:
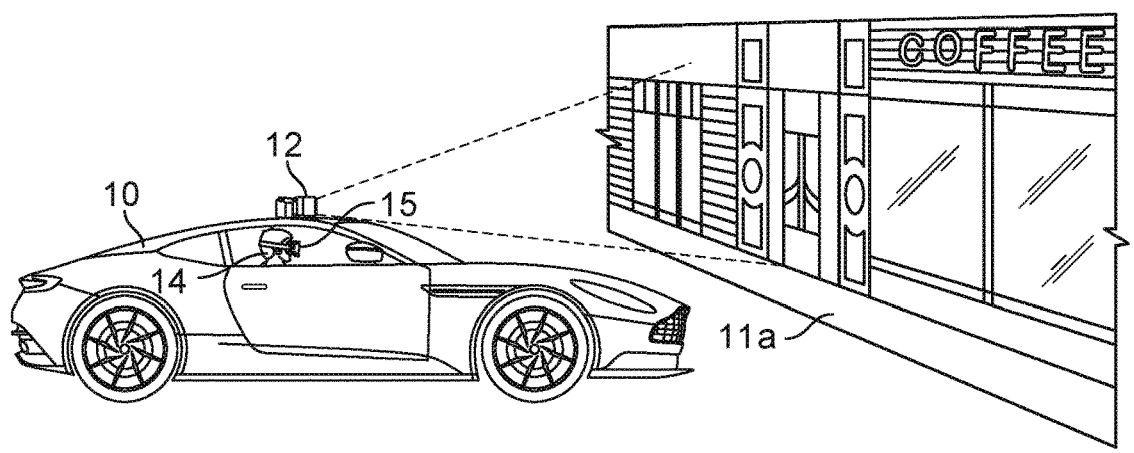
FIG. 3 illustrates a vehicle in which an occupant wears an HMD.

FIG. 3 illustrates one embodiment in which the occupant 14 wears an HMD 15. The HMD 15 provides video to the occupant 14 through the display of the HMD 15. The vehicle includes a camera 12 that takes video of the outside environment 11a and processes it in a manner suitable for the location of the occupant. The processed video is provided to the occupant's display in the HMD 15 as a VSTW and the position of the VSTW is calculated in relation to the compartment of the vehicle and moves with the compartment. While the vehicle is in motion, the VSTW change its content to represent the outside environment 11*a* of the vehicle. Whereas the video-unrelated-to-the-VST doesn't change when the occupant moves his head. The computer is configured to receive a location of a VSTW in relation to the compartment, and to calculate, based on the position of the occupant's head, a window-location for the VSTW on the video.

Figure 4:
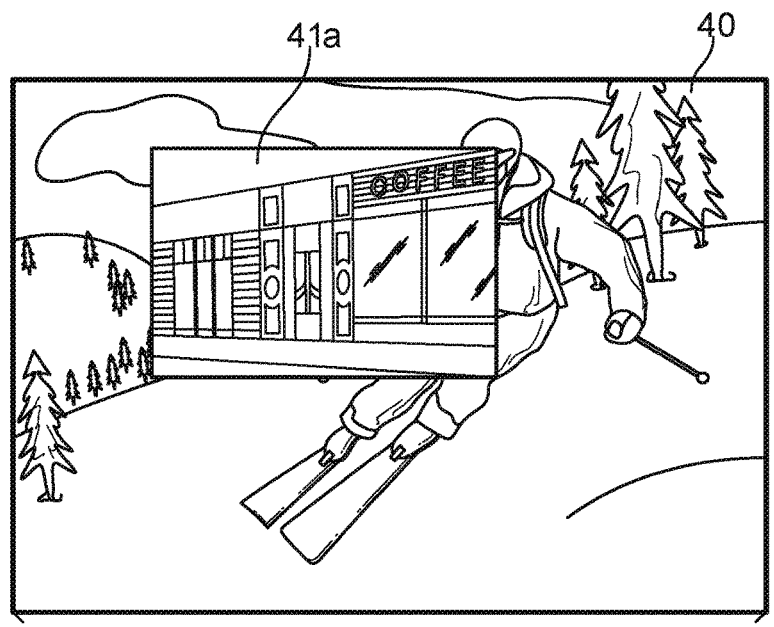
FIG. 4 illustrates an occupant wearing an HMD and viewing large VUR and smaller VST.
Figure 4:
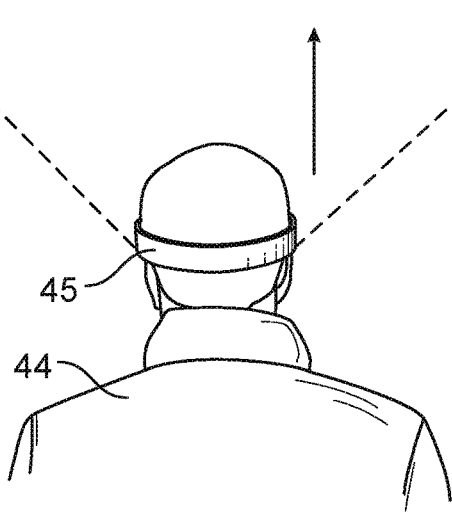

FIG. 4 illustrates one embodiment in which the occupant 44 wears HMD 45 and views large VUR 40 and smaller VST 41*a*. The VUR 40 does not change when the occupant's head 44 moves. The VSTW presents video of the street based on video taken by the camera that is mounted to the vehicle. The location of the video-see-through window in relation to the compartment does not change when the occupant 44 moves his/her head in order to imitate a physical window that does not change its position relative to the compartment when the occupant's head moves.

Figure 5B:
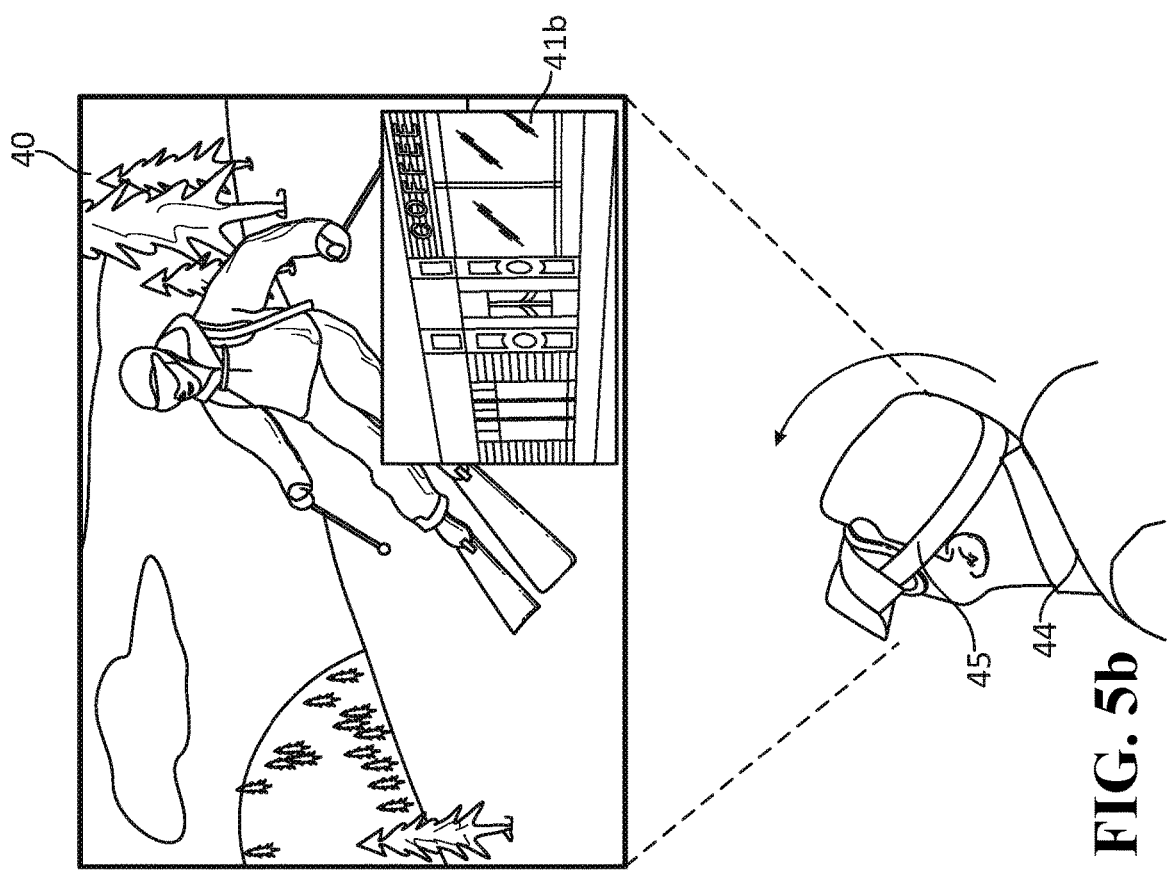
FIG. 5b illustrates how the VST moves to the bottom right when the occupant looks to the upper left.
Figure 5A:
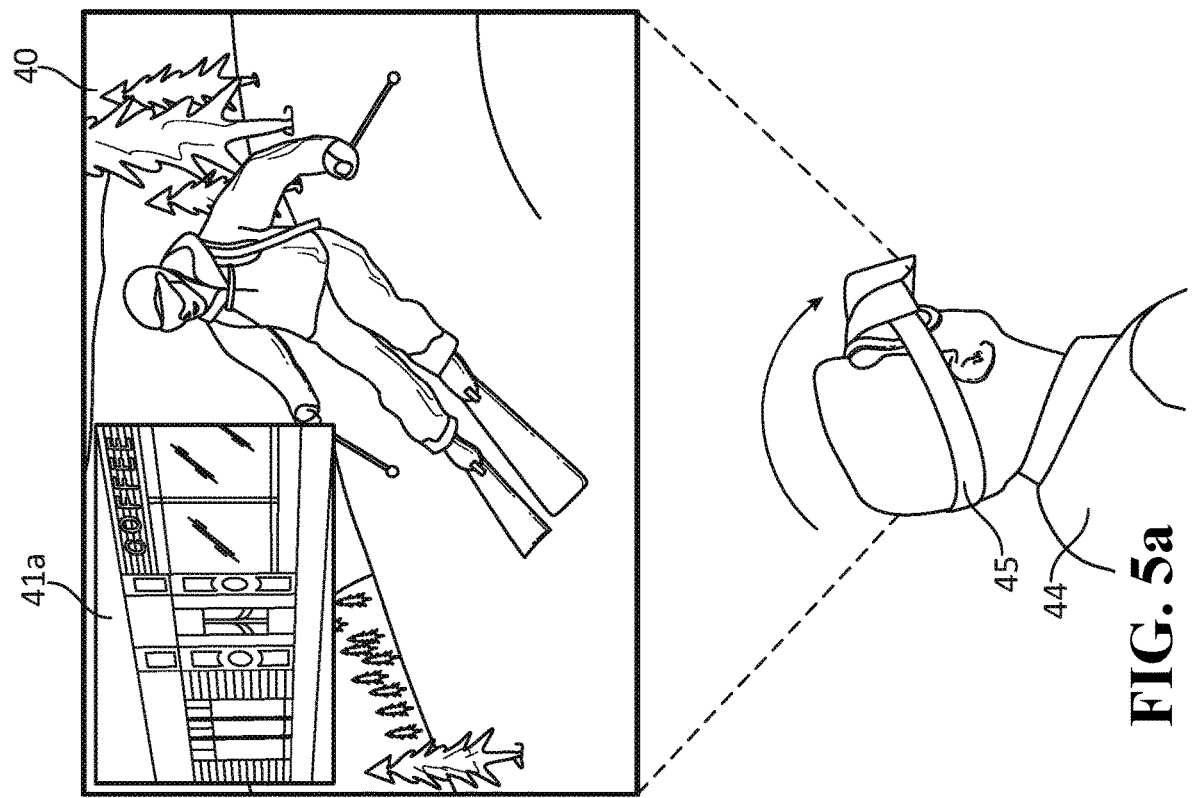
FIG. 5a illustrates how the VST moves to the upper left when the occupant looks to the bottom right.

FIG. 5*a* illustrates how, in one embodiment, the VST moves to the upper left when the occupant 44 looks to the bottom right. FIG. 5*b* illustrates how the VST moves to the bottom right when the occupant 44 looks to the upper left, while the VUR moves with the head. In both cases, the VUR moves with the head while the location of the VST changes according to the movement of the head relative to the compartment as measured by the HMD tracking module 27.

In some embodiments, the content of the VUR may be augmented-reality content, mixed-reality content, and/or virtual-reality content rendered to correspond to the occupant's viewing direction. In this embodiment, the VUR is unrelated to the video taken by the camera. In one example, the VUR may include a video description of a virtual world in which the occupant may be playing a game (e.g., represented by an avatar). Optionally, in this example, most of the features of the virtual world are different from the view of the outside of the vehicle (as seen from the occupant's viewing direction). For example, the occupant may be driving in a city, while the virtual world displays woods, a meadow, or outer space. In another example, the VUR may include augmented reality content overlaid above a view of the inside of the compartment.

In addition to the components described above, in some embodiments, the system may include a second camera that is mounted to the HMD and is configured to take video of the compartment ($V_{comp}$). In this embodiment, the computer is further configured to generate a compartment-video (CV), based on $V_{comp}$ and a location of a compartment-video window (CVW) in relation to the HMD-video (e.g., HMD-video 16), and to generate the HMD-video also based on the CV in the CVW, such that the HMD-video combines the VUR with the VST in the window-location and with the CV in the CVW. There are various ways in which the CVW may be incorporated into the HMD-video. Some examples of these approaches are illustrated in the following figures.

Figure 6:
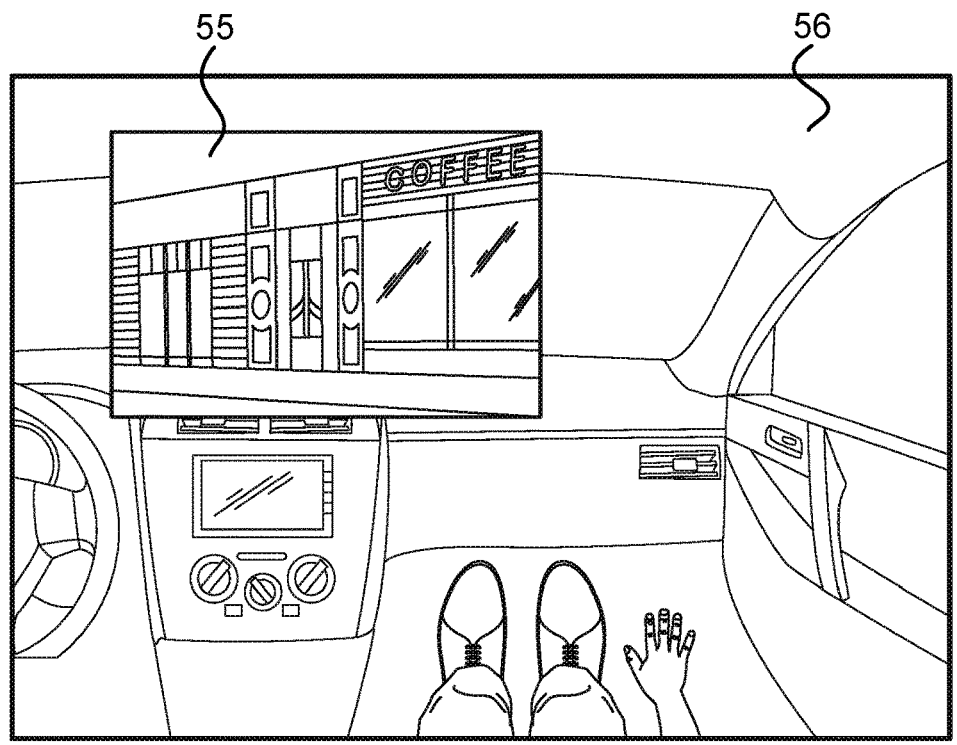
FIG. 6 illustrates HMD-video that includes both a non-transparent VST and video that shows the hands of the occupant and the interior of the compartment.
Figure 7:
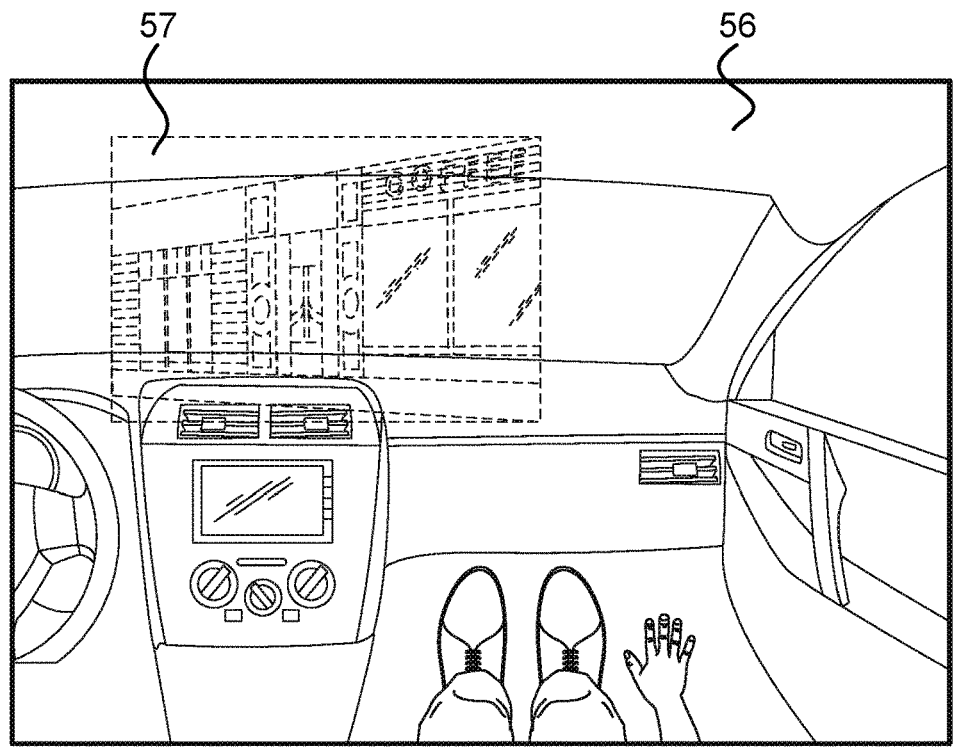
FIG. 7 illustrates HMD-video that includes both a partially transparent VST and video that shows the hands of the occupant and the interior of the compartment.
Figure 8A:
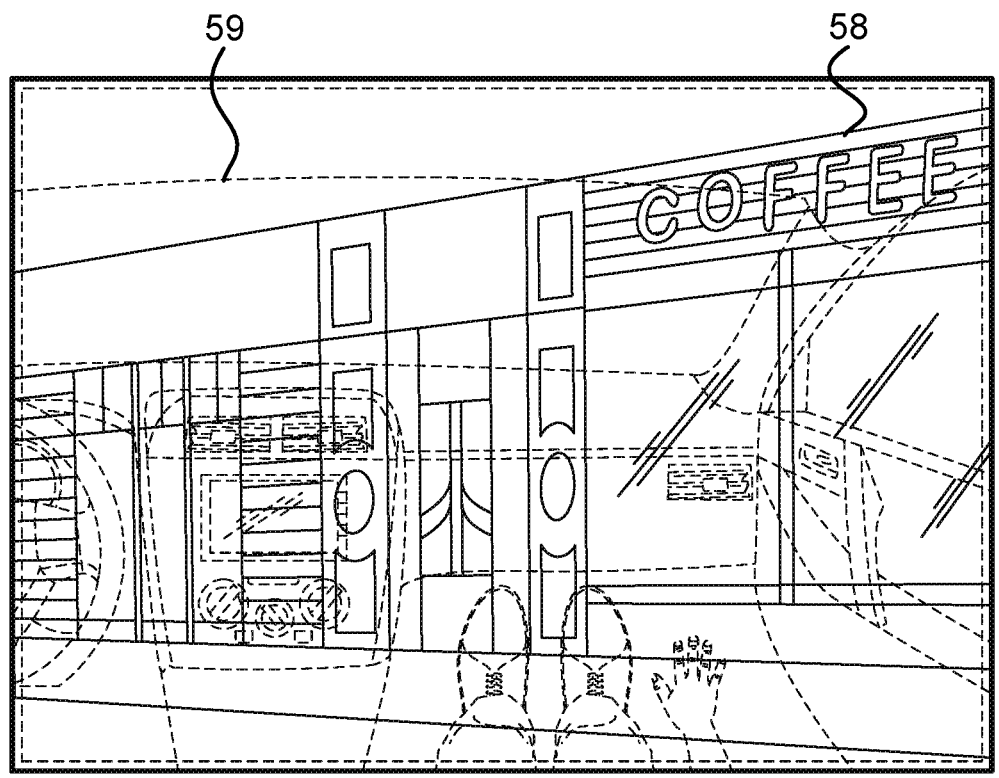
FIG. 8a illustrates HMD-video that includes a VST and partially transparent video that shows the hands of the occupant and the interior of the compartment.

FIG. 6 illustrates HMD-video that includes both a non-transparent VST 55 in the window-location and a CV 56 that shows the hands of the occupant and the interior of the compartment in the CVW. FIG. 7 illustrates HMD-video that includes both a partially transparent VST 57 in the window-location and the CV 56 that shows the hands of the occupant and the interior of the compartment in the CVW. FIG. 8*a* illustrates HMD-video that includes a VST 58 and partially transparent CV 59. The figure illustrates that the occupant sees the outside environment in full field-of-view (FOV), while on top of it there is a partially transparent image (illustrated as dotted image) of the compartment and the hands of the occupant, in order to help the occupant not to hit things in the compartment.

Figure 9A:
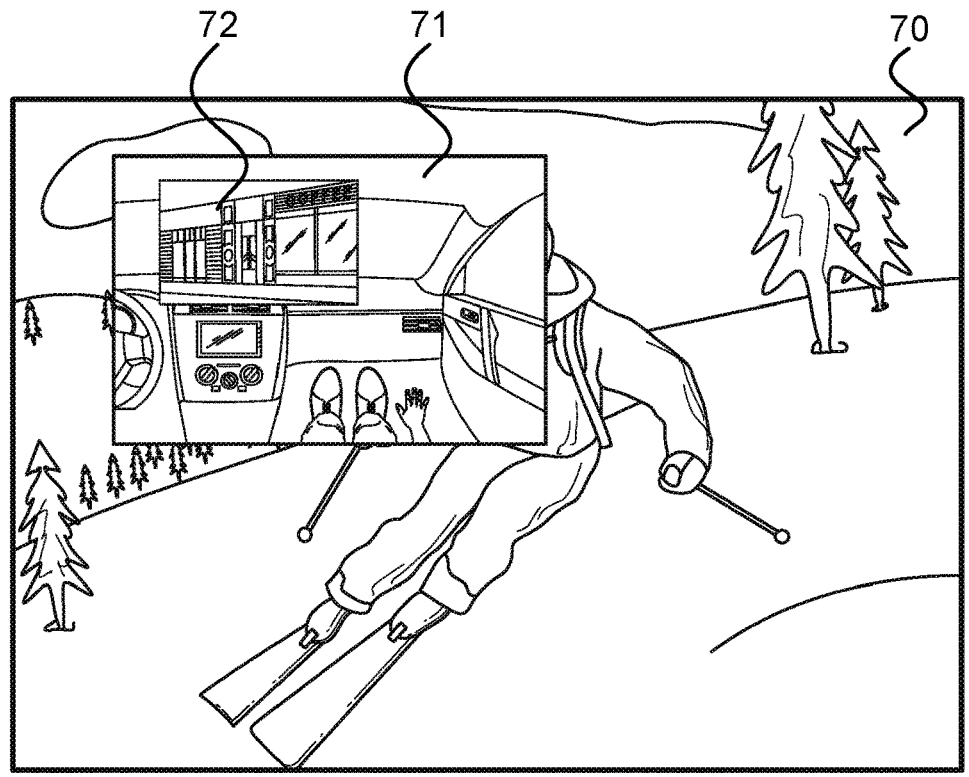
FIG. 9a illustrates HMD-video that includes a VUR in full FOV, a first window comprising compartment-video (CV) and a second smaller window comprising the VST.
Figure 9B:
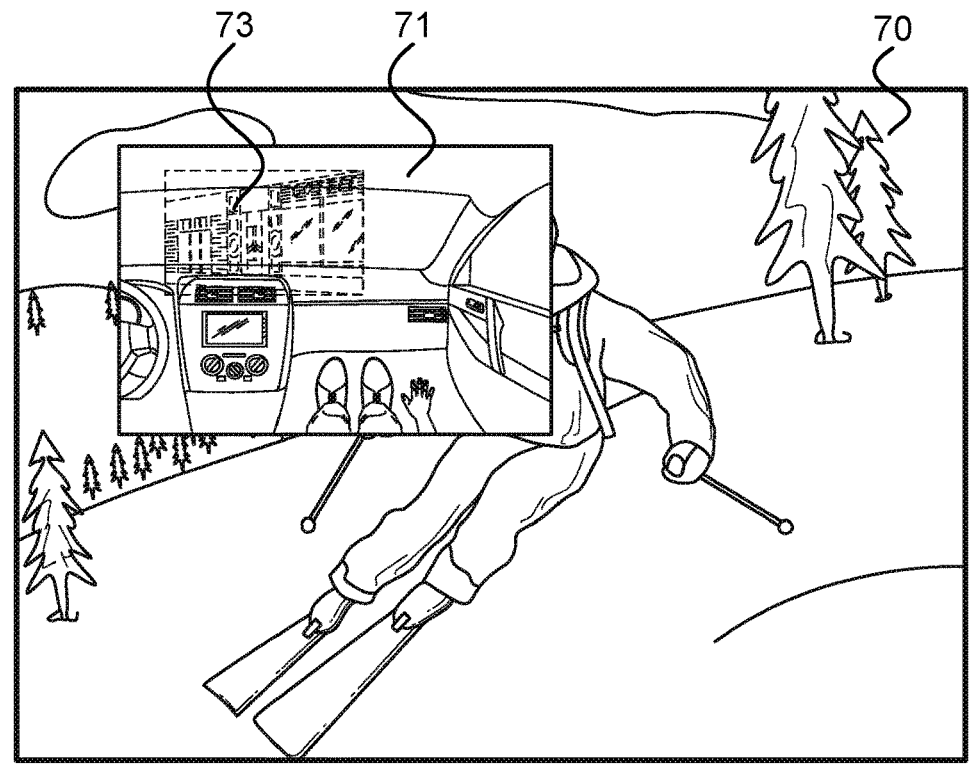
FIG. 9b illustrates HMD-video that includes VUR in full FOV, a first window comprising the CV and a second partially transparent smaller window comprising the VST.
Figure 10A:
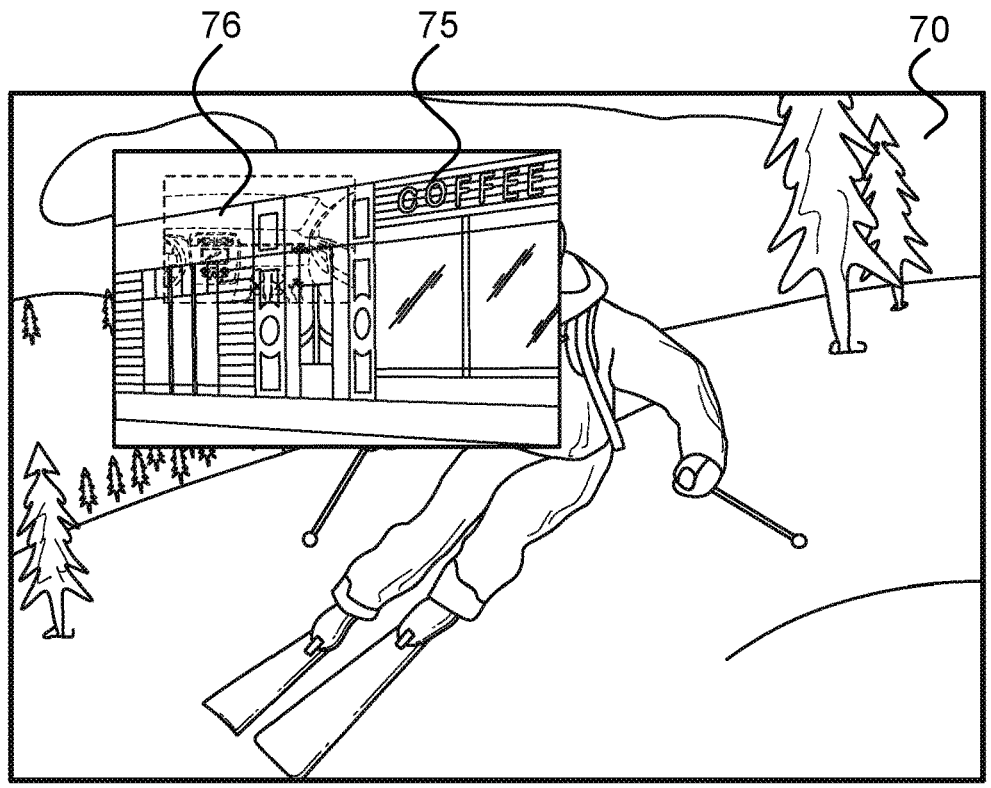
FIG. 10a illustrates HMD-video that includes VUR in full FOV, a first window comprising VST and a second smaller window comprising zoom out of the CV.
Figure 10B:
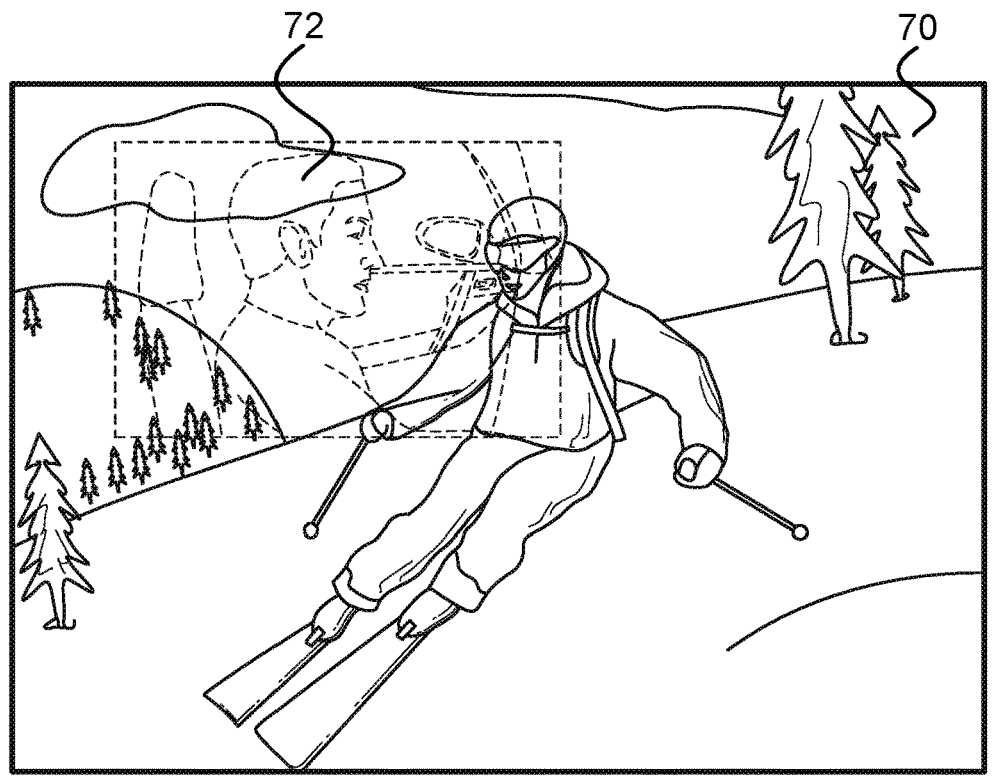
FIG. 10b illustrates HMD-video that includes VUR and a partially transparent CV.

FIG. 9*a* illustrates HMD-video that includes a VUR 70 in full FOV, a first window comprising the CV 71 in the CVW and a second smaller window comprising the VST 72 in the window-location. FIG. 9*b* illustrates HMD-video that includes VUR 70 in full FOV, a first window comprising the CV 71 in the CVW and a second partially transparent smaller window comprising the VST 73 in the window-location. FIG. 10*a* illustrates HMD-video that includes VUR 70 in full FOV, a first window comprising VST 75 in the window-location and a second smaller window comprising zoom out of the CV 76 in the CVW. Optionally, the cabin view in the zoom out is smaller than in reality, and may enable the occupant to orient in the cabin. Optionally, the occupant may move the CVW, as illustrated in FIG. 10*a* where the zoom out of the CV in the CVW is somewhat above its location in reality. FIG. 10*b* illustrates HMD-video that includes VUR 70 and a partially transparent CV 72. Here a first occupant sees the VUR in full field-of-view (FOV), and on top of it there is a partially transparent image of the compartment and a second occupant that sits to the left of the first occupant, which may help the first occupant not to hit the second occupant.

There may be various ways in which the system determines the location and/or size of the VSTW. In one embodiment, the VSTW is pinned to at least one of the following locations: a specific physical location and a location of an object in the compartment, such that the location of the VSTW in relation to the compartment does not change when the occupant moves his/her head with the HMD 15 as part of watching the HMD-video 16 and without commanding the VSTW to move in relation to the compartment.

In another embodiment, the system includes a user interface configured to receive a command from the occupant to move and/or resize the VSTW in relation to the compartment. In one example, the command is issued through a voice command (e.g., saying "move VST to the bottom"). In another example, the command may be issued by making a gesture, which is detected by a gesture control module in the compartment and/or on a device of the occupant (e.g., as part of the HMD). Optionally, in this embodiment, the computer is further configured to: update the window-location based on the command from the occupant, and generate an updated VST based on the updated window-location and the video taken by the camera. In this embodiment, the VST and the updated VST present different VSTW locations and/or dimensions in relation to the compartment. Optionally, the HMD is configured not to present any part of the VST to the occupant when the window-location is not in the field of view presented to the occupant through the HMD.

In yet another embodiment, the system may further include a video analyzer configured to identify an Object Of Interest (OOI) in the outside environment. For example, the OOI of interest may be a certain landmark (e.g., a building), a certain object (e.g., a store or a certain model of automobile), or a person. In this embodiment, the computer is further configured to receive, from the video analyzer, an indication of the position of the OOI, and to track the OOI by adjusting the window-location according to the movements of the vehicle, such that the OOI is visible via the VST. Optionally, the HMD is configured not to present any part of the VST to the occupant when the window-location is not in the field of view presented to the occupant through the HMD.

The VST that represents the view of the outside environment from the point of view of the occupant, in some embodiments, does not necessarily match the video taken by the cameras. In one embodiment, the VST may utilize image enhancement techniques to compensate for outside lighting conditions, to give an occupant an experience similar to looking out through a conventional vehicle window but without the view being distorted by raindrops or dirt on the window, and/or to improve the visual impression of the outside environment e.g. by showing background images which are different from those retrievable from the outside environment. Additionally or alternatively, the VST may mimic the outside environment, alter the outside environment, and/or be completely different from what can be seen on the outside environment. The VST may be focused on providing visual information that makes the travelling more fun. The vehicle may provide different styles of the outside environment to different occupants in the vehicle, such that a first VST provided to a first occupant may mimic the outside environment, while a second VST provided to a second occupant may alter the outside environment and/or be completely different from the outside environment, optionally for comfort enhancement and/or entertainment.

In some embodiments, the VST is informative, and aids at least some of the occupants to determine the location of the vehicle in the environment. In one embodiment, at least some of those occupants could not determine their location without the VST. In one example, less than 20% of average vehicle occupants, who are familiar with the outside environment, are able to determine their real location in the outside environment by watching the VUR, without using a map, with a margin of error that is less than 100 meters, and while the vehicle travels; while more than 20% of the average vehicle occupants, who are familiar with the outside environment, are able to determine their real location in the outside environment by watching the VST, without using a map, and with a margin of error that is less than 100 meters, and while the vehicle travels.

Figure 11A:
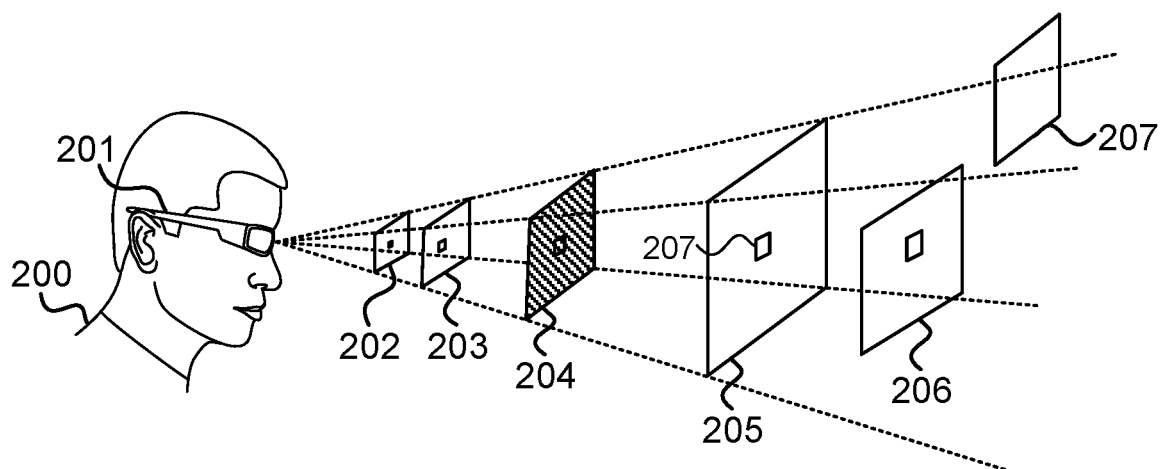
FIG. 11a, FIG. 11b, and FIG. 11c illustrate various fields of views used herein.

FIG. 11a illustrates a FOV in the context of presented video and terminology used herein. The vehicle occupant 200 wears an HMD 201 that presents HMD-video (such as HMD-video 16). The HMD-video may be presented at a single focal plane, or at multiple focal planes, depending on the characteristics of the HMD 201 (when the occupant focuses on a certain focal plane, then his/her point of gaze is said to be on the certain focal plane). In addition, the presented objects may be two-dimensional (2D) virtual objects and/or three-dimensional (3D) virtual objects that may also be referred to as holographic objects. Element 204 represents the location of a nontransparent element physically coupled to the vehicle compartment. In one example, the HMD 201 is a holographic HMD, such as Microsoft HoloLens, which can present content displayed on a series of focal planes that are separated by some distance. The virtual objects may be presented before the nontransparent element (e.g., polygons 202, 203), essentially on the nontransparent element 204, and/or beyond the nontransparent element (e.g., polygons 205, 206). As a result, the occupant's gaze distance may be shorter than the distance to the nontransparent element (e.g., distance to polygons 202, 203), essentially equal to the distance to the nontransparent element 204, and/or longer than the distance to the nontransparent element (e.g., distance to polygons 205, 206). Polygon 207 represents a portion of the presented video at eye level of the vehicle occupant, which in one example is within ±7 degrees from the horizontal line of sight. Although the figure illustrates overlapping FOVs of polygons 202, 203, 204, and 205, the HMD may show different objects, capturing different FOVs, at different focal planes. In one example, the HMD may project an image throughout a portion of, or all of, a display volume. Further, a single object such as a vehicle could occupy multiple volumes of space.

According to the terminology used herein, the nontransparent element 204 is said to be located on FOV overlapping the FOV of polygons 205 and 203 because polygons 203, 204, 205 share the same FOV. FOV of polygon 206 is contained in the FOV of polygon 204, and FOV of polygon 207 intersects the FOV of polygon 204. FOV of polygon 203 is before the nontransparent element 204 and therefore may hide the nontransparent element 204 partially or entirely, especially when utilizing a multi-focal plane HMD.

Figure 11B:
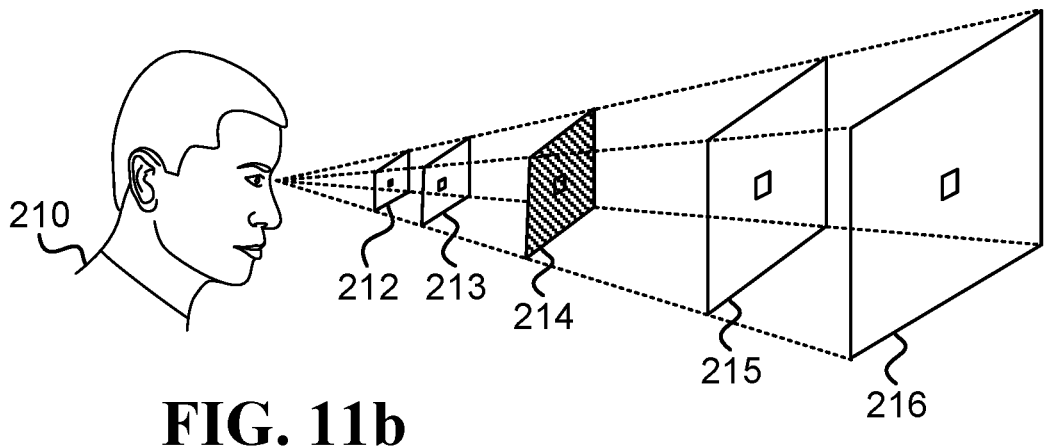
Figure 11C:
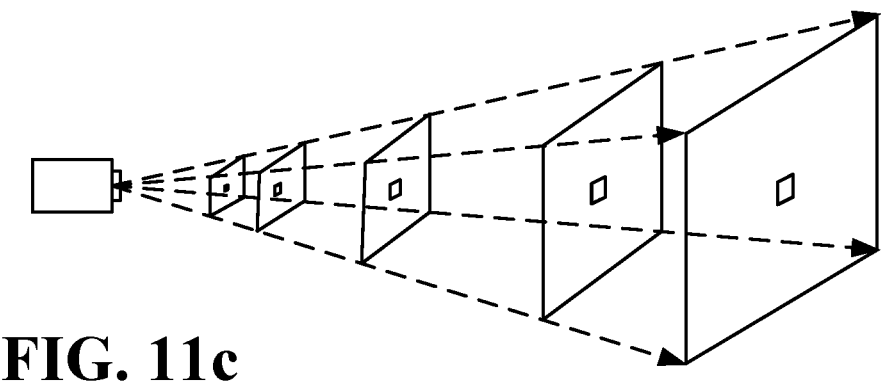

FIG. 11b illustrates a FOV in the context of the presented video, where the vehicle occupant 210 does not wear an HMD that presents the video, such as when watching an autostereoscopic display. The autostereoscopic display is physically located on plane 214 and the presented video may be presented at a single focal plane, or at multiple focal planes, depending on the characteristics of the autostereoscopic display. In one example, the autostereoscopic display is a holographic display, such as SeeReal Technologies holographic display, where the presented video may present virtual objects before the focal plane of the autostereoscopic display (e.g., planes 212, 213), essentially on the focal plane of the autostereoscopic display 214, and/or beyond the focal plane of the autostereoscopic display (e.g., planes 215, 216). As a result, the occupant's gaze distance may be shorter than the distance to the autostereoscopic display (e.g., planes 212, 213), essentially equal to the distance to the autostereoscopic display 214, and/or longer than the distance to the autostereoscopic display (e.g., planes 215, 216). The term "autostereoscopic" includes technologies such as automultiscopic, glasses-free 3D, glassesless 3D, parallax barrier, integral photography, lenticular arrays, Compressive Light Field Displays, holographic display based on eye tracking, color filter pattern autostereoscopic display, volumetric display that reconstructs light field, integral imaging that uses a fly's-eye lens array, and/or High-Rank 3D (HR3D). FIG. 11c illustrates FOV of a 3D camera that is able to capture sharp images from different focal lengths.

In some embodiments, the vehicle and/or the HMD utilize at least one Inertial Measurement Unit (IMU), and the system utilizes an Inertial Navigation System (INS) to compensate imperfections in the IMU measurements. An INS typically has one or more secondary navigation sensors that provide direct measurements of the linear velocity, position and/or orientation of the vehicle. These secondary navigation sensors could be anything from stereo vision systems, to GPS receivers, to digital magnetic compasses (DMCs) or any other type of sensor that could be used to measure linear velocity, position and/or orientation. In one example, the information from these secondary navigation sensors is incorporated into the INS using an Extended Kalman Filter (EKF). The EKF produces corrections that are used to adjust the initial estimations of linear velocity, position and orientation that are calculated from the imperfect IMU measurements. Adding secondary navigation sensors into an INS can increase its ability to produce accurate estimations of the linear velocity, position and orientation of the vehicle over long periods of time.

In one embodiment, the system utilizes domain specific assumptions in order to reduce drift of an INS used to calculate the HMD spatial position in relation to the compartment. More specifically, the following methods may be used to reduce or correct drift. Such methods generally fall in the categories of using sensor fusion and/or domain specific assumptions.

(i) Sensor fusion refers to processes in which signals from two or more types of sensors are used to update and/or maintain the state of a system. In the case of INS, the state generally includes the orientation, velocity and displacement of the device measured in a global frame of reference. A sensor fusion algorithm may maintain this state using IMU accelerometer and gyroscope signals together with signals from additional sensors or sensor systems. There are many techniques to perform sensor fusion, such as Kalman filter and particle filter.

One example of periodically correcting drift is to use position data from a triangulation positioning system relative to the compartment. Such systems try to combine the drift free nature of positions obtained from the triangulation positioning system with the high sampling frequency of the accelerometers and gyroscopes of the IMU. Roughly speaking, the accelerometer and gyroscope signals are used to 'fill in the gaps' between successive updates from the triangulation positioning system.

Another example of reducing the drift is using a vector magnetometer that measures magnetic field strength in a given direction. The IMU may contain three orthogonal magnetometers in addition to the orthogonal gyroscopes and accelerometers. The magnetometers measure the strength and direction of the local magnetic field, allowing the north direction to be found.

(ii) In some embodiments, it is possible to make domain specific assumptions about the movements of the occupant and/or the vehicle. Such assumptions can be used to minimize drift. One example in which domain specific assumptions may be exploited is the assumption that when the vehicle accelerates or decelerates significantly, the HMD accelerates or decelerates essentially the same as the vehicle, allowing HMD drift in velocity to be periodically corrected based on a more accurate velocity received from the autonomous-driving control system of the vehicle. Another example in which domain specific assumptions may be exploited is the assumption that when the vehicle accelerates or decelerates significantly, the HMDs of two occupants travelling in the same vehicle accelerate or decelerate essentially the same, allowing HMD drifts to be periodically corrected based on comparing the readings of the two HMDs. Still another example in which domain specific assumptions are exploited is the assumption that the possible movement of an HMD of a belted occupant is most of the time limited to a portion of the compartment, allowing HMD drifts to be periodically corrected based on identifying when the HMD exceeds beyond that portion of the compartment.

In one example, it may be desirable to adjust the position of displaying a virtual object in response to relative motion between the vehicle and the HMD so that the virtual object would appear stationary in location. However, the HMD IMU may indicate that the HMD is moving even when the detected motion is a motion of the vehicle carrying the HMD. In order to distinguish between motion of the HMD caused by the vehicle and motion of the HMD relative to the vehicle, non-HMD sensor data may be obtained by the HMD from sensor such as an IMU located in the vehicle and/or the GPS system of the vehicle, and the motion of the vehicle may be subtracted from the motion of the HMD in order to obtain a representation of the motion of the HMD relative to the vehicle. By differentiating movements of the HMD caused by the occupant motion compared to movements caused by the vehicle motion, the rendering of the virtual object may be adjusted for the relative motion between the HMD and the vehicle.

Using the nontransparent element, instead of a transparent glass window that provides the same FOV to the outside environment, may provide various benefits, such as: (i) reduced manufacturing cost of the vehicle compared to a similar vehicle having instead of the nontransparent element a transparent glass window that provides the same FOV to the outside environment as provided by the 3D display device, (ii) reduced weight of the vehicle compared to a similar vehicle having instead of the nontransparent element a transparent glass window that provides the same FOV to the outside environment as provided by the 3D display device, and provides the same safety level, (iii) better aerodynamic shape and lower drag for the vehicle, which results in an improved energy consumption, and (iv) improved privacy for the occupant as a result of not enabling an unauthorized person standing nearby the vehicle to see the occupant directly.

The term "real-depth VST window (VSTW)" is defined herein as an imaging display that shows a 3D image of an outside environment located beyond a wall that interrupts the occupant's unaided view of the outside environment. The real-depth VSTW has the following characteristics: (i) the 3D image corresponds to a FOV to the outside environment beyond the wall, as would have essentially been seen by the occupant had the wall been removed; (ii) the outside environment is captured by a camera, and the rendering of the 3D image is based on images taken by the camera; and (iii) while looking via the imaging display, the occupant's point of gaze (where one is looking) is most of the time beyond the wall that interrupts the occupant's unaided view of the outside environment.

A possible test to determine whether "(i) the 3D image corresponds to a FOV to the outside environment beyond the wall, as would have essentially been seen by the occupant had the wall been removed" is whether an imaginary user standing beyond the wall, watching both the real-depth VSTW and the outside environment, would recognize that at least 20% of the contours of objects in the 3D image correspond to the contours of the objects seen on the outside environment. Differences between the colors of the corresponding objects in the 3D image and the outside environment usually do not affect the criterion of the 20% corresponding contours, as long as the color difference does not affect the perception of the type of object. For example, different skin colors to corresponding people in the 3D image and the outside environment do not violate the criterion of the 20% corresponding contours. As another example, differences in the weight and/or height of corresponding objects in the 3D image and the outside environment do not violate the criterion of the 20% corresponding contours as long as the imaginary user understands that the objects correspond to the same person.

Sentences such as "from the FOV of the occupant" are to be interpreted as no more than 20 degrees angular deviation from the field of view of the occupant to the outside environment. Zoom in/out does not affect the FOV as long as the average occupant would still recognize the rendered environment as the 3D VST. For example, zoom in of up to ×4, which maintains no more than 20 degrees angular deviation from the FOV of the occupant to the outside environment, is still considered "from the FOV of the occupant". Reasonable lateral deviation essentially does not affect the FOV as long as the average occupant would still recognize the rendered environment as the 3D VST. For example, displaying to the occupant the outside environment from the FOV of a camera located on the roof of the occupant's vehicle, is still considered as showing the outside environment from the occupant's FOV.

A possible test to determine whether "(ii) the outside environment is measured by a camera, and the images taken by the camera are used to render the 3D image" is whether the real-depth VSTW would display a different 3D VST when it does not receive the images taken by the camera. For example, assuming the camera is a 3D video camera, and the 3D image is a manipulation of the images taken by the 3D video camera; then, when the real-depth VSTW does not receive the images, it cannot show the changes that are taking place in the outside environment. As another example, assuming the 3D image is mainly rendered from cached data stored in a database, and the camera is used to provide the setup of objects that behave in an unknown way, such as trajectories of nearby vehicles on the road, or a gesture of a person walking beyond the wall; then, when the output of the camera is used to render the 3D image, the real-depth VSTW would represent the unknown trajectory of the nearby vehicles or the unknown gesture of the person, while when the output of the camera is not used to render the 3D image, the real-depth VSTW would not represent the unknown trajectory of the nearby vehicles or the unknown gesture of the person merely because the renderer does not have that data.

A possible test to determine whether "(iii) the occupant's point of gaze (where one is looking) is most of the time beyond the wall that interrupts the occupant's unaided view of the outside environment" includes the following steps: (a) use eye tracker to determine the point of gaze on a representative scenario, (b) measure the distance to the wall, and (c) determine whether the average gaze distance is longer than the distance to the wall.

It has become more and more common for vehicle occupants to engage in various work- or entertainment-related activities. The activities typically involve various forms of displays which the occupants view, e.g., instead of looking out of the vehicle, can offer a productive or entertaining way to pass the time spent traveling. The quality of viewing experience can be influenced by the amount of ambient light that penetrates the vehicle. US patent application num. 20150261219 describes an autonomous mode controller configured to control the operation of shaded vehicle windows. However, the operation is unrelated to watching video. Thus, there is a need to be able to control ambient light levels in a vehicle in a way that relates to consumption of video content while in the vehicle.

Some aspects of this disclosure involve a system that utilizes window shading of a vehicle window in order to improve the quality of video viewed by an occupant of the vehicle who wears a head-mounted display (HMD). In one embodiment, an autonomous on-road vehicle includes a system configured to enable an HMD to cooperate with a window light shading module. This embodiment involves a light shading module, a camera, a processor, and the HMD. The light shading module is integrated with a vehicle window and is configured to be in at least one of first and second states. In the first state the Visible Light Transmittance (VLT) of the vehicle window is above 10% of ambient light entering through the window, in the second state the VLT of the vehicle window is below 50% of ambient light entering through the window, and the VLT of the vehicle window in the first state is higher than the VLT of the vehicle window in the second state. The camera is physically coupled to the vehicle and configured to take video of the outside environment. The processor is configured to generate, based on the video, a video see-through (VST) that represents the outside environment from a point of view of an occupant looking to the outside environment through at least a portion of the vehicle window. The HMD comprises an optical see-through component and a display component; the HMD is configured to operate according to a first mode of operation when the occupant looks at the direction of the vehicle window and the light shading module is in the first state, and to operate according to a second mode of operation when the occupant looks at the direction of the vehicle window and the light shading module is in the second state. Wherein the total intensity of the VST light, emitted by the display component and reaching the occupant's eyes, is higher in the second mode than in the first mode.

Figure 8B:
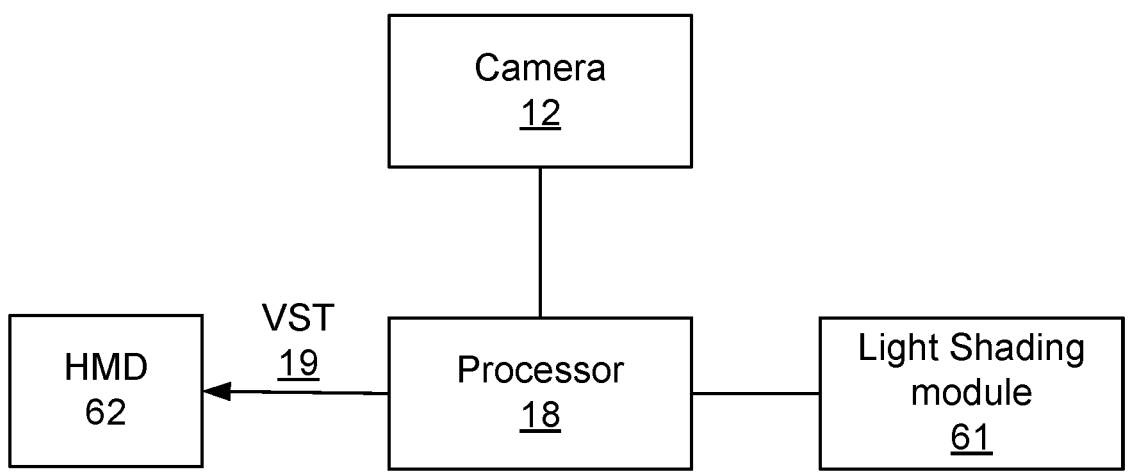
FIG. 8b is a schematic illustration of components of a system configured to enable an HMD to cooperate with a window light shading module.

In one embodiment, a system configured to enable a head-mounted display (HMD) to cooperate with a window light shading module of an autonomous on-road vehicle includes at least the following elements: the HMD 62, a light shading module 61, a camera (such as camera 12), and a processor 18. FIG. 8*b* is a schematic illustration of at least some of the relationships between the system elements mentioned above.

The light shading module 61 is integrated with a vehicle window and is configured to be in at least one of first and second states. Optionally, the light shading module 61 covers more than half of the front windshield in the second state. In one embodiment, in the first state, the Visible Light Transmittance (VLT) of the vehicle window is above 10% of ambient light entering through the window, and in the second state, the VLT of the vehicle window is below 50% of ambient light entering through the window. Additionally, the VLT of the vehicle window in the first state is higher than the VLT of the vehicle window in the second state. In another embodiment, in the first state the VLT of the vehicle window is above 70% of ambient light entering through the window, and in the second state, the VLT of the vehicle window is below 30% of ambient light entering through the window.

Herein, "ambient light" in the context of a vehicle refers to visible light that is not controlled by the vehicle, such as light arriving from: the sun, lights of other vehicles, street/road lighting, and various reflections from elements such as windows.

In some embodiments, utilizing the light shading module 61 may improve the quality of images viewed via the HMD 62 when the light shading module 61 is in the second state. Optionally, the perceived contrast of the optical see-through component is better when the light shading module is in the second state compared to when the light shading module 61 is in the first state.

Figure 12:
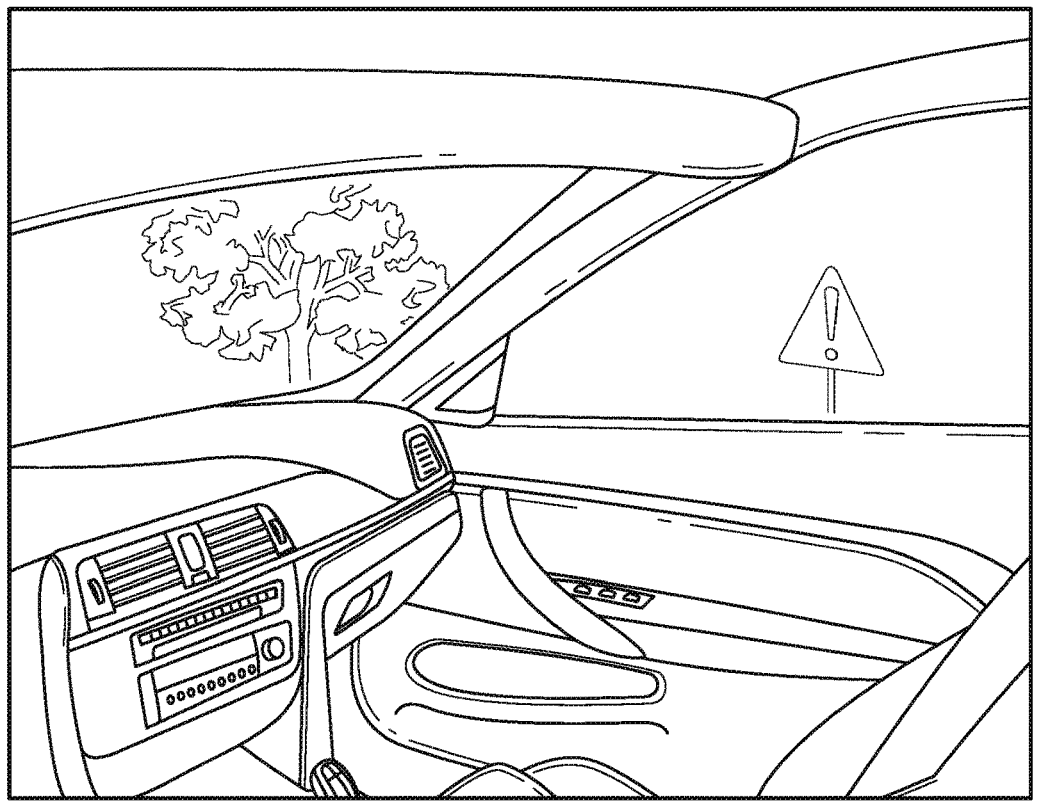
FIG. 12 and FIG. 13 illustrate first and second modes for a shading module.
Figure 13:
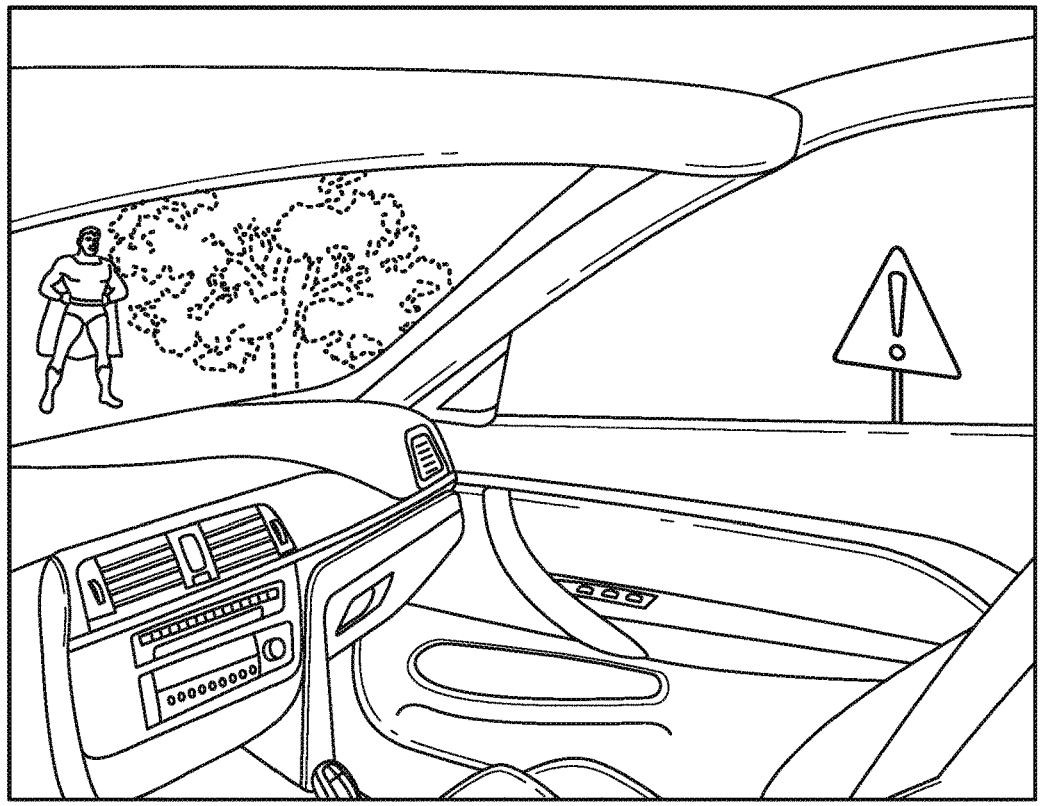

Various types of light shading modules may be utilized in embodiments described herein. In one embodiment, the light shading module 61 is a movable physical element configured to reduce the intensity of the ambient light entering into the vehicle compartment through the vehicle window. Optionally, the light shading module is unfurled on the inside of the compartment in order to block at least 50% of the ambient light intensity. Optionally, the light shading module is unfurled on the outside of the compartment in order to block at least 50% of the ambient light intensity. FIG. 12 illustrates a first mode where the occupant sees the outside environment through the optical see-through component. This figure illustrates the view that the occupant sees when looking outside through the window. FIG. 13 illustrates a second mode where the occupant sees the outside environment through the VST. In this example, the outside environment is a bit different, and there is also a virtual Superman floating near the tree.

Figure 14:
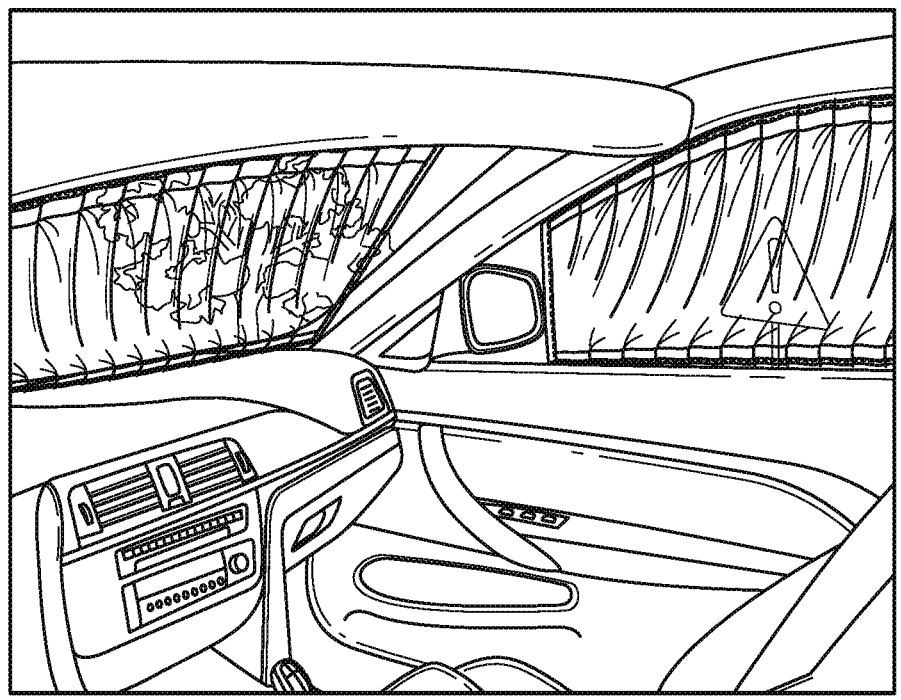
FIG. 14 illustrates a VST over a curtain.
Figure 15:
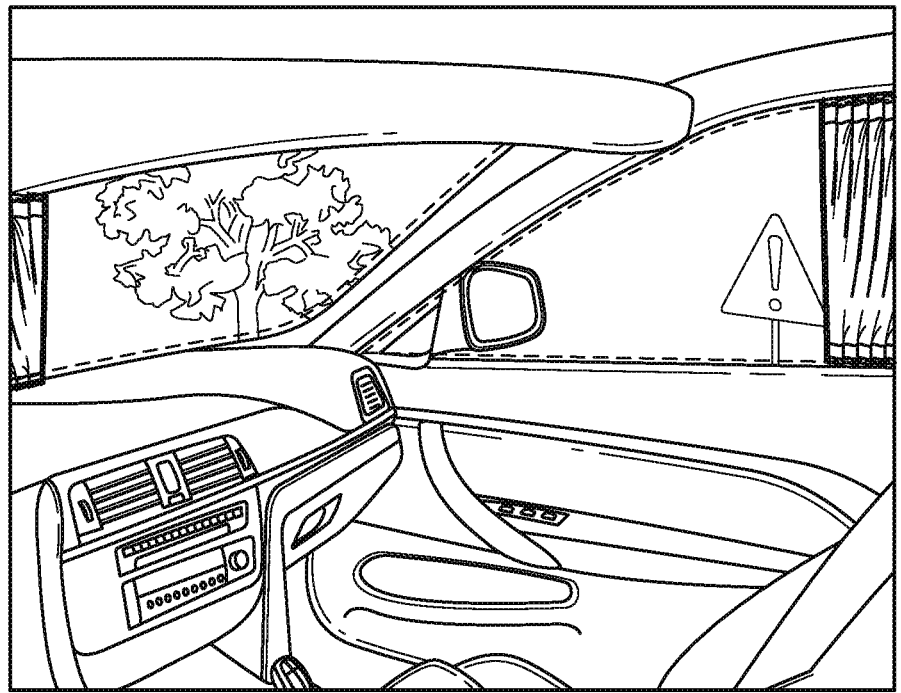
FIG. 15 illustrates a light shading module that is unfurled on the inside of the compartment.
Figure 16:
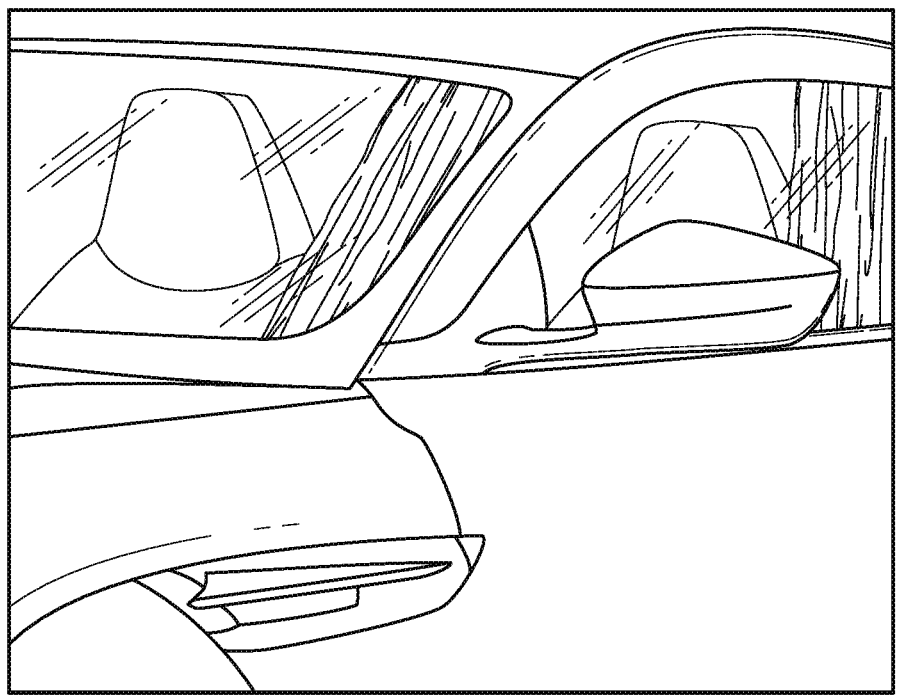
FIG. 16 illustrates a light shading module that is unfurled on the outside of the compartment.

In another embodiment, the light shading module 61 may be a curtain. FIG. 14 illustrates a VST over a curtain. FIG. 15 illustrates a light shading module that is unfurled on the inside of the compartment. FIG. 16 illustrates a light shading module that is unfurled on the outside of the compartment. And in yet another embodiment, the vehicle window is made of a material that is able to serve as the light shading module 61 by changing its transparency properties. The camera is physically coupled to the vehicle, and configured to take video of the outside environment. For example, the camera may be based on at least one of the following sensors: a CCD sensor, a CMOS sensor, a near infrared (NIR) sensor, an infrared sensor (IR), and a device based on active illumination such as a LiDAR. The processor is configured to generate, based on the video, a video see-through (VST 19) that represents the outside environment from a point of view of an occupant looking to the outside environment through at least a portion of the vehicle window. Optionally, the processor is further configured not to generate the VST 19 when the HMD 62 operates in the first mode.

The HMD 62 comprises an optical see-through component and a display component. Optionally, the HMD 62 is configured to operate according to a first mode of operation when the occupant looks at the direction of the vehicle window and the light shading module 61 is in the first state, and to operate according to a second mode of operation when the occupant looks at the direction of the vehicle window and the light shading module 61 is in the second state. The total intensity of the VST light, emitted by the display component and reaching the occupant's eyes, is higher in the second mode than in the first mode.

In one embodiment, in the first mode, intensity of light that reaches the occupant's eyes via the optical see-through component is higher than intensity of light from the VST that is emitted by the display component and reaches the occupant's eyes. And in the second mode, the intensity of light from the environment that reaches the occupant's eyes via the optical see-through component is lower than the intensity of light from the VST that is emitted by the display component and reaches the occupant's eyes. In one example, the total intensity of VST light, emitted by the display component and reaching the occupant's eyes, is at least 50% higher in the second mode than in the first mode. In some embodiments, the display component may be based on a digital display that produces the virtual image (such as in Oculus rift), direct retina illumination, or other methods that are capable of producing the virtual image.

In one embodiment, the system described above optionally includes an occupant tracking module configured to calculate the point of view of the occupant based on measurements of a sensor. Optionally, the occupant tracking module is the HMD tracking module 27. Optionally, in this embodiment, the processor is further configured to render the VST based on data received from the occupant tracking module. Optionally, the display is a three dimensional (3D) display configured to show the occupant the VST, such that point of gaze of the occupant, while looking via the 3D display device, is most of the time beyond the location of the light shading module 61.

In one embodiment, a system includes an occupant tracking module configured to track gaze directions of first and second occupants who sit in first and second compartments of a vehicle, respectively; wherein the first and second compartments are separated by a translucent or opaque material that obstructs at least 30 degrees of the horizontal unaided field of view (FOV), at eye level, of the first and second occupants; a camera physically coupled to the vehicle, configured to take video of the outside environment; a processor configured to generate, based on the video, first and second video see-through (VST) of the outside environment as could have been seen from the respective points of view of the first and second occupants, had each of the first and second occupants' FOV not been obstructed by at least a portion of the translucent or opaque material; a first display configured to show the first occupant the first VST; and a second display configured to show the second occupant the second VST.

Herein, sentences such as "obstructs at least X degrees of the horizontal unaided FOV at eye level" refers to FOV of an occupant to whom the vehicle is designed (such as a 1.70 meter tall healthy man who sits straight and looks approximately to the horizon), who does not use an electronic device to see the outside environment through the translucent or opaque material that causes the horizontal obstruction. For example, in a windowless vehicle having a display instead of a window, the display may be the element that causes the horizontal obstruction when it is turned off.

Optionally, the translucent or opaque material provides privacy to the second occupant by preventing the first occupant from seeing the second occupant. Optionally, the translucent or opaque material provides privacy to the second occupant by attenuating sounds generated by the first occupant as heard by the second occupant by at least 10 Decibels (dB). In one example, the test for checking the sound attenuation attributed to the translucent or opaque material may be tested as follows: produce noise at the seat of the first occupant and measure at the seat of the second occupant with and without the translucent or opaque material; and if the noise reduction resulting from having the translucent or opaque material is above 10 dB, which is equivalent to Noise Reduction Rating (NRR) of 27 decibels, than the translucent or opaque material does attenuate sounds generated by the first occupant as heard by the second occupant by at least 10 dB. Optionally, the portion of the translucent or opaque material refers to at least 20% of the translucent material, which hides at least 20 degrees of the peripheral optical outside views of the first and second occupants. Optionally, the vehicle is a public vehicle that provides enhanced privacy for its occupants; and the public vehicle is selected from: a bus, a taxi, and a train.

In one embodiment, a system include an occupant tracking module configured to track gaze directions of first and second occupants who sit on first and second occupant seats in a vehicle; wherein the first and second occupant seats are located side by side, and the first and second occupants are expected to obstruct portions of each other's field of view (FOV) to the outside environment; a camera physically coupled to the vehicle, configured to take video of the outside environment; a processor configured to generate, based on the video and the gaze directions, first and second respective videos, each comprising a video see-through (VST) of the outside environment as could have been seen from the points of view of the first and second occupants, respectively, had the first and second occupants not been obstructing at least portions of each other's FOV to the outside environment; a first display configured to show the first occupant the first video; and a second display configured to show the second occupant the second video.

Optionally, the system further includes a second camera configured to measure the compartment; and the processor is further configured to generate, based on images captured by the second camera, a first representation of the compartment which does not show the second occupant, and to combine the first video and the first representation of the compartment. Optionally, the processor is further configured to generate, based on the images captured by the second camera, a second representation of the compartment which does not show the first occupant, and to combine the second video and the second representation of the compartment. Optionally, the first and second display devices are included in first and second HMDs, respectively, the second camera comprises third and fourth cameras; the third camera is physically coupled to the first HMD, and the fourth camera is physically coupled to the second HMD. Optionally, the second camera is physically coupled to the compartment. Optionally, the system further includes transparent windows to the outside environment having visible light transmittance (VLT) above 25%; wherein the first video extends the FOV to the outside environment available to the first occupant compared to the FOV to the outside environment available to the first occupant through the windows when the second occupant does not sit in the vehicle. Optionally, the first video comprises a representation of the second occupant. Optionally, the first occupant wears a head-mounted display (HMD), and the representation of the second occupant is generated based on a camera mounted to the HMD. Optionally, the representation of the second occupant is generated based on a camera mounted to the vehicle and facing the vehicle compartment. Optionally, the representation of the second occupant comprises an outline of the second occupant. Optionally, the representation of the second occupant comprises a partially transparent image of the second occupant. In one example, partially transparent image has transparency between 1 to 50 percents. Optionally, the first display is comprised in an HMD worn by the first occupant. Optionally, the first display is a display mounted to the vehicle.

When traveling in a vehicle, there are various work- and entertainment-related activities to engage an occupant of the vehicle. Many of these activities typically involve viewing content on displays. And while most of the time the occupant may mostly be engaged in content presented on a display, there are times in which a lack of awareness of the driving environment can lead to undesired consequences. For example, if an unexpected driving event occurs, such as hitting a speed bump, making a sharp turn, or a hard braking, this may startle the occupant. Thus, there is a need for a way to make the occupant aware of certain unexpected driving events, in order to make the driving experience less distressful when such events occur.

In some embodiments, an occupant of a vehicle may have the opportunity to view video see-through (VST), which is video generated based on video of the environment outside the vehicle. VST can often replace the need to look out of a window (if the vehicle has windows). Some examples of scenarios in which VST may be available in a vehicle include a windowless vehicle, a vehicle with shaded windows having VLT below 30%, and/or when the occupant wears a VR headset. While traveling in such a vehicle, the occupant may benefit from gaining a view to the outside environment when an unexpected driving event occurs. By being made aware of the event, the occupant is less likely to be surprised, disturbed, and/or distressed by the event.

While traveling in a vehicle, an occupant of the vehicle may not always be aware of the environment outside and/or of what actions the vehicle is about to take (e.g., braking, turning, or hitting a speedbump). Thus, if such an event occurs without the occupant being aware that it is about to happen, this may cause the occupant to be surprised, disturbed, distressed, and even physically thrown off balance (in a case where the event involves a significant change in the balance of the physical forces on the occupant). This type of event is typically referred to herein as a Sudden Decrease in Ride Smoothness (SDRS) event. Some examples of SDRS events include at least one of the following events: hitting a speed bump, driving over a pothole, climbing on the curb, making a sharp turn, a hard braking, an unusual acceleration (e.g., 0-100 km/h in less than 6 seconds), and starting to drive after a full stop.

In some embodiments, an SDRS event takes place at least 2 minutes after starting to travel and it is not directly related to the act of the starting to travel. Additionally, the SDRS event takes place at least 2 minutes before arriving to the destination and is not directly related to the act of arriving at the destination In one example, a sentence such as "an SDRS event is imminent" refers to an SDRS event that is: (i) related to traveling in the vehicle, and (ii) expected to happen in less than 30 seconds, less than 20 seconds, less than 10 seconds, or less than 5 seconds. In another example, a sentence such as "an SDRS event is imminent" may refer to an event that starts at that instant, or is about to start within less than one second.

Figure 17:
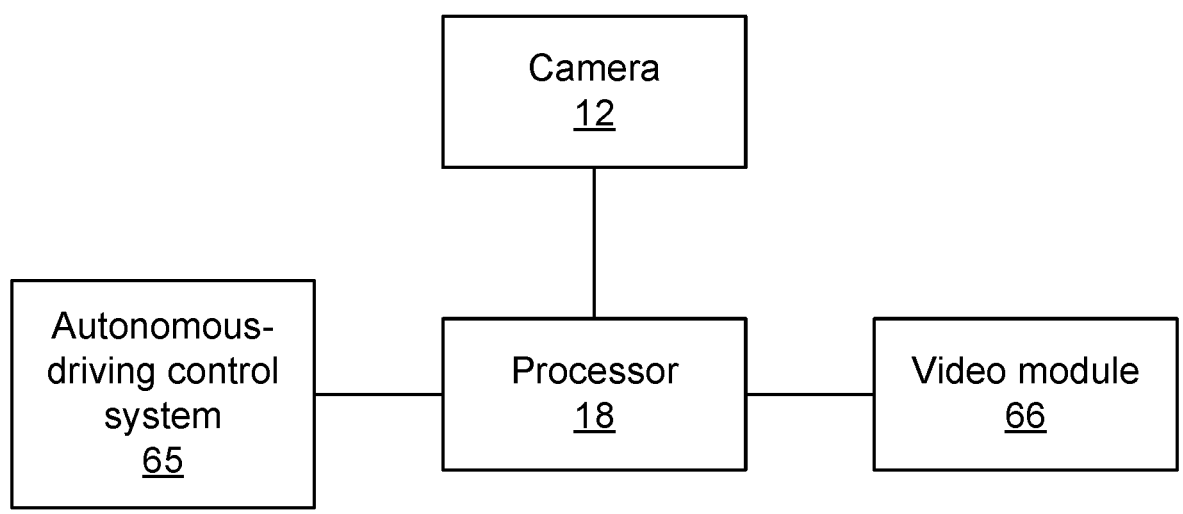
FIG. 17 is a schematic illustration of components of a video system that may be used to increase awareness of an occupant of a vehicle regarding an imminent SDRS.

The following is a description of an embodiment of a video system that may be used to increase awareness of an occupant of a vehicle regarding an imminent SDRS. FIG. 17 illustrates one embodiment of a video system for an autonomous on-road vehicle, which includes at least an autonomous-driving control system 65, a camera (such as camera 12), a processor (such as processor 18), and a video module 66.

The autonomous-driving control system 65 is configured to generate, based on trajectory of the vehicle and information about the road, an indication indicative of whether a Sudden Decrease in Ride Smoothness (SDRS) event is imminent Optionally, the autonomous-driving control system 65 receives at least some of the information about the road from at least one of the following sources: sensors mounted to the vehicle, sensors mounted to nearby vehicles, an autonomous-driving control system 65 used to drive a nearby vehicle, and a database comprising descriptions of obstacles in the road that are expected to cause intense movement of the vehicle. In one example, the database comprising the descriptions of the obstacles includes one or more of the following types of data: locations of speed bumps, locations of potholes, locations of stop signs, and locations of sharp turns in the road.

In one embodiment, the autonomous-driving control system 65 is configured to generate the indication indicative of whether an SDRS event is imminent based on at least one of the following configurations: (i) the autonomous-driving control system 65 receives images of the road from a camera, and calculates the indication based on the vehicle trajectory and image analysis of the images, (ii) the autonomous-driving control system 65 receives from a radar reflections of electromagnetic waves from the road, and calculates the indication based on the vehicle trajectory and signal processing of the reflections, and (iii) the autonomous-driving control system 65 receives a notification from a detailed road map, and calculates the indication based on the vehicle trajectory and the notification.

The camera, which is mounted to the vehicle, is configured to take video of the environment outside the vehicle.

Optionally, the data captured by the camera comprises 3D data. The processor is configured to generate a video see-through (VST) based on the video taken by the camera.

The video module 66 is configured to select a first mode of presentation, in which a video-unrelated-to-the-VST (VUR) is presented on the foveal vision region of the occupant, at eye level, responsive to the indication not indicating that an SDRS event is imminent The video module 66 is further configured to select a second mode of presentation, in which the VST is presented on the foveal vision region of the occupant, at eye level, responsive to the indication indicating that an SDRS event is imminent Optionally, the VST captures more than 50% of the foveal vision region of the occupant in the second mode of presentation. In some embodiments, presenting video on the foveal vision region comprises presenting images with at least 50% transparency. Herein, "foveal vision" refers to an angle of about 5° of the sharpest field of vision.

In one embodiment, in the first mode of presentation, the VUR is presented on the foveal vision region of the occupant with opacity A, and the VST is presented on the foveal vision region of the occupant with opacity B, where A>B≥0. Optionally, a normalized opacity parameter takes a value from 0.0 to 1.0, and the lower the value the more transparent the video is. In this embodiment, in the second mode of presentation, the VUR is presented on the foveal vision region of the occupant with opacity A', and the VST is presented on the foveal vision region of the occupant with opacity B', where B'>B and B'>A'. In optional embodiments, one or more of the following values may be true: A'>0, B=0, and A'=0. Herein, "partially transparent" refers to opacity below one and above zero.

Having the VST presented when an SDRS event is imminent can make the occupant be aware and prepared for the SDRS event. Thus, the occupant is less likely to be startled, distressed, and/or physically thrown off balance by the SDRS event. In one example, the SDRS event involves hitting a speedbump, while the occupant views a movie. About 5 seconds prior to hitting the speedbump, a partially transparent window displaying VST in which the speedbump is highlighted (e.g., flashing red) is presented on the foveal vision region of the occupant for a couple seconds (e.g., by being presented in the center of the movie). This way upon hitting the speedbump, the occupant is not startled by the event. In another example, the autonomous-driving control system 65 determines that a "hard braking" is required, e.g., in order to avoid collision with a vehicle ahead that slowed unexpectedly. In this example, the occupant may be working on a virtual desktop, and within 100 milliseconds of when the determination is made that the vehicle is about to rapidly deaccelerate (a "hard braking"), the VST depicting the rear of the vehicle ahead is displayed in the center of the virtual desktop. This way the occupant is immediately made aware of why the vehicle is braking and this notification may prompt the occupant to seek a more appropriate posture for the braking.

Figure 18A:
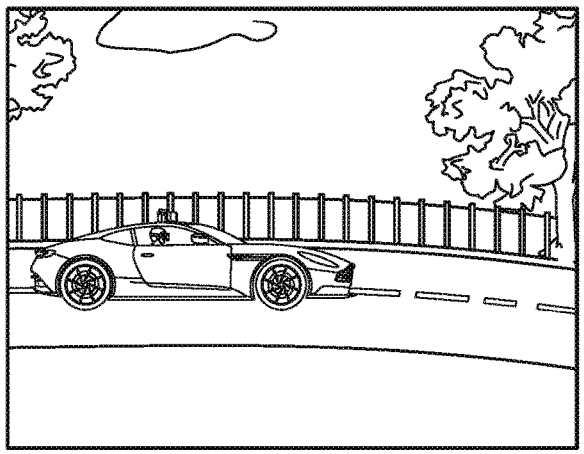
FIG. 18a illustrates presenting VUR to an occupant when there is no indication that an SDRS event is imminent.
Figure 18A:
Figure 18B:
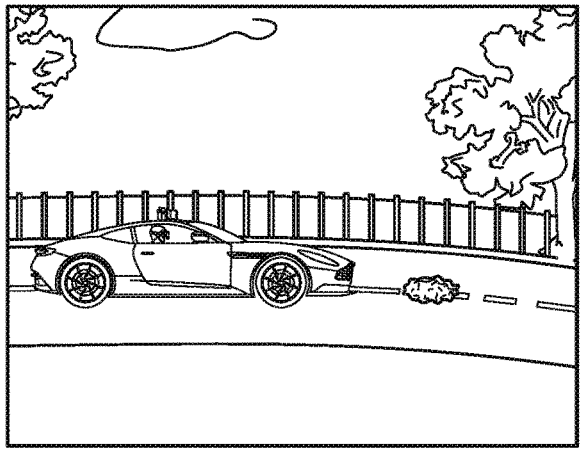
FIG. 18b illustrates presenting VST responsive to receiving an indication that an SDRS event is imminent (a pothole)
Figure 18B:
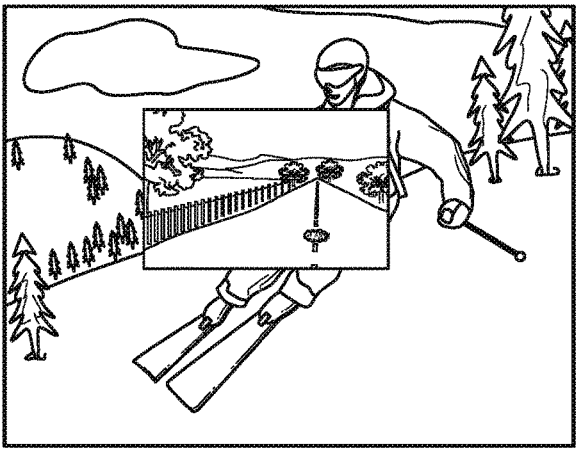
Figure 18C:
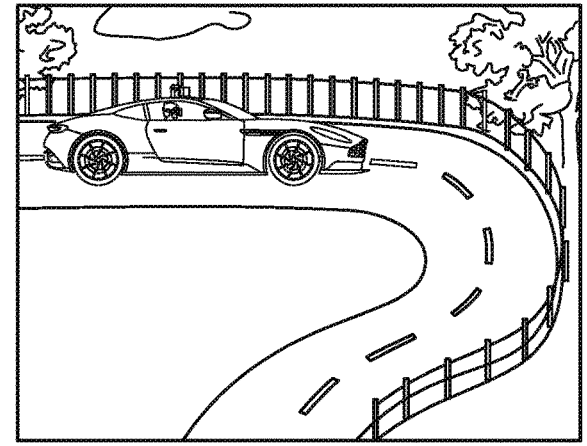
FIG. 18c illustrates presenting VST responsive to receiving an indication that an SDRS event is imminent (a sharp turn)
Figure 18C:
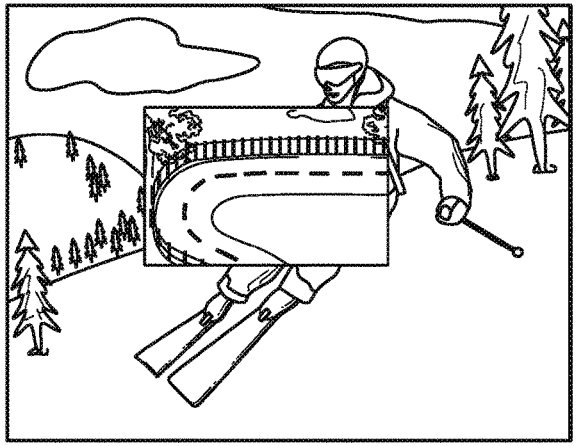

Some illustrations of utilization of the different modes of operation are given in the following figures. FIG. 18a illustrates presenting VUR responsive to not receiving from the autonomous-driving control system 65 an indication that an SDRS event is imminent This figure has two parts, the left part shows the vehicle driving over a clean road, and the right part shows the VUR. FIG. 18b illustrates presenting VST responsive to receiving from the autonomous-driving control system 65 an indication that an SDRS event is imminent The figure has two parts, the left part shows the vehicle about to drive over a pothole, and the right part shows a small window showing the pothole over the VUR (optionally to warn the occupant). FIG. 18c illustrates presenting VST responsive to receiving from the autonomous-driving control system 65 an indication that an SDRS event is imminent The figure has two parts, the left part shows the vehicle about to enter a sharp turn, and on the right part shows a small window showing the sharp turn over the VUR (optionally to warn the occupant).

Traditional vehicles typically have a front windshield that offers occupants of the vehicle a frontal view of the outside environment. However, in some embodiments, this frontal view may be provided using the VST. For example, in one embodiment, the vehicle includes a nontransparent element, which is coupled to the vehicle, and obstructs at least 30 degrees out of the frontal horizontal unaided FOV to the outside environment of an occupant at eye level. In one example of a standard vehicle, such as Toyota Camry model 2015, the frontal horizontal unaided FOV extends from the left door through the windshield to the right door.

The use of the nontransparent element improves the safety of the occupant during a collision compared to a similar vehicle having the same total weight and comprising a transparent glass window instead of the nontransparent element. The nontransparent element may be coupled to the vehicle in various configurations, in embodiments described herein. In one embodiment, the nontransparent element is physically coupled to the vehicle at an angle, relative to the occupant, that is covered by the field of view of the VST, and the nontransparent element features visible light transmittance (VLT) below 10% of ambient light.

Various types of displays may be utilized to present the occupant with video (e.g., the VST and/or the VUR). In one embodiment, the video is presented to the occupant on a screen coupled to the vehicle compartment. In one example, the screen coupled to the vehicle compartment utilizes parallax barrier technology. A parallax barrier is a device located in front of an image source, such as a liquid crystal display, to allow it to show a stereoscopic image or multiscopic image without the need for the viewer to wear 3D glasses. The parallax barrier includes a layer of material with a series of precision slits, allowing each eye to see a different set of pixels, thus creating a sense of depth through parallax. In another embodiment, the occupant wears a head-mounted display (HMD), and the HMD is used to present the video to the occupant. Optionally, the HMD is a VR headset, and as a result of presenting the VST, the occupant does not need to remove the VR headset in order to see the cause of the SDRS event.

In some embodiments, the video module 66 may be selective regarding indications of which SRDS events may prompt it to operate in the second mode of operation. For example, if the occupant is engaged in a game, the video module 66 may refrain from presenting the VST in the foveal vision region if the vehicle is about to make a sharp turn. However, it may optionally still present the VST in the foveal vision region if the SDRS event involves something that may be more forcefully felt by the occupant, such as extreme evasive maneuvering performed to avoid a collision.

In some embodiments, the video module 66 may determine whether to show a VST responsive to an SRDS event (in the second mode of operation) based on the level of concentration of the occupant. For example, if the occupant is deeply engaged in a certain activity (e.g., in work or playing a game) above a threshold, the video module 66 may refrain from operating in the second mode for certain SDRS events that would cause the video module 66 to operate in the second mode were the occupant engaged in the certain activity below the threshold. In one example, the engagement level may be based on the occupant's level of concentration, as measured by a wearable sensor (such as an EEG headset or a smartwatch) or a sensor physically coupled to the compartment (such as an eye tracker, a thermal camera, or a movement sensor embedded in the seat).

Presenting an occupant of a vehicle with video see-through (VST) of the outside environment from a point of view of the occupant can help the occupant be prepared for various events that may be considered to cause a Sudden Decrease in Ride Smoothness (SDRS events). Some examples of SDRS events include the following events: hitting a speed bump, driving over a pothole, climbing on the curb, making a sharp turn, a hard braking, an unusual acceleration (e.g., 0-100 km/h in less than 6 seconds), and starting to drive after a full stop.

In order for the occupant to become aware of an imminent SDRS event, the VST needs to be presented in an attention-grabbing way. For example, when an SDRS event is imminent, the VST that describes the environment is brought to the center of the occupant's attention by displaying it at eye level and/or increasing the size of the VST (compared to other times when an SDRS event is not imminent).

The following is a description of an embodiment of a video system that may be used to increase awareness of an occupant of a vehicle regarding an imminent SDRS by making the VST more prominent for an imminent SDRS. In one embodiment, a video system for an autonomous on-road vehicle includes at least the autonomous-driving control system 65, a camera, and a processor. In this embodiment, the occupant is engaged, at least part of the time, in entertainment- or work-related activities, which involve presentation of video-unrelated-to-the-VST (VUR) to the occupant, for example, on a screen coupled to the compartment of the vehicle or a HMD worn by the occupant. Some examples of such content (common in the year 2016) include cinema movies, broadcast TV shows, standard web browsers, and Microsoft Office 2016 applications (such as Word, Excel and PowerPoint).

The camera, which is mounted to the vehicle, is configured to take video of the environment outside the vehicle. The processor is configured to generate, based on the video taken by the camera, a video see-through (VST) of outside environment from a point of view of an occupant of the vehicle. Optionally, the occupant is in a front seat of the vehicle (such that no other occupant in the vehicle is positioned ahead of the occupant). In some embodiments, the processor is configured to present video, which may include VUR and/or VST, to the occupant using different presentation modes, depending on whether an SDRS event is imminent For example, the video may be presented according to first or second modes, depending on whether an SDRS event is imminent Optionally, the VST captures in the video according to the first mode a diagonal FOV of at least 3°, 5°, or 10° of the occupant's FOV. Optionally, the VST is not presented in the foveal vision region of the occupant in the video according to the first mode, while the VST is presented in the foveal vision region of the occupant in the video according to the second mode.

In one embodiment, responsive to an indication that is not indicative of an imminent SDRS event (generated by the autonomous-driving control system 65), the processor is configured to provide video to the occupant using the video according to the first mode. In the video according to the first mode, the occupant is presented with video that comprises a video-unrelated-to-the-VST (VUR) at eye level in the direction of forward traveling. Additionally, the video may comprise a video see-through (VST) of outside environment that is not presented at eye level in the direction of forward traveling.

Receiving an indication indicative that an SDRS event is imminent may change the way video is presented to the occupant. Optionally, this change is made without receiving a command to do so from the occupant. In one embodiment, responsive to the indication indicating that an SDRS event is imminent, the processor is configured to provide video to the occupant using a video according to a second mode. In the video according to the second mode, the occupant is presented with video that comprises the VST, presented at eye level in the direction of forward traveling. Optionally, if the video according to the first mode includes VST, then the size of the VST window in the video according to the second mode is larger by at least 25% relative to the size of the VST window in the video according to the first mode. Optionally, the video according to the second mode includes presenting the VUR in the background (e.g., the VST is overlaid above the VUR). Optionally, while providing the video according to the second mode, responsive to an updated indication that does not indicate that an SDRS event is imminent, the processor is further configured to switch back to provide the video according to the first mode to the occupant.

Figure 19A:
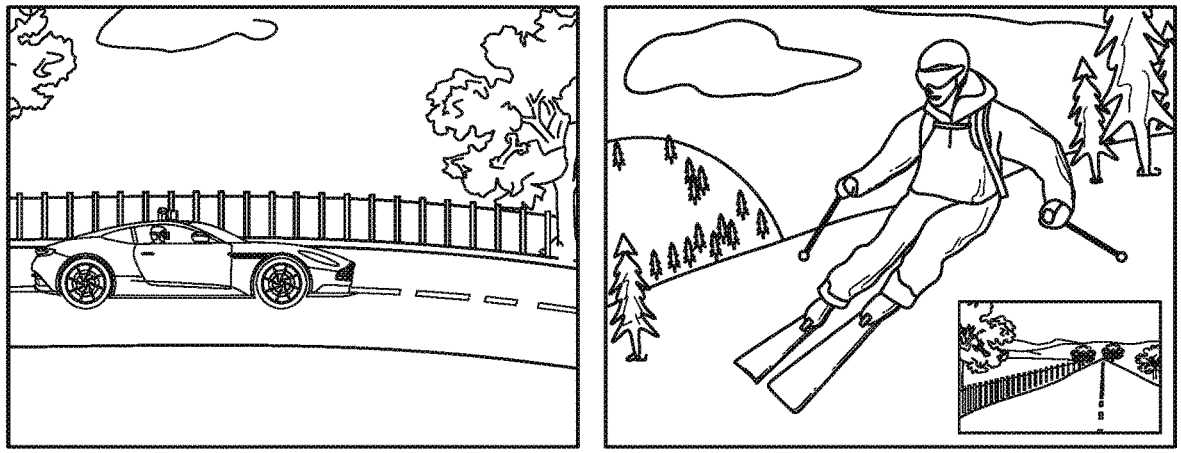
FIG. 19a illustrates presenting VUR and VST when there is no indication that an SDRS event is imminent.
Figure 19B:
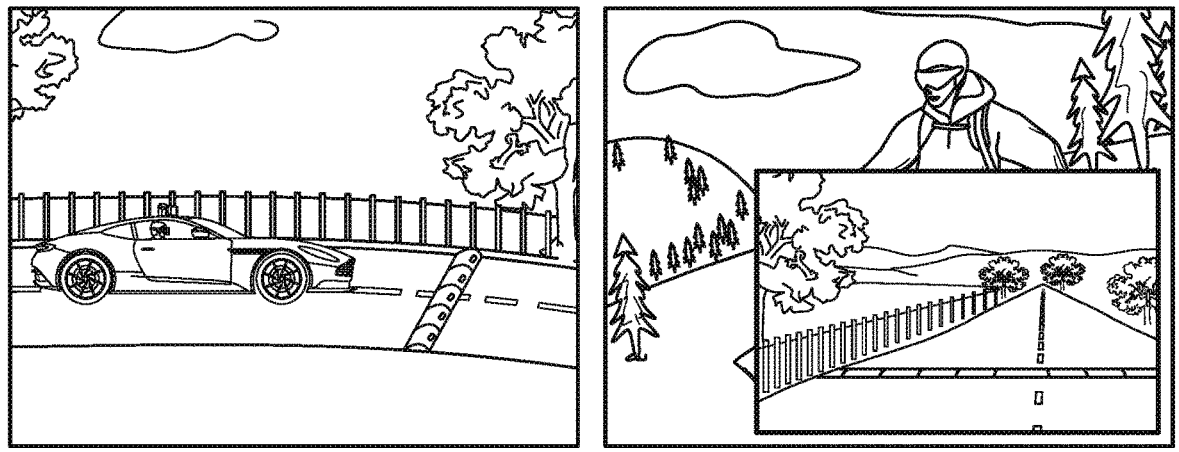
FIG. 19b illustrates presenting a larger VST responsive to receiving an indication that an SDRS event is imminent (a road bump)
Figure 19C:
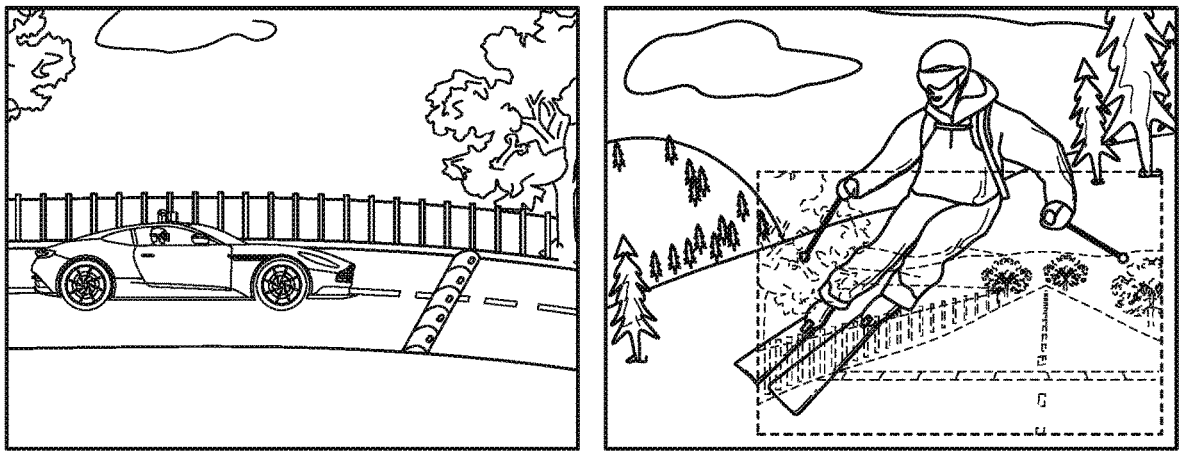
FIG. 19c illustrates presenting a partially transparent VST responsive to receiving an indication that an SDRS event is imminent.

The following figures illustrate various ways in which the video according to the first and second modes may be utilized. FIG. 19*a* illustrates presenting a VUR, which is a movie showing a person skiing, responsive to not receiving from the autonomous-driving control system 65 an indication that an SDRS event is imminent This figure has two parts, the left part shows the vehicle driving over a clean road, and the right part shows the VUR with a small VST on the right. FIG. 19*b* illustrates presenting a VST responsive to receiving from the autonomous-driving control system 65 an indication that an SDRS event is imminent This figure has two parts, the left part shows the vehicle about to drive over a speed bump, and the right part shows the VUR but now with a big VST on the right. In this example, the big VST captures about half of the VUR and shows the speed bump. FIG. 19*c* illustrates presenting a partially transparent VST responsive to receiving from the autonomous-driving control system 65 an indication that an SDRS event is imminent Here, the big VST (that captures about half of the VUR and shows the speed bump) is presented as partially transparent layer over the VUR in order to show the occupant both the VUR and the VST.

In one embodiment, presenting to the occupant video according to the second mode involves presenting the VUR behind the VST, and the size and location of the VUR in the video according to the second mode is essentially the same as the size and location of the VUR in the video according to the first mode. Optionally, this means that there is a difference of less than 10% in the size and location of the VURs in the videos according to the first and second modes. In another embodiment, the VUR is presented in a diagonal FOV of at least 10 degrees, and is not based on the video taken by the camera.

In some embodiments, the VUR may be unrelated to the purpose of the traveling in the vehicle. For example, the VUR may include videos related to the following activities: watching cinema movies, watching TV shows, checking personal emails, playing entertainment games, and surfing in social networks.

In some embodiments, the occupant's field of view (FOV) to the outside environment is obstructed by a nontransparent element, and the VST represents at least a portion of the obstructed FOV. Optionally, the occupant uses a VR headset and the obstruction is due to a nontransparent element belonging to the VR headset. Additionally or alternatively, the obstruction may be due to the vehicle's compartment; in this case the nontransparent element may be an SAEDP, a safety beam, and/or a crumple zone at eye level, which obstruct at least 30 degrees out of the frontal horizontal unaided FOV to the outside environment of the occupant at eye level.

When traveling in a vehicle, an occupant of the vehicle may not always be viewing the outside environment. For example, the occupant may be engaged in work- or entertainment-related activities. Additionally, in some vehicles, the occupant may not have a good view of the outside environment most of the time, or even all of the time. For example, the vehicle may have very few (or no) windows, or the vehicle may have a shading mechanism that reduces the light from the outside. However, there are times when the occupant should be made aware of the outside environment, even though the occupant may not be actively driving the vehicle. For example, the occupant may be made aware of the outside environment in order to make the occupant prepared for an event that causes a Sudden Decrease in Ride Smoothness (an SDRS event). Some examples of SDRS events include the following events: hitting a speed bump, driving over a pothole, climbing on the curb, making a sharp turn, a hard braking, an unusual acceleration (e.g., 0-100 km/h in less than 6 seconds), and starting to drive after a full stop.

In order for the occupant to become aware of an imminent SDRS event, in some embodiments that involve a vehicle that has a shading module that controls how much ambient light is let in, when an SDRS event is imminent the vehicle may increase the amount of light that enters via a window. This additional light can give an occupant a better view of the outside environment, which can make the occupant aware and better prepared for the SDRS.

The following is a description of an embodiment of a system that may be used to increase awareness of an occupant of a vehicle regarding an imminent SDRS by enabling more ambient light to enter a vehicle via a window. In one embodiment, a shading system for a window of an autonomous on-road vehicle includes at least the autonomous-driving control system 65, a shading module, and a processor.

Figure 20A:
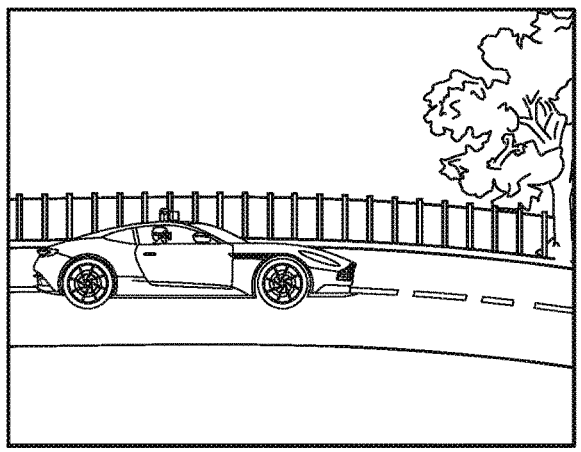
FIG. 20a illustrates a smart glass shading module when there is no indication that an SDRS event is imminent.
Figure 20A:
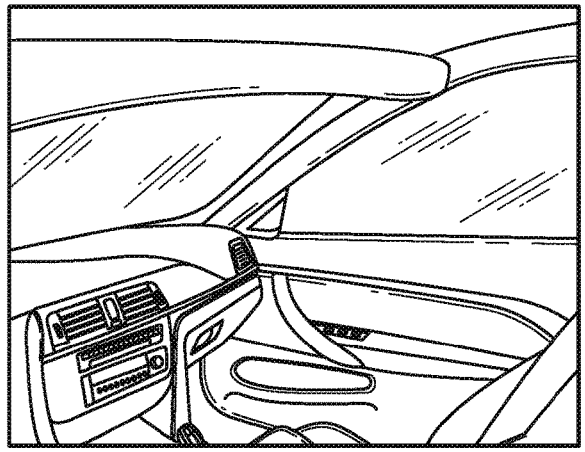
Figure 20B:
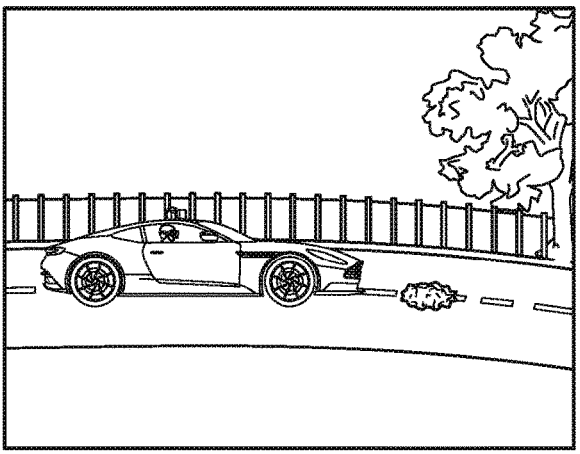
FIG. 20b illustrates the smart glass shading module when there is an indication that an SDRS event is imminent.
Figure 20B:

FIG. 20a illustrates a smart glass shading module that operates according to an indication that an SDRS event is not imminent This figure has two parts, the left part shows the vehicle driving over a clean road, and the right part shows that the smart glass window blocks most of the ambient light (illustrated in the figure by the tree outside that is invisible to the occupant). FIG. 20b illustrates the smart glass shading module that operates according to an indication that an SDRS event is imminent This figure has two parts, the left part shows the vehicle about to drive over a pothole, and the right part shows that the smart glass window does not block the ambient light (illustrated in the figure by the tree outside that is visible to the occupant).

The shading module is configured to control the amount of ambient light that enters the vehicle via the window. Optionally, the window is a front-facing window (e.g., a windshield). Optionally, the window is a side-facing window. There are various types of shading modules that may be utilized in different embodiments.

In one embodiment, the shading module comprises a curtain. Optionally, the curtain covers most of the area of the window. Optionally, the curtain may open and close with the aid of an electromechanical device, such as a motor, based on commands issued by the processor.

In another embodiment, the shading module is a movable physical element configured to reduce the intensity of the ambient light entering through the vehicle window into the vehicle compartment. For example, the shading module may include various forms of blinds, a shutter, or a sliding element. Optionally, the shading module may be unfurled on the inside of the vehicle compartment in order to block more than 70% of the ambient light intensity. Optionally, the shading module may be unfurled on the outside of the vehicle compartment in order to block more than 70% of the ambient light intensity.

In yet another embodiment, the shading module comprises a smart glass able to change its light transmission level. Optionally, the smart glass is a vehicle window smart glass that comprises suspended particle devices (SPDs) film. Smart glass window may also be known as a switchable glass, a smart window, and/or a switchable window. Smart glass is glass or glazing whose light transmission properties are altered when voltage, current, light or heat is applied. Examples of electrically switchable smart glass include: suspended particle devices (SPDs), electrochromic devices, transition-metal hydride electrochromics devices, modified porous nano-crystalline films, polymer dispersed liquid crystal devices, micro-blinds, and thin coating of nanocrystals embedded in glass. Examples of non-electrical smart glass include: mechanical smart windows, Vistamatic®, and Sunvalve.

The processor is configured to command the shading module to operate in different modes based on indications generated by the autonomous-driving control system 65. In some embodiments, the processor is configured to command the shading module to operate in different modes that allow different amounts of the ambient light to enter the vehicle via the window, depending on whether an SDRS event is imminent For example, shading module may operate in first or second modes, depending on whether an SDRS event is imminent Optionally, in the first mode the shading module blocks more of the ambient light entering through the vehicle window than in the second mode. Optionally, the increased ambient light in the second mode can help make the occupant more aware of the outside environment, which can enable the occupant to prepare for the SDRS event.

In one embodiment, responsive to an indication that no SDRS event is imminent, the processor is configured to command a shading module to operate in a first mode in which the shading module blocks more than 30% of ambient light entering through a window of the vehicle. Receiving an indication indicative that an SDRS event is imminent may change the amount of ambient light that enters the vehicle via the window. Optionally, this change is made without receiving a command to do so from the occupant. In one embodiment, responsive to an indication that an SDRS event is imminent, the processor is configured to command the shading module to operate in the second mode in which the shading module blocks less than 90% of the ambient light entering through the vehicle window.

Some aspects of this disclosure include a system that can show an occupant of a vehicle and Object Of Interest (OOI) in the outside environment, which the occupant would otherwise miss (e.g., due to being engaged in work- or entertainment-related activities and/or having no direct view of the outside environment).

In one embodiment, a system configured to identify an Object Of Interest (OOI) in the outside environment, and to present to an occupant of an autonomous on-road vehicle a video see-through (VST) that comprises the OOI, includes at least a camera (such as camera 12), a processor (such as processor 18), and a video module (such as video module 66).

Different types of things may be considered an OOI in different embodiments. In one embodiment, the OOI is selected from a set comprising: types of vehicles, types of scenery, and types of people. Optionally, the system may include a user interface configured to present a menu that enables the occupant to select the types of OOI, which when identified, will be presented in the second mode of presentation. In one example, an OOI may be any type of high-end vehicle (e.g., a Porsche). In another example, an OOI may include an ocean view.

The camera, which is mounted to the vehicle, is configured to take video of the environment outside the vehicle. Optionally, the data captured by the camera comprises 3D data. The processor is configured to generate, based on the video taken by the camera, a video see-through (VST) of outside environment from a point of view of an occupant of the vehicle. Optionally, the occupant is in a front seat of the vehicle (such that no other occupant in the vehicle is positioned ahead of the occupant).

The video module is configured to present, to the occupant, video that captures diagonal field of view (FOV) of at least 10 degrees, at eye level. Optionally, the video module is further configured to select a mode of operation based on whether an indication is received that is indicative of whether video taken by the camera include the OOI. Optionally, changing a mode of operation is done without an expressed command at that time by the occupant.

In one embodiment, when not receiving an indication that the images includes the OOI, the video module is configured to select a first mode of presentation, in which a video-unrelated-to-the-VST (VUR) is presented on the foveal vision region of the occupant. And responsive to receiving the indication that the images include the OOI, the video module is further configured to select a second mode of presentation, in which the VST is presented on the foveal vision region of the occupant.

There are various ways in which an indication of the OOI may be generated in different embodiments. In one embodiment, the system includes an image processing module configured to identify the OOI in the VST and to generate the indication. Various image processing techniques and/or image identification methods known in the art may be utilized by the image processing module for this task.

In another embodiment, the system may include the autonomous-driving control system 65 configured to utilize a positioning system, such as GPS coordinates, to identify that the vehicle reached the OOI and to generate the indication. Optionally, the occupant may define which places may be OOIs and/or what types of locations are to be considered OOIs (e.g., historical monuments, nice scenery, etc.).

In still another embodiment, the system may include a crowd-based module configured to identify the OOI based on feedback received from many different occupants who watched VSTs comprising the OOI. Optionally, this feedback may be derived based on indications of how other occupants felt about the VST (when it depicted certain content corresponding to OOIs). For example, points of interest may be determined according to affective crowd data, determine based on how other occupants felt about what they saw, and optionally find places where the crowd affective response was positive (e.g., blooming of flowers, etc.). Optionally, some occupants who watched the video related to the unhindered FOV for long periods (or have a physical window) may be monitored to see when an interesting view is encountered. Points of interest may involve items identified in the exterior environment using image analysis, including presenting the VST when one or more of the following happens: passing a fancy vehicle, passing someone the occupant knows, passing a vehicle accident, passing a police officer, having a sunset view, and passing an animal the occupant is interested in.

In one embodiment, the system may receive an indication that the occupant is feeling at least one of nauseous and claustrophobic, and consequently present the VST in order to help the occupant to confront the feeling. For example, when there is a serious spike (e.g., increase in heart-rate and sweating), then the system may present the VST automatically. The system may also present a "normal" interior to the occupant (e.g., natural lighting settings). Optionally, when digital content is consumed (e.g., a game or a movie), the system may check whether the affective spike (e.g., increased excitement) is due to the content or due to the experience of being in the vehicle with AR or VR. If it is the former case, then the system might not present the VST.

Most on-road vehicles, including autonomous and non-autonomous vehicles, include as part of the vehicle body one or more windows, such as a windshield, side windows, or a rear window. The purpose of these windows is to offer vehicle occupants a view of the outside world. However, this feature comes at a cost; there are several drawbacks to using windows in vehicles.

Vehicle windows are typically made of glass or other transparent stiff materials. This makes most windows heavy and often expensive to manufacture. In addition, windows are typically poor thermal insulators, which can greatly increase the energy demands of a vehicle's climate control systems, especially when the sun beats down.

However, one of the major drawbacks of having windows in vehicles relates to the safety risks they pose in the case of a collision. Due to its stiffness, the vehicle occupant is at a risk of being hit by the window and suffer from a head injury. Additionally, in order to avoid obstruction of the view, various support structures such as beams need to placed outside of the window area, which can weaken a vehicle's structural integrity in the case of a collision.

While various safety systems have been developed and deployed over the years in order to address the safety shortcomings of windows, they only offer a partial, and usually inadequate redress. For example, stowed airbags that deploy in the case of a collision have become a widespread safety system in many modern vehicles. However, many airbag systems are designed not to deploy in the case of minor collisions, such as collisions that occur at low speeds, which can still pose a risk of major bodily harm to a vehicle's occupants (e.g., in the case of an impact with the vehicle's side).

Thus, there is a need for vehicles that can offer an advantage offered by windows (e.g., a view of the outside), which do not suffer from at least some of the shortcomings of vehicle windows, such as the increased safety risk that windows often pose.

Some aspects of this disclosure involve an autonomous on-road vehicle that includes a nontransparent Shock-Absorbing Energy Dissipation Padding (SAEDP) that is coupled to the compartment of the vehicle and is located at eye level in front of an occupant who sits in a front seat of the compartment during normal driving. Additionally, the vehicle includes a stiff element that is configured to support the SAEDP and to resist deformation during collision in order to reduce compartment intrusion. The stiff element is located at eye level between the SAEDP and the outside environment. Thus, the combination of the SAEDP and the stiff element offers the occupant an increased level of protection, e.g., in the case of a collision, compared to a vehicle in which a traditional window is in place at eye level in the front of the vehicle. However, due to it being nontransparent, placing the SAEDP at eye level may obstruct the occupant's view to the outside. Thus, in order to offer the occupant such a view, in some embodiments, the vehicle also includes a camera configured to take video of the outside environment in front of the occupant, and a computer configured to generate, based on the video, a representation of the outside environment in front of the occupant at eye level. This representation may be provided to the occupant using various types of displays. One non-limiting advantage of the vehicle described above is that it increases the safety of the occupant in the case of a collision, without prohibiting the occupant from obtaining a view of the outside environment.

In one embodiment, an autonomous on-road vehicle includes a compartment, which one or more occupants may occupy while traveling in the vehicle (e.g., by sitting in seats). Coupled to the front of the compartment is a Shock-Absorbing Energy Dissipation Padding (SAEDP) and a stiff element that supports the SAEDP. Optionally, the SAEDP is nontransparent. The stiff element is located at eye level between the SAEDP and the outside environment during normal driving. Additionally, the vehicle includes a camera (e.g., camera 142 or structure 147 that comprises multiple cameras), which is configured to take video of the outside environment in front of the occupant, and a computer (e.g., computer 143) that is configured to generate, based on the video, a representation of the outside environment in front of the occupant at eye level. Optionally, the camera, and/or each of the cameras in the structure 147, may be based on at least one of the following sensors: a CCD sensor, a CMOS sensor, a near infrared (NIR) sensor, an infrared sensor (IR), and a camera based on active illumination such as a LiDAR. Optionally, when the camera comprises multiple cameras, the multiple cameras are directed to multiple directions around the vehicle, and the multiple cameras support generating multiple representations of the outside environment from different points of view.

It is to be noted that in some embodiments, the SAEDP may be fixed at its location both in normal driving and in times that are not considered to correspond to normal driving, while in other embodiments, the SAEDP may change its location during at least some of the times that do not correspond to normal driving.

The SAEDP is coupled to the compartment in such a way that it is located at eye level in front of an occupant who sits in a front seat of the compartment during normal driving. Different types of SAEDPs may be utilized in different embodiments.

In one embodiment, the SAEDP comprises a passive material that is less stiff than a standard automotive glass window. The passive material is configured to protect the occupant's head against hitting the inner side of the vehicle compartment during a collision. Optionally, the passive material has thickness greater than at least one of the following thicknesses: 1 cm, 2 cm, 5 cm, 10 cm, 15 cm, and 20 cm. Optionally, the thickness of the passive material may refer to the average thickness of the SAEDP across the portion of the SAEDP at eye level. Alternatively, the thickness may refer to the maximal thickness at some position of the SAEDP (which is at least one of the values mentioned above).

In another embodiment, the SAEDP comprises a pneumatic pad that is configured to inflate in order to protect the occupant's head against hitting the inner side of the vehicle compartment during collision. In some examples, the pneumatic pads may be formed from an elastomeric material providing chambers containing air or another gas. Optionally, the chambers are retained in compressed deflated condition until being inflated by the admission of gas pressure controlled by the vehicle's autonomous-driving control system that is responsible to estimate the probability and severity of an imminent collision. Additionally or alternatively, the chambers may be provided with restricted passages limiting the flow out from the chambers to provide shock-absorbing energy dissipation to reduce the rebound effect. U.S. Pat. No. 5,382,051 discloses examples for pneumatic pads that can be used with some of the embodiments.

In yet another embodiment, the SAEDP comprises an automotive airbag, which is configured to protect the occupant's head against hitting the inner side of the vehicle compartment during collision. In one example, the airbag is in a stowed state during normal driving. The airbag is coupled to an inflator configured to inflate the airbag with gas to an inflated state, upon receiving an indication indicative of a probability of an impact of the vehicle exceeding a threshold. In this example, the airbag is located, when in the stowed state, at eye level in front of the occupant.

In some embodiments, the compartment may include a door, and the SAEDP is physically coupled to the door from the inside, such that the SAEDP moves with the door as the door opens and/or closes. In some embodiments, the vehicle may include a second SAEDP coupled to the outer front of the vehicle to minimize damage to a pedestrian during a pedestrian-vehicle collision. In one embodiment, the stiff element that supports the SAEDP is nontransparent. In another embodiment, the stiff element may be automotive laminated glass or automotive tempered glass. Optionally, the structure of the vehicle comprises a crumple zone located at eye level between the stiff element and the outside environment.

The representation of the outside environment is intended to provide the occupant with some details describing the outside environment. In some embodiments, the representation of the outside environment is generated from the point of view of the occupant, and it represents how a view of the outside environment would look like to the occupant, had there been a transparent window at eye level instead of the SAEDP and/or the stiff element. Optionally, a display is utilized to present the representation to the occupant.

Various types of displays may be utilized in different embodiments to present the representation of the outside environment to the occupant. In one embodiment, the display is comprised in an HMD, and the vehicle further comprises a communication system configured to transmit the representation to the HMD. For example, the HMD may be a virtual reality system, an augmented reality system, or a mixed-reality system. In one embodiment, the display is supported by at least one of the SAEDP and the stiff element. For example, the display is physically coupled to the SAEDP and/or the stiff element. Optionally, the display is a flexible display. For example, the flexible display may be based on at least one of the following technologies and their variants: OLED, organic thin film transistors (OTFT), electronic paper (e-paper), rollable display, and flexible AMO-LED. In one example, the display is flexible enough such that it does not degrade the performance of the SAEDP by more than 20% during a collision. In one example, the performance of the SAEDP is measured by hitting a crash test dummy head against the SAEDP and measuring the head's deceleration using sensors embedded in the head.

Figure 21A:
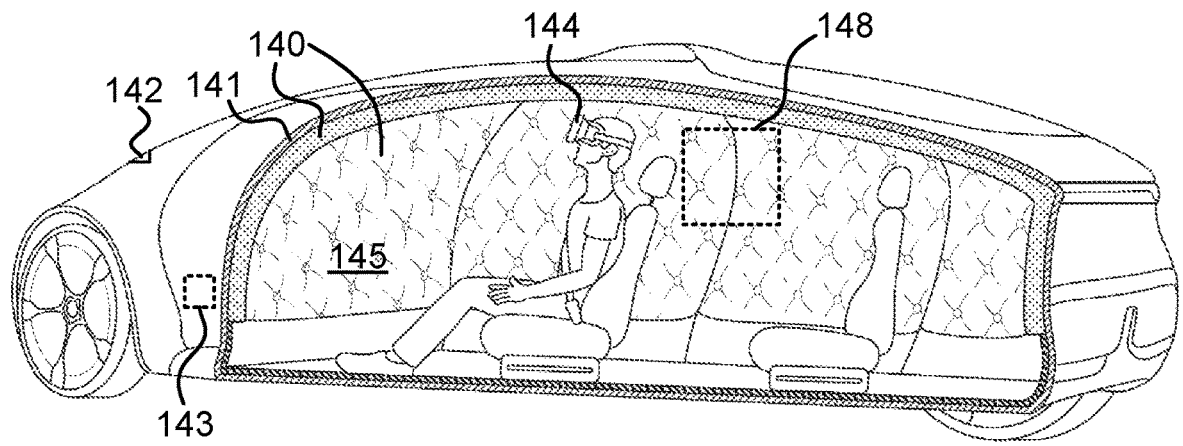
FIG. 21a and FIG. 21b illustrate vehicles with an SAEDP in their compartment were an occupant uses an HMD to receive a representation of the outside environment.
Figure 21B:
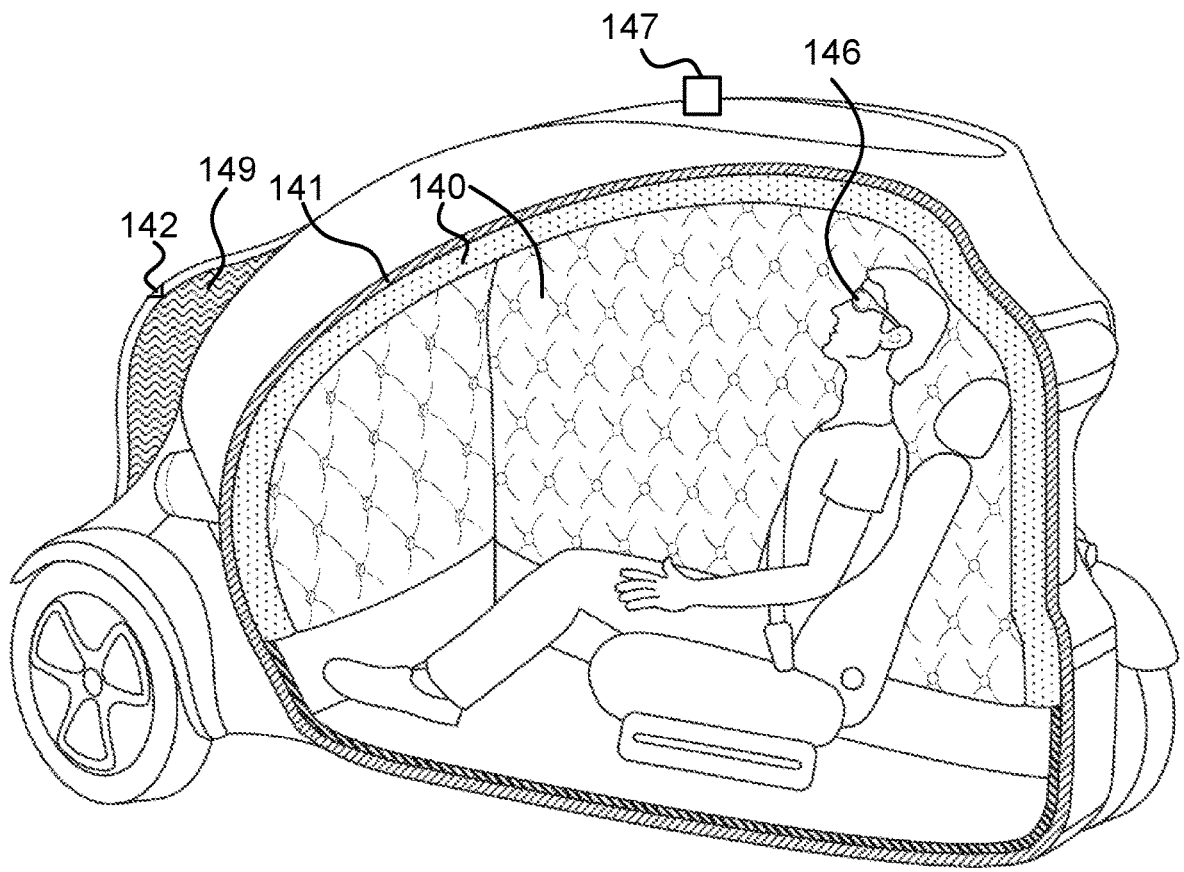
Figure 22:
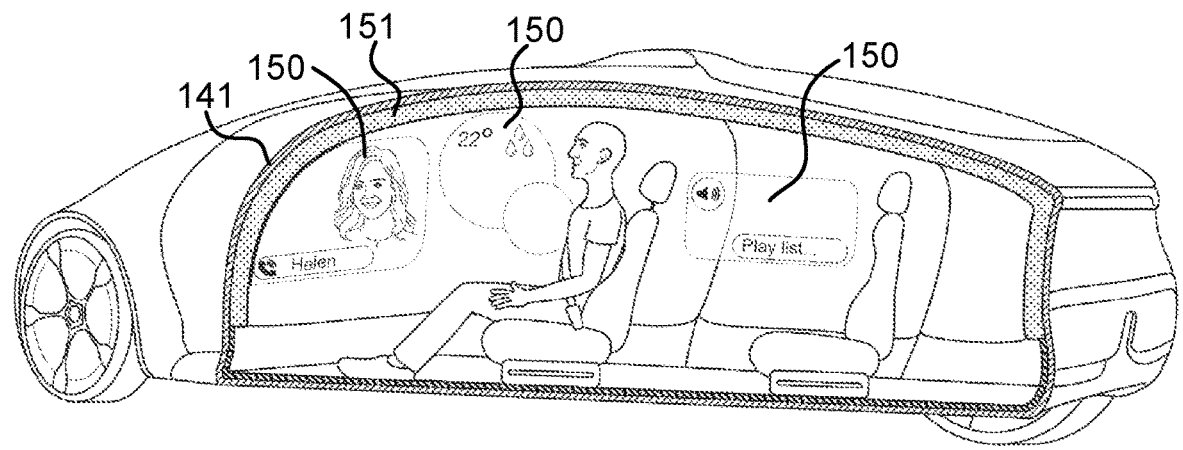
FIG. 22 illustrates a vehicle with an SAEDP in the vehicle's compartment with displays.

FIG. 21a, FIG. 21b, and FIG. 22 illustrate various embodiments of the vehicle described above. Each of the illustrated vehicles comprises a cross-section view of the vehicles, where each includes a compartment 145 for a single occupant (in FIG. 21b) or more (in FIG. 21a and FIG. 22). In the figures, much of the compartment is covered with the SAEDP 140, which is nontransparent and comprises a soft passive material (cushiony in its nature). Supporting the SAEDP 140 is a stiff element 141, which in the illustrations comprises portions of the exterior (hull) of the vehicle which may optionally be made of one or more of the following materials: fiber-reinforced polymer, carbon fiber reinforced polymer, steel, and aluminum. The vehicles also include a camera (such as camera 142 and/or structure 147 that houses multiple cameras), which is positioned to capture a front view of the outside environment of the vehicle. Additionally, the vehicles include a computer 143, which may be positioned in various locations in the vehicle. In some embodiments, the computer may be comprised of multiple processors and/or graphics processors that may be located at various locations in the vehicle.

The figures illustrate various types of displays that may be utilized to present the occupant with the representation of the outside environment generated by the computer 143 based on the video taken by the camera 142. In FIG. 21a the representation is presented via an HMD 144, which may be, for example, a virtual reality HMD. In FIG. 21b the representation is presented via an HMD 146, which may be, for example, a mixed-reality headset. And in FIG. 22 the representation may be provided via one or more of the displays 150, which are coupled to the compartment. It is to be noted that in the figures described above not all of the described elements appear in each figure.

The figures also illustrate various structural alternatives that may be implemented in different embodiments described herein. For example, FIG. 21a illustrates a vehicle that includes window 148, which may optionally be an automotive tempered glass window, located in a location in which the head of a belted occupant is not expected to hit during collision. FIG. 21b illustrates a vehicle that includes crumple zone 149, which is located at the front of the vehicle at eye level. The figure also illustrates the structure 147 that houses multiple cameras directed to multiple directions around the vehicle.

In some embodiments, the representation of the outside environment may be manipulated in order to improve how the outside environment looks to the occupant. Optionally, this may be done utilizing the computer. In one example, manipulating the representation includes at least one of the following manipulations: converting captured video of an overcast day to video of a sunny day by preserving main items in the captured video (such as vehicles and buildings) and applying effects of a sunny day, converting unpleasant environment to a nice one, converting standard vehicles to futuristic or old fashion vehicles, and adding fans standing outside and waiving to the occupant.

In one embodiment, the manipulation maintains the main items in the environment, such that the occupant would still know from the manipulated representation where he/she is traveling. In another embodiment, the manipulated representation maintains the main objects in the video of the outside environment, such that the main objects presented in the manipulated video essentially match the main objects that would have been seen without the manipulation. In some embodiments, the vehicle compartment may include an automotive laminated glass window or automotive tempered glass window located in a location where the head of a belted occupant is not expected to hit as a result of collision while traveling in velocity of less than 50 km/h, as illustrated by the dotted rectangle 148 in FIG. 21a. In one embodiment, the structure of the vehicle is such that a crumple zone is located at eye level between the stiff element and the outside environment.

Various types of vehicles may benefit from utilization of the nontransparent SAEDP supported by the stiff element and in conjunction with the camera and computer, as described above. The following are some examples of different characterizations of vehicles in different embodiments. In one embodiment, the vehicle weighs less than 1,500 kg without batteries, and it is designed to carry up to five occupants. In another embodiment, the vehicle weighs less than 1,000 kg without batteries, and it comprises an engine that is able to sustain continuously at most 80 horsepower. In yet another embodiment, the vehicle weighs less than 1,000 kg and it is designed to carry up to two occupants. In still another embodiment, the vehicle weighs less than 800 kg without batteries, and it comprises an engine that is able to sustain continuously at most 60 horsepower. In yet another embodiment, the vehicle weighs less than 500 kg without batteries and it comprises an engine that is able to sustain continuously at most 40 horsepower. And in still another embodiment, the vehicle weighs less than 400 kg without batteries and is designed to carry up to two occupants.

Many vehicles have side windows that enable an occupant of the vehicle to get a view of the outside environment. However, this feature may come at a cost of increasing the risk to the occupant in the case of an accident. Collisions that involve being hit on the side of the vehicle can be quite dangerous to the occupant of the vehicle. Since there is often not a lot of space between the occupant's head and the side of the vehicle, head injuries are a major risk in this type of accident. Additionally, the window positioned to the side of the head, which has low structural integrity (compared to most of the rest of the vehicle's exterior), can break during a side collision, which increases the risk of compartmental intrusion.

While various safety systems have been developed and deployed over the years in order to address the safety shortcomings of side windows, they only offer a partial, and usually inadequate redress. Thus, there is a need for vehicles that can offer the advantage of windows (e.g., a view of the outside), without suffering from at least some of the shortcomings of vehicle windows, such as the increased safety risk that windows often pose. Some aspects of this disclosure involve an autonomous on-road vehicle that includes a nontransparent Shock-Absorbing Energy Dissipation Padding (SAEDP) that is coupled to the compartment and is located, during normal driving, at eye level to the left of the occupant who sits in a front seat of the compartment (in the left front seat when the vehicle has more than one front seat). The SAEDP obstructs at least 30 degrees out of the horizontal unaided field of view (FOV) to the outside environment to the left of the occupant at eye level. Additionally, the vehicle includes a stiff element that is configured to support the SAEDP and to resist deformation during collision in order to reduce compartment intrusion. The stiff element is located at eye level between the SAEDP and the outside environment. Thus, the combination of the SAEDP and the stiff element offers the occupant an increased level of protection, e.g., in the case of a collision to the left side of the vehicle, compared to a vehicle in which a traditional window is in place at eye level on the left side of the vehicle. However, due to it being nontransparent, placing the SAEDP at eye level may obstruct the occupant's view to the outside. Thus, in order to offer the occupant such a view, in some embodiments, the vehicle also includes a camera configured to take video of the outside environment to the left of the occupant, and a computer, which is configured to generate, based on the video, a representation of the outside environment to the left of the occupant at eye level. This representation may be provided to the occupant using various types of displays. One non-limiting advantage of the vehicle described above is that it increases the safety of the occupant in the case of a side collision, without prohibiting the occupant from obtaining a side view of the outside environment.

In one embodiment, an autonomous on-road vehicle includes a compartment, which one or more occupants may occupy while traveling in the vehicle (e.g., by sitting in seats). Coupled to the compartment is a Shock-Absorbing Energy Dissipation Padding (SAEDP) and a stiff element that supports the SAEDP. Optionally, the SAEDP is nontransparent. The SAEDP is located at eye level to the left of the occupant who sits in a front seat of the compartment during normal driving. The stiff element is located at eye level between the SAEDP and the outside environment. Optionally, the stiff element is nontransparent. Optionally, the stiff element may be automotive laminated glass or automotive tempered glass.

The vehicle also includes a camera (such as camera 161) that is configured to take video of the outside environment to the left of the occupant, and a computer that is configured to generate, based on the video, a representation of the outside environment to the left of the occupant at eye level. Optionally, the camera comprises multiple cameras directed to multiple directions around the vehicle, and the multiple cameras support generating multiple representations of the outside environment from different points of view.

Figure 23:
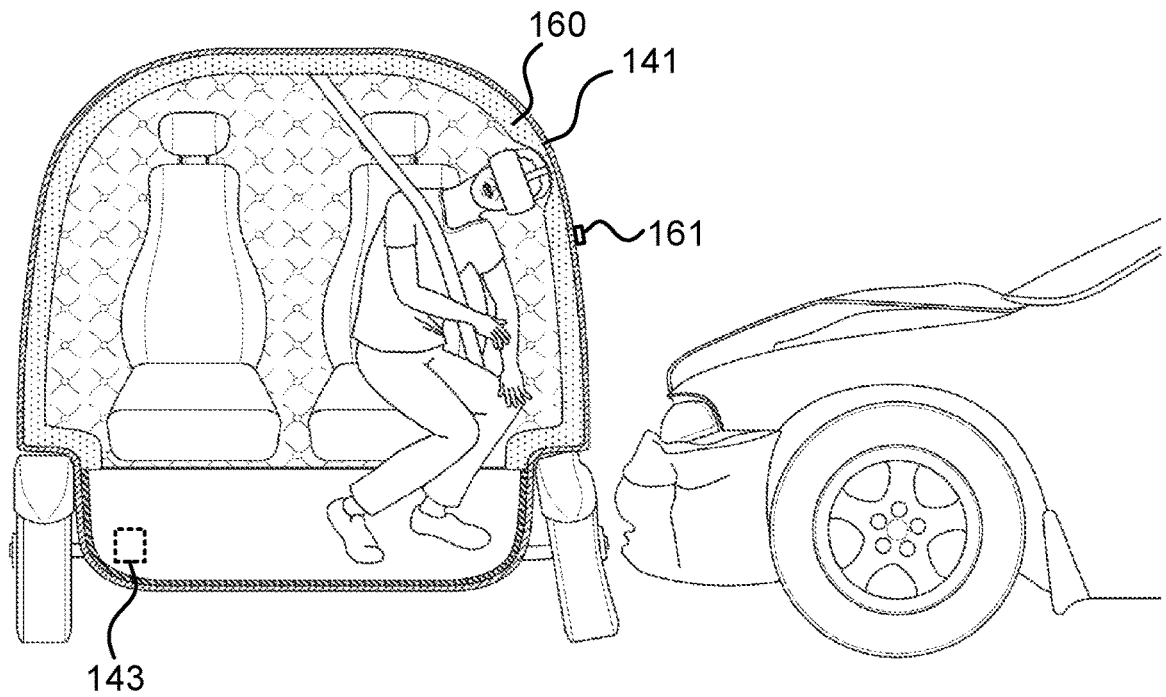
FIG. 23 illustrates how an SAEDP protects the occupant in a side collision.

FIG. 23 illustrates one embodiment of the autonomous on-road vehicle described above, which shows how an SAEDP protects the occupant during a collision. In the figure, SAEDP 160 (which may comprise a passive material) is coupled to the stiff element 141. When another vehicle collides with the side of the vehicle, the occupants head strikes the soft SAEDP 160, instead of a glass window (which would be positioned there in many conventional vehicles).

The SAEDP is coupled to the compartment in such a way that it is located at eye level to the left of the occupant who sits in a front seat of the compartment during normal driving. Optionally, due to its location, the SAEDP obstructs at least 30 degrees out of the horizontal unaided field of view (FOV) to the outside environment to the left of the occupant at eye level. Optionally, the SAEDP obstructs at least 45 degrees or at least 60 degrees out of the horizontal unaided FOV to the outside environment to the left of the occupant at eye level. In one example of a standard vehicle, such as Toyota Camry model 2015, the frontal horizontal unaided FOV extends from the left door through the windshield to the right door.

In some embodiments, the SAEDP is physically coupled to the left door of the vehicle. In one embodiment, the vehicle has a single seat (occupied by the occupant). In another embodiment, the vehicle has two or more front seats and the occupant occupies the leftmost of the two or more front seats. Different types of SAEDPs may be utilized in different embodiments. In one embodiment, the SAEDP comprises a passive material, which is less stiff than a standard automotive glass window, having a thickness greater than at least one of the following thicknesses: 1 cm, 2 cm, 5 cm, 10 cm, 15 cm, and 20 cm. In other embodiments, the SAEDP may include an automotive airbag or a pneumatic pad that is configured to inflate in order to protect the occupant's head against hitting the inner side of the vehicle compartment during collision.

In a similar fashion to how the SAEDP and stiff element are utilized to help protect the left side of the occupant, the same setup may be applied to the right side of the vehicle, in order to help protect that side. Thus, in some embodiments, the vehicle may further include a second SAEDP located at eye level to the right of the occupant who sits in the front seat, and a second stiff element located at eye level between the second SAEDP and the outside environment. Optionally, the second SAEDP obstructs at least 20 degrees out of the horizontal unaided FOV to the outside environment to the right of the occupant at eye level, and the computer is further configured to generate a second representation of the outside environment to the right of the occupant.

Some aspects of this disclosure involve an autonomous on-road vehicle that includes a nontransparent Shock-Absorbing Energy Dissipation Padding (SAEDP) that can cover a side window that enables an occupant of the vehicle to see the outside environment. The side window is located at eye level of an occupant who sits in the vehicle. A motor is configured to move the SAEDP over a sliding mechanism between first and second states multiple times without having to be repaired. A processor is configured to receive, from an autonomous-driving control system, an indication that a probability of an imminent collision reaches a threshold, and to command the motor to move the SAEDP from the first state to the second state. In the first state the SAEDP does not block the occupant's eye level view to the outside environment, and in the second state the SAEDP blocks the occupant's eye level view to the outside environment in order to protect the occupant's head against hitting the side window during collision. One non-limiting advantage of the vehicle described above is that it increases the safety of the occupant in the case of a side collision.

In one embodiment, an autonomous on-road vehicle includes a side window 170, a nontransparent SAEDP (e.g., SAEDP 171), a motor 172, and a processor 175. The processor 175 is configured to receive, from an autonomous-driving control system (such as autonomous-driving control system 65), an indication indicating that a probability of an imminent collision reaches a threshold, and to command the motor 172 to move the SAEDP 171 from the first state to the second state. In the first state the SAEDP 171 does not block the occupant's eye level view to the outside environment, and in the second state, the SAEDP 171 blocks the occupant's eye level view to the outside environment in order to protect the occupant's head against hitting the side window during collision. Optionally, the processor is configured to command the motor 172 to start moving the SAEDP 171 to the second state at least 0.2 second, 0.5 second, 1 second, or 2 seconds before the expected time of the collision.

The motor 172 is configured to move the SAEDP 171 over a sliding mechanism 173 between first and second states multiple times without having to be repaired. For example, during the same voyage, the SAEDP 171 may go up and down multiple times without a need for the occupant or anyone else to repair the SAEDP 171 and/or other components (such as motor 172 or the window 170) in order to the SAEDP 171 to be able to continue its operation correctly (i.e., continue moving up and down when needed). In some examples, the motor 172 is a motor designed to move the SAEDP 171 more than twice, more than 100 times, and/or more than 10,000 times without being replaced.

The side window 170 is located at eye level of an occupant who sits in the vehicle, which enables the occupant to see the outside environment. In one embodiment, the side window 170 is a power window. In this embodiment, the power window comprises a window regulator that transfers power from a window motor 177 to the side window glass in order to move it up or down. The motor 172 is coupled to an SAEDP regulator that transfers power from the motor 172 to the SAEDP 171 in order to move it up or down. In this embodiment, the SAEDP regulator is located closer to the inner side of the compartment then the window regulator. Optionally, the motor 172 and the window motor 177 may be of the same type or of different types.

In one embodiment, the SAEDP 171 comprises a passive material, which is less stiff than a standard automotive glass window, having thickness greater than at least one of the following thicknesses: 1 cm, 2 cm, 5 cm, 10 cm, 15 cm, and 20 cm. Optionally, the vehicle may include a storage space in a door of the vehicle, which is configured to store the SAEDP 171 in the first state. Additionally or alternatively, the vehicle may include a storage space in the roof of the vehicle, which is configured to store the SAEDP 171 in the first state.

Optionally, the SAEDP 171 may move upwards when switching between the first and second states, and the top of the SAEDP has a profile (such as a triangle or a quarter sphere) which reduces the risk of catching the a part of the occupant (e.g., a finger or limb) or the occupant's clothing, between the top of the SAEDP 171 and an upper frame when moving the SAEDP 171 to the second state.

In one embodiment, when switching the SAEDP 171 quickly between the first and second states, the SAEDP 171 is configured not to cover a range of 1 to 5 cm of the top height of the window. Optionally, keeping said range unoccupied reduces the risk of catching the occupant's fingers or limb by the edge of the SAEDP 171 when moving the SAEDP 171 to the second state.

In some embodiments, the vehicle may include additional SAEDPs that cover additional regions of the vehicle's compartment (besides the side window 170). In one example, the vehicle includes an SAEDP 176 that covers at least a portion of the roof of the vehicle.

In some embodiments, the vehicle includes a camera (e.g., camera 178a), which is configured to take video of the outside environment while the SAEDP 171 is in the second state. Additionally, in these embodiments, the vehicle may include a computer (such as computer 13), which is configured to generate a representation of the outside environment based on the video, and a display configured to present the representation of the outside environment to the occupant. The display may be physically coupled to the compartment and/or belong to an HMD. Optionally, the camera is physically coupled to the SAEDP, and thus moves along with the SAEDP 171 when it is moved between the first and second states. Optionally, the display is physically coupled to the SAEDP 171, and thus moves along with the SAEDP 171 when it is moved between the first and second states. Optionally, the display is configured to show, at eye level, a representation of the outside environment when the SAEDP is in the second state. In one example, the display is a flexible display. In another example, the camera comprises multiple cameras directed to multiple directions around the vehicle, and the computer is configured to generate at least two different representations of the outside environment, from at least two different points of view, for two occupants who sit in the vehicle.

In some embodiments, in addition to raising the SAEDP 171, one or more of the displays mentioned above is utilized to present the occupant a video of the threat and the predicted trajectory that could result in the collision, in order to explain why the SAEDP 171 is being moved to the second state.

Figure 24A:
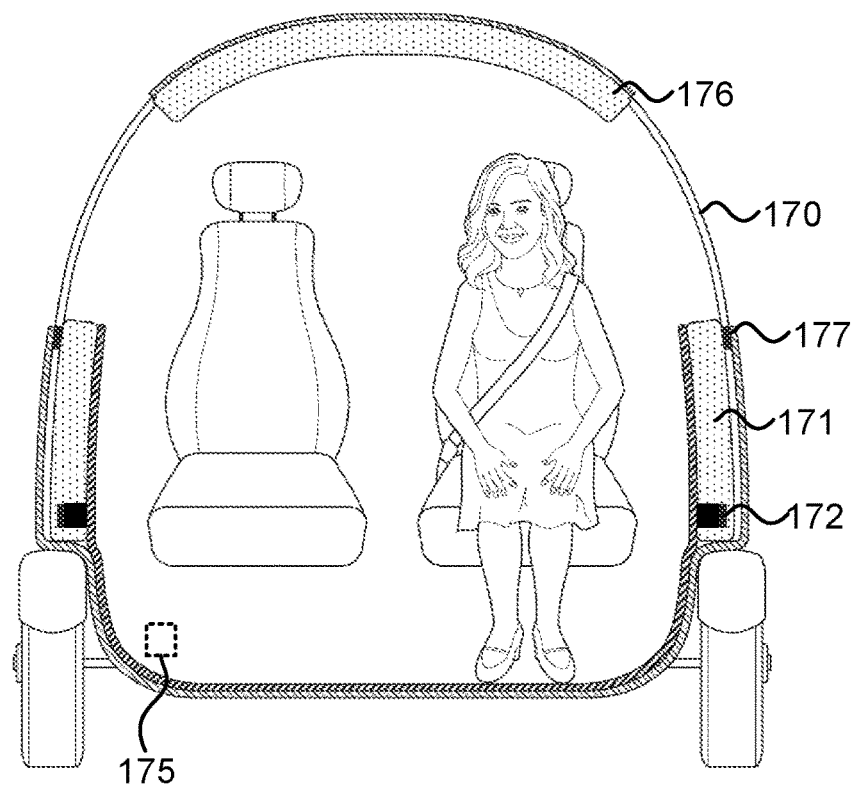
FIG. 24a and FIG. 24b illustrate a vehicle with a motor configured to move a nontransparent SAEDP to cover a side window.
Figure 24B:
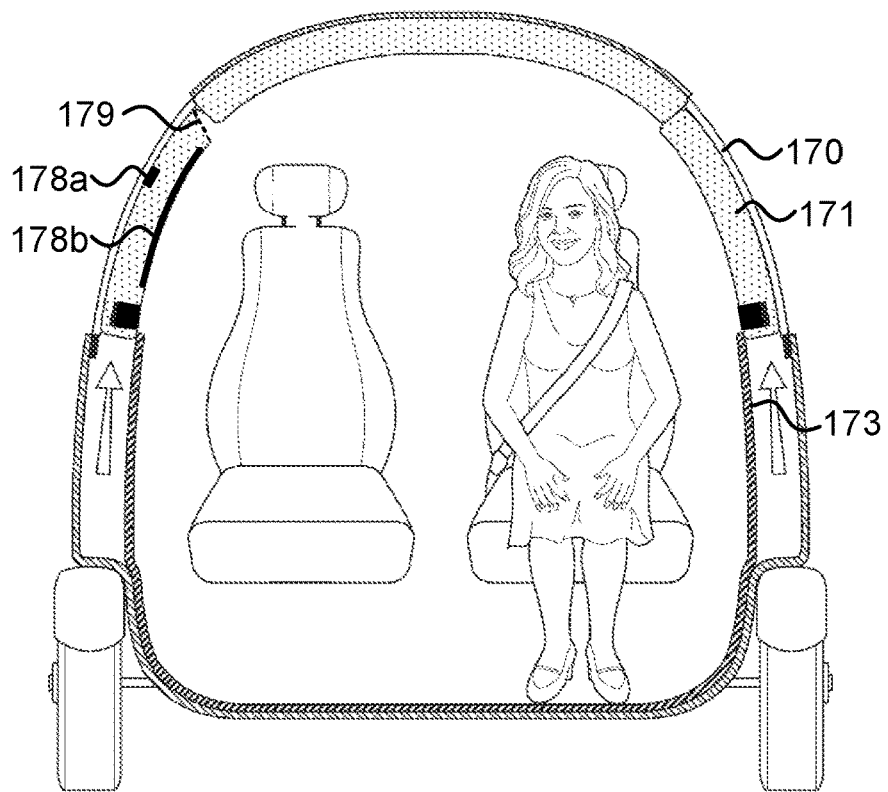

FIG. 24a and FIG. 24b illustrate an example of a vehicle in which the side window may be covered by an SAEDP that can move up and down. The figures illustrate cross-sections of the vehicle, which show how the SAEDP 171 may move from the first state (in FIG. 24a) to the second state (in FIG. 24b). The dotted line 179 indicates that the SADEP 171 does not close the entire gap over the window (e.g., in order to avoid catching the occupant's hair). The figures also illustrate sliding mechanism 173, which may be utilized to guide and assist in the movement of SAEDP 171. FIG. 24b also illustrates camera 178a and display 178b, which are connected to a processor that generates, based on the video received from the camera, a view of the outside environment when an SAEDP (on the right side of the vehicle) is in the second state. The view of the outside environment is presented to the occupant on the display 178b. Camera and display on the left SAEDP 171, which correspond to camera 178a and display 178b, are not shown in the figure in order to make it clearer; however it is to be understood that such camera and display may be fitted to any relevant moving SAEDP.

In one embodiment, the mechanism that moves the SAEDP 171 between the first and second states (referred to as the "SAEDP mechanism") is similar to a power window regulator that moves an automobile window up and down. As with automobile power windows, the SAEDP regulator may be powered by an electric motor, which may come with the SAEDP regulator as one unit, or as a system that enables the motor or regulator to be replaced separately. The SAEDP mechanism includes a control system, a motor, a gear reduction, a sliding mechanism and the SAEDP, which are usually physically coupled to the door, but may alternatively be physically coupled to the roof as disclosed below. The sliding mechanism may have different architectures, such as Bowden type, double Bowden type, cable spiral, or crossed levers.

In a first example, the SAEDP mechanism is similar to a double Bowden power window mechanism, in which the SAEDP 171 is physically coupled to two supports respectively constrained along two rails. The control system drives the motor that wraps two Bowden cables, which move two supports and, consequently, the SAEDP 171. A Bowden cable transmits mechanical force through the movement of an inner cable relative to an outer housing, and in the case of a DC motor, the basic operations of the motor are accomplished by reversing the polarity of its power and ground input.

In a second example, the SAEDP mechanism is similar to a gear-drive type power window regulator; in this case, the SAEDP mechanism includes an SAEDP motor to power the mechanism, gear drive and geared arm to move the SAEDP 171 between the first and second states, and an SAEDP holding bracket to hold the SAEDP 171.

In a third example, the SAEDP mechanism is similar to a cable type power window regulator; in this case, the SAEDP regulator includes an SAEDP motor that drives a wire cable though a mechanism, a series of pulleys that guide the cable, and a regulator carriage attached to the cable and to the SAEDP 171 and slides on the regulator track. One or more tracks may be mounted vertically inside the door panel that serves as a guide piece when the SAEDP 171 slides up and down. Depending on the design, the setup may have one main regulator track in the center of the door, or have a track on each side of the SAEDP.

In a fourth example, the SAEDP regulator is similar to a scissor power window regulator; in this case, a motor operates a gear wheel that raises and lowers the SAEDP 171 by the use of a scissor action of rigid bars.

The motor that moves the SAEDP 171 over the sliding mechanism may be any suitable motor, such as a DC electric motor, an AC electric motor, or a pneumatic motor.

In one embodiment, the indication that the probability of an imminent collision reaches a threshold is received from the autonomous-driving control system 65 that calculates the probability based on the trajectory of the vehicle and information about the road. Optionally, the information about the road may be received from one of more of the following sources: a sensor mounted to the vehicle, a sensor mounted on a nearby vehicle, a road map, a stationary traffic controller nearby the vehicle, and a central traffic controller that communicates with the vehicle via wireless channel.

In one embodiment, the processor 175 is further configured to receive an updated indication that the probability of the imminent collision does not reach a second threshold, and to command the motor to move the SAEDP to the first state. In this embodiment, the second threshold denotes a probability for a collision that is equal or lower than the threshold.

Vehicle-pedestrian collisions claim many casualties. This is likely to persist even in the age of autonomous vehicles. In some cases, collisions with pedestrians may be simply impossible to avoid or too dangerous (to the vehicle occupants) to avoid. Due to many traditional vehicles having a front windshield, vehicle-pedestrian collisions often involve the pedestrian hitting the stiff windshield, which can lead to severe bodily harm to the pedestrian and maybe also to damage the windshield. Thus, there is a need for devices that can reduce the danger in vehicle-pedestrian collisions.

Figure 24C:
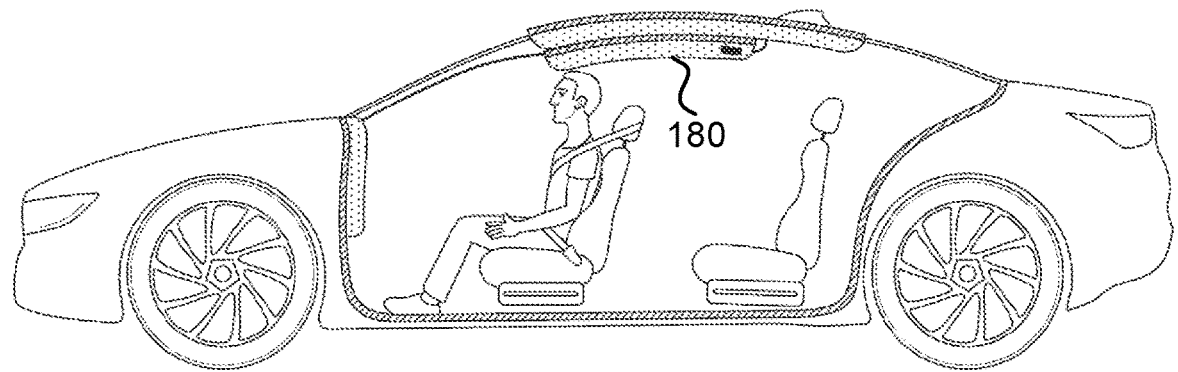
FIG. 24c and FIG. 24d illustrate a motor configured to move a front nontransparent Shock-Absorbing Energy Dissipation Padding (SAEDP) between first and second states.
Figure 24D:
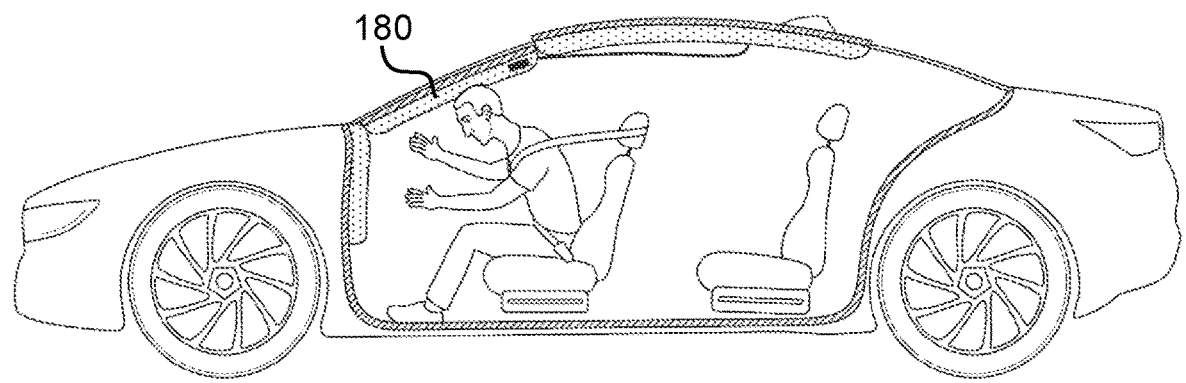

FIG. 24c and FIG. 24d illustrate a motor configured to move a front nontransparent SAEDP 180 between first and second states. The front SAEDP 180 may be moved along one or more rails.

Some aspects of this disclosure involve an autonomous on-road vehicle that includes an outer nontransparent Shock-Absorbing Energy Dissipation Padding (SAEDP) mounted to the front side of the vehicle, such that the SAEDP is in front of and at eye level of an occupant who sits in a front seat of the vehicle during normal driving. Additionally, the vehicle includes a camera that is mounted to the vehicle and is configured to take video of the outside environment in front of the occupant, and a computer configured to generate, based on the video, a representation of the outside environment at eye level for the occupant.

One non-limiting advantage of the vehicle described above is that it increases the safety of a pedestrian in case of a vehicle-pedestrian collision, without prohibiting the occupant of the vehicle from receiving a frontal view of the outside environment.

Figure 25A:
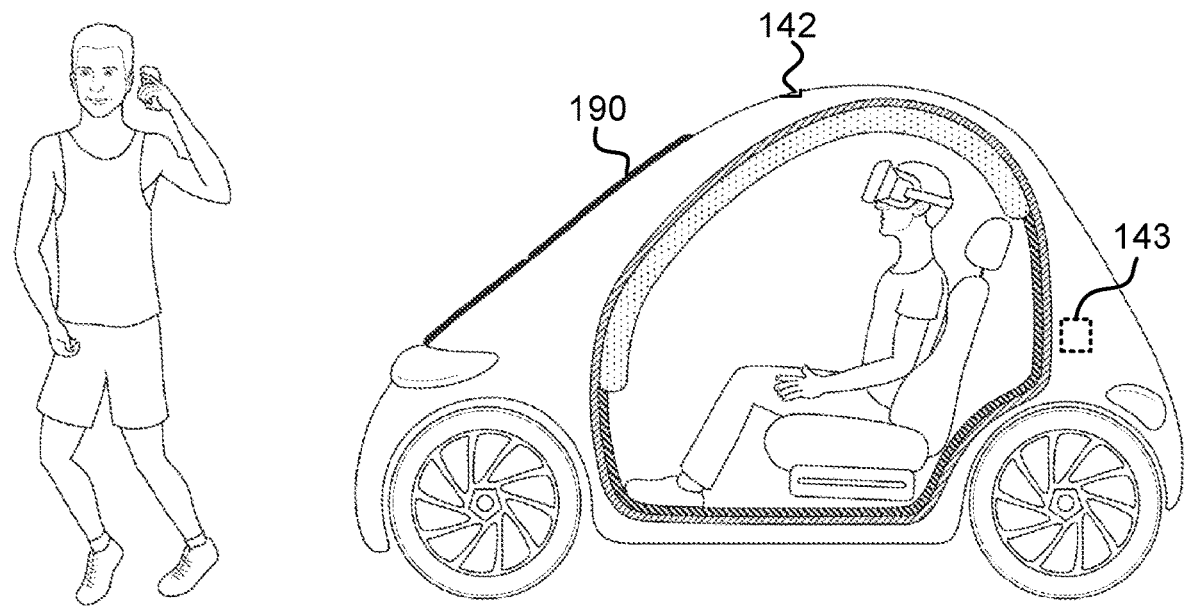
FIG. 25a illustrates an SAEDP mounted to the front of a vehicle at eye level of an occupant of the vehicle.

FIG. 25a illustrates one embodiment of an autonomous on-road vehicle that includes outer nontransparent SAEDP 190, which is mounted to the front side of the vehicle, such that the SAEDP 190 is in front of and at eye level of an occupant who sits in a front seat of the vehicle during normal driving. The SAEDP 190 is less stiff than a standard automotive glass window and is designed to absorb some of the crashing energy transmitted to a pedestrian during a pedestrian-vehicle collision. Additionally, the vehicle includes a camera (such as camera 142), which is mounted to the vehicle and is configured to take video of the outside environment in front of the occupant, and a computer (such as computer 143), which is configured to generate, based on the video, a representation of the outside environment at eye level for the occupant. Optionally, the representation is generated from the point of view of the occupant. Optionally, the vehicle includes a display configured to present the representation to the occupant. For example, the display may belong to an HMD worn by the occupant. In another example, the display may be coupled to the compartment of the vehicle, and may be a flexible display.

The SAEDP 190 may be implemented utilizing various approaches in different embodiments described herein. In one embodiment, the SAEDP 190 comprises a passive material. Optionally, the SAEDP 190 has thickness greater than at least one of the following thicknesses: 1 cm, 2 cm, 5 cm, 10 cm, 15 cm, and 20 cm.

Figure 25B:
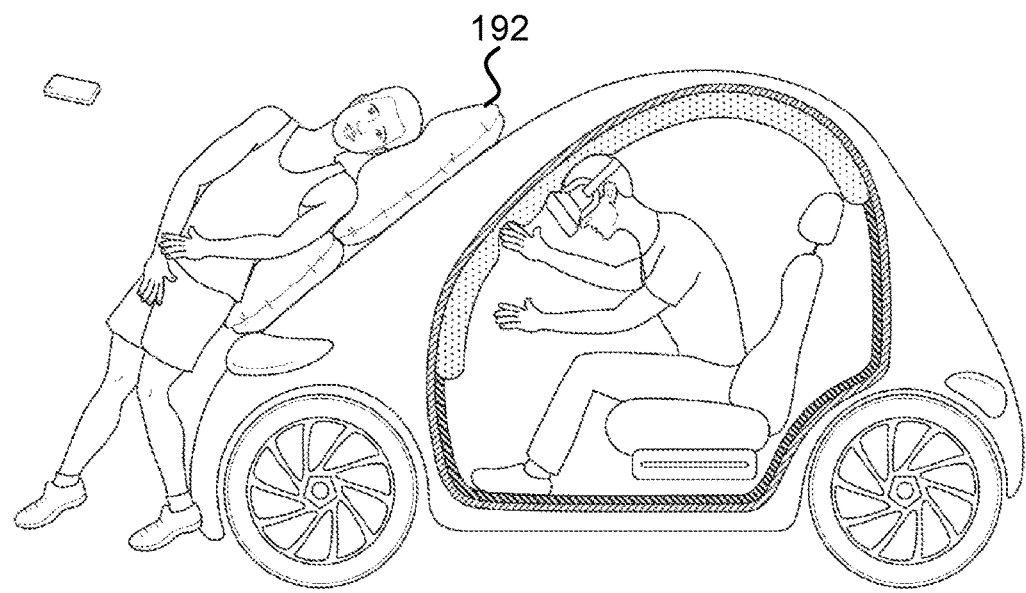
FIG. 25b illustrates an outer SAEDP that includes two air bags.

In another embodiment, the SAEDP 190 comprises an automotive airbag configured to inflate in order to protect the pedestrian. FIG. 25b illustrates an outer SAEDP 190 that includes two air bags 192 configured to absorb some of the crashing energy transmitted to a pedestrian during a pedestrian-vehicle collision. Optionally, the airbag has a stowed condition and an inflated condition. The airbag is coupled to an inflator configured to inflate the airbag with gas, and the airbag is located, in the stowed condition, at eye level in front of the occupant. In this embodiment, the vehicle further includes an autonomous-driving control system, such as autonomous-driving control system 65, which is configured to calculate a probability of pedestrian-vehicle collision, based on measurements of sensors mounted to the vehicle, and to command the airbag to inflate before the pedestrian head hits the vehicle.

In yet another embodiment, the SAEDP 190 comprises a pneumatic pad configured to inflate in order to protect the pedestrian. In this embodiment, the vehicle further includes an autonomous-driving control system, such as autonomous-driving control system 65, which is configured to calculate a probability of pedestrian-vehicle collision, based on measurements of sensors mounted to the vehicle, and to command the pneumatic pad to start inflate at least 0.5 second before the expected time of the collision in order to protect the pedestrian. Optionally, the pneumatic pad is reusable, and can be used multiple times without the need to be repaired. For example, the vehicle comprises a mechanism to deflate and/or stow the pneumatic pad, without requiring its repair and/or replacement.

Some aspects of this disclosure involve an autonomous on-road vehicle that includes a window located at eye level of an occupant who sits in a front seat of the vehicle (e.g., a windshield), a reusable nontransparent Shock-Absorbing Energy Dissipation Padding (SAEDP), a motor, and a processor. The window enables the occupant to see the outside environment. The motor is configured to move the SAEDP over a sliding mechanism between first and second states multiple times without having to be repaired. In the first state the SAEDP does not block the occupant's eye level frontal view to the outside environment, and in the second state the SAEDP blocks the occupant's eye level frontal view to the outside environment. Additionally, in the second state the SAEDP can absorb some of the crashing energy transmitted to a pedestrian during a pedestrian-vehicle collision. The processor is configured to receive, from an autonomous-driving control system, an indication indicative of whether a probability of an imminent pedestrian-vehicle collision reaches a threshold. Responsive to receiving an indication of an imminent collision (e.g., within less than 2 seconds), the processor is configured to command the motor to move the SAEDP from the first state to the second state.

One non-limiting advantage of the vehicle described above is that it increases the safety of a pedestrian in case of a vehicle-pedestrian collision, without prohibiting the occupant of the vehicle from receiving a frontal view of the outside environment during normal driving.

FIG. 26a and FIG. 26b illustrate a motorized external SAEDP 121 that can move between first and second states multiple times. The figures illustrate how the SAEDP 121 can move from the first state (in FIG. 26a) to the second state (FIG. 26b) by having the motor 122 move the SAEDP 121 over sliding mechanism 123. Additionally, the figures illustrate optional camera 126 that is embedded in the SAEDP 121, and which may provide video to a processor configured to generate a representation of the outside environment when the SAEDP 121 is in the second state.

In one embodiment, an autonomous on-road vehicle includes window 120, reusable SAEDP 121, motor 122, and processor 124. The window 120, which is located at eye level of an occupant who sits in a front seat of the vehicle, and which may be a windshield, enables the occupant to see the outside environment. The SAEDP 121 is reusable, i.e., it may be moved multiple times without the need to replace it or repair it after each use. The SAEDP 121 may be implemented utilizing various approaches in different embodiments described herein. In one embodiment, the SAEDP 121 comprises a passive material. Optionally, the SAEDP 121 has thickness greater than at least one of the following thicknesses: 1 cm, 2 cm, 5 cm, 10 cm, 15 cm, and 20 cm. In another embodiment, the SAEDP 121 comprises a pneumatic pad configured to inflate in order to protect the pedestrian. Optionally, the pneumatic pad is reusable, and the processor 124 is configured to command the pneumatic pad to start inflate at least 0.5 second before the expected time of the pedestrian-vehicle collision.

The motor 122 is configured to move the SAEDP 121 over a sliding mechanism 123 between first and second states multiple times without having to be repaired. In the first state the SAEDP 121 does not block the occupant's eye level frontal view to the outside environment, and in the second state the SAEDP 121 blocks the occupant's eye level frontal view to the outside environment. When in the second state, the SAEDP 121 is configured to absorb some of the crashing energy transmitted to a pedestrian during a pedestrian-vehicle collision.

The processor 124 is configured to receive, from an autonomous-driving control system (such as autonomous-driving control system 65), an indication indicative of whether a probability of an imminent pedestrian-vehicle collision reaches a threshold. Optionally, most of the time the vehicle travels, the processor 124 does not provide an indication that the probability reaches the threshold. Responsive to receiving an indication of an imminent collision (e.g., within less than 2 seconds), the processor 124 is configured to command the motor 122 to move the SAEDP 121 from the first state to the second state. Optionally, the processor 124 is configured to command the motor to start moving the SAEDP 121 to the second state at least 0.2 second, 0.5 second, 1 second, or 2 seconds before the pedestrian-vehicle collision in order to protect the pedestrian.

In one example, the vehicle includes a sensor configured to detect the distance and angle between the vehicle and a pedestrian, and the autonomous-driving control system calculates the probability of the imminent pedestrian-vehicle collision based on the data obtained from the sensor, the velocity of vehicle and the possible maneuver.

In one embodiment, the processor 124 is further configured to receive an updated indication that indicates the probability of the imminent pedestrian-vehicle collision does not reach a second threshold, and to command the motor 122 to move the SAEDP to the first state. Optionally, the second threshold denotes a probability for a pedestrian-vehicle collision that is equal or lower than the threshold.

In one embodiment, the processor is further configured to command a second motor to move a wiper, used to wipe the window, in order to enable the SAEDP to move to the second state. In one example, the wiper is lifted up such that the flexible part of the wiper does not touch the window to enable the SAEDP to move to its second state. In another example, the wiper is moved to its lowest position to enable the SAEDP to move to its second state.

In one embodiment, the vehicle includes a camera (such as camera 126), which is configured to take video of the outside environment while the SAEDP 121 is in the second state. Additionally, in this embodiment, the vehicle may further include a computer configured to generate, based on the video, a representation of the outside environment, and a display configured to present the representation of the outside environment to the occupant while the SAEDP 121 is in the second state. Optionally, the camera 126 is physically coupled to the SAEDP 121 from the outer side, and thus moves with the SAEDP 121 when it moves between the first and second states. Optionally, the display is physically coupled to the SAEDP 121 from the inner side, and thus also moves with the SAEDP 121 when it moves between the first and second states; the occupant can see the display via the window 120 when the SAEDP is in the second state. In an alternative embodiment, the display is physically coupled to the compartment (such as a windshield that also functions as a display) and/or comprised in an HMD worn by the occupant.

In addition to, or instead of, moving an SAEDP when a collision is imminent, in some embodiments, an imminent collision may prompt a raise of one or more power windows in the vehicle. This approach is illustrated in the following embodiment.

In one embodiment, a safety system for an occupant of an autonomous on-road vehicle includes an automobile power window and an autonomous-driving control system (such as autonomous-driving control system 65). The autonomous-driving control system is configured to calculate probability of an imminent collision based on data received from sensors coupled to the vehicle. Responsive to detecting that the probability reaches a threshold, and at least one second before the expected collision, the autonomous-driving control system commands the power window to rise. In this embodiment, a raised power window provides an improved safety for the occupant of the vehicle during collision compared to a lowered power window. Optionally, responsive to detecting that the probability reaches the threshold, and at least two seconds before the expected collision, the autonomous-driving control system is configured to command the power window to rise. In one embodiment, the vehicle further includes an SAEDP coupled to the power window from the inside (e.g., as illustrated in FIG. 24a and FIG. 24b). In one embodiment, the power window is non-transparent, and the safety system for the occupant includes a display coupled to the power window from the inside. The display is configured to present to the occupant a video see-trough (VST) of the outside environment that is generated based on a video camera pointed at the outside environment.

In another embodiment, the power window is made of a nontransparent material, which is stronger than a standard automotive tempered glass having the same dimensions. In this embodiment, the vehicle further comprises a camera configured to take video of the outside environment (such as camera 178a), and a computer configured to generate a VST to the outside environment based on the video. Optionally, the camera is physically coupled to the power window, such that the camera is raised and lowered with the power window. Additionally or alternatively, the camera may be coupled to an element of the vehicle that is not the power window, such that the camera does not move up and down when the power window is raised and lowered. Optionally, the vehicle further includes a display coupled to the inner side of the power window, such that the display is at eye level when the power window is raised, and below eye level when the power window is lowered; the display is configured to present the VST to the occupant. Optionally, the occupant wears an HMD, and the computer is configured to present the VST to the occupant on the HMD when the power window is raised, and not to present the VST to the occupant on the HMD when the power window is lowered.

Autonomous vehicles can alleviate occupants from some, if not all, of the tasks related to driving the vehicle. This may enable occupants to partake in various activities, such as working, playing games, relaxing, and even sleeping. Traditional vehicles are usually designed to allow occupants to sit upright in the vehicle for safety reasons and in order for them to have a view to the outside. However, for certain activities (e.g., relaxing or sleeping) an upright position is not very comfortable. Thus, there is a need for an autonomous vehicle in which an occupant may assume a more comfortable position, such as lying down, without compromising on safety.

With autonomous vehicles, it is not necessary for occupants to sit. Some aspects of this disclosure involve autonomous vehicles in which an occupant of the vehicle may lay down. Such a design for an autonomous vehicle has the advantage of enabling a more comfortable position for certain activities (e.g., relaxing or sleeping). Additionally, such a vehicle may be built to be lower than traditional vehicles, which can offer advantages in terms of increased safety (e.g., a lower center of gravity offers better stability) and better vehicle aerodynamics.

In order to increase the safety of the occupant, various forms of padding may be used in the compartment of the vehicle. In some embodiments, an autonomous on-road vehicle designed for lying down includes a closed compartment and a mattress, having an average thickness of at least 3 cm, which covers at least 50% of the compartment floor. In the compartment, there is a nontransparent Shock-Absorbing Energy Dissipation Padding (SAEDP), having an average thickness of at least 1 cm, which covers at least 50% of the compartment side walls and at least 60% of the compartment front wall during normal driving. Optionally, the SAEDP is supported by a stiff element that resists deformation during a collision in order to reduce compartment intrusion. Additionally, the vehicle includes a camera configured to take video of the outside environment, a computer configured to generate a representation of the outside environment based on the video, and a display configured to present the representation to the occupant.

Figure 27:
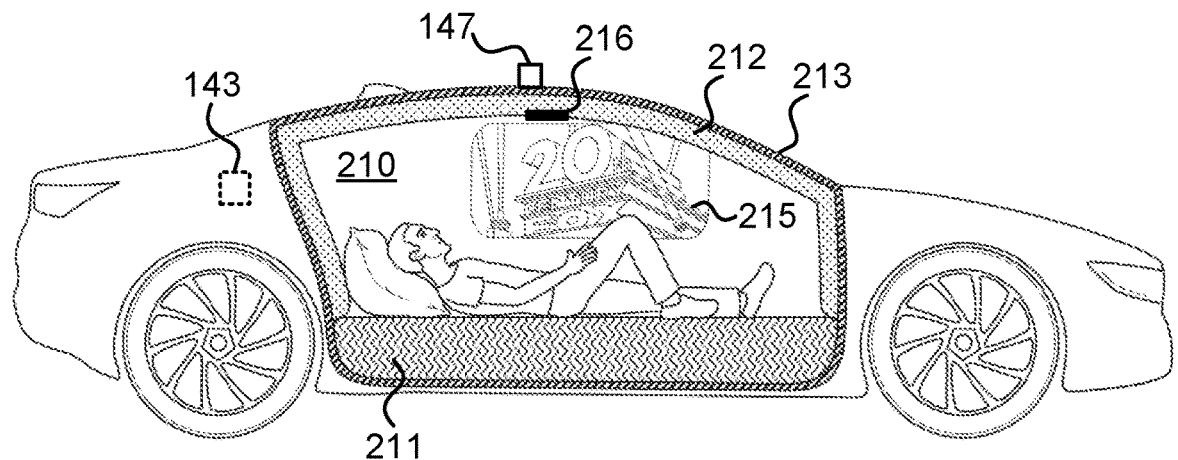
FIG. 27 illustrates a vehicle compartment in which an occupant may lay down.

In one embodiment, an autonomous on-road vehicle designed for lying down includes a closed compartment 210, a mattress 211, an SAEDP 212 covering portions of the compartment 210, a camera (e.g., the structure 147 that houses multiple cameras), a computer (e.g., the computer 143), and a display 215. FIG. 27 illustrates one embodiment of a vehicle compartment 210 in which an occupant may lay down. In the figure, the occupant is lying down on mattress 211, which covers the floor of the compartment 210, and is watching a movie on the display 215. The SAEDP 212 covers the front, roof, and back of the compartment 210. It is to be noted that the SAEDP 212 also covers portions of the side walls of the compartment 210, however, this is not illustrated to enable a clearer image of the embodiment. The figure also includes an airbag 216, which may be inflated below the SAEDP 212 in order to protect the occupant and restrain his/her movement in the case of a collision.

The mattress 211 covers at least 50% of the compartment floor. Optionally, the mattress 211 covers at least 80% of the compartment floor. In one embodiment, the mattress 211 has an average thickness of at least 3 cm. In other embodiments, the average thickness of the mattress 211 is greater than at least one of the following thicknesses: 5 cm, 7 cm, 10 cm, 20 cm, and 30 cm.

The SAEDP 212 is a nontransparent SAEDP, having an average thickness of at least 1 cm. Optionally, the SAEDP 212 covers at least 50% of the compartment side walls and at least 60% of the compartment front wall during normal driving. In one embodiment, the average thickness of the SAEDP 212 is greater than at least one of the following thicknesses: 2 cm, 3 cm, 5 cm, 10 cm, 15 cm, and 20 cm. In another embodiment, the SAEDP 212 covers at least 80% of the compartment side walls and at least 80% of the compartment front wall. In yet another embodiment, the SAEDP covers at least 50% of the compartment roof. In still another embodiment, the mattress and the SAEDP cover essentially the entire compartment interior.

In addition to the SAEDP 212, in some embodiments additional measures may be employed in order to improve the safety of the occupant. In one embodiment, the vehicle includes an automotive airbag configured to deploy in front of the SAEDP 212 in order to protect the occupant, in addition to the SAEDP 212, against hitting the inner side of the vehicle compartment during a collision. It is noted that the meaning that the airbag deploys in front of the SAEDP is that the airbag deploys towards the inner side of the compartment. Optionally, the airbag has a stowed condition and an inflated condition, and the airbag is coupled to an inflator configured to inflate the airbag with gas upon computing a predetermined impact severity. The stowed airbags may be stored in various positions, such as stored essentially in the middle of the front wall, stored essentially in the middle of the rear wall, stored in the side walls (possibly two or more horizontally spaced airbags), and stored in the roof (possibly one or more airbags towards the front of the compartment and one or more airbags towards the rear of the compartment). In some embodiments, various additional safety measures may be utilized to improve the safety of the occupant while traveling, such as a sleeping net and/or a safety belt, as described for example in U.S. Pat. Nos. 5,536,042 and 5,375,879.

Stiff element 213 is configured to support the SAEDP 212 and to resist deformation during a collision in order to reduce compartment intrusion. Part of the stiff element 213 is located at eye level between the SAEDP 212 and the outside environment during normal driving. Optionally, the stiff element covers, from the outside, more than 80% of the SAEDP on the compartment side walls. Optionally, the vehicle also includes a crumple zone located at eye level between the stiff element 213 and the outside environment.

In another embodiment, the vehicle includes a pneumatic pad configured to inflate in order to protect the occupant, in addition to the SAEDP 212, against hitting the inner side of the vehicle compartment during a collision. Optionally, the pneumatic pad is configured to deploy in front of the SAEDP 212 towards the inner side of the compartment. Alternatively, the pneumatic pad is located between the SAEDP 212 and the stiff element 213, and is configured to deploy behind the SAEDP 212. The pneumatic pad may be mounted to various locations, such as mounted to the front wall, mounted to the rear wall, mounted to the side walls, and/or mounted to the roof.

The camera is configured to take video of the outside environment. The computer is configured to generate a representation of the outside environment based on the video. Optionally, the representation is generated from the point of view of the occupant. The display 215 is configured to present the representation to the occupant. In one embodiment, the display 215 is comprised in an HMD, and the vehicle further comprises a communication system configured to transmit the representation to the HMD. In another embodiment, the display 215 is physically coupled to at least one of the SAEDP 212 and the stiff element 213 at eye level of the occupant. Optionally, the display 215 is a flexible display. For example, the display 215 may be a flexible display that is based on at least one of the following technologies and their variants: OLED, organic thin film transistors (OTFT), electronic paper (e-paper), rollable display, and flexible AMOLED. Optionally, the display 215 is flexible enough such that it does not degrade the performance of the SAEDP by more than 20% during a collision.

Having a vehicle compartment that is designed to allow an occupant to lay down comfortably can be done using various compartment designs, which may be different from the designs used in standard vehicles, in which occupants primarily sit up. In one example, the vehicle does not have an automotive seat with a backrest and safety belt, which enables the occupant to sit straight in the front two thirds of the compartment. In another example, the vehicle is designed for a single occupant, and the average distance between the mattress and the compartment roof is below 80 cm. In still another example, the vehicle is designed for a single occupant, and the average distance between the mattress and the compartment roof is below 70 cm. In still another example, the vehicle is designed for a single occupant, and the average distance of the compartment roof from the road is less than 1 meter. And in yet another example the vehicle is designed for a single occupant, and the average distance of the compartment roof from the road is less than 80 cm.

It is to be noted that the use of the terms "floor", "roof", "side walls", and "front wall" with respect to the compartment are to be viewed in their common meaning when one considers the compartment to be a mostly convex hull in 3D, such as having a shape that resembles a cuboid. Thus, for example, an occupant whose face faces forward, will see the front wall ahead, the floor when looking below, the roof when looking above, and a side wall when looking to one of the sides (left or right). In embodiments that do not resemble cuboids, alternative definitions for these terms may be used based on the relative region (in 3D space) that each of the portions of the compartment occupy. For example, the floor of the compartment may be considered to be any portion of the compartment which is below at least 80% of the volume of the compartment. Similarly, the roof may be any portion of the compartment that is above at least 80% of the volume of the compartment. The front wall may be any portion of the compartment that is ahead of at least 80% of the volume of the compartment, etc. Note that using this alternative definitions, some portions of the compartment may be characterized as belonging to two different regions (e.g., the front wall and the roof).

Windowless vehicles may have various benefits when it comes to safety, weight, and cost. However, in some cases, some occupants may feel claustrophobic in such a vehicle. Thus, there is a need for a way to make traveling in such vehicles more pleasurable for occupants who might feel somewhat uneasy in confined spaces. Other occupants would like to see themselves while traveling. Thus, there is a need to allow an occupant traveling in a vehicle to see oneself.

Some aspects of this disclosure involve an autonomous on-road vehicle that includes a compartment having a large mirroring element located in front of an occupant who sits in a front seat of the compartment. Optionally, the mirroring element has height and width exceeding 25×25 cm, such that it covers a square that is at least those dimensions. Optionally, the mirroring element captures a region corresponding to at least 10×10 degrees, including a region spanning from the horizon to 10° below the horizon, of the occupant's forward field of view during normal driving. Additionally, the mirroring element provides an effect of reflecting more than 25% of the light arriving from the occupant's direction. In some embodiments, the vehicle has an advantage that it can increase the perceived compartment volume, which can make travelling in the vehicle more pleasurable for some people.

Figure 28:
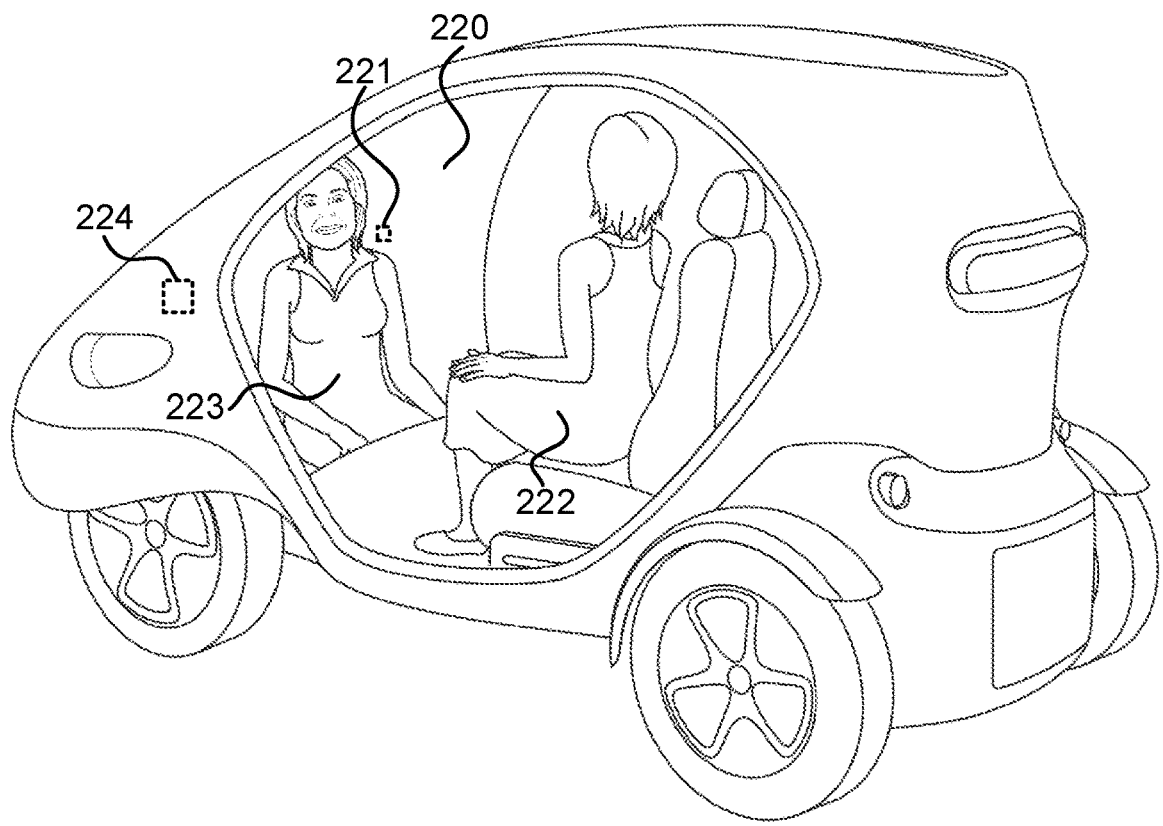
FIG. 28 illustrates a vehicle with a front mirror.

FIG. 28 illustrates one embodiment of a vehicle having a front mirroring element. The figure illustrates how the occupant 222 can see her reflection 223 in the mirroring element 220.

In one embodiment, the mirroring element 220 is located in front of an occupant who sits in a front seat of the compartment. The mirroring element 220 provides an effect of reflecting more than 25% of the light arriving from the occupant's direction. Optionally, the mirroring element 220 provides an effect of reflecting more than at least one of 50%, 80%, and 90% of the light arriving from the occupant's direction. Optionally, the mirroring element 220 increases the volume of the vehicle compartment as perceived by the occupant due to the reflection effect.

In one embodiment, the mirroring element 220 has height and width exceeding 25×25 cm, such that it covers a square that is at least those dimensions. Optionally, the mirroring element 220 captures a region corresponding to at least 10×10 degrees, including a region spanning from the horizon to 10° below the horizon, of the occupant's forward field of view during normal driving. Optionally, the height and width of the mirroring element 220 is above 50×40 cm, and the mirroring element captures above 30×30 degrees of the occupant's field of view, including a region spanning from the horizon to 30° below the horizon. Optionally, the mirroring element 220 covers more than 25%, 50%, or 75% of the area where a conventional windshield of a normal non-autonomous on-road vehicle in year 2016 is expected to be located.

The mirroring element 220 may be implemented in different ways, in different embodiments. In one embodiment, the mirroring element 220 comprises an optical mirror that is essentially flat and perpendicular to the ground. In this embodiment, most of the effect of reflecting is generated by the optical mirror. In one example, an optical mirror that is essentially flat and perpendicular to the ground refers to an optical mirror having a radius of curvature greater than a meter and a deviation below ±30° from the perpendicular to the ground.

In another embodiment, the mirroring element 220 comprises a Fresnel type optical reflector comprising many reflecting prisms. In this embodiment, the Fresnel type optical reflector is not flat, but the reflecting prisms are arranged in angles that reflect the light from the occupant such as to imitate a flat mirror.

In one embodiment, the mirroring element 220 comprises an electronic display that operates based on a camera 221 configured to take video of the occupant 222, and a computer 224 configured to generate a digital representation of the occupant 223 based on the video of the occupant. In this case, most of the effect of reflecting is generated by light emitted by the electronic display (which is the output of the video of the occupant as generated by the computer 224).

Due to the close proximity between the at least one camera 221 and the occupant, it may be necessary to stitch the reflecting effect of a large area from multiple cameras that capture the occupant from different angles. In one example, the camera 221 comprises first and second cameras, located to the right and left of the occupant, respectively. In another example, the camera 221 comprises first and second cameras, located above the level of the occupant's nose and below the level of the occupant's collarbone, respectively, and less than 80 cm away from the occupant.

In still another embodiment, the effect of reflecting is achieved by a digital mirror that comprises multiple cameras embedded within the digital mirror and configured to take images of the occupant, and multiple light emitting pixels configured to emit light rays that generate the effect of reflecting.

In still another embodiment, the effect of reflecting is a 3-dimensional effect of reflecting, which is rendered based on at least two cameras coupled to the compartment and configured to capture the occupant from the right and left, respectively. Optionally, the cameras are coupled at least 10 cm from the right and left of the middle of the compartment. Additionally, the cameras may be coupled at least 10 cm above and below the expected height of the occupant's collarbone.

In one embodiment, the mirroring element 220 comprises an electronic display, and the vehicle further includes a camera configured to take video of the outside environment in front of the occupant, and a computer configured to generate, based on the video, a representation of the outside environment in front of the occupant at eye level, for displaying on the mirroring element 220. In addition to the effect of reflecting, in some embodiments the mirroring element 220 may also be configured to operate in a second state in which it provides an effect of reflecting less than 20% of the light arriving from the occupant's direction, and to present to the occupant the representation of the outside environment. Here, presenting the representation may imitate a transparent windshield to the outside environment.

The vehicle may also include, in some embodiments, a display configured to present to the occupant, at eye level in front of the occupant, the representation of the outside environment instead of, or in addition to, the effect of reflecting. Optionally, the vehicle may include a user interface configured to enable the occupant to switch between seeing the effect of reflecting and seeing the representation of the outside environment. In one example, the display is comprised in a head-mounted display (HMD). In another example, the display is mechanically coupled to the compartment, and/or the mirroring element comprises the display.

In one embodiment, the effect of reflecting light that comes from the direction of the occupant is obtained utilizing an HMD. An autonomous on-road vehicle includes a compartment comprising a front seat, a camera, a computer, a communication module, and the HMD. The camera is physically coupled to the vehicle, configured to take images of an occupant who sits in the front seat. The computer is configured to generate, based on the images, a video that shows a mirror effect. Herein, the "mirror effect" involves presenting the occupant with an image that is similar to an image that the occupant would see had there been an actual mirror in front of the occupant. Optionally, the system enables the occupant to have control on the synthetic mirror effect, such as control on the distance between the occupant and her image, and/or control on the width of the image. The communication module is configured to transmit the video to a head-mounted display (HMD) worn by the occupant, and the HMD is configured to present the video to the occupant, such that the occupant sees a representation of his or her reflection when looking forward at eye level. Optionally, the HMD is selected from the group comprising at least one of: a virtual reality headset, an augmented reality headset, and mixed reality headset. Optionally, the video presented to the occupant captures at least 30×30 degrees of the occupant's field of view, spanning at least from the horizon to 30° below the horizon.

In one embodiment, the vehicle described above further includes a second camera configured to take a second set of images of the outside environment in front of the occupant. In this embodiment, the computer is further configured to generate a representation of the outside environment based on the second set of images, and the HMD is configured to present the representation of the outside environment instead of the video that shows the mirror effect or in addition to the video that shows the mirror effect.

In one embodiment, the vehicle described above may include multiple cameras that capture images that are utilized by the computer to generate the video that shows the mirror effect. In one example, at least first and second cameras are physically coupled to the compartment to the right and left of the occupant, respectively. In another example, at least first and second cameras are physically coupled to the compartment above the level of the occupant's nose and below the level of the occupant's collarbone, respectively, and less than 80 cm away from the occupant.

Many vehicles have side windows that enable an occupant of the vehicle to get a view of the outside environment. However, this feature may come at a cost of increasing the risk to the occupant in the case of an accident. Collisions that involve being hit on the side of the vehicle can be quite dangerous to the occupant of the vehicle. Since there is often not a lot of space between the occupant's head and the side of the vehicle, head injuries are a major risk in this type of accident. Additionally, the window positioned to the side of the head, which has a lower structural integrity compared to the safety cage, can break during a side collision, which increases the risk of compartmental intrusion.

While various safety systems have been developed and deployed over the years in order to address the safety shortcomings of side windows, they only offer a partial, and usually inadequate redress. Thus, there is a need for vehicles that can offer the advantage of windows (e.g., a view of the outside), without suffering from at least some of the shortcomings of vehicle windows, such as the increased safety risk that windows often pose.

Some aspects of this disclosure involve utilizing one or more nontransparent side beams in order to help protect the occupant in a case of a collision. The one or more nontransparent side beams are stiffer than automotive laminated glass. In one example, the nontransparent side beam comprises a high tensile steel pipe and pressed material. In another example, the nontransparent side beam comprises an aluminum extruded shape.

In one embodiment, an autonomous on-road vehicle that weighs less than 1500 kg without batteries includes a nontransparent side beam, located to the left and at eye level of an occupant who sits in a front seat during normal driving, extends horizontally over at least 30 cm, has an average width below 10 cm, and is stiffer than automotive laminated glass. The vehicle also includes a camera configured to take video of the outside environment to the left of the occupant, and a computer configured to generate for the occupant, based on the video, a representation of the outside environment to the left of the occupant at eye level. Optionally, the representation is presented to the occupant using a display. In one example, the display is comprised in a head-mounted display (HMD), and the vehicle further comprises a communication system configured to transmit the representation to the HMD. In another example, the display is coupled to the inner side of the compartment.

Figure 29A:
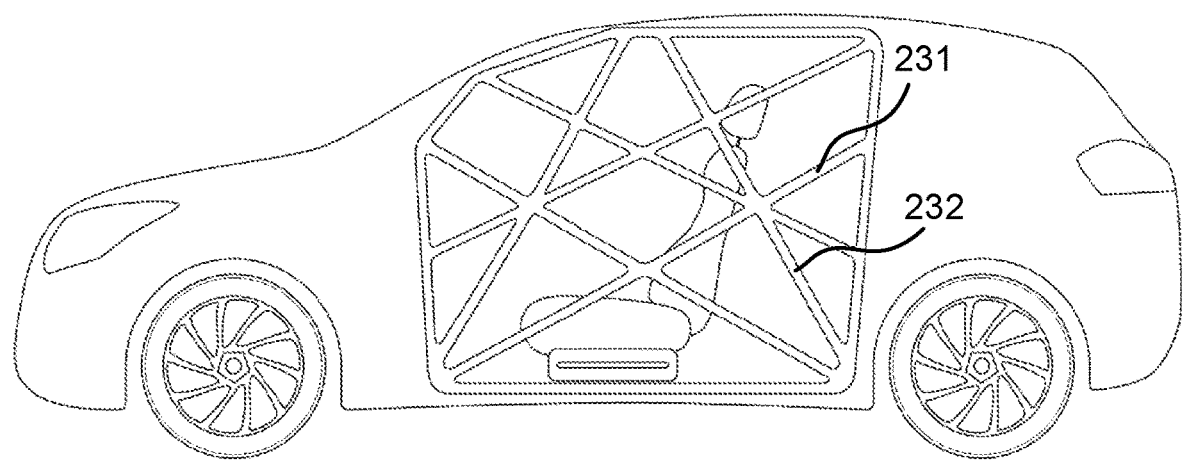
FIG. 29a illustrates one embodiment of an autonomous on-road vehicle which includes a nontransparent side beam.

The following is a description of an embodiment of a vehicle in which one or more nontransparent side beams may be utilized to help protect the left side of a vehicle (and an occupant therein). FIG. 29a illustrates one embodiment of an autonomous on-road vehicle which includes a nontransparent side beam, a camera (e.g., the camera 161), and a computer (e.g., the computer 143). Optionally, the vehicle weighs less than 1500 kg without batteries.

The nontransparent side beam is located to the left and at eye level of an occupant who sits in a front seat during normal driving, extends horizontally over at least 30 cm, has an average width below 10 cm, and is stiffer than automotive laminated glass. Optionally, the nontransparent side beam is at least 60 cm long and at least 1 cm wide (herein "cm" refers to centimeters). In one example, the nontransparent side beam comprises a high tensile steel pipe and pressed material. In another example, the nontransparent side beam comprises an aluminum extruded shape. In still another example, the nontransparent side beam has an average width below at least one of 10 cm, 5 cm, or 2 cm, and weighs less than 30 kg, 20 kg, 10 kg, and 5 kg.

The camera configured to take video of the outside environment to the left of the occupant. The computer is configured to generate for the occupant, based on the video, a representation of the outside environment to the left of the occupant at eye level. Optionally, the representation is generated from the point of view of the occupant, and the vehicle further includes a display configured to present the representation to the occupant. In one example, the display is comprised in a head-mounted display (HMD), and the vehicle further comprises a communication system configured to transmit the representation to the HMD. In another example, the display is coupled to the inner side of the compartment.

In some embodiments, a plurality of beams, which may be similar to the nontransparent side beam described above, may be located in the region of the left side of the vehicle. It is to be noted that the plurality of beams may not necessarily all have the same dimensions or be made of the same exact materials. Optionally, the plurality of beams may be connected in various ways in order to form a structure that can better resist compartment deformation in the case of a collision. For example, in one embodiment, the vehicle includes an additional nontransparent side beam that is not parallel to the nontransparent side beam and crosses it to form an "X" shaped structure. Herein, an "X" shaped structure refers to any structure of two nonparallel beams that cross, where the two do not necessarily form a symmetric "X" (e.g., a symmetric "X" may be obtained when the two beams are of equal length and cross at their centers). This structure is illustrated in FIG. 29a where nontransparent side beams 231 and 232 cross to form an "X" shape structure. It is to be noted that the nontransparent side beam 231 is at eye level (i.e., at least a portion of the beam 231 is at the same height as a typical occupant's eyes). FIG. 29a illustrates one example of a configuration of a plurality of nontransparent side beams located in the left side of the vehicle.

Optionally, the nontransparent beams are covered with an exterior door panel (also known as door skin). Examples of materials useful for making the door panel, which forms part of the outer layer of the vehicle, include: metal, fiberglass, carbon fiber, and/or fiber-reinforced plastic.

Different designs of vehicles may benefit from utilizing one or more nontransparent side beams as described above. In one embodiment, the nontransparent side beam is embedded in a movable structure that changes its location with respect to the vehicle compartment. For example, the nontransparent side beam may be part of the left door of the vehicle. In another embodiment, the nontransparent side beam is embedded in the vehicle compartment itself and does not change its location with respect to the rest of the compartment. For example, the nontransparent side beam may be placed in a compartment wall to the left of the occupant.

In order to better protect the occupant from injury due to hitting the head against the side of the vehicle, in some embodiments, the vehicle may comprise a nontransparent Shock-Absorbing Energy Dissipation Padding (SAEDP) located at eye level between the nontransparent side beam and the occupant. The SAEDP is less stiff than a standard automotive glass window. In one example, the SAEDP comprises a passive material. In another example, the SAEDP includes an airbag. And in still another example, the SAEDP includes a pneumatic pad. Optionally, the vehicle includes a display on which the representation of the outside environment may be presented to the occupant. Optionally, the display is supported by the SAEDP and/or the nontransparent side beam. Optionally, the display is a flexible display.

In a similar fashion to the utilization of nontransparent side beams on the left side of the vehicle, in some embodiments, one or more nontransparent side beams may be used to help protect the occupant's right side. For example, in one embodiment, the vehicle includes a second nontransparent side beam, located at eye level to the right of the occupant, and a second camera configured to take video of the outside environment to the right of the occupant. In this embodiment, the computer is further configured to generate a second representation of the outside environment to the right of the occupant. Optionally, the second nontransparent side beam extends horizontally over at least 30 cm and weighs less than at least one of the following weights: 20 kg, 10 kg, and 5 kg.

Most on-road vehicles, including autonomous and non-autonomous vehicles, include as part of the vehicle body one or more windows, such as a windshield, side windows, or a rear window. The purpose of these windows is to offer vehicle occupants a view of the outside world. However, this feature comes at a cost. One of the major drawbacks of having a standard windshield relates to the safety risks it poses in the case of a collision. In order to avoid obstruction of the view, various support structures such as a-pillar and other beams need to be placed outside of the windshield area, which can weaken a vehicle's structural integrity in the case of a collision.

While various safety systems have been developed and deployed over the years in order to address the safety shortcomings of vehicle windows, they only offer a partial, and usually inadequate redress. Thus, there is a need for a vehicle that can offer the advantage of a windshield (e.g., a view of the outside), without suffering from at least some of the shortcomings of a standard windshield, such as the increased safety risk that a standard windshield often poses.

Some aspects of this disclosure involve utilizing one or more nontransparent beams in order to help protect the occupant in a case of a collision. The one or more beams are stiffer than automotive laminated glass. In one example, a nontransparent beam comprises a high tensile steel pipe and pressed material. In another example, a nontransparent beam comprises an aluminum extruded shape.

In one embodiment, an autonomous on-road vehicle that weighs less than 1500 kg without batteries includes a nontransparent beam, located in front of and at eye level of an occupant who sits in a front seat of the vehicle during normal driving, extends horizontally over at least 30 cm, has an average width below 10 cm, and is stiffer than automotive laminated glass. The vehicle also includes a camera to take video of the outside environment in front of the occupant, and a computer to generate for the occupant, based on the video, a representation of the outside environment in front of the occupant at eye level. Optionally, the representation is presented to the occupant using a display. In one example, the display is comprised in a head-mounted display (HMD), and the vehicle further comprises a communication system configured to transmit the representation to the HMD. In another example, the display is coupled to the inner side of the compartment.

Figure 29B:
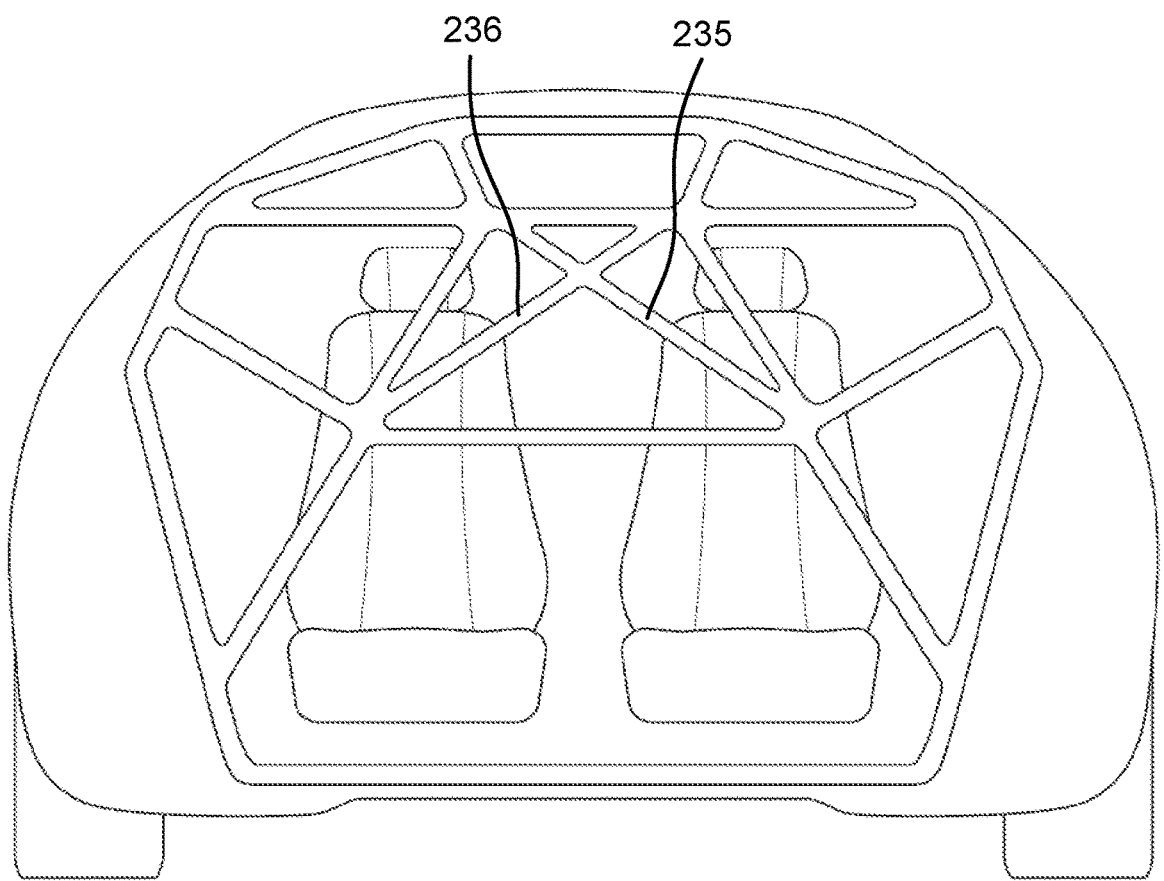
FIG. 29b illustrates one embodiment in which an autonomous on-road vehicle includes a nontransparent beam.

The following is a description of an embodiment of a vehicle in which one or more nontransparent beams may be utilized to help protect the vehicle's front (and an occupant therein). FIG. 29b illustrates one embodiment in which an autonomous on-road vehicle includes a nontransparent beam 235, a camera (e.g., the camera 142), and a computer (e.g., the computer 143). Optionally, the vehicle weighs less than 1500 kg without batteries.

The nontransparent beam 235 is located in front of and at eye level of an occupant who sits in a front seat of the vehicle during normal driving, extends horizontally over at least 30 cm, has an average width below 10 cm, and is stiffer than automotive laminated glass. Optionally, the nontransparent beam is at least 60 cm long and at least 1 cm wide. In one example, the nontransparent beam comprises a high tensile steel pipe and pressed material, has an average width below 15 cm, 10 cm, or 5 cm, and weighs less than 20 kg, or 10 kg. In another example, the nontransparent beam comprises an aluminum extruded shape, has an average width below 15 cm, 10 cm, or 5 cm, and weighs less than 20 kg, or 10 kg.

The camera configured to take video of the outside environment in front of the occupant. The computer is configured to generate for the occupant, based on the video, a representation of the outside environment in front of the occupant at eye level. Optionally, the representation is generated from the point of view of the occupant, and the vehicle further includes a display configured to present the representation to the occupant. In one example, the display is comprised in a head-mounted display (HMD), and the vehicle further comprises a communication system configured to transmit the representation to the HMD. In another example, the display is coupled to the inner side of the compartment.

In some embodiments, a plurality of beams, which may be similar to the nontransparent beam described above, may be located in the front of the vehicle at eye level. It is to be noted that the plurality of beams may not necessarily all have the same dimensions or be made of the same exact materials. Optionally, the plurality of beams may be connected in various ways in order to form a structure that can better resist compartment deformation in the case of a collision. FIG. 29b illustrates one example in which the vehicle includes an additional nontransparent beam 236 that is not parallel to the nontransparent beam 235 and crosses it to form an "X" shaped structure. Beams 235 and 236 cross to form an "X" shape structure, which optionally weighs less than 30 kg. Both of the beams 235 and 236 are at eye level (i.e., at least a portion of each beam is at the same height as a typical occupant's eyes). It is noted that FIG. 29b illustrates a plurality of beams (in addition to beams 235 and 236) located in the front of the vehicle.

Different designs of vehicles may benefit from utilizing one or more nontransparent beam as described above. In one embodiment, the nontransparent beam is embedded in a movable structure that changes its location with respect to the vehicle compartment. For example, the nontransparent beam may be part of a front door through which the occupant may enter the vehicle. In another embodiment, the nontransparent beam is embedded in the vehicle compartment itself and does not change its location with respect to the rest of the compartment. For example, the nontransparent beam may be placed in a compartment front wall that is located in front of the occupant.

In order to better protect the occupant from injury (e.g., during a collision), in some embodiments, the vehicle may comprise a nontransparent Shock-Absorbing Energy Dissipation Padding (SAEDP) located at eye level between the nontransparent beam and the occupant. The SAEDP is less stiff than a standard automotive glass window. In one example, the SAEDP comprises a passive material. In another example, the SAEDP includes an airbag. And in still another example, the SAEDP includes a pneumatic pad. Optionally, the vehicle includes a display on which the representation of the outside environment may be presented to the occupant. Optionally, the display is coupled to the inner side of the compartment. Optionally, the display is a flexible display.

When traveling in a vehicle, the occupant may be engaged in various work- and entertainment-related activities. As a result, the occupant may not be aware of the driving conditions, which may lead to undesired consequences in certain cases when the occupant is engaged in certain activities such as drinking a beverage, applying makeup, or using various tools. For example, if an unexpected driving event occurs, such as hitting a speed bump, making a sharp turn, or a hard braking, this may startle the occupant or cause the occupant to lose stability, which can lead to the occupant spilling a hot beverage or hurting himself/herself. Thus, there is a need for a way to make the occupant aware of certain unexpected driving events, in order to avoid accidents when conducting various activities in an autonomous vehicle.

While traveling in a vehicle, an occupant of the vehicle may not always be aware of the environment outside and/or of what actions the vehicle is about to take (e.g., braking, turning, or hitting a speedbump). Thus, if such an event occurs without the occupant being aware that it is about to happen, this may cause the occupant to be surprised, disturbed, distressed, and even physically thrown off balance (in a case where the event involves a significant change in the balance of the physical forces on the occupant). This type of event is typically referred to herein as a Sudden Decrease in Ride Smoothness (SDRS) event. Some examples of SDRS events include at least one of the following events: hitting a speed bump, driving over a pothole, climbing on the curb, making a sharp turn, a hard braking, an unusual acceleration (e.g., 0-100 km/h in less than 6 seconds), and starting to drive after a full stop.

The aforementioned SDRS events may become harmful to the occupant when the occupant is engaged in certain activities, such as activities that involve manipulating objects that may harm the occupant if unintended body movement occurs due to the SDRS event. Thus, some aspects of this disclosure involve identifying when the occupant is engaged in a certain activity involving manipulating an object, which may become dangerous if the vehicle makes a sudden unexpected movement, such as when an SDRS event occurs. In one example, the object is a tool for applying makeup, and the certain activity comprises bringing the tool close to the eye. In another example, the object is an ear swab, and the certain activity comprises cleaning the ear with the ear swab. In yet another example, the object is selected from the group comprising the following tools: a knife, a tweezers, a scissors, and a syringe, and the certain activity comprises using the tool. And in still another example, the object is a cup that is at least partially filled with liquid, and the certain activity comprises drinking the liquid (e.g., drinking without a straw).

In some embodiments, an SDRS event takes place at least 2 minutes after starting to travel and it is not directly related to the act of starting to travel. Additionally, the SDRS event takes place at least 2 minutes before arriving to the destination and is not directly related to the act of arriving at the destination. In one example, a sentence such as "an SDRS event is imminent" refers to an SDRS event that is: (i) related to traveling in the vehicle, and (ii) expected to happen in less than 30 seconds, less than 20 seconds, less than 10 seconds, or less than 5 seconds. In another example, a sentence such as "an SDRS event is imminent" may refer to an event that starts at that instant, or is about to start within less than one second.

Figure 30A:
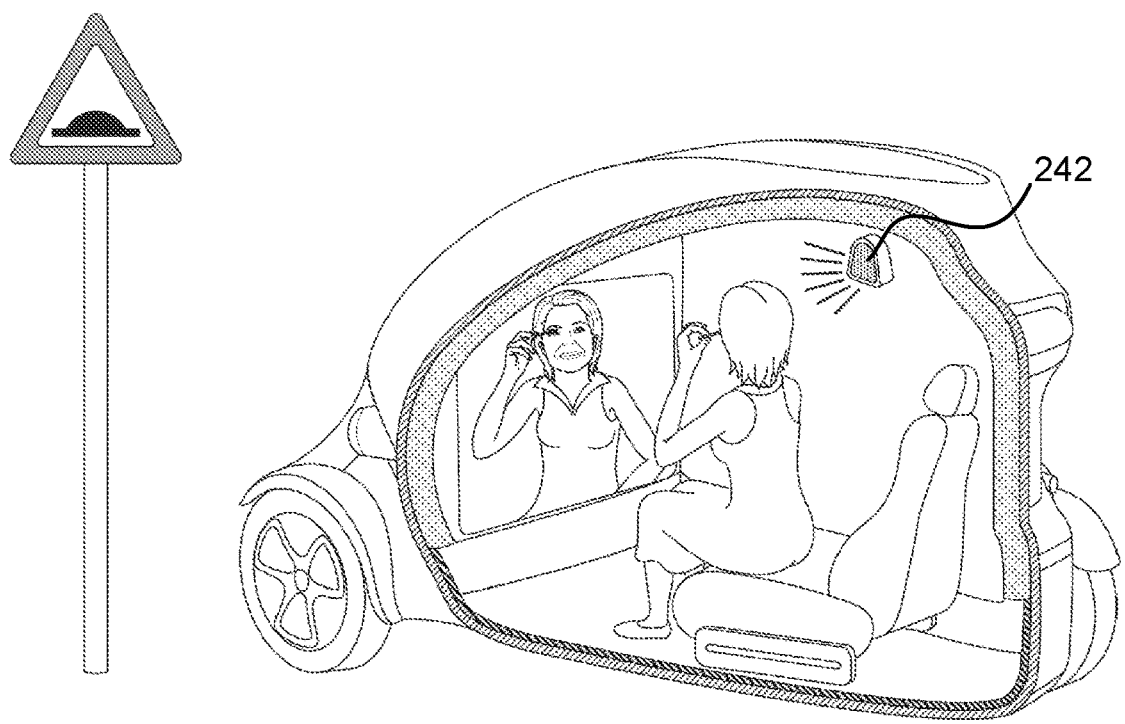
FIG. 30a and FIG. 30b illustrate cross sections of a vehicle with a user interface to warn an occupant engaged in a dangerous activity.
Figure 30B:
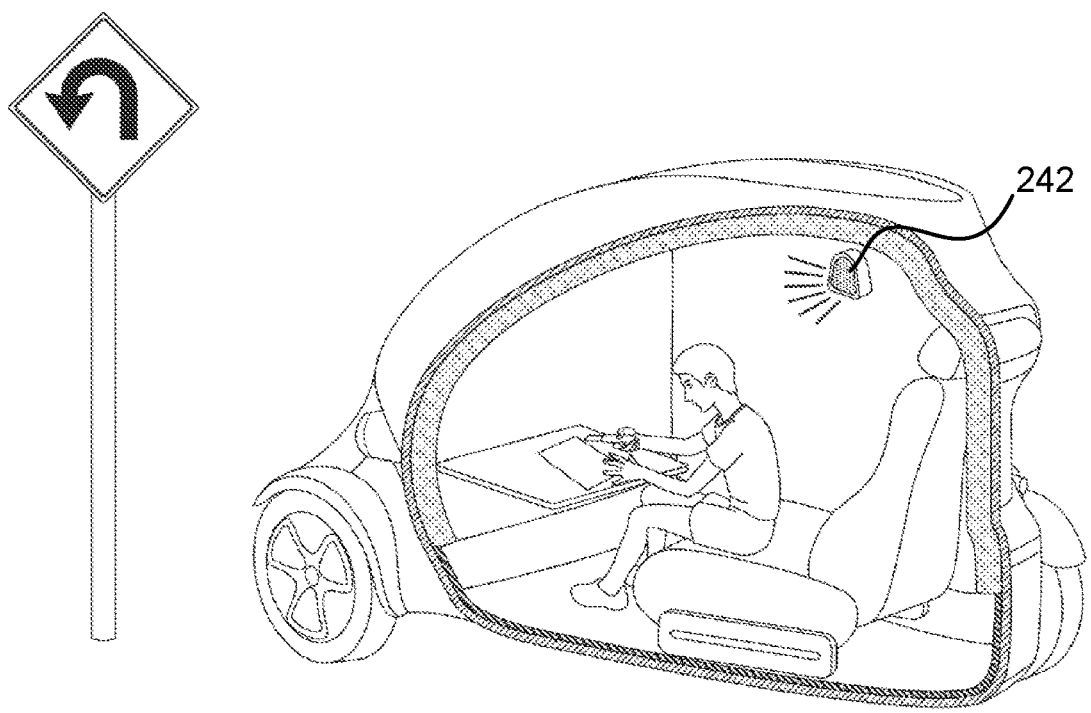

Some aspects of this disclosure involve a safety system that warns an occupant of a vehicle that is engaged in a certain activity (examples of which are given above) regarding an imminent SDRS event. In one embodiment, the safety system includes a camera that takes images of the occupant and a computer that estimates, based on the images, whether the occupant is engaged in a certain activity that involves handling an object that can harm the occupant in a case of an occurrence of an SDRS event. The computer receives from an autonomous-driving control system an indication indicative of whether an SDRS event is imminent Responsive to both receiving an indication indicative of an imminent SDRS event and estimating that the occupant is engaged in the certain activity, the computer commands a user interface to provide a first warning to the occupant shortly before the SDRS event. Responsive to receiving an indication indicative of an imminent SDRS event and not estimating that the occupant is engaged in the certain activity, the computer does not command the user interface to warn the occupant, or commands the user interface to provide a second warning to the occupant, shortly before the SDRS event. In this embodiment, the second warning is less noticeable than the first warning. Optionally, no second warning is generated. FIG. 30a and FIG. 30b each illustrate a cross section of a vehicle with a user interface 242 (e.g., a speaker) that warns an occupant who is engaged in an activity that may become dangerous in the occurrence of an SDRS event. The speaker in these figures may emit a warning (e.g., a beeping sound) at least one second before the time the SDRS event is expected to occur.

Figure 32:
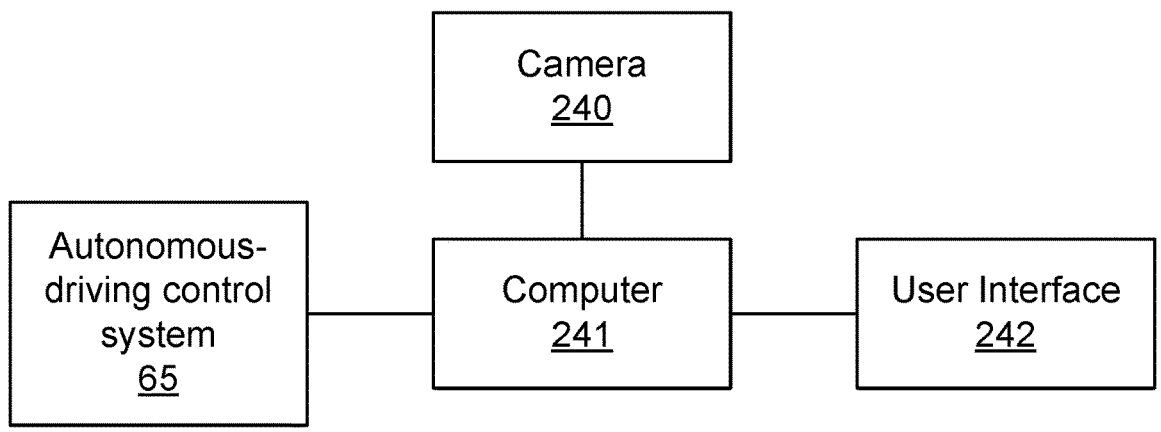
FIG. 32 is a schematic illustration of an embodiment of a safety system for an autonomous vehicle.

FIG. 32 is a schematic illustration of an embodiment of a safety system for an autonomous vehicle, which may be utilized to warn an occupant of a vehicle who is engaged in a certain activity that may become dangerous if an SDRS event occurs. In one embodiment, the safety system includes at least a camera 240, a computer 241, and a user interface 242.

The camera 240 is configured to take images of an occupant of the vehicle. Optionally, the camera 240 may be physically coupled to the compartment of the vehicle. Alternatively, the camera 240 may be physically coupled to a head-mounted display (HMD) that is worn by the occupant of the vehicle.

The computer 241 is configured, in one embodiment, to make an estimation, based on the images taken by the camera 240, whether the occupant is engaged in a certain activity that involves handling an object that can harm the occupant in a case of an intense movement of the vehicle, such an SDRS event (e.g., the certain activity may be applying makeup, drinking a beverage from an open cup, or manipulating a sharp tool). Additionally, in this embodiment, the computer 241 is further configured to receive, from the autonomous-driving control system 65, an indication indicative of whether an SDRS event is imminent. The autonomous-driving control system 65 is discussed above in relation to FIG. 17. The computer 241 may be any of the computers described in this disclosure, such as the computers illustrated in FIG. 35 or FIG. 36.

In one embodiment, the camera 240 comprises a video camera, and the computer 241 is configured to utilize an image-processing algorithm to identify the object and/or the certain activity, and to estimate whether the occupant is engaged in the certain activity. In another embodiment, the camera 240 comprises an active 3D tracking device, and the computer 241 is configured to analyze the 3D data to identify the object and/or the certain activity, and to estimate whether the occupant is engaged in the certain activity. Optionally, the active 3D tracking device is based on emitting electromagnetic waves and generating 3D images based on received reflections of the emitted electromagnetic waves. Two examples of technologies that involve this approach, which may be utilized by the camera 240 in this embodiment, include LiDAR and a combination of IR sensors and LEDs such as the systems used by Leap Motion®.

Based on the indication and the estimation described above, the computer 241 may cause the user interface 242 to warn the occupant in various ways, or refrain from warning the occupant (regarding an imminent SDRS event). Optionally, warning the occupant regarding an imminent SDRS event is done shortly before the time the SDRS event is expected to occur. Herein, "shortly before" refers to at most 30 seconds before the SDRS event. Optionally, warning the occupant regarding an imminent SDRS event is done at least one second before the SDRS event, or within some other time that may be required for the occupant to safely cease from the certain activity in which the occupant is engaged at the time, and prepare for the SDRS event. In one example, responsive to both receiving an indication indicative of an imminent SDRS event and estimating that the occupant is engaged in the certain activity, the computer 241 is further configured to command the user interface 242 to provide a first warning to the occupant shortly before the SDRS event. In another example, responsive to receiving an indication indicative of an imminent SDRS event and not estimating that the occupant is engaged in the certain activity, the computer 241 is further configured to command the user interface 242 to provide a second warning to the occupant, shortly before the SDRS event. In this example, the second warning is less noticeable than the first warning. In yet another example, responsive to both receiving an indication indicative of no imminent SDRS event and estimating that the occupant is engaged in the certain activity, the computer 241 is further configured not to command the user interface 242 to warn the occupant.

The user interface 242 may include, in some embodiments, an element that provides the occupant with an auditory indication (e.g., by providing a verbal warning and/or a sound effect that may draw the occupant's attention). For example, in one embodiment, the user interface 242 may include a speaker which may be coupled to the compartment of the vehicle or worn by the occupant (e.g., as part of earphones). Optionally, the first warning is louder than the second warning. Optionally, in this embodiment, the occupant does not drive the vehicle. In another embodiment, the user interface 242 may include an element that can provide the occupant with a visual cue, such as project a certain image in the field of view of the occupant and/or create a visual effect that may be detected by the occupant (e.g., flashing lights). Optionally, the user interface 242 includes a display that is coupled to the compartment of the vehicle or is part of a head mounted display (HMD) worn by the occupant. Optionally, in this embodiment, the first warning comprises a more intense visual cue than the second warning (e.g., the first warning involves more intense flashing of a warning icon than the second warning involves).

Detecting whether the occupant is engaged in the certain activity with an object can be done utilizing various object detection and/or activity detection algorithms. These algorithms typically employ various image analysis algorithms known in the art. For example, some of the approaches that may be utilized to detect moving objects are described in Joshi, et al. "A survey on moving object detection and tracking in video surveillance system." International Journal of Soft Computing and Engineering 2.3 (2012): 44-48. Additionally, various examples of approaches that may be used to detect human activity are described in the following references: Aggarwal, et al., "Human activity analysis: A review", ACM Computing Surveys (CSUR) 43.3 (2011): 16, Weinland, el al. "A survey of vision-based methods for action representation, segmentation and recognition", Computer vision and image understanding 115.2 (2011): 224-241, and Ramanathan, et al., "Human action recognition with video data: research and evaluation challenges", IEEE Transactions on Human-Machine Systems 44.5 (2014): 650-663.

In one embodiment, a method for warning an occupant of an autonomous vehicle, includes the following steps: In step 1, receiving images of the occupant. In step 2, estimating, based on the images, whether the occupant is engaged in a certain activity that involves handling an object that can harm the occupant in a case of a Sudden Decrease in Ride Smoothness (SDRS). In step 3, receiving, from an autonomous-driving control system, an indication indicative of whether an SDRS event is imminent. In step 4, responsive to both receiving an indication indicative of an imminent SDRS event and estimating that the occupant is engaged in the certain activity, commanding a user interface to provide a first warning to the occupant shortly before the SDRS event. And in step 5, responsive to receiving an indication indicative of an imminent SDRS event and not estimating that the occupant is engaged in the certain activity, commanding the user interface to provide a second warning to the occupant, or not commanding the user interface to warn the occupant, shortly before the SDRS event; wherein the second warning is less noticeable than the first warning.

Optionally, responsive to both receiving an indication indicative of no expected SDRS event and estimating that the occupant is engaged in the certain activity, the computer is further configured not to command the user interface to warn the occupant. Optionally, warning the occupant shortly before the SDRS event refers to warning the occupant less than 30 seconds before the expected SDRS event; and wherein the SDRS event may result from one or more of the following: driving on a speed bump, driving over a pothole, starting to drive after a full stop, driving up the pavement, making a sharp turn, and a hard braking Optionally, the method further includes utilizing an image processing algorithm for identifying the object and for estimating whether the occupant is engaged in the certain activity.

In one embodiment, a non-transitory computer-readable medium is used in a computer to warn an occupant of an autonomous vehicle; the computer comprises a processor, and the non-transitory computer-readable medium includes: program code for receiving images of the occupant; program code for estimating, based on the images, whether the occupant is engaged in a certain activity that involves handling an object that can harm the occupant in a case of a Sudden Decrease in Ride Smoothness (SDRS); program code for receiving, from an autonomous-driving control system, an indication indicative of whether an SDRS event is imminent; program code for commanding a user interface to provide a first warning to the occupant shortly before the SDRS event, responsive to both receiving an indication indicative of an imminent SDRS event and estimating that the occupant is engaged in the certain activity; and program code for commanding the user interface to provide a second warning to the occupant, or not commanding the user interface to warn the occupant, shortly before the SDRS event, responsive to receiving an indication indicative of an imminent SDRS event and not estimating that the occupant is engaged in the certain activity; wherein the second warning is less noticeable than the first warning.

Figure 33:
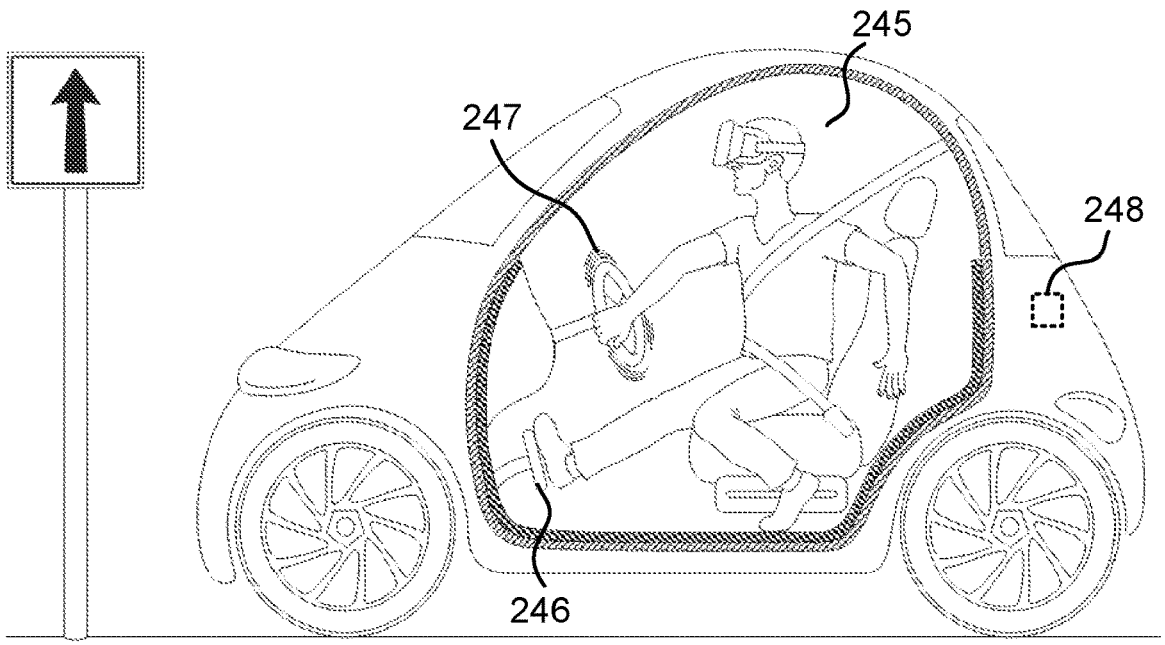
FIG. 33 illustrates an embodiment of an autonomous vehicle in which a driving controller installed in the vehicle may be utilized by an occupant of the vehicle engaged in gaming activity.

Autonomous vehicles provide occupants with the opportunity to conduct in various recreational activities while traveling in the vehicles. Some of these activities may involve playing games. To this end, there is a need to make autonomous vehicles more accommodating for such activities. Some aspects of this disclosure involve utilization of driving controllers installed in an autonomous vehicle by an occupant engaged in gaming activity. FIG. 33 illustrates an embodiment of an autonomous vehicle in which a driving controller installed in the vehicle may be utilized by an occupant of the vehicle engaged in gaming activity. The vehicle includes at least compartment 245 and computer 248. The compartment 245 is configured to carry the occupant. Additionally, the compartment 245 comprises at least one of the following vehicle driving controllers: an accelerator pedal, a brake pedal (e.g., brake pedal 246), a steering wheel (e.g., steering wheel 247), and a vehicle navigation module. It is to be noted that the computer 248 may be any of the computers described in this disclosure, such as the computers illustrated in FIG. 35 or FIG. 36. The computer 248 is configured to operate at least one of the vehicle driving controllers according to a driving mode or a gaming mode. In the driving mode, the computer 248 is responsive to operating at least one of the vehicle driving controllers, and as a result performs at least one of the following driving activities: accelerating the vehicle in response to operating the accelerator pedal, slowing the vehicle in response to operating the brake pedal, steering the vehicle in response to operating the steering wheel, and changing the traveling destination in response to operating the vehicle navigation module. In the gaming mode, the computer 248 is not responsive to the vehicle driving controllers and does not perform at least one of the driving activities in response to operating at least one of the vehicle driving controllers by the user. In one embodiment, in the driving mode, the computer 248 is responsive to voice commands by the occupant related to the driving activities, while in the gaming mode, the computer 248 is not responsive to voice commands by the occupant related to the driving activities.

Figure 34:
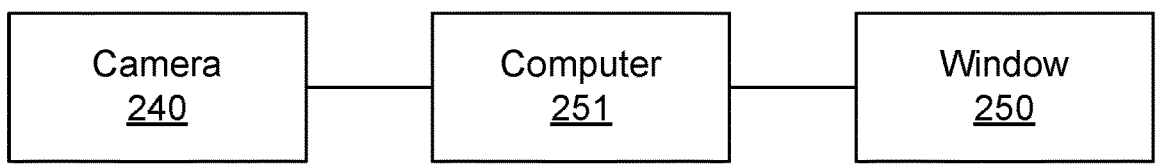
FIG. 34 is a schematic illustration of components of an autonomous vehicle that includes a computer, a window, and a camera.

Autonomous vehicles provide occupants with the opportunity to conduct in various activities while traveling in the vehicles. Some of these activities may be considered private. To this end, there is a need to make autonomous vehicles capable of protecting the occupants' privacy. Some aspects of this disclosure involve autonomous vehicles that protect their occupants' privacy. FIG. 34 is a schematic illustration of components of an autonomous vehicle that includes computer 251, window 250, and the camera 240. The vehicle further includes a compartment configured to carry an occupant. The compartment includes the window 250 through which a person, located outside the compartment, can see the occupant. Additionally, the vehicle includes the camera 240, which is located in a location that enables it to take a video of the occupant. The computer 251 is configured to process the video taken by the camera 240, make a determination of whether the occupant is conducting in a private activity, and operate the window 250 according to at least first and second modes based on the determination. Optionally, conducting in the private activity comprises exposing an intimate body part. Optionally, conducting in the private activity comprises an action involving scratching, grooming, sleeping, or dressing. Optionally, detecting that the occupant is conducting in the private activity is done utilizing an image analysis method, such as an approach described in Aggarwal, et al., "Human activity analysis: A review", ACM Computing Surveys (CSUR) 43.3 (2011): 16, Weinland, el al. "A survey of vision-based methods for action representation, segmentation and recognition", Computer vision and image understanding 115.2 (2011): 224-241, and/or Ramanathan, et al., "Human action recognition with video data: research and evaluation challenges", IEEE Transactions on Human-Machine Systems 44.5 (2014): 650-663.

In one embodiment, responsive to the determination indicating that the occupant is not conducting in a private activity, the computer 251 configures the window 250 to operate the window in the first mode, which enables the person to see the occupant up to a first privacy level. Optionally, responsive to the determination indicating that the occupant is conducting in a private activity, the computer 251 configures the window 250 to operate in the second mode, which enables the person to see the occupant up to a second privacy level. The second privacy level maintains the privacy of the occupant to a higher extent than the first privacy level.

In one embodiment, the second privacy level does not enable the person to see the occupant and/or an intimate body part of the occupant that would be otherwise exposed (e.g., if the window 250 were operated in the first mode). In one example, the window 250 may be a transparent physical window, and the transparency of the window 250 is lower by at least 30% in the second mode comparted to the first mode. In another example, the window 250 is a virtual window, and in the second privacy level, the window 250 refrains from displaying at least a part of an intimate body part captured by the camera 240.

Figure 37:
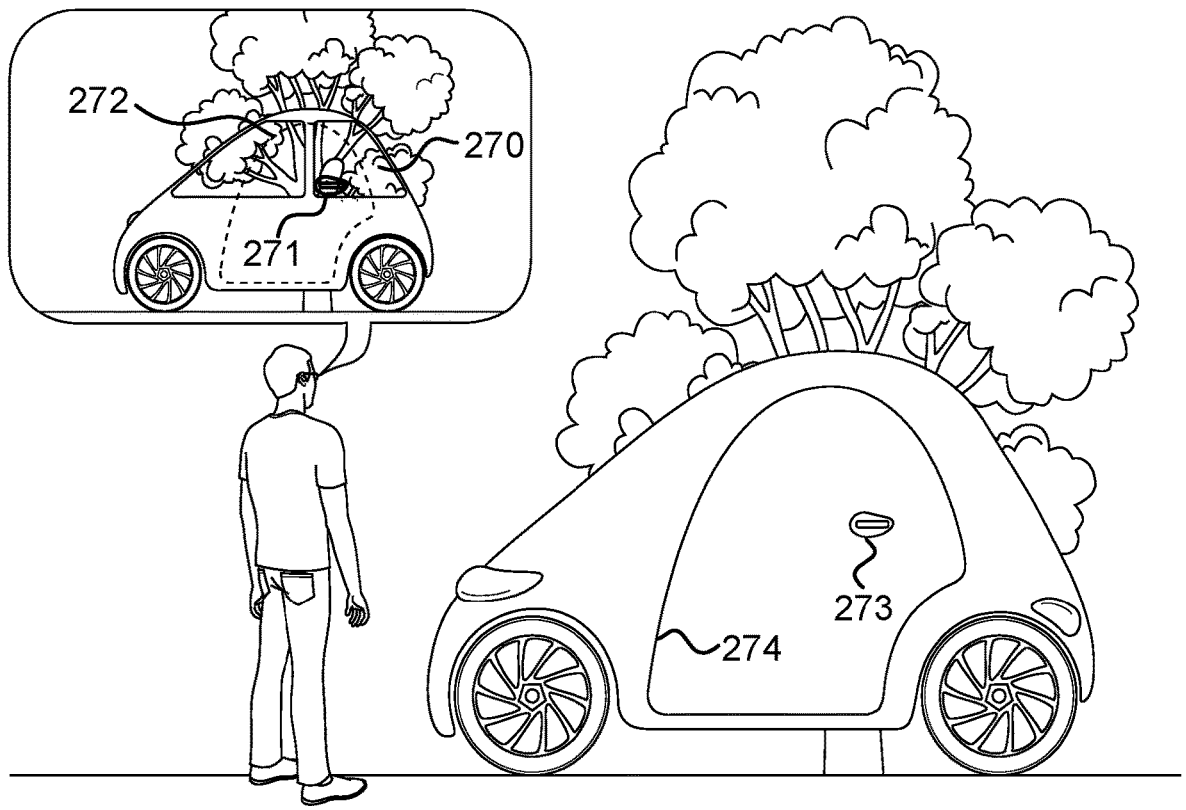
FIG. 37 and FIG. 38 illustrate a windowless vehicle with virtual windows surrounding a door handle.
Figure 38:
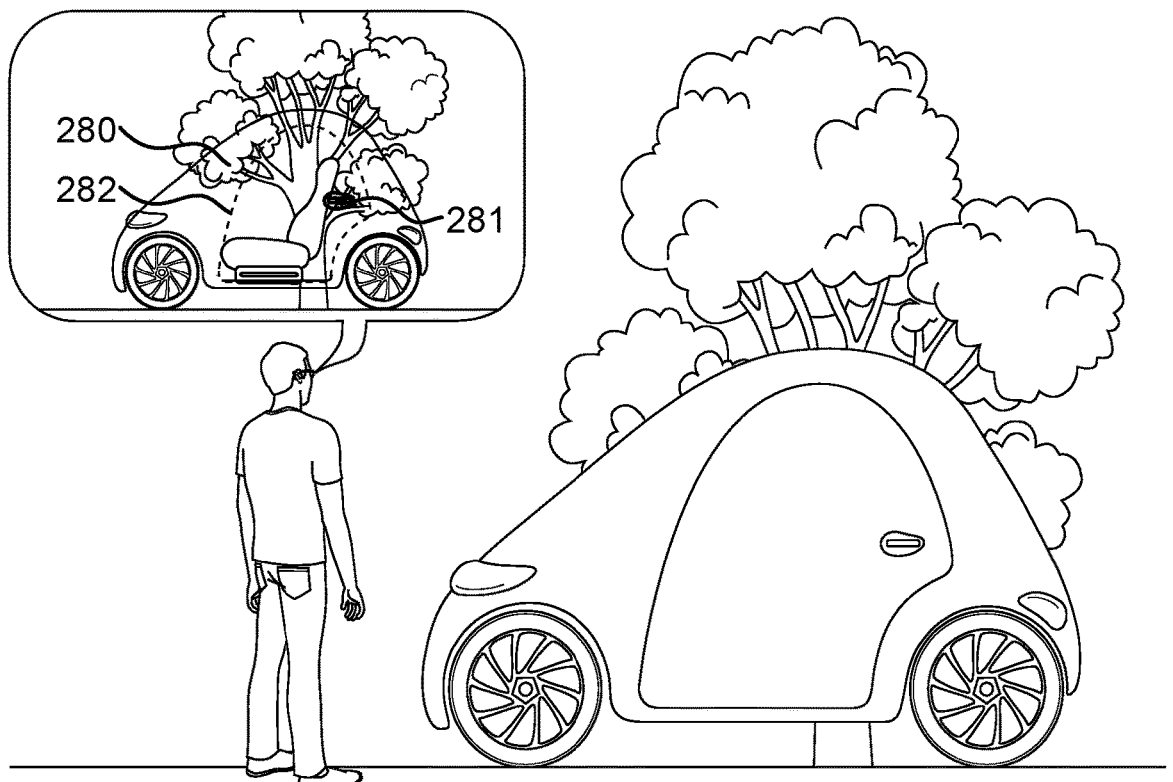

FIG. 37 illustrates one embodiment of a windowless vehicle with a left door and a door handle The virtual windows 270 surround the door handle 273, and thus the computer shows the visual indication of the door handle 271. The virtual windows 270 also surrounds part of the door edges 274, and thus the computer shows the visual indication of the door edges 272. FIG. 38 illustrates another variation of a windowless vehicle with a left door and a door handle Here, the virtual window 280 encompasses almost the entire vehicle, and surrounds the door handle and the door edges. In order to enable the person to use the door easily and safely, the computer shows the visual indication of the door handle 281 and the visual indication of the door edges 282.

Figure 39:
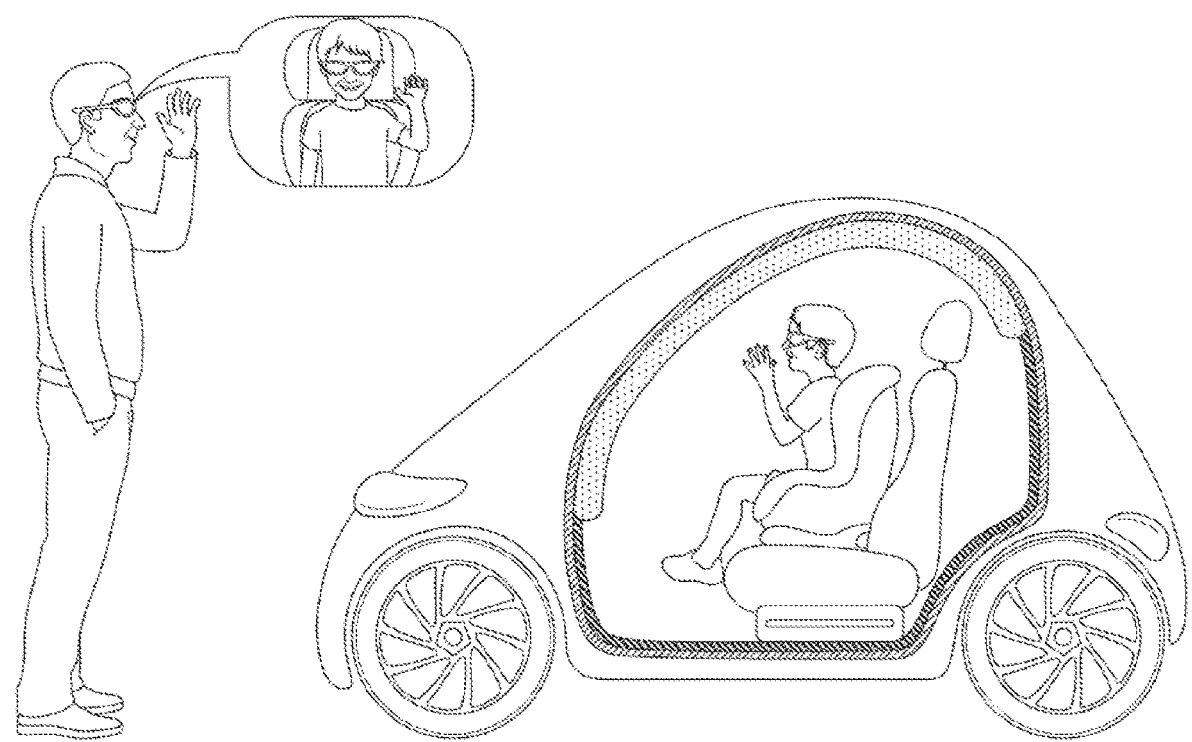
FIG. 39 illustrates how a parent can see his/her child inside the windowless vehicle through an HMD.

The virtual window is useful to reduce the reluctance of a person from a windowless vehicle. For example, FIG. 39 illustrates how a parent can see his/her child inside the windowless vehicle through the HMD. The child can also see the parent through the child's HMD (not illustrated in the figure). Furthermore, thanks to the virtual window a person can see the compartment before he/she gets in, and/or a person standing outside the vehicle can see through the vehicle as if the vehicle had windows from both sides and no blockers. Optionally, the computer is further configured to receive a position of the person's head relative to the compartment, and to generate the virtual window from a point of view suitable for the position of the person's head relative to the compartment. Optionally, the computer is further configured to change the point of view presented through the virtual window responsive to receiving an indication that the angular position of the person's head relative to the compartment was changed. Optionally, responsive to receiving an indication that the person changed his angular position relative to the compartment in the range of 20°-40°, the computer is further configured to changes the point of view of the virtual window in the range of 20°-40° relative to the car. Optionally, further comprising at least one lamp configured to light the compartment; wherein the computer is further configured to turn on the lamp to capture the first video when there is not enough ambient light coming from outside the vehicle. For example, when there is not enough light due to the hour or the vehicle is inside a dark parking lot, then the computer turns on the lamp to light the compartment. Optionally, the vehicle further includes a third camera configured to take a third video of the compartment; wherein the third camera is physically coupled to the right half of the vehicle's compartment and below the first camera, and the computer is further configured to generate the representation of a virtual window based on the third video. Optionally, the first camera is located above the level of the occupant's nose, and the third camera is located below the level of the occupant's collarbone. Optionally, further comprising a third camera configured to take a third video of the compartment; the third camera is physically coupled to the right half of the vehicle's compartment and to the right of the first camera, and the computer is further configured to generate the representation of a virtual window based on the third video. Optionally, the computer is configured to show the visual indication of the door handle when the distance of the person from the door is below a first threshold, and not to show the visual indication of the door handle when the distance of the person from the door is above a second threshold that is greater than the first threshold. Optionally, the virtual window further includes a second visual indicator or the door edges in order to assists the person to be aware of the true side of the door when entering the compartment. Optionally, the computer is configured to show the second visual indication of the door edges when the distance of the person from the door is below a first threshold, and not to show the second visual indication of the door edges when the distance of the person from the door is above a second threshold that is greater than the first threshold. Optionally, further comprising a user interface configured to enable the person to change the dimensions of the virtual window. For example, the person can increase or decrease the size of the virtual window, can move the virtual window vertically and/or laterally, and/or can control whether the virtual window presents just the compartment and/or the outside environment on the other side of the vehicle. The user interface may be part of one of more of the following: a user interface of the HMD, a user interface of a handheld device such as a smartphone or a tablet, and/or a user interface belonging to the vehicle.

Optionally, the vehicle with the virtual windows further includes: (i) at least one additional camera physically coupled to at least one of: the vehicle and a head-mounted display (HMD) worn by the person, and (ii) an image processor configured to calculate position of the person relative to the compartment based on images taken by the at least one additional camera; wherein the computer is further configured to utilize the calculated position in order to generate the representation from the point of view of the person. Optionally, the vehicle further includes a display configured to present the representation to the person. Optionally, the display is located in a head-mounted display (HMD), and the vehicle further comprises a wireless communication system configured to transmit the representation to the HMD. Optionally, at least one of the cameras coupled to the vehicle is a 3D camera. Optionally, the representation represents at least a quarter of the portion of the compartment obstructed to the person by the nontransparent element. Optionally, the vehicle comprises a nontransparent element, located at eye level of an occupant who sits in a front seat of the compartment during normal driving; wherein the nontransparent element obstructs at least 30 degrees out of the horizontal unaided field of view (FOV) to the outside environment of the occupant at eye level; and the nontransparent element further obstructs unaided view of the person to a portion of the compartment. Optionally, the nontransparent element is mounted to the right door and obstructs at least 30 degrees out of the right horizontal unaided FOV to the outside environment of the occupant at eye level. Optionally, the nontransparent element is mounted to the front side of the compartment and obstructs at least 30 degrees out of the frontal horizontal unaided FOV to the outside environment of the occupant at eye level; and further comprising a third camera, physically coupled to the front side of the compartment, configured to take a third video of the compartment; wherein the computer is further configured to generate, based on the third video, a second representation of a second virtual window that presents at least a part of the compartment that is obstructed by the nontransparent element to a second person standing in front of the vehicle. Optionally, the nontransparent element comprises an SAEDP configured to protect the occupant's head during a collision; whereby the SAEDP is less stiff than a standard automotive glass window. Optionally, the nontransparent element comprises an SAEDP coupled to the outer side of the vehicle, configured to minimize damage to a pedestrian during a pedestrian-vehicle collision. Optionally, the nontransparent element comprises a crumple zone coupled to the outer side of the vehicle.

In one embodiment, a system configured to present a virtual window with structural indications, comprising: a vehicle comprising a right door with a door handle; a first camera, physically coupled to the right half of the vehicle's compartment, configured to take a first video of the compartment; a second camera, physically coupled to the left half of the vehicle, configured to take a second video of the outside environment to the left of the vehicle; a computer configured to generate, based on the first and second videos and a position of the door handle, a representation of a virtual window that surrounds a visual indicator of the door handle; and a wireless communication system configured to transmit the representation to a head-mounted display (HMD) located outside and to the right of the compartment; wherein the virtual window presents parts from both the compartment and the outside environment to the left of the vehicle, and the visual indication of the door handle assists a person who wears the HMD and watches the virtual window to find the door handle.

A vehicle compartment is relatively small and the occupant sits close to the walls. As a result, there is sometimes a need to capture the occupant with multiple cameras and stitch the occupant's video from images received from at least two cameras. In one embodiment, a system generates a stitched video of a compartment of an on-road vehicle from a point of view of a person located outside and nearby the vehicle, comprising: first, second, and third cameras, physically coupled to the compartment, and configured to take first, second, and third videos of the compartment, respectively; the first camera is located between 225° and 315° relative to an occupant who sits in a front seat of the compartment, the second camera that is located between 315° and 45° relative to the occupant, and the third camera is located between 45° and 135° relative to the occupant, whereby an item located directly in front of a forward looking occupant is said to be located at zero degrees relative to the occupant; a computer configured to receive a first position of the person's head relative to the compartment, and to generate, based on the first position and at least two of the videos, a first representation of the stitched video of the compartment from the first position; and a wireless communication system configured to transmit the first representation to a head-mounted display (HMD) located outside the compartment. It is noted that sentences in the form of "a first representation of the stitched video of the compartment from the first position" mean that the first representation of the stitched video of the compartment is generated from a point of view suiting the first position. In one example, a suiting point of view is within less than ±10° from the exact point of view from the first position, and with zoom between 50% and 200% relative to the unaided view from the first position.

Optionally, the computer is further configured to receive a second position of the person's head relative to the compartment, and to generate, based on the second position and the at least two of the videos, a second representation of the stitched video of the compartment from the second position; wherein the second position is different from the first position, and the point of view of the second representation is different from the point of view of the first representation. Optionally, the vehicle does not move while the person moves from the first position to the second position. Optionally, both the vehicle and the person are moving while the person moves from the first position to the second position, and the second position is at least one meter closer to the vehicle than the first position. Optionally, the computer is further configured to receive a second position of the person's head relative to the compartment, and to generate, based on the second position and at least two of the videos, a second representation of the stitched video of the compartment from the second position; wherein the second position is different from the first position, and the point of view of the second representation is different from the point of view of the first representation. Optionally, the vehicle does not move while the person moves from the first position to the second position; the first position is to the left of the vehicle, the second position is to the right of the vehicle, the first representation of the stitched video is generated based on the first and second videos and is not mainly based on the third video, and the second representation of the stitched video is generated based on the second and third videos and is not mainly based on the first video. Optionally, further comprising a fourth camera that is physically coupled to the vehicle, is configured to take a fourth video of the compartment, and is located between 135° and 225° relative to the occupant; wherein the computer is further configured to generate the first representation also based on the fourth video. In this embodiment, there is an angular distance greater than 5° between each of the first, second, third, and fourth cameras. The representation of the stitched video includes the data required for the HMD to present the stitched video for the person. In one example, the representation of the stitched video may be essentially the same as the stitched video. In another example, the representation of the stitched video includes a model of the compartment that was calculated based on at least two of the videos. Optionally, the system further includes a fourth camera selected from at least one of the following: a camera physically coupled to the vehicle and configured to capture the outside environment, and a camera physically coupled to a head-mounted display (HMD) worn by the person and configured to capture the environment in front of the person; wherein the computer is further configured to calculate the first position based on video taken by the fourth camera. Optionally, the wireless communication system comprises at least three receivers physically coupled to the vehicle and a mobile transceiver coupled to the HMD, and the computer is further configured to calculate the first position based on triangulation of signals sent by the mobile transceiver and received by the at least three receivers. Optionally, one or more of the receivers are transceivers. Optionally, the person is located in an adjacent vehicle, and the computer is further configured to calculate the first position based on position of the adjacent vehicle relative to the vehicle. In one example, the position of the adjacent vehicle relative to the vehicle is received from at least one of the vehicle navigation module and the adjacent vehicle navigation module. Optionally, the HMD is configured to present the stitched video to the person. Optionally, the compartment comprises a nontransparent element, located at eye level of an occupant who sits in the compartment; wherein the nontransparent element obstructs at least 30 degrees out of the frontal horizontal unaided field of view (FOV) to the outside environment of the occupant at eye level; and the nontransparent element further obstructs unaided view of the person to a portion of the compartment. Optionally, the computer is further configured to perform at least one of the following in order to generate the representation of the stitched video: generate a 3D model of the compartment based on the at least two of the videos, and utilize a pre-calculated 3D model of the compartment in order to generate the representation based on the at least two of the videos. Optionally, the computer is further configured to identify an intimate part of the occupant, and to remove the intimate part from the representation of the stitched video. Optionally, the computer is further configured to identify an improvement to the stitched video, and to add to the representation of the stitched video at least one virtual object; whereby the virtual object is selected from a group comprising at least one of: a virtual occupant, and an improved look of the occupant in the compartment.

Figure 40:
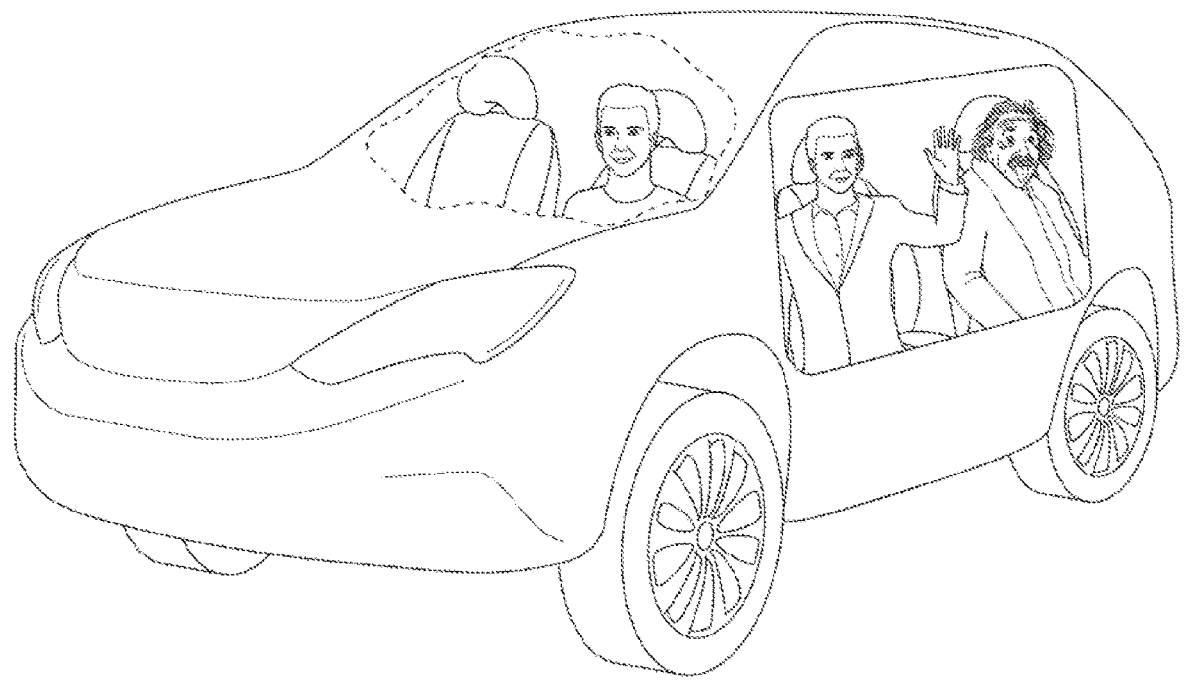
FIG. 40 illustrates a compartment with a virtual occupant next to the occupant.

FIG. 40 illustrates a compartment with a virtual occupant (Albert Einstein) next to the occupant. Although the compartment is small and the occupant can move, having multiple cameras spread around the occupant enables gathering enough data to render the virtual occupant properly in most cases. Optionally, the computer generates an augmented representation of the compartment by: generating a representation of the compartment based on at least two of the videos, and adding a computer-generated virtual occupant to the representation. Optionally, further comprising a nontransparent element, located at eye level of an occupant who sits in the compartment; wherein the nontransparent element obstructs at least 30 degrees out of the frontal horizontal unaided field of view (FOV) to the outside environment of an occupant at eye level; and the augmented representation provides the person an impression that the nontransparent element is a transparent vehicle window. Optionally, further comprising a fourth camera physically coupled to the HMD and configured to take a fourth video; and the computer is further configured to calculate the first position of the person's head relative to the compartment based on the fourth video. Optionally, the system further includes a fourth camera physically coupled to the vehicle and configured to take a fourth video of the outside environment; and the computer is further configured to calculate the first position of the person's head relative to the compartment based on the fourth video.

In one embodiment, a system configured to generate a compartment view for a person located behind a vehicle, comprising: first and second cameras, physically coupled to the compartment, configured to take first and second videos of the compartment, respectively; the first camera is located between 100° and 180° relative to an occupant who sits in a front seat of the compartment, and the second camera that is located between 181° and 260° relative to the occupant, whereby an item located directly in front of a forward looking occupant is said to be located at zero degrees relative to the occupant; a computer configured to receive a first position of the person's head relative to the compartment, and to generate, based on the first position and the first and second videos, a first representation of the compartment view from the first position; and a wireless communication system configured to transmit the representation to a head-mounted display (HMD) located outside the compartment. Optionally, the computer is further configured to receive a second position of the person's head relative to the compartment, and to generate, based on the second position and the first and second videos, a second representation of the compartment view from the second position; wherein the second position is different from the first position, and the point of view of the second representation is different from the point of view of the first representation. Optionally, the system further includes a third camera, physically coupled to the compartment, configured to take a third video of the compartment, and located between 261° and 300° relative to the occupant; wherein the vehicle does not move while the person moves from the first position to a second position; wherein the first position is behind the vehicle, the second position is to the left of the vehicle, the first representation of the compartment view is not mainly based on the third video, and a second representation of the compartment view is generated based on the second and third videos and is not mainly based on the first video. Optionally, the HMD is configured to present the rear compartment view to the person.

In one embodiment, an unmanned carrier for carrying urban manned vehicles, comprising: a computer configured to synchronize pick-up of manned vehicles by the unmanned carrier; wherein each manned vehicle is an autonomous on-road vehicle that is configured to transport at least one occupant in a compartment, is authorized by law to drive in a residential neighborhood, and is unauthorized by law to drive on the highway on its own because it is not safe enough for highway speed; a motorized lift configured to enable the manned vehicles to get on and get off the unmanned carrier without human intervention; an autonomous-driving control system configured to navigate the unmanned carrier autonomously on a highway; and a stiff safety frame configured to protect the occupants who sit in the carried manned vehicles during a collision at highway speed.

Figure 47A:
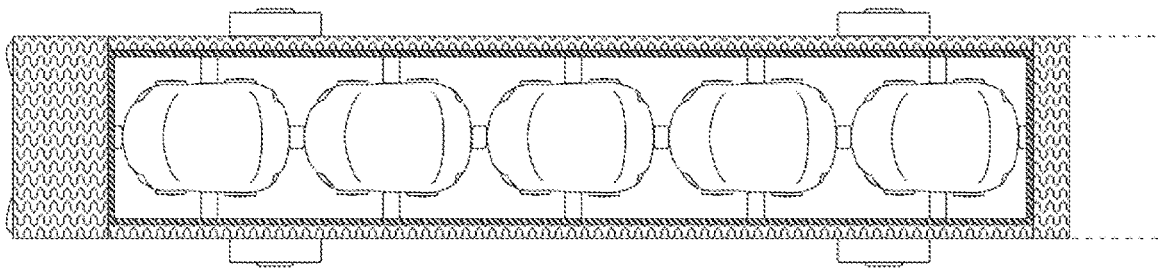
FIG. 47a, FIG. 47b, and FIG. 47c illustrate carriers having stiff safety frames configured to protect the occupants who sit in the carried manned vehicles during a collision at highway speed.
Figure 47B:
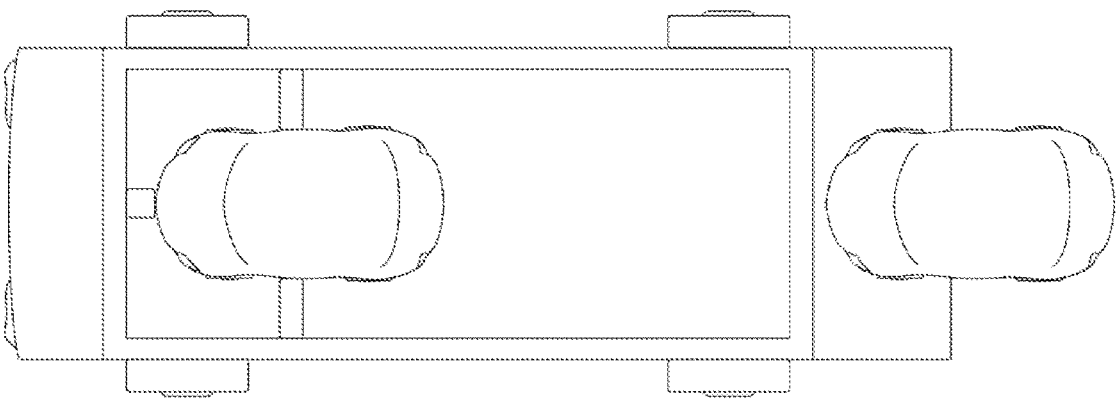
Figure 47C:
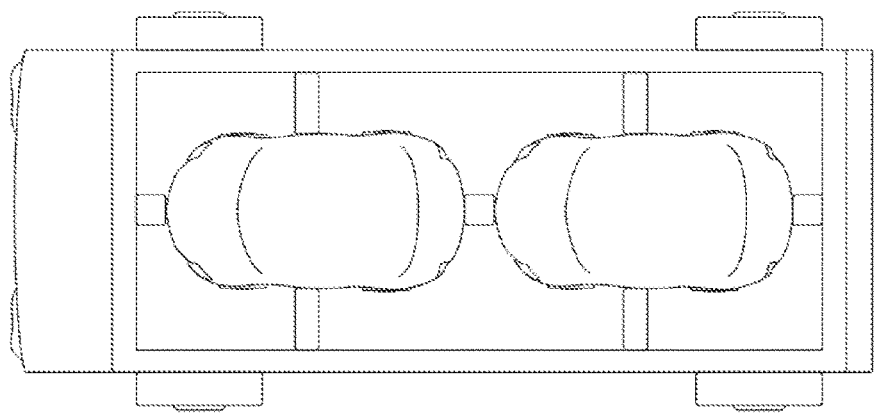
Figure 48A:
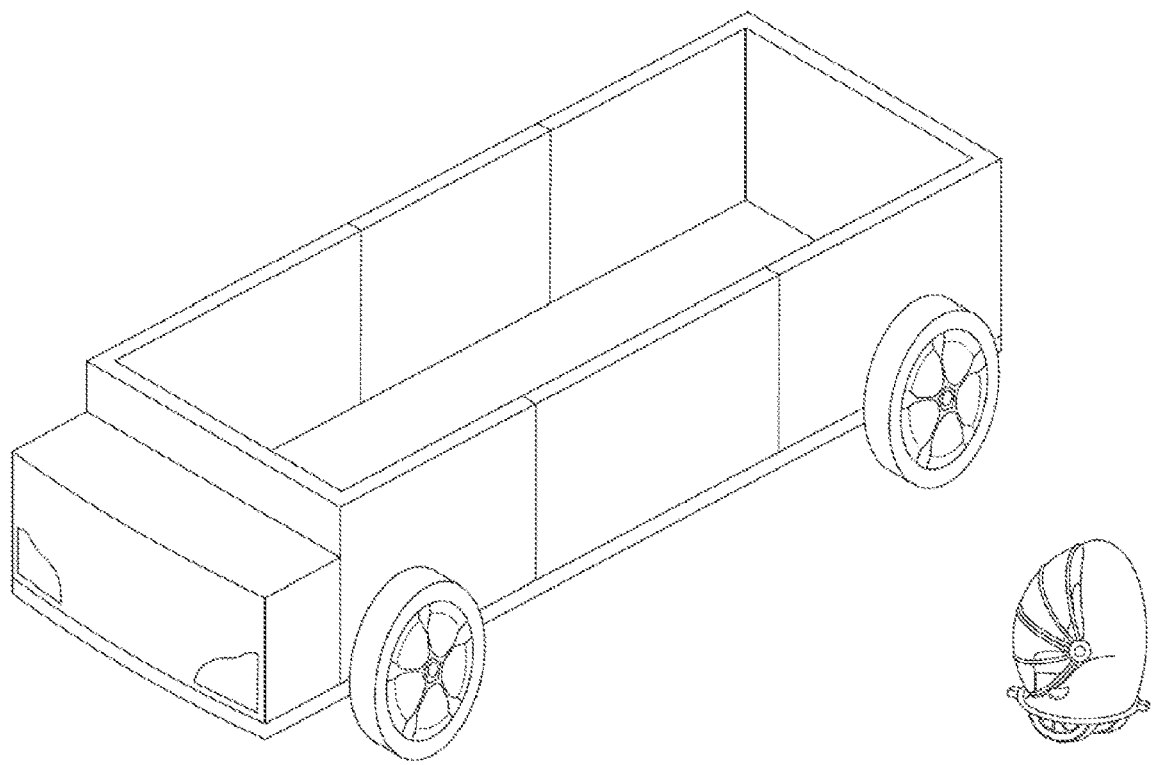
FIG. 48a and FIG. 48b illustrate a carrier having stiff safety frames configured to protect the occupants who sit in a two wheel vehicles during a collision at highway speed.
Figure 48B:
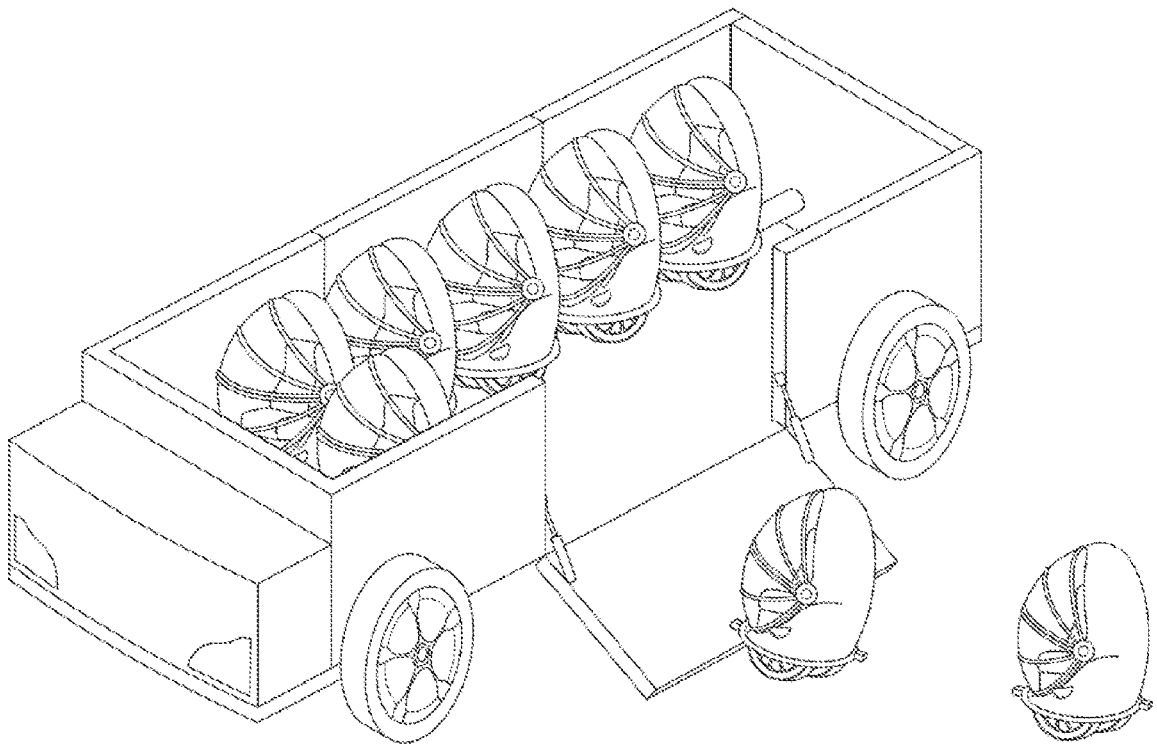
Figure 50:
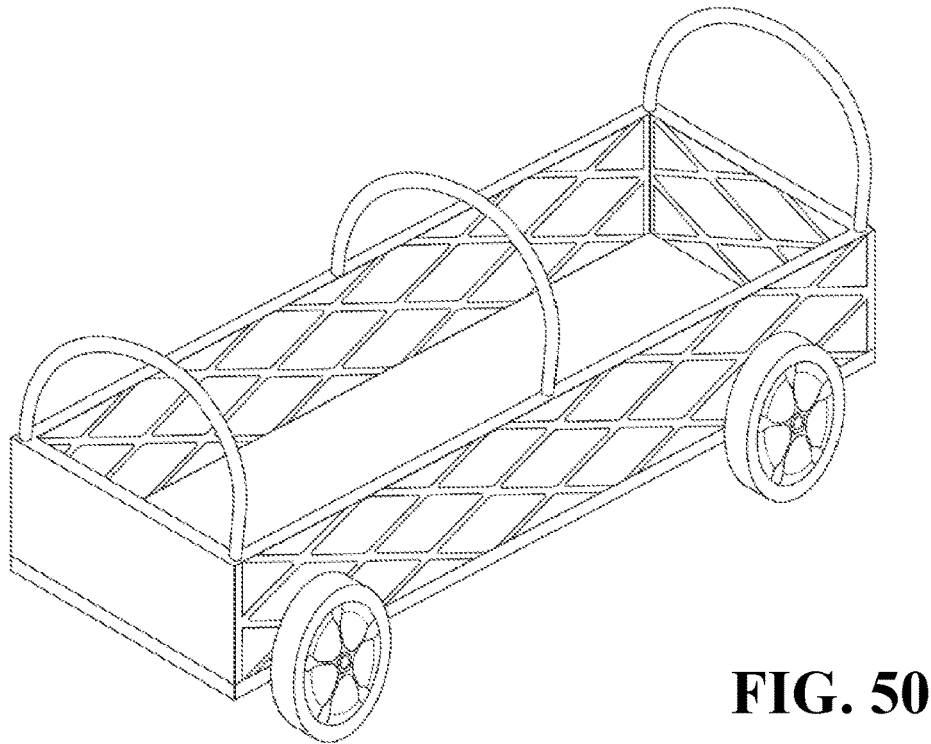
FIG. 50 illustrates a carrier with rollover hoops.

FIG. 47a, FIG. 47b, and FIG. 47c illustrate carriers having stiff safety frames configured to protect the occupants who sit in the carried manned vehicles during a collision at highway speed. FIG. 48a and FIG. 48b illustrate a carrier having stiff safety frames configured to protect the occupants who sit in a two wheel vehicles during a collision at highway speed. Optionally, the motorized lift forms part of the safety frame. Optionally, the safety frame comprises a safety cage configured to hold the manned vehicles on the unmanned carrier during collision at highway speed. Optionally, the safety cage is made of a stiff material configured to resist deformation during collision in order to reduce intrusion into the compartments of the carried manned vehicles. Optionally, the safety frame comprises at least one rollover hoop. FIG. 50 illustrates a carrier with rollover hoops. Optionally, the safety frame comprises a crumple zone having volume above 20 liters. Optionally, the crumple zone is a front crumple zone, located before the front carried maimed vehicle, and configured to absorb energy of a front collision; wherein the front crumple zone is more effective than crumple zones of the maimed vehicles carried by the unmanned carrier. Optionally, the crumple zone is a rear crumple zone, located beyond the last carried maimed vehicle, and configured to absorb energy of a rear collision; wherein the rear crumple zone is more effective than crumple zones of the maimed vehicles carried by the unmanned carrier. Optionally, the crumple zone is a side crumple zone, located to the size of at least one of the carried maimed vehicles, and configured to absorb energy of a side collision. Optionally, the unmanned carrier further comprises a charging unit, configured to charge the manned vehicles while being carried by the unmanned carrier. Optionally, each maimed vehicle weighs below 200 kg and utilizes a battery that is enough to travel less than 50 kilometer (km). Optionally, each maimed vehicle is configured to transport at least one human occupant, is able to drive on its own not faster than 70 km/h, and does not have an automotive safety cage configured to sustain collision at highway speeds. Optionally, the unmanned carrier further comprises a platform configured to carry the manned vehicles on the unmanned carrier such that the wheels of the maimed vehicles do not touch the road while the maimed vehicles are carried by the unmanned carrier. Optionally, the maimed vehicles, carried by unmanned carrier, are designed for urban drive and not suitable for highway speed, which reduces the cost of the manned vehicles compared to similar maimed vehicles designed for highway speed. Optionally, the motorized lift is selected from at least one of the following lifts: a hydraulic lift, and an electro-mechanical lift. Optionally, a manned vehicle drives in reverse to get on the unmanned carrier from the front of the unmanned carrier. Optionally, a maimed vehicle drives forward to get on the unmanned carrier from the back of the unmanned carrier. Optionally, a maimed vehicle gets on the unmanned carrier from a position to the side of the unmanned carrier in order to get on from the side of the unmanned carrier. Optionally, further comprising a first video camera mounted to the unmanned carrier, and a video communication link configured to stream video, taken by the first video camera, to a computer configured to provide an occupant of the manned vehicle a video see through based on the video taken by the first video camera. Optionally, further comprising a second video camera mounted to the maimed vehicle; wherein the computer is further configured to provide the occupant a video see through based on the video taken by the second video camera after the manned vehicle gets off the unmanned carrier. Optionally, the unmanned carrier does not have a compartment configured to transport a human occupant.

One embodiment of connecting charging power to the vehicle is a direct electrical connection, known as conductive coupling. For example, a mains lead into a weatherproof socket through high capacity cables with connectors to protect humans from high voltages. Example of a standard for plug-in vehicle charging is the SAE 1772 conductive connector (IEC 62196 Type 1) in the USA, and ACEA VDE-AR-E 2623-2-2 (IEC 62196 Type 2) for deployment in Europe. Another embodiment of connecting charging power to the vehicle is inductive charging, where a special paddle is inserted into a slot on the vehicle. The paddle is one winding of a transformer, while the other is built into the vehicle. When the paddle is inserted, it completes a magnetic circuit which provides power to the battery pack. In one example of an inductive charging system, one winding is attached to the underside of the vehicle, and the other stays on the floor of the carrier and/or parking lot. One of the advantages of the inductive approach is that there is no possibility of electrocution, as there are no exposed conductors, although interlocks, special connectors and ground fault detectors can make conductive coupling nearly as safe. Inductive charging can also reduce vehicle weight, by moving more charging componentry off-board.

The maimed vehicle may get on the unmanned carrier using known and/or to be invented methods, such as using environment sensors of the maimed vehicle and/or the unmanned carrier. US 20150045992, titled "Work vehicle robotic platform" to Ashby discloses a system where a vehicle autonomously drives up a ramp and positions itself on a trailer. U.S. Pat. No. 9,120,412, titled "Carrying autonomous vehicle system and methods" to Cantor discloses an autonomous vehicle carrying system capable of carrying at least two autonomous vehicles on its main frame.

In one embodiment, a transportation system, comprising: autonomous on-road maimed vehicles, each configured to transport at least one occupant in a compartment, is authorized by law to drive in a residential neighborhood, and is unauthorized by law to drive on a highway on its own because it is not safe enough for highway speed; an unmanned carrier configured to carry at least two of the manned vehicles on the highway, while the occupants stay in the maimed vehicles; wherein the unmanned carrier comprises a safety mechanism configured to improve the survivability of the occupants to a collision at an interurban speed above 90 km/h; and a computer configured to synchronize pick-up of the manned vehicles by the unmanned carrier; wherein the pick-up is performed without human intervention utilizing a motorized lift that is coupled to the unmanned carrier and is configured to enable the manned vehicles to get on and get off the unmanned carrier.

Figure 53:
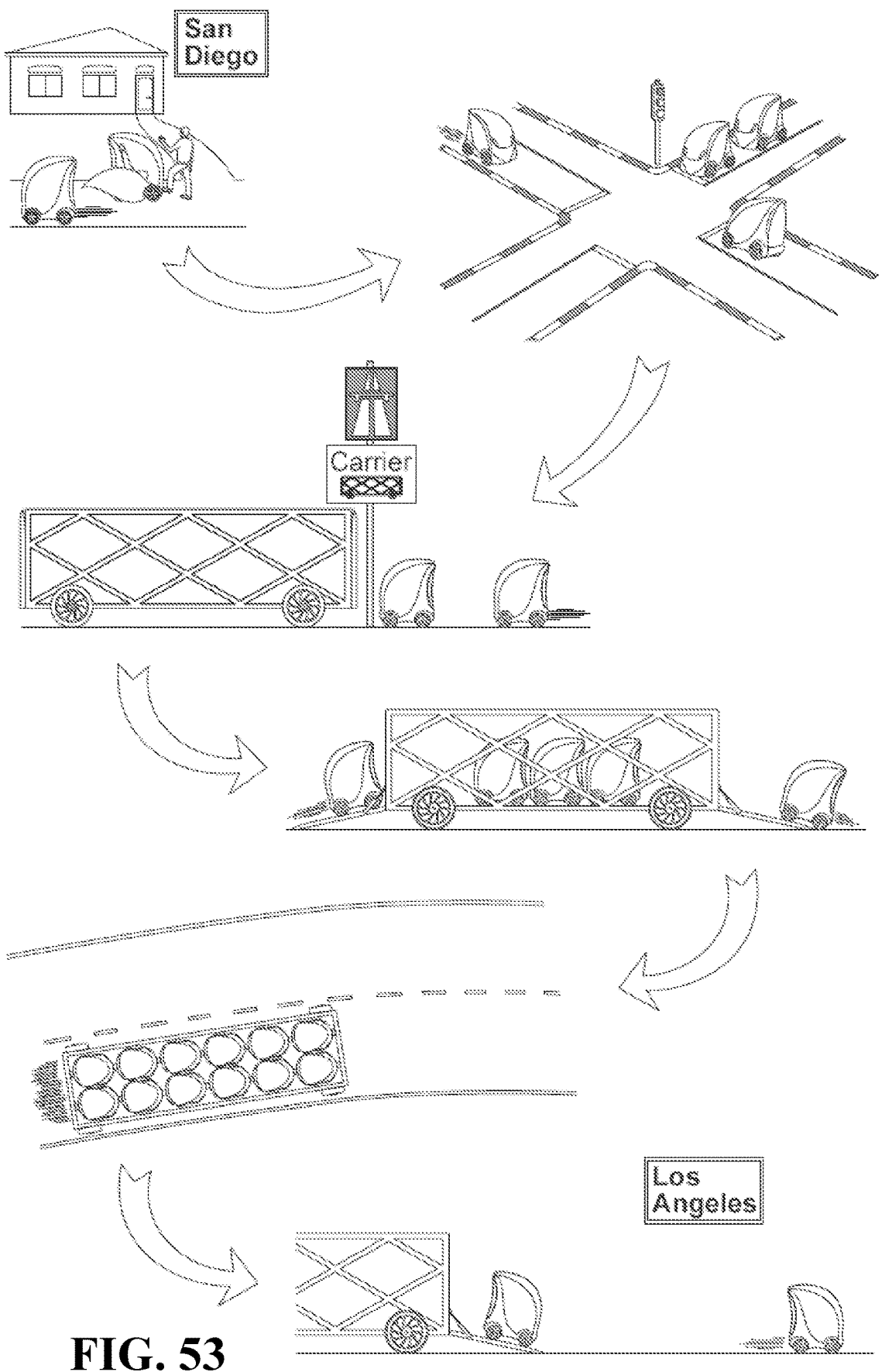
FIG. 53 and FIG. 54 are examples of a plurality of autonomous on-road manned vehicles and a plurality of unmanned carriers each configured to carry manned vehicles on the highway.
Figure 54:
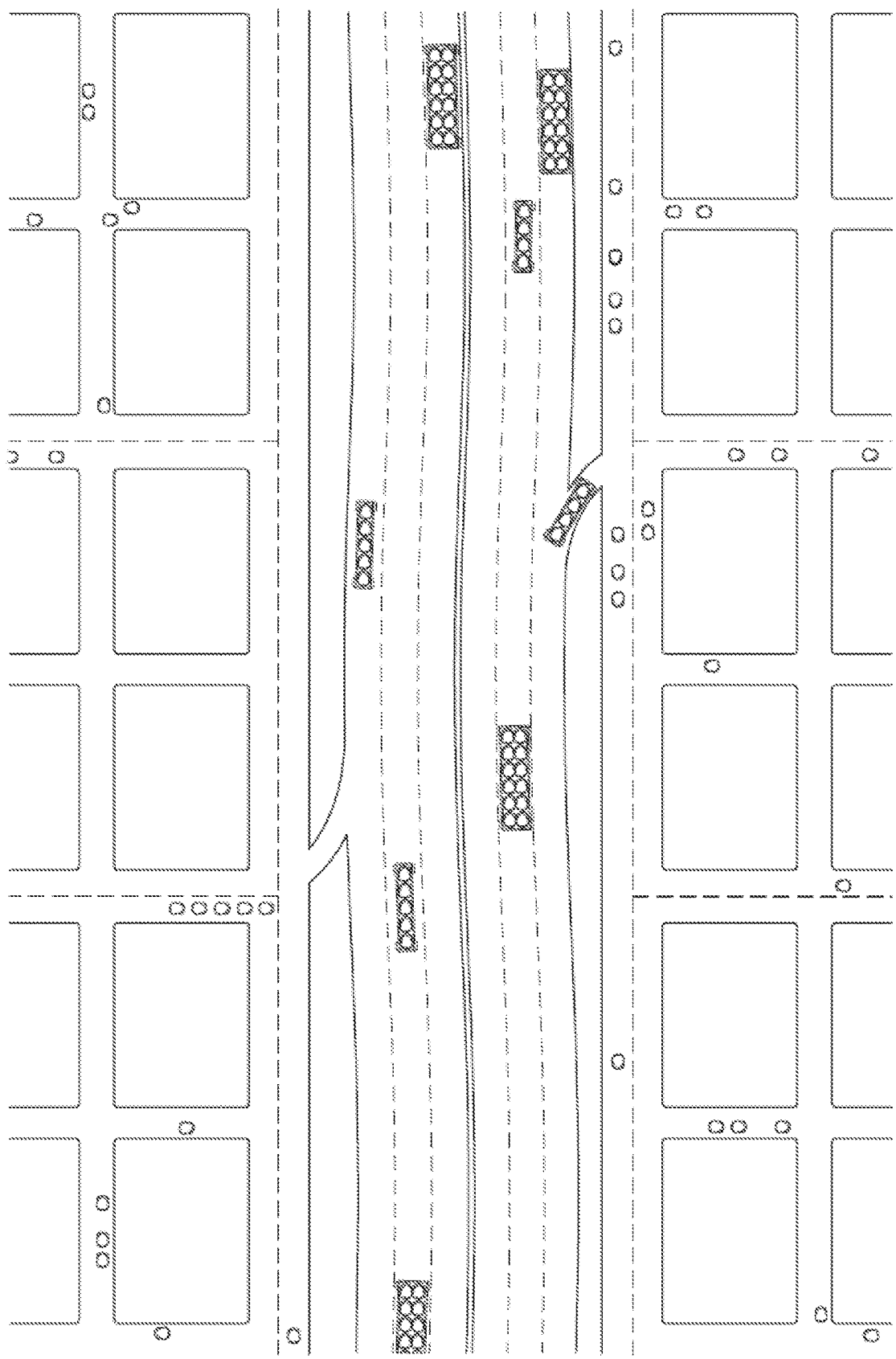

FIG. 53 and FIG. 54 are examples of one transportation system comprising a plurality of autonomous on-road maimed vehicles, a plurality of unmanned carriers each configured to carry at least two of the manned vehicles on the highway, and a computer configured to synchronize pick-up of the manned vehicles by the unmanned carriers. Optionally, the manned vehicle comprises collision safety mechanisms designed for an urban speed collision, and has tare weight of less than 800 kg without batteries. Optionally, the maimed vehicle has tare weight of less than 500 kg without batteries. Optionally, the safety mechanism comprises a crumple zone at least in one of the following directions: the front, the rare, the right side, and the left side. Optionally, the safety mechanism comprises a safety frame; the safety frame is configured to open when the manned vehicles get on the unmanned carrier, then configured to close in order to protect the manned vehicles while traveling, and then configured to open to enable the manned vehicles get off the unmanned carrier. Optionally, each manned vehicle comprises an automatic latch configured to fix the manned vehicle to the unmanned carrier during drive. In one embodiment, the maimed vehicles are guided by the computer and their autonomous-driving control systems to reach the pick-up point to meet and get on the unmanned carrier. In order to synchronize the travel of the manned vehicles up and down the unmanned carrier, the autonomous-driving control systems of the maimed vehicles and the unmanned carrier communicate over a communication network. The communications between the autonomous-driving control systems may contain numerical values specifying the velocity, trajectory, timing of traveling up or down the unmanned carrier, indications of the maximum speed limits, and indications of the state of the motorized lifts on which the manned vehicles travel up and down the unmanned carrier. The autonomous-driving control systems of the manned vehicle and the unmanned carrier may transmit feedback messages indicating actual vehicle operating parameters to each other and/or to the carrier controller.

Figure 51:
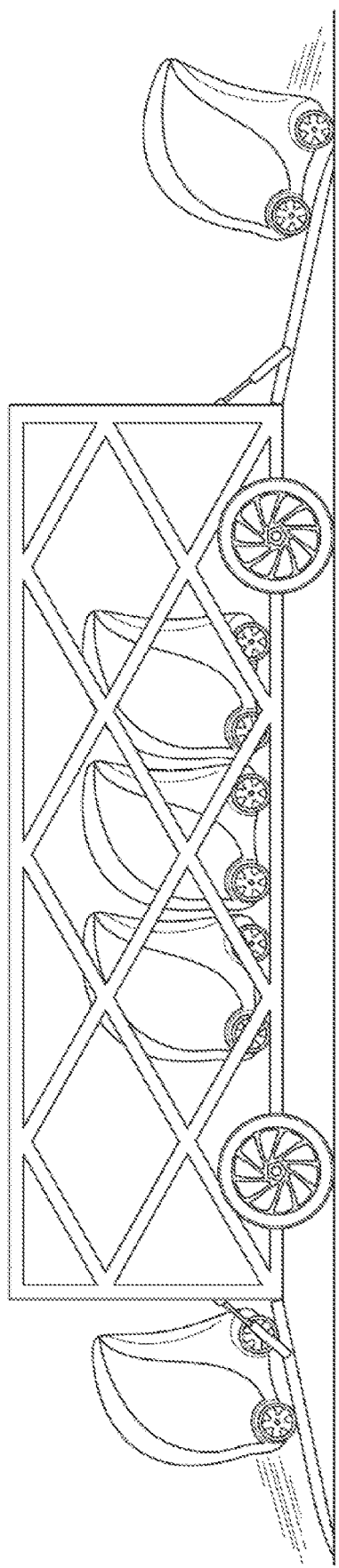
FIG. 51 illustrates a carrier with a front and rear lifts.

In one embodiment, an unmanned carrier for carrying manned vehicles, comprising: an engine configured to drive wheels; a platform sufficient to accommodate at least two manned vehicles, wherein each manned vehicle is an autonomous on-road vehicle configured to transport at least one occupant; front and rear lifts from which the manned vehicles can get on the carrier and get off the carrier; and automatic latches configured to fix the manned vehicles to the platform while in transit. FIG. 51 illustrates a carrier with a front and rear lifts from which the manned vehicles can get on the carrier and get off the carrier. Optionally, the wheels are located alongside of the platform, such that the top of at least one of the wheels is above the platform. Optionally, the wheels are located alongside of the platform, such that the top of at least one of the wheels is above a section of the platform to which at least one of the maimed vehicles is fixed. Optionally, the wheels are located alongside of the platform, such that the top of at least one of the wheels is above the point of contact between the platform and a wheel of one of the maimed vehicles fixed to the platform. Optionally, at least 20% of at least one of the volume and mass of the engine is located alongside of the platform. Optionally, at least 20% of at least one of the volume and mass of the engine is located alongside and above the platform. Optionally, at least 20% of at least one of the volume and mass of the engine is located alongside and above a section of the platform to which at least one of the manned vehicles is fixed. Optionally, the manned vehicles are non-armored autonomous on-road vehicles. Optionally, the unmanned carrier does not have a compartment configured to transport a human occupant. Optionally, the front and rear lifts are hydraulic lifts configured to move down automatically before the manned vehicles travel up or down the unmanned carrier. Optionally, the hydraulic lifts are configured to be in an up position while the unmanned carrier vehicle drives and the parked manned vehicles are not expected to get off soon. Optionally, the hydraulic lifts are further configured to act as collision safety barriers for the carried maimed vehicles. Optionally, the hydraulic lifts comprise video cameras that are coupled to video communication links configured to stream video taken by the video cameras to the parked maimed vehicle in order to enable the parked maimed vehicle to provide their occupants video see through based on the video taken by the video cameras.

Figure 49A:
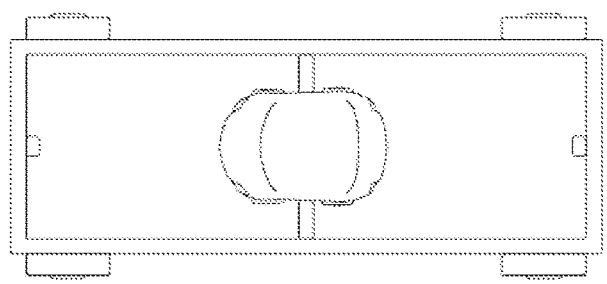
FIG. 49a, FIG. 49b, and FIG. 49c illustrate one embodiment of an unmanned carrier configured to park different number of carried manned in different parking positions on the platform in order to maintain center of mass on the platform.
Figure 49B:
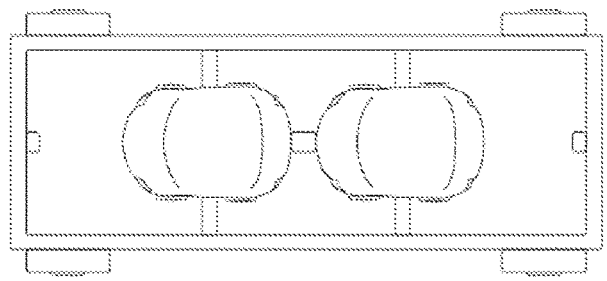
Figure 49C:
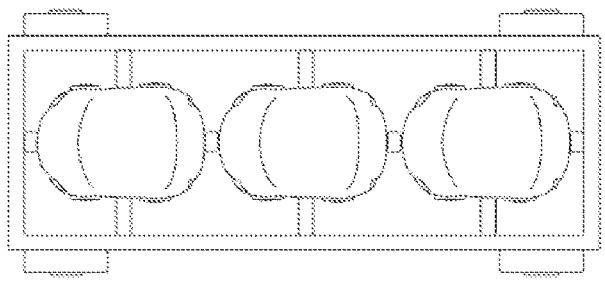

In one embodiment, an unmanned carrier for carrying maimed vehicles, comprising: a platform of size sufficient to carry at least two maimed vehicles, wherein each maimed vehicle is an autonomous on-road vehicle configured to transport at least one occupant; and a computer configured to navigate different number of carried maimed vehicles to park in different parking positions on the platform in order to maintain center of mass on the platform. FIG. 49a, FIG. 49b, and FIG. 49c illustrate one embodiment of an unmanned carrier configured to park different number of carried manned in different parking positions on the platform in order to maintain center of mass on the platform. Optionally, the unmanned carrier does not have a compartment configured to transport a human occupant. Optionally, when the unmanned carrier carries one manned vehicle, the computer is further configured to park the maimed vehicle essentially in the middle of the platform. Optionally, when the unmanned carrier carries two maimed vehicles, the computer is further configured to park the maimed vehicles essentially around the center of mass, such that none of the two manned vehicles is parked in the middle of the platform. Optionally, the platform is of a size sufficient to carry at least three maimed vehicles in a row; when the unmanned carrier carries two maimed vehicles in a row, the computer is further configured to park the two maimed vehicles essentially around the center of mass, such that none of the two maimed vehicles is parked in the middle of the platform, in order to maintain the center of mass; and when the unmanned carrier carries three maimed vehicles in a row, the computer is further configured to park one of the maimed vehicles essentially in the middle of the platform in order to maintain the center of mass. Optionally, the platform is of size sufficient to carry at least three maimed vehicles in a row, the platform comprises front and rear lifts from which the manned vehicles can get on and off the platform, and the unmanned carrier carries three manned vehicles; wherein the computer is further configured to park in the middle of the platform a manned vehicle that is not planned to get off first.

Figure 52:
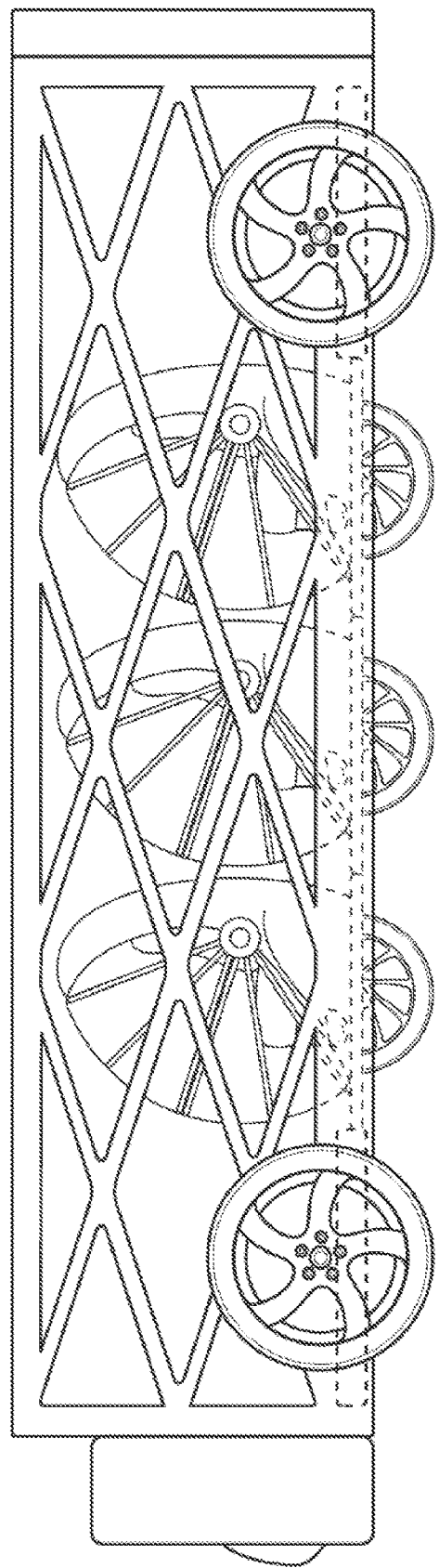
FIG. 52 illustrates one embodiment of an unmanned safety frame.

In one embodiment, a unmanned safety frame (USF), comprising: a chassis, wheels, an engine, an autonomous driving system, and a safety frame; the autonomous driving system is configured to drive the USF in cooperation with manned vehicles that drive while they are located inside the safety frame; wherein each manned vehicle is an autonomous on-road vehicle configured to transport at least one occupant; and the safety frame is configured to improve the survivability of the manned vehicles to a collision while the manned vehicles are located inside the safety frame compared to the survivability of the manned vehicles to a collision while the manned vehicles are not located inside the safety frame. FIG. 52 illustrates one embodiment of an unmanned safety frame (USF). Connecting vehicles automatically while parking and/or driving to form a vehicle train is known in the art, as illustrated for example in the following patent applications and patents: WO2016/161216A1, US2010/0044998, US2006/0170188, U.S. Pat. Nos. 8,738,196, 8,382,143, and 8,374,741. Optionally, the safety frame comprises a crumple zone at least in one of the following directions: the front, the rare, the right side, and the left side. Optionally, the safety frame comprises a safety cage; the safety cage is configured to open when the manned vehicles get into the USF, then configured to close in order to protect the manned vehicles while traveling inside the safety frame, and then configured to open to enable the manned vehicles to get out of the USF. Optionally, the USF further comprises an electromechanical interface configured to secure the USF to the manned vehicles located inside the safety frame while traveling. Optionally, the electromechanical interface comprises a latch configured to operate automatically in order to secure the USF to the manned vehicles located inside the safety frame. Optionally, the manned vehicles are small manned vehicles designed for urban drive below 90 km/h on a regular basis. Optionally, each manned vehicle has tare weight of less than 400 kg without batteries. Optionally, the USF further comprises a computer configured to coordinate a pick-up point where the manned vehicle is expected to get into the USF.

In one embodiment, an expendable vehicle travels in a convoy (also known as platoon in some cases) before or after an autonomous maimed vehicle in order to protect the autonomous manned vehicle against collision. The expendable vehicle may be an unmanned vehicle without a compartment for a human occupant, or a manned autonomous vehicle that drives empty without a human occupant inside (and thus is considered expendable). The expendable vehicle may be an autonomous vehicle that drives without being physically connected to the autonomous manned vehicle. Alternatively, the expendable vehicle may be a semi-autonomous vehicle that drives while being physically connected to the autonomous manned vehicle, optionally in a similar manner to the semi-autonomous vehicle described in U.S. Pat. No. 8,496,078 when the expendable vehicle drives behind the manned vehicle, or in an opposite architecture when the expendable vehicle drives before the maimed vehicle. In a case of a possible collision, the expendable vehicle performs a maneuver aimed to reduce the damage to the manned vehicle as a result of the collision.

In one embodiment, a transportation system configured to arrange the order of vehicles in a convoy according to collision risk, comprising: a computer configured to arrange the order of first and second autonomous vehicles driving in a convoy over a route comprising first and second roads; wherein the first autonomous vehicle is occupied, the second autonomous vehicle is unoccupied, the first road is a one-way road, and the second road is a two-way undivided roadways; while driving on the first road, the computer is configure to prefer to order second autonomous vehicle to drive behind the first autonomous vehicle (optionally because the risk of a rear-end collision is assumed to be higher than the risk of a head-on collision); and while driving on the second road, the computer is configure to prefer to order second autonomous vehicle to drive in front of the first autonomous vehicle (optionally because the risk of a head-on collision is assumed to be higher than the risk of a rear-end collision). Herein an unoccupied vehicle refers to a vehicle that does not carry a human occupant, and an occupied vehicle refers to a vehicle that carries at least one human occupant. Optionally, the second autonomous vehicle is an unmanned autonomous vehicle. Optionally, the second autonomous vehicle is configured to perform a maneuver aimed to reduce the damage to the first autonomous vehicle as a result of a collision. Optionally, the second autonomous vehicle drives ahead of the first autonomous vehicle on the route by at least one of the following durations: 5 sec, 10 sec, 30 sec, and 60 sec; and the computer is further configured to delay the traveling of the second autonomous vehicle relative to the first autonomous vehicle in order to enable it to join the convoy. Optionally, the system further comprises a third occupied autonomous vehicle that drives on the same route ahead of the convoy, which comprises the first and second autonomous vehicles, by at least one of the following durations: 5 sec, 10 sec, 30 sec, and 60 sec; and the computer is further configured to delay the traveling of the third occupied autonomous vehicle relative to the convoy in order to enable it to join the convoy.

In one embodiment, a transportation system configured to arrange the order of vehicles in a convoy according to the occupancy data, comprising: a computer configured to receive data about occupancy of first, second, third and fourth autonomous vehicles that are planned to travel over the same route; upon determining that the first and second autonomous vehicles are occupied by occupants and the third and fourth autonomous vehicles are unoccupied, the computer is configure to command the vehicles to order in the convoy such that the unoccupied vehicles are at the edges of the convoy (e.g., ordered as following: third vehicle, first vehicle, second vehicle, and fourth vehicle). Optionally, the computer is further configured to receive data about occupancy of a fifth autonomous vehicle that is planned to join the convoy, and to command the first to fourth vehicles to make room for the fifth vehicle between the third and fourth autonomous vehicles. Optionally, the fifth occupied autonomous vehicle drives on the same route ahead of the convoy by at least one of the following durations: 5 sec, 10 sec, 30 sec, and 60 sec; and the computer is further configured to delay the traveling of the fifth occupied autonomous vehicle relative to the convoy in order to enable it to join the convoy. Optionally, the fifth occupied autonomous vehicle drives on the same route behind the convoy by at least one of the following durations: 5 sec, 10 sec, 30 sec, and 60 sec; and the computer is further configured to delay the traveling of the convoy relative to the fifth occupied autonomous in order to enable the fifth occupied autonomous vehicle to join the convoy. Optionally, the third autonomous vehicle drives ahead of the other autonomous vehicles on the route by at least one of the following durations: 5 sec, 10 sec, 30 sec, and 60 sec; and the computer is further configured to delay the traveling of the third autonomous vehicle relative to the convoy in order to enable it to join the convoy. Optionally, at least one of the third and fourth autonomous vehicles is an unmanned autonomous vehicle. Optionally, the unmanned vehicle is configured to perform a maneuver aimed to reduce the damage to the manned vehicles as a result of a collision.

Crash statistics show that the likelihood of crash death varies among vehicle types according to size. Small/light vehicles have less structure and size to absorb crash energy, so crash forces on occupants are higher. Occupants in lighter vehicles are usually at a disadvantage in collisions with heavier vehicles and occupant deaths in lighter vehicles are usually more likely to occur in multiple-vehicle crashes. Therefore, the transportation system orders the vehicles in the convoy according to an order that minimizes the likelihood of death in a multiple-vehicle crash. Although the physics of frontal car crashes usually are described in terms of what happens to the vehicles, injuries depend on the forces that act on the occupants, and these forces are affected by two key physical factors. One is the weight of a crashing vehicle, which determines how much its velocity will change during impact. The greater the change, the greater the forces on the occupants inside and the higher the injury risk. The second factor is vehicle size, specifically the distance from the front of a vehicle to its compartment. The longer the distance is, the lower the forces on the occupants. Size and weight affect injury likelihood in all kinds of crashes. In a collision involving two vehicles that differ in size and weight, the occupants in the smaller, lighter vehicle will be at a disadvantage. The bigger, heavier vehicle will push the smaller, lighter one backward during the impact. This means there will be less force on the occupants of the heavier vehicle and more on the people in the lighter vehicle. Greater force means greater risk, so the likelihood of injury goes up in the smaller, lighter vehicle.

In one embodiment, a transportation system configured to arrange the order of vehicles in a convoy according to vehicle weight and size, comprising: a computer configured to receive data about weight and size of first, second, third and fourth autonomous vehicles that are planned to travel over the same route; upon determining that the first and second autonomous vehicles are lighter and smaller than the third and fourth autonomous vehicles, the computer is configure to command the vehicles to order in the convoy such that the heavier and larger vehicles are at the edges of the convoy (e.g., ordered as following: third vehicle, first vehicle, second vehicle, and fourth vehicle). Optionally, the computer is further configured to receive data about weight and size of a fifth autonomous vehicle that is planned to join the convoy; upon determining that the fifth autonomous vehicle is lighter and smaller than the third and fourth autonomous vehicles, the computer is configure to command the first to fourth vehicles to make room for the fifth vehicle between the third and fourth autonomous vehicles. Optionally, the fifth autonomous vehicle drives on the same route ahead of the convoy by at least one of the following durations: 5 sec, 10 sec, 30 sec, and 60 sec; and the computer is further configured to delay the traveling of the fifth occupied autonomous vehicle in order to enable it to join the convoy. Optionally, the fifth autonomous vehicle drives on the same route behind the convoy by at least one of the following durations: 5 sec, 10 sec, 30 sec, and 60 sec; and the computer is further configured to delay the traveling of the convoy in order to enable the fifth occupied autonomous vehicle to join the convoy. Optionally, the computer is further configured to receive data about weight and size of a fifth autonomous vehicle that is planned to join the convoy; upon determining that the fifth autonomous vehicle is heavier and larger than the third and fourth autonomous vehicles, the computer is configure to command the fifth vehicle to join the convoy at the front. Optionally, the computer is further configured to receive data about weight and size of a fifth autonomous vehicle that is planned to join the convoy; upon determining that the fifth autonomous vehicle is unoccupied, lighter and smaller than the third and fourth autonomous vehicles, the computer is configure to command the fifth vehicle to join the convoy at the front. One reason for this decision is that an unoccupied vehicle is more expendable than an occupied vehicle. Optionally, the first and second autonomous vehicle drives ahead of the third and fourth autonomous vehicles on the route by at least one of the following durations: 5 sec, 10 sec, 30 sec, and 60 sec; and the computer is further configured to delay the traveling of the first and second autonomous vehicles relative to the third and fourth autonomous vehicles in order to enable them to join the convoy between the third and fourth autonomous vehicle. Optionally, the first and second autonomous vehicle drives behind the third and fourth autonomous vehicles on the route by at least one of the following durations: 5 sec, 10 sec, 30 sec, and 60 sec; and the computer is further configured to delay the traveling of the third and fourth autonomous vehicles relative to the first and second autonomous vehicles in order to enable them to join the convoy before and after the first and second autonomous vehicle.

Figure 55:
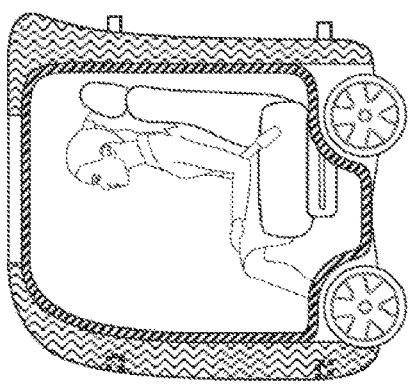
FIG. 55 illustrates connectable vehicles where each has a front crumple zone.
Figure 55:
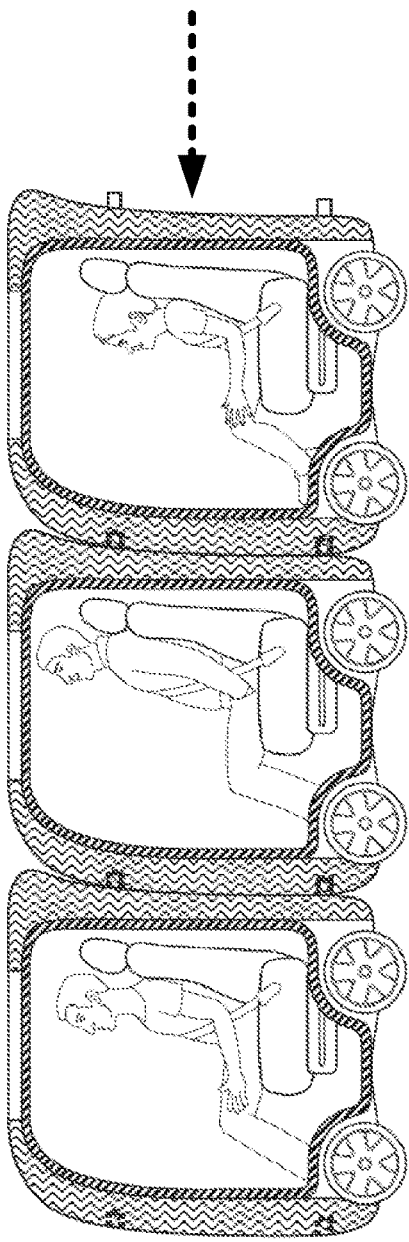

FIG. 55 illustrates connectable vehicles where each has a front crumple zone. The connectable vehicles connect to each other to create a convoy, wherein the area of the physical contact between two adjacent connectable vehicles is above at least one of the following areas: 200 cm$^2$, 500 cm$^2$, 1,000 cm$^2$, 2,000 cm$^2$, 4,000 cm$^2$, 7,000 cm$^2$, and 10,000 cm$^2$. Optionally, different connectable vehicles may have front crumple zones of different volumes and types. Optionally, some of the connectable vehicles may not have front crumple zones. Optionally, some of the connectable vehicles may have rear crumple zones.

In one embodiment, a first connectable vehicles has a front crumple zone, a second connectable vehicles has a rear crumple zone, and a computer is configured to connect the first and second connectable vehicles such that the first connectable vehicle is in the front. Optionally, when a third connectable vehicle having smaller front and rear crumple zones is to be connected to the first and second connectable vehicles, the first and second vehicles disconnect in order to enable the third connectable vehicle to connect between them in order to form a vehicle train having the first connectable vehicle before the third connectable vehicle, and the third connectable vehicle before the second connectable vehicle.

Figure 56:
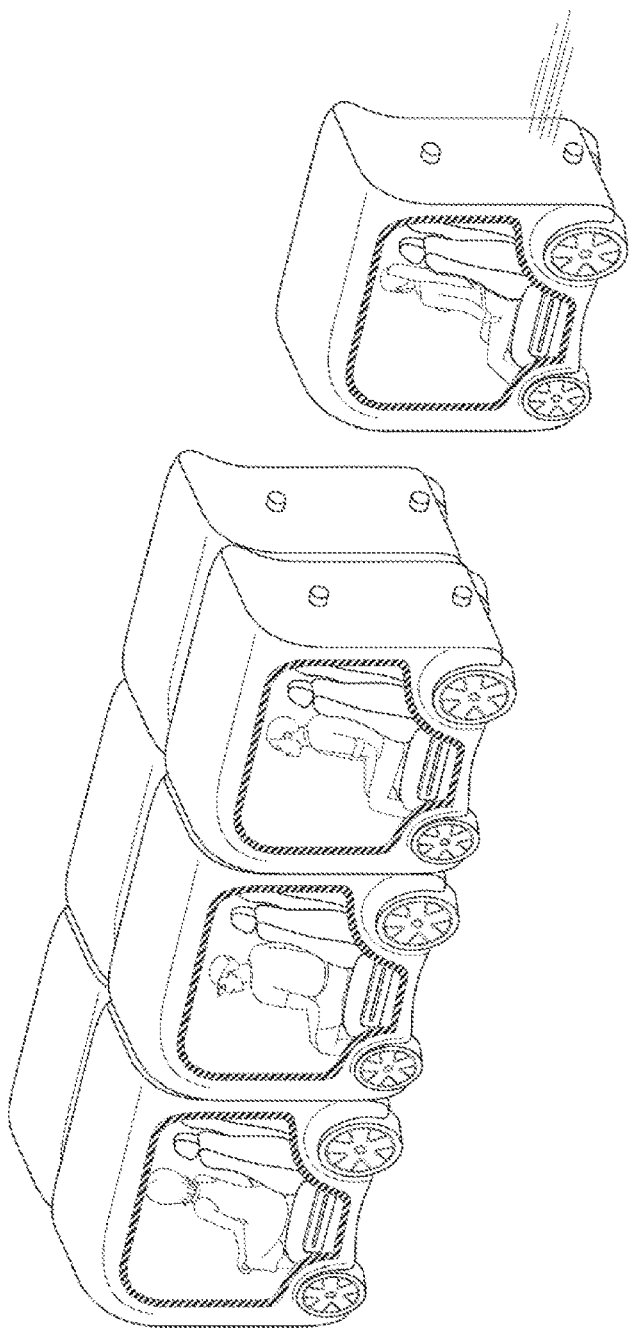
FIG. 56 illustrates connectable vehicles configured to connect in two or more rows.

FIG. 56 illustrates connectable vehicles configured to connect in two or more rows. Optionally, at least one of the vehicles has a front crumple zone. The connectable vehicles connect to each other to create a convoy, wherein the area of the physical connections between two adjacent connectable vehicles is above at least one of the following areas: 200 cm$^2$, 500 cm$^2$, 1,000 cm$^2$, 2,000 cm$^2$, 4,000 cm$^2$, 7,000 cm$^2$, and 10,000 cm$^2$. FIG. 57a illustrates a front collision where the front and rear crumple zones of the first two vehicles deform while the safety cages of the compartments did not break. FIG. 57b is a schematic illustration of a 1D finite element method simulation of a system modeled using nonlinear stiffness and mass distribution. Such a simulation can find recommended combinations of the following parameters: the required rigidity of the frame rate, the force transfer coefficient within the crumple zones, the amount of crash boxes in the crumple zones, the required frame maximum deformation before the destruction, and the minimal crumple zone length.

In one embodiment, a system comprising: first and second vehicles comprising first and second driving computers, respectively, configured to drive the first and second vehicles autonomously both when driving alone and when driving in a convoy where the second vehicle is physically connected by an automatic hitch behind the first vehicle; the rear side of the first vehicles and the front side of the second vehicle have shapes that when the first and second vehicles drive in a convoy, the area of the physical contact between the first and second vehicles is above at least one of the following areas: 200 $cm^2$, 500 $cm^2$, 1,000 $cm^2$, 2,000 $cm^2$, 4,000 $cm^2$, 7,000 $cm^2$, and 10,000 $cm^2$; and the area of the physical contact between the first and second vehicles supports a crumple zone having a volume above 1,000 $cm^3$. Optionally, more than 60% of the crumple zone is permanently coupled to the rear side of the first vehicle. Optionally, more than 60% of the crumple zone is permanently coupled to the front side of the second vehicle. Optionally, the crumple zone has a volume above at least one of the following columes: 2,000 $cm^3$, 4,000 $cm^3$, 10,000 $cm^3$, 15,000 $cm^3$, and 20,000 $cm^3$, 40,000 $cm^3$, and 100,000 $cm^3$.

In one embodiment, a system comprising: first and second vehicles comprising first and second driving computers, respectively, configured to drive the first and second vehicles autonomously both when driving alone and when driving in a convoy where the second vehicle is physically connected by an automatic hitch behind the first vehicle; the second vehicle comprises a nontransparent crumple zone located at eye level in front of an occupant who sits in a front seat of the second vehicle's compartment; a stiff element configured to support the crumple zone and to resist deformation during collision in order to reduce compartment intrusion; wherein the stiff element is located at eye level between the crumple zone and the occupant during normal driving, and is coupled to the compartment; the second vehicle further comprises a camera configured to take video of the outside environments in front of the second vehicle; and a computer configured to generate for the occupant, based on the video, a representation of the outside environment at eye level. Optionally, the first vehicle comprises a second camera configured to take video of the outside environments in front of the first vehicle; and the computer is further configured to generate for the occupant the representation of the outside environment at eye level based on the second video when the first and second vehicles drive connected. Optionally, the system further comprises an energy store system, a control system, and a propulsion system.

Prior art vehicles disclose many types of crumple zones located below the occupant's chest level, probably because the crumple zones is not transparent and if the crumple zone would be above the chest level then the occupant would not be able see the road. By using the virtual windows described herein, there is no need for optical see-through of the road, and thus is it possible to extend the crumple zone to the driver's chest level, and even above to the neck level, head level, or even above head level. Vehicle crumple zones save the lives of hundreds of thousands of people every year. The crumple zone is a volume that absorbs some of the energy of a collision and lengthens the time of the collision event. The crumple zone presents a force in opposition to the collision force over a distance. By increasing the time of the collision event, and by absorbing some of the collision energy, the crumple zone reduces the forces transmitted to the occupants. The effectiveness of the crumple zone is a function of its volume, thus a small volume crumple zone offers less protection to the occupants relative to a similar type of crumple zone having a large volume. With no crumple zones over the window locations, the vehicle exposes its occupants to very high forces during a collision because the motion of their bodies will change very rapidly. Even if the occupant does not strike the hard window, the high acceleration can tear internal organs and blood vessels, and the skull may move and compress and injure the brain.

Prior art technologies offer front, side and rear crumple zones to reduce damage to the occupants from a collision, such as bumpers, springs and other shock absorbing devices designed to dissipate some of the energy of the collision to reduce occupant injuries. However, the effectiveness of these shock absorbing devices remains a function of their volume, which determines the amount of energy they can absorb. Side impact protection is usually a more difficult problem than frontal or rear impact protection because the occupant's head is closer to the side window than to the front or back windows, and closer proximity means that there is less time to absorb the energy of the side collision. Also, the vehicle broadside (also referred to as the side of the vehicle) has much less volume to absorb the collision energy, compared to the front or rear sides of the vehicle, thus placing a crumple zone instead of the side window can be very effective in a broadside collision.

In one embodiment, a retracted bumper mechanism installed on the exterior of the vehicle and located at occupant eye level, designed to rapidly extend before an impending collision, can absorb some of the collision energy, and thus reduce compartment intrusion. The reference Wang, J. T. "An extendable and retractable bumper", 19 th ESV conference, 2005, illustrates an example of an extendable mechanism that can be located at occupant eye level with the required modifications. In another embodiment, a rapidly inflatable device, installed on the exterior of the vehicle and located at occupant eye level, can reduce the severity of impact loads transmitted to the vehicle structure by dissipating or absorbing a portion of the energy induced due to the impact, and thus and reduce compartment intrusion. In still another embodiment, a deformation zone that extends to occupant eye level, helps in absorbing some of the collision energy and reduces compartment intrusion. Optionally, the crumple zone comprises a honeycomb energy absorber that extends to occupant eye level, which helps in absorbing some of the collision energy and reduces compartment intrusion. Optionally, the crumple zone comprises a deformation zone that extends to occupant eye level, which helps in absorbing some of the collision energy and reduces compartment intrusion. Optionally, the crumple zone comprises a deformable zone configured to absorb collision energy, which extends to occupant eye level. Optionally, the crumple zone comprises a retracted bumper mechanism, installed on the exterior of the vehicle and located at occupant eye level, designed to rapidly extend before an impending collision. Optionally, the crumple zone comprises a rapidly inflatable device, installed on the exterior of the vehicle and located at occupant eye level, designed to rapidly inflate before an impending collision. One example of a deformable zone is presented in U.S. Pat. No. 6,027,159. Optionally, the nontransparent crumple zone has thickness greater than at least one of the following values: 5 cm, 10 cm, 20 cm, 30 cm, 50 cm, 75 cm, and 100 cm. Optionally, the nontransparent crumple zone weighs less than: (i) half of the weight of an automotive glass having the same thickness as the nontransparent crumple zone, and (ii) quarter of the weight of an armor steel plate having the same thickness as the nontransparent crumple zone. Optionally, the compartment comprises a front door, and the crumple zone is physically coupled to the door, such that the crumple zone moves with the door when the door opens. Optionally, the system further comprises a shock-absorbing energy dissipation padding, coupled to the outer side of the crumple zone at eye level of the occupant, configured to minimize damage to a pedestrian during a pedestrian-vehicle collision. Optionally, the representation is generated from the point of view of the occupant, and further comprising a display configured to present the representation to the occupant. Optionally, the display is comprised in a head-mounted display (HMD), and the vehicle further comprises a communication system configured to transmit the representation to the HMD. Optionally, the display is coupled to the inner side of the compartment. Optionally, the display is a flexible display. Optionally, the stiff element is nontransparent. Optionally, the camera comprises multiple cameras directed to multiple directions around the vehicle, and the multiple cameras support generating multiple representations of the outside environment from different points of view. Optionally, the vehicle compartment further comprises an automotive-grade window located in a location where the head of a belted occupant is not expected to hit as a result of collision while traveling in velocity of less than 50 km/h.

In one embodiment, a system comprising: first and second vehicles comprising first and second driving computers, respectively, configured to drive the first and second vehicles autonomously both when driving alone and when driving in a convoy where the second vehicle is physically connected by an automatic hitch behind the first vehicle; the first vehicle comprises a nontransparent crumple zone located at eye level behind an occupant who sits in a front seat of the first vehicle's compartment; and a stiff element configured to support the crumple zone and to resist deformation during collision in order to reduce compartment intrusion; wherein the stiff element is located at eye level between the crumple zone and the occupant during normal driving, and is coupled to the compartment. Optionally, the first vehicle further comprises a camera configured to take video of the outside environments in front of the first vehicle; and a computer configured to generate for a second occupant of the second vehicle, based on the video and when the first and second vehicles drive physically connected, a representation of the outside environment at eye level. Optionally, the second vehicle comprises a second camera configured to take video of the outside environments in front of the second vehicle; and the computer is further configured to generate for the second occupant the representation of the outside environment at eye level based on the second video when the first and second vehicles drive alone. Optionally, the nontransparent crumple zone has thickness greater than at least one of the following values: 5 cm, 10 cm, 20 cm, 30 cm, 50 cm, 75 cm, and 100 cm. Optionally, the nontransparent crumple zone weighs less than: (i) half of the weight of an automotive glass having the same thickness as the nontransparent crumple zone, and (ii) quarter of the weight of an armor steel plate having the same thickness as the nontransparent crumple zone. Optionally, the vehicle weighs less than 800 kg without batteries and is designed to transport up to two occupants. Optionally, the compartment comprises a back door, and the crumple zone is physically coupled to the door, such that the crumple zone moves with the door when the door opens. Optionally, the representation is generated from the point of view of the occupant, and further comprising a display configured to present the representation to the occupant. Optionally, the display is comprised in a head-mounted display (HMD), and the vehicle further comprises a communication system configured to transmit the representation to the HMD. Optionally, the display is coupled to the inner side of the compartment. Optionally, the display is a flexible display.

In one embodiment, a three-wheeler connects to a convoy (optionally inside a safety frame) and the third wheel is lifted up to have the car drive only on two wheels. The lifted wheel may be similar to a wheel used for a low speed vehicle, because the lifted wheel does not roll at high speeds. Additionally or alternatively, in the case of an electric motor the electric motor may be disconnected to reduce the power required to tow the vehicle. Optionally, two front wheels with motors are raise in convoy, and a third rear wheel stays on the road. The two front wheels may be smaller than the third wheel. Driving on a single wheel reduce the friction with the road. Additionally or alternatively, electric motors still apply force when the vehicle is towed; therefore there is a need to disconnect the motor in order to reduce the required energy to move the towed vehicle.

In one embodiment, a system comprising: first and second vehicles comprising first and second driving computers, respectively, configured to drive the first and second vehicles autonomously both when driving alone and when driving in a convoy where the second vehicle is physically connected by an automatic hitch behind the first vehicle; the second vehicle comprises a front drive wheel powered by an electric motor, and a rear wheel; and a device configured to disconnect the motor from the front wheel when the second vehicle drives connected to the first vehicle.

When autonomous vehicles drive in a convoy, such as illustrated for example in FIG. 55 and FIG. 56, towing some of the vehicles having electric motors with all motorized wheels flat on the ground may not be recommended due to one or more of the following reasons: (i) a gearbox without a passive lubrication system may not be lubricated when the vehicle is off, (ii) an electric motor generates current which can cause damage to the control system if done for a longer time period, (iii) regenerative braking consumes energy and is not always welcome for all motorized wheels, (iv) some of the wheels may not be designed for high speed, (v) in some cases such as with a brushed motor, the motor always wears, even while the vehicle is towed, which causes a shorter motor life, (vi) motor bearings experience wear while the vehicle is towed, reducing the overall life of the motor, and (vii) other maintenance and cost of ownership reasons.

In one embodiment, the drive wheels are connected directly to one or more brushed motors. Because the motor cannot be disconnected from the wheels, a switch or relay may be put in place between the motor and the control system along with a control system to allow the following options: (i) the switch is closed to allow the vehicle to function normally under its own power, (ii) the switch is closed while the vehicle is towing and the control system allows the motor to act as a generator to charge the battery while the vehicle is being towed, and (iii) the switch is opened in order to prevent the motor from acting as a generator. Alternatively, diodes may be placed in the supply lines to only allow current to flow in one direction, preventing the motor from generating current.

In another embodiment, the vehicle is driven by brushless motors that are connected directly to the wheels. Relays or switches are put in place on each phase of the motor, between the motor and the speed controller. When the car is being towed, the switches are open to prevent any electrical current from being generated by the motor, potentially damaging the speed controller. Optionally, a rectifier may be used to turn the 3 phase AC voltage which is generated into a single phase DC voltage at an appropriate voltage to charge the vehicle's battery.

In still another embodiment, a dog and spline clutch enables the motor to be either engaged or not engaged. The clutch may either be implemented at the wheels or may be implemented between the motor and a single speed gear box or a transfer case. The dog and spline clutch may be activated by an electronic actuator that disconnects the motor from the wheels when the vehicle is being towed, and connects the motor to the wheels when the vehicle is being driven. Optionally the clutch is planced inside a casing to prevent dirt from entering and interfering with engagement and disengagement. In still another embodiment, a wet or dry clutch, which is normally disengaged, is placed at each drive wheel and only engages the wheel when the vehicle is on and driving. When it is being towed, the drive motor is completely disconnected. In still another embodiment, a transfer case or a gearbox with a neutral position enables the vehicle to be towed.

In one embodiment, a system comprising: first and second vehicles comprising first and second driving computers, respectively, configured to drive the first and second vehicles autonomously both when driving alone and when driving in a convoy where the second vehicle is physically connected by an automatic hitch behind the first vehicle; the second vehicle comprises a front drive wheel powered by an electric motor, and a rear wheel; and a device configured to lift of the ground the front drive wheel when the second vehicle drives connected to the first vehicle.

The following embodiment describes solutions to lift of the ground at least one of the motorized wheels. In one embodiment, at least one of the drive wheels is seat on a tow dolly that is attached to the tow vehicle. Optionally, jacks are built into the vehicle so that the electric vehicle is raised and the dolly slides under it. In another embodiment, when the vehicle has a short wheel base and is light, the non-drive wheels may be shifted toward the center of the vehicle so that the weight is taken off of the drive wheels and the vehicle is attached to a tow vehicle closest to the drive wheels when being towed. In still another embodiment, the car being towed has a hitch receiver embedded in the front (optionally in the front bumper). The towing vehicle has a hydraulic jack connected to a hitch receiver, which enable to raise and lower the drive wheels of the towed vehicle off the ground. Optionally, the hitch receiver has a pivot to allow the towed vehicle to be at an angle both with respect to the road and with respect to the towing vehicle. In one example the hitch receiver with the pivot includes a ball joint, such as a hitch mount ball joint that is flipped upside down so that the vertical post of the apparatus had a ball attached to the bottom. In still another embodiment, a $3^{rd}$ set of wheels is designed into the vehicle which will descends and pivot when the car is being towed. The $3^{rd}$ set of wheels may be retracted when the vehicle is driving.

Figure 58A:
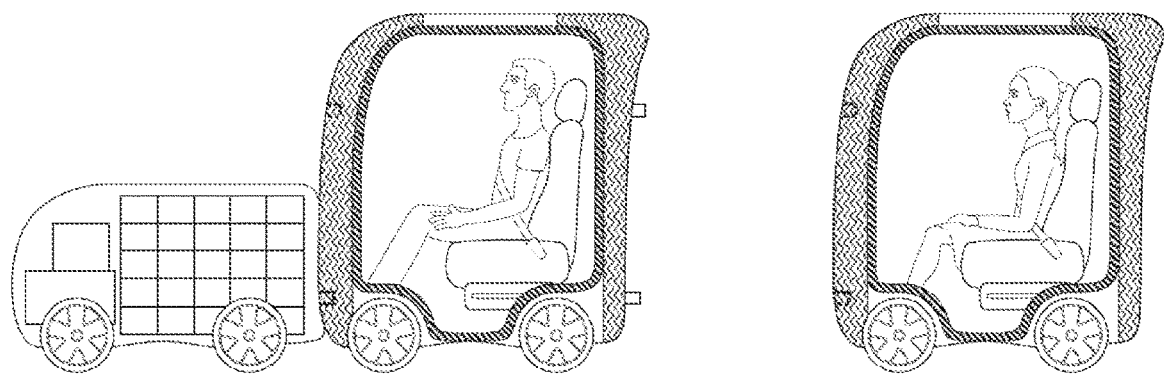
FIG. 58a and FIG. 58b illustrate autonomous connectable vehicles powered by an unmanned powering vehicle.
Figure 58B:
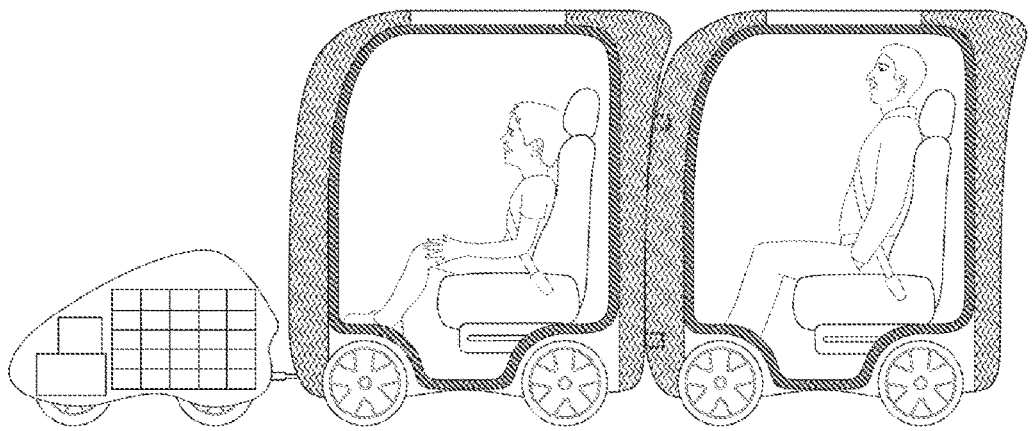
Figure 59:
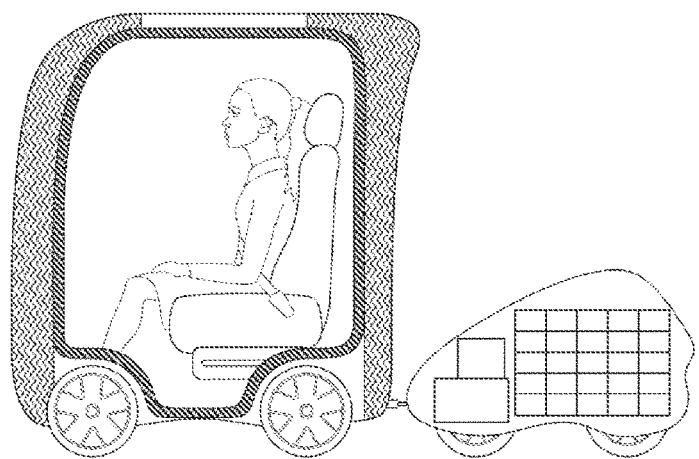
FIG. 59 illustrates an unmanned powering vehicle connected behind an autonomous vehicle.

FIG. 58*a* and FIG. 58*b* illustrate autonomous connectable vehicles powered by an unmanned powering vehicle. FIG. 59 illustrates an unmanned powering vehicle connected behind an autonomous vehicle. The vehicles may be connected using various methods, such as the ones described herein, and/or other methods. In one embodiment, in order to increase the duty cycle of a manned vehicle and/or reduce wearing of its engine and/or to support operation without stationary charging stations, the manned vehicle physically connects to an unmanned towing vehicle that bears at least some of the load of moving the manned vehicle during a portion of a trip planned by the manned vehicle. Optionally, the unmanned towing vehicle also charges and/or fuels the manned vehicle while they are physically connected. The unmanned towing vehicle is specifically designed for towing the manned vehicle, and optionally charging and/or fueling the manned vehicle. The unmanned towing vehicle is programmed to meet the manned vehicle as needed, according to its planed trajectory and charging level, and the connection to the unmanned towing vehicle is done on purpose and not just because the unmanned towing vehicle was traveling the same path the towed manned vehicle was traveling.

In one embodiment, an autonomous on-road manned vehicle, comprising: a chassis, wheels, an autonomous driving system, a compartment, an engine, an electromechanical interface, a towing computer, and an extended driving controller; the electromechanical interface is configured to attach the maimed vehicle, while in transit, to an unmanned towing vehicle; wherein the manned vehicle can operate and drive an occupant both when connected and unconnected to the unmanned towing vehicle; the towing computer is configured to coordinate a connection to the unmanned towing vehicle; wherein the connection takes place after the maimed vehicle has driven an occupant for at least a minute; and the towing computer is configured to reduce the load on the engine as a result of delegating to the unmanned towing vehicle at least 20% of the load of moving the manned vehicle while the two are connected; and the extended driving controller is configured to drive the maimed vehicle in cooperation with the unmanned towing vehicle.

Optionally, while in transit, both the manned vehicle and the unmanned towing vehicle drive autonomously; the manned vehicle and the unmanned towing vehicle connect on the path, and continue connected. Optionally, the point of connection is on the traveling path of the manned vehicle. Optionally, the manned vehicle further comprises a battery and the unmanned towing vehicle is further configured to charge the battery of the maimed vehicle while they are connected. Optionally, the unmanned towing vehicle does not have a standard compartment, and the unmanned towing vehicle is specifically designed to tow a manned vehicle. Optionally, the connection between the manned vehicle and the unmanned towing vehicle has a degree of freedom in the yaw plane. Optionally, the connection between the manned vehicle and the unmanned towing vehicle physical is stiff, and the maimed vehicle and the unmanned towing vehicle move together as a single vehicle.

In one embodiment, an unmanned towing vehicle, comprising: a chassis, wheels, an autonomous driving system, and an engine, together configured to enable the unmanned towing vehicle to drive autonomously; an electromechanical towing interface configured to physically connect to an autonomous on-road manned vehicle and to bear at least 20% of the load of moving the manned vehicle; and an extended driving controller configured to drive the unmanned towing vehicle in cooperation with the maimed vehicle.

In one embodiment, in order to increase the duty cycle of a manned vehicle, especially during rush hours, the manned vehicle connects to a charging unmanned vehicle that charges the manned vehicle while traveling. The charging unmanned vehicle is specifically designed to charge and/or fuel the manned vehicle, and is programmed to meet the manned vehicle as needed according its planed trajectory and charging level.

In one embodiment, an autonomous on-road manned vehicle, comprising: a chassis, wheels, an autonomous driving system, a compartment, an engine, a battery, a charging computer, an electromechanical interface, and an extended driving controller; the electromechanical interface is configured to connect to a detachable unmanned autonomous charging vehicle; wherein the manned vehicle can operate and drive an occupant with and without being connected to the detachable unmanned autonomous charging vehicle; the charging computer is configured to coordinate a connection to the detachable unmanned autonomous charging vehicle; wherein the connection takes place after the manned vehicle drove an occupant for at least a few minutes; and the extended driving controller is configured to drive the manned vehicle in cooperation with the detachable unmanned autonomous charging vehicle in order to charge the manned vehicle while traveling. Optionally, the point of connection is on the traveling path of the manned vehicle. Optionally, the charging unmanned vehicle travels in front of the manned vehicle, and the connection to the charging unmanned vehicle is located on the front part of the manned vehicle. Optionally, the charging unmanned vehicle travels behinds the manned vehicle, and the connection to the charging unmanned vehicle is located on the rear part of the manned vehicle. Optionally, the manned vehicle comprises, on both its front and rear sides, physical connections configured to receive and forward driving power from the physically coupled unmanned vehicle; and wherein the manned vehicle drive in a convoy comprising at least two maimed vehicle that save power during the traveling by utilizing driving power obtained from the charging unmanned vehicle. Optionally, the charging unmanned vehicle provides the manned vehicle with information regarding the road and/or instructions that control the driving of the manned vehicle.

In one embodiment, a detachable unmanned autonomous powering vehicle, comprising: a chassis, wheels, an autonomous driving system, and an engine, together configured to enable the detachable unmanned autonomous powering vehicle to drive autonomously; a charging unit configured to charge an autonomous on-road maimed vehicle; an electromechanical interface configured to physically connect to the manned vehicle in order to charge the manned vehicle; and an extended driving controller configured to drive the detachable unmanned autonomous powering vehicle in cooperation with the manned vehicle in order to charge the manned vehicle while traveling. Optionally, the detachable unmanned autonomous powering vehicle connects to and detached from the maimed vehicle automatically. Optionally, the detachable unmanned autonomous powering vehicle does not includes a compartment configured to transport a human passenger. Optionally, the charging unit comprises batteries that are mainly designed to power the maimed vehicle and not the detachable unmanned autonomous powering vehicle. Optionally, the charging unit comprises at least one of a fuel cell, a solid-oxide fuel cell, and supercapacitors. Optionally, the charging unit comprises an electric generator. Optionally, the electric generator is selected from gas-powered generator and gasoline-powered generator.

In order to reduce the cost, weight, and/or pollution, an autonomous on-road maimed vehicle may include an economic driving system. The economic driving system is designed to be upgraded significantly by connecting to a detachable unmanned autonomous powering vehicle. The detachable unmanned autonomous powering vehicle can be shared between many autonomous on-road vehicle manned vehicles, which utilize such economic driving systems, to provide the extra driving power upon demand.

In one embodiment, an autonomous on-road maimed vehicle, comprising: a chassis, wheels, an autonomous driving system, a compartment, and a low power engine, an electromechanical interface, and an extended driving controller; the low power engine is configured to provide moderate driving performances when the manned vehicle is not connect to a detachable unmanned autonomous powering vehicle; the electromechanical interface is configured to connect the manned vehicle to the detachable unmanned autonomous powering vehicle; and the extended driving controller is configured to drive the manned vehicle in cooperation with the detachable unmanned autonomous powering vehicle in order to improve the driving performances. Optionally, the manned vehicle is configured to connect and detach from the unmanned autonomous powering system automatically. Optionally, the low power engine is designed to sustain continuously at most 20 horsepower when the manned vehicle is not connect to the detachable unmanned autonomous powering vehicle. Optionally, the detachable unmanned autonomous powering vehicle connects to the back of the manned vehicle, and is configured to act as an extra rear-wheel-drive to the manned vehicle. Optionally, the detachable unmanned autonomous powering vehicle provides extra electrical power to the low power engine of the manned vehicle; wherein the extra electrical power increases the performance of the low power engine by at least 20%. Optionally, the detachable unmanned autonomous powering vehicle provides extra electrical power to the low power engine of the manned vehicle, and as a result of the extra electrical power the manned vehicle is able to accelerate faster compared to its maximum possible acceleration without the extra electrical power. Optionally, the detachable unmanned autonomous powering vehicle connects to the front of the manned vehicle, and is configured to bear at least 20% of the load born by the low power engine. Optionally, further comprising a pooling computer configured to receive locations and trajectories of maimed vehicles and locations and status of detachable unmanned autonomous powering vehicles, and to match the detachable unmanned autonomous powering vehicles to the manned vehicles mainly during section that require the increase in the driving performances. Optionally, for slow traffic urban traveling the manned vehicles usually travel without being connected to the detachable unmanned autonomous powering vehicles. Optionally, for highways traveling the manned vehicles usually travel connected to the detachable unmanned autonomous powering vehicles. Optionally, the maimed vehicle is configured to start its journey without being connected to the detachable unmanned autonomous powering vehicle, connect to the detachable unmanned autonomous powering vehicle after starting its journey, and disconnect from the detachable unmanned autonomous powering vehicle before completing its journey. Optionally, the detachable unmanned autonomous powering vehicle is further configured to supply at least 30% of the power required to operate the low power engine of the manned vehicle while being physically connected.

In one embodiment, a detachable unmanned autonomous powering vehicle, comprising: a chassis, wheels, an autonomous driving system, and an engine, together configured to enable the detachable unmanned autonomous powering vehicle to drive autonomously; an electromechanical interface configured to physically connect to a manned vehicle; and an extended driving controller configured to drive the detachable unmanned autonomous powering vehicle in cooperation with the manned vehicle in order to increase the driving performances of the maimed vehicle.

In one embodiment, a transportation system, comprising: an autonomous on-road maimed vehicle, configured to transport at least one occupant in a compartment, is authorized by law to self-drive in a residential neighborhood, and is unauthorized by law to self-drive on a highway because it is not safe enough for highway speed; a latch configured to automatically connect the vehicle to an elevated guideway; and the elevated guideway is configured to carry the vehicle at a maximum speed that is greater than the vehicle's maximum authorized self-driving speed, while the at least one occupant stays in the vehicle. Optionally, the system further comprises a hook configured to lift the vehicle from below (touches the vehicle's floor); the vehicle drives on the hook, then the hook is lifted, and the vehicle is lifted with the hook. Optionally, the vehicle comprises an automatic latch connected to a top part of the vehicle (selected from the front hood/bonnet, the roof, or the rear trunk lid) configured to fix the vehicle to the guideway during elevated drive. Optionally, the guideway operates based on magnetic levitation. Optionally, the guideway operates based on a cable car, which pulls the vehicle by a cable that is rotated by a motor located off the vehicle. Optionally, the elevated guideway is further configured to charge the vehicle while carried. Optionally, the system further comprises a computer configured to synchronize pick-up of the vehicle by the elevated guideway, without human intervention.

In one embodiment, a transportation system, comprising: an autonomous on-road maimed vehicle, configured to transport at least one occupant in a compartment; and a carrier comprising a latch and a front shape, configured to automatically connect the vehicle to an elevated guideway and to carry the vehicle, while the at least one occupant stays in the vehicle; wherein the front shape features a better aerodynamic coefficient compared to the part of the vehicle located behind the front shape while carrying the vehicle on the elevated guideway. In one example, a better aerodynamics of the front shape means that the drug generated while carrying the vehicle on the elevated guideway with the front shape is lower compared to the drug that would be generated while carrying the vehicle on the elevated guideway without the front shape. Optionally, the drug generated while carrying the vehicle on the elevated guideway with the front shape at maximum speed is at least one of 10%, 20%, 40%, and 60% lower compared to the drug that would be generated while carrying the vehicle on the elevated guideway without the front shape. Optionally, the front shape covers at least one of 30%, 50%, 70% and 90% of the vehicle front planes.

In one embodiment, the carrier further comprises a side shape featuring a better aerodynamics compared to the aerodynamics of the side planes of the vehicle that are located behind the side shape while carrying the vehicle on the elevated guideway at maximum speed. In one example, a better aerodynamics of the side shape means that the drug generated as a result of a side wind above 50 km/h while carrying the vehicle on the elevated guideway with the side shape is lower compared to the drug that would be generated as a result of the side wind while carrying the vehicle on the elevated guideway without the front shape. Optionally, the vehicle is authorized by law to self-drive in a residential neighborhood, and is unauthorized by law to self-drive on a highway because it is not safe enough for highway speed. Optionally, the elevated guideway is configured to carry the vehicle at a maximum speed that is greater than the vehicle's maximum authorized self-driving speed.

In one embodiment, an integrated transportation system, comprising: autonomous on-road maimed vehicles, each configured to transport at least one occupant, is authorized by law to self-drive in a residential neighborhood, and is unauthorized by law to self-drive on a highway because it is not safe enough for highway speed; an elevated guideway configured to automatically connect to the manned vehicles and to carry the manned vehicles at a first maximum speed that is greater than the vehicle's maximum authorized self-driving speed; the elevated guideway is further configured to automatically disconnect from the vehicles; and an on-road unmanned vehicle configured to drive the manned vehicles as a group at a second maximum speed that is greater than the vehicle's maximum authorized self-driving speed. Optionally, the on-road unmanned vehicle comprises a safety frame configured to improve the survivability of the maimed vehicles to a collision while the maimed vehicles are located inside the safety frame compared to the survivability of the maimed vehicles to a collision while the manned vehicles are not located inside the safety frame. Optionally, the on-road unmanned vehicle comprises an unmanned carrier configured to carry the manned vehicles; wherein the unmanned carrier comprises a stiff safety frame configured to protect the occupants during a collision at highway speed. Optionally, the system further comprises a computer configured to calculate a transportation path and to command the vehicle to pick up the occupant. In one embodiment, the vehicle compartment is made from strong alloy steel made using additive manufacturing, and inside padded with absorbing material. Additionally or alternatively, the safety cage of the vehicle has a round shape to improve its resistance during accident.

Arches, also referred to as hoops or ellipses, provide an improved impact resistance and survivability during collision as a result of using arched mechanical elements instead of straight mechanical elements. The following embodiments illustrate architectures that provide various types of arched shapes, and it is to be understood that any type of arch, hoop, ellipse, and/or egg shape are intended to be covered by the following illustrations. The hoops are not transparent and thus occlude the FOV to the outside environment. Therefore, it makes sense in some embodiments to combine the following embodiments with one or more of the video see through embodiment described above.

Figure 41A:
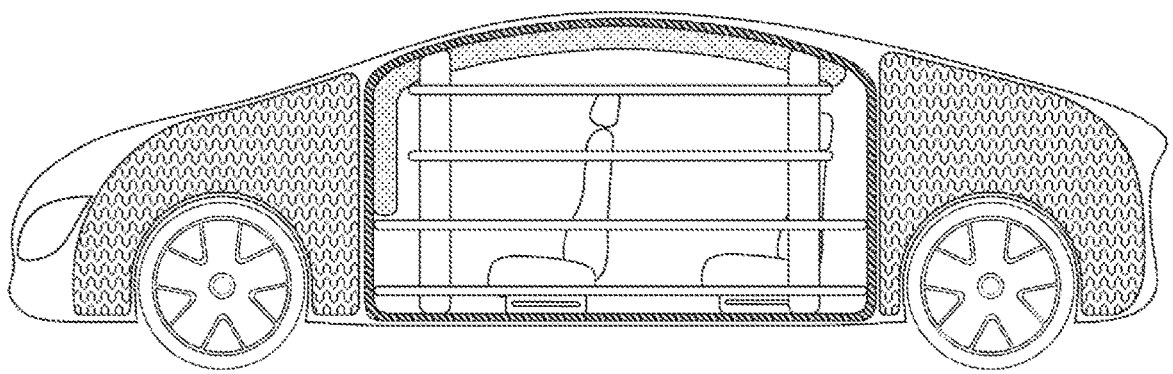
FIG. 41a, FIG. 41b, and FIG. 41c illustrate one embodiment of horizontal ellipses that move up and down over a strong stiff frame to open and close the door.
Figure 41B:
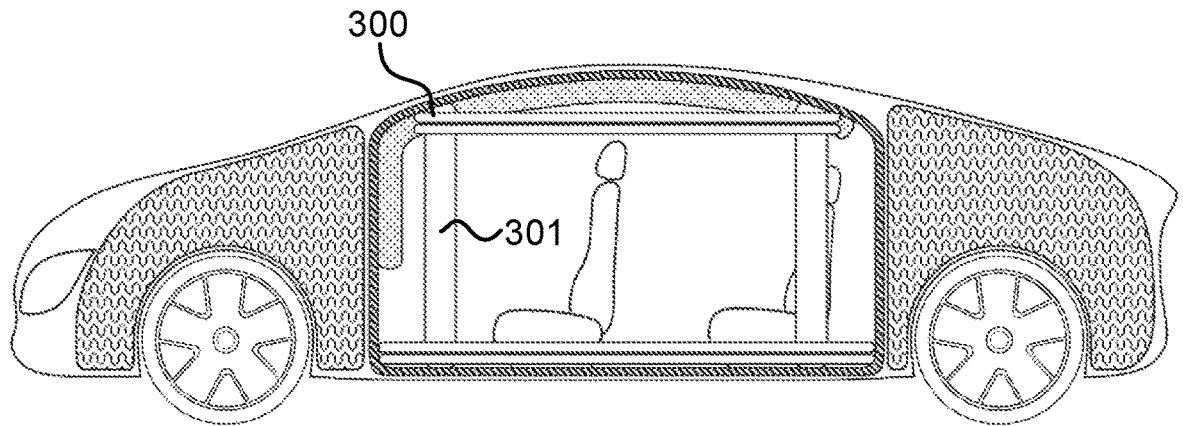
Figure 41C:
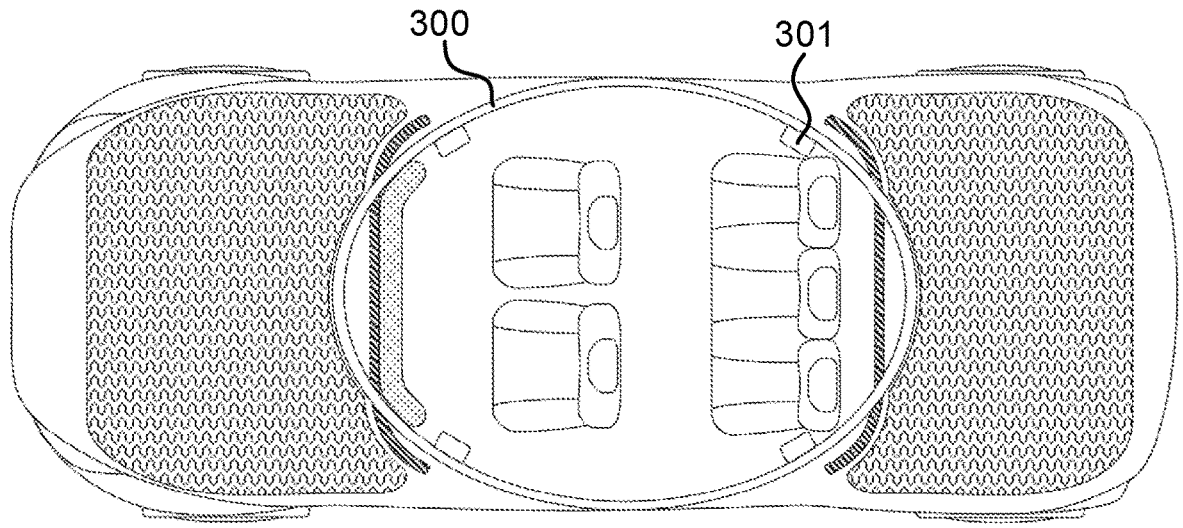

FIG. 41a, FIG. 41b, and FIG. 41c illustrate one embodiment of horizontal ellipses 300 that move up and down over a strong stiff frame 301 in order to open and close the door. In one embodiment, an autonomous on-road vehicle comprises: a compartment; horizontal ellipses configured to move up and down over a strong stiff frame in order to open and close a door, wherein at least one of the horizontal ellipses is located at eye level of an occupant who sits in a front seat of the compartment during normal driving; a camera configured to take video of the outside environment; and a computer configured to generate, based on the video, a representation of the outside environment at eye level for the occupant.

Figure 42A:
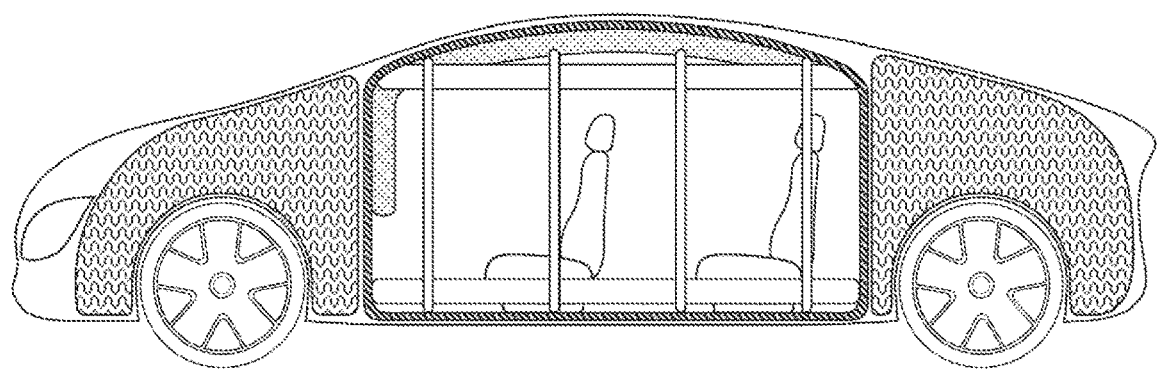
FIG. 42a, FIG. 42b, and FIG. 42c illustrate one embodiment of vertical hoops that move forwards and backwards over a strong stiff frame to open and close the door.
Figure 42B:
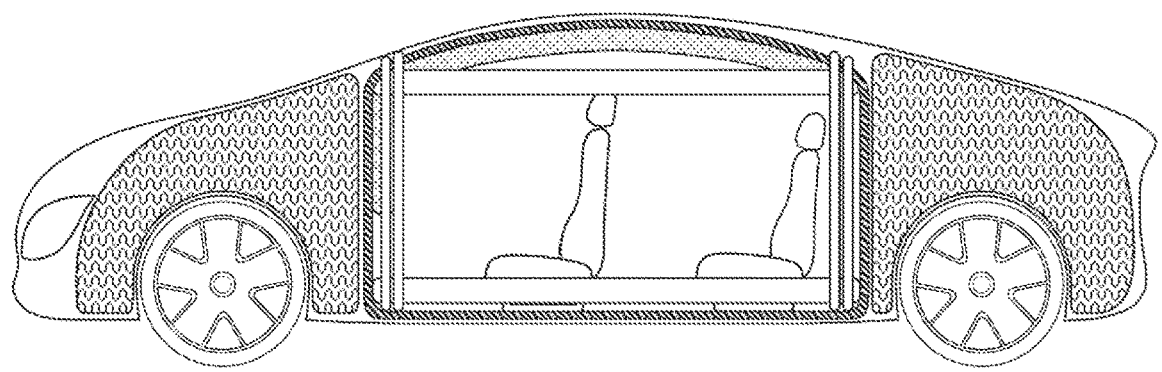
Figure 42C:
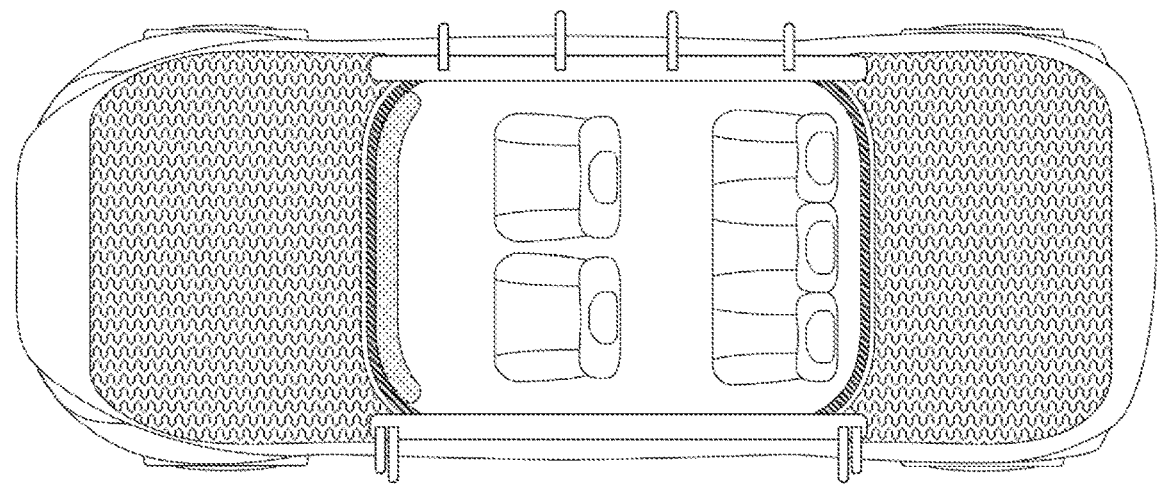
Figure 43A:
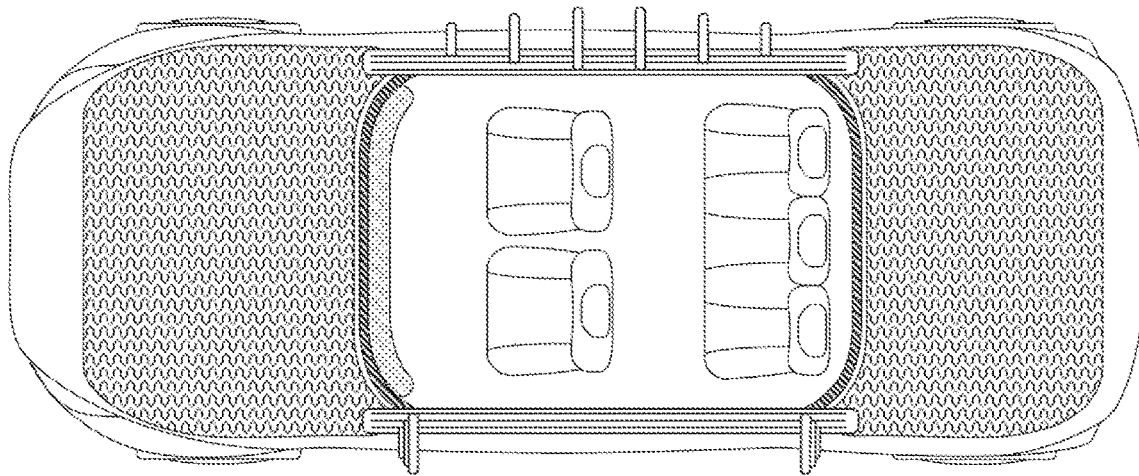
FIG. 43a, FIG. 43b and FIG. 43c illustrate top views of variations of moving doors with hoops.

FIG. 42a and FIG. 42b illustrate one embodiment of vertical hoops that move forwards and backwards over a strong stiff frame in order to open and close the door. FIG. 42c illustrates a top view of a closed right door and an open left door. FIG. 43a illustrates a top view of another variation of a closed right door and an open left door, in which the different vertical hoops move on different tracks. In one embodiment, an autonomous on-road vehicle comprises: a compartment; vertical hoops configured to forwards and backwards over a strong stiff frame in order to open and close a door, wherein at least a section of at least one of the vertical hoops is located at eye level of an occupant who sits in a front seat of the compartment during normal driving; a camera configured to take video of the outside environment; and a computer configured to generate, based on the video, a representation of the outside environment at eye level for the occupant.

Figure 43B:
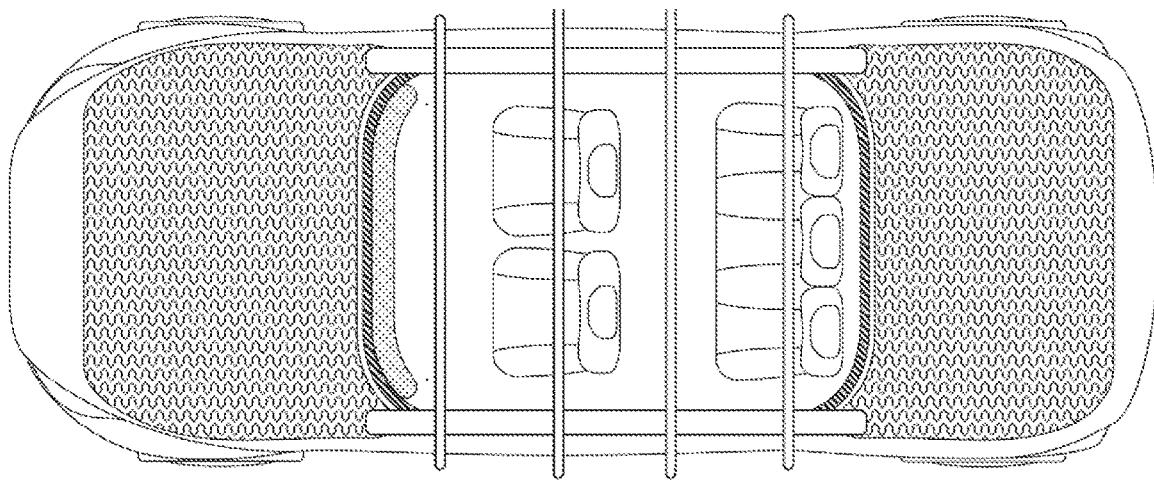
Figure 43C:
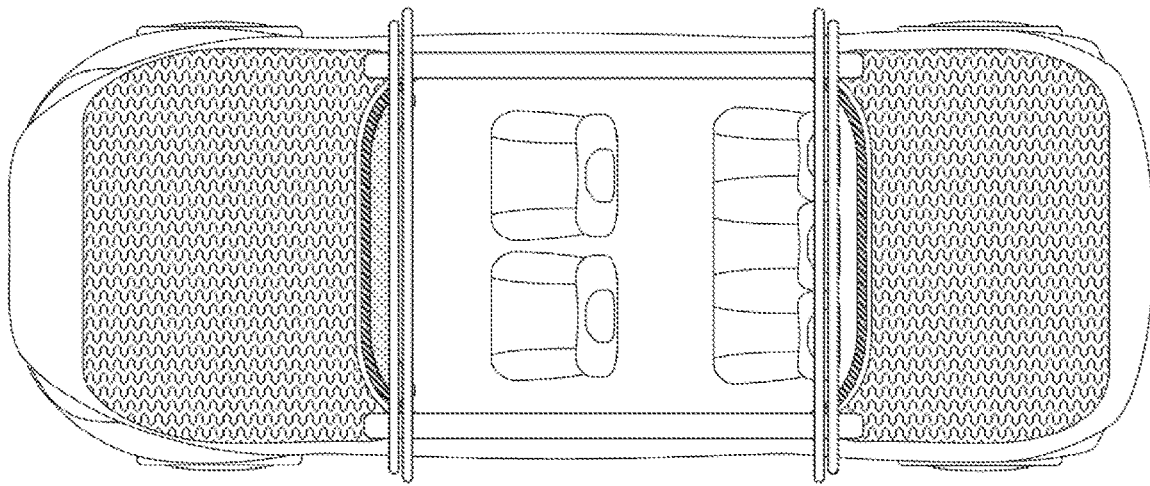

FIG. 43b illustrates a top view of a closed door made of vertical hoops that cover also the roof. FIG. 43c illustrates a top view of an open door made of the above vertical hoops that cover also the roof. This embodiment provides a better resistance for rollover due to the hoops that protect the roof. In one embodiment, an autonomous on-road vehicle comprises: a compartment; vertical hoops, which cover also the roof, configured to forwards and backwards over a strong stiff frame in order to open and close a door, wherein at least a section of at least one of the vertical hoops is located at eye level of an occupant who sits in a front seat of the compartment during normal driving; a camera configured to take video of the outside environment; and a computer configured to generate, based on the video, a representation of the outside environment at eye level for the occupant.

Figure 44A:
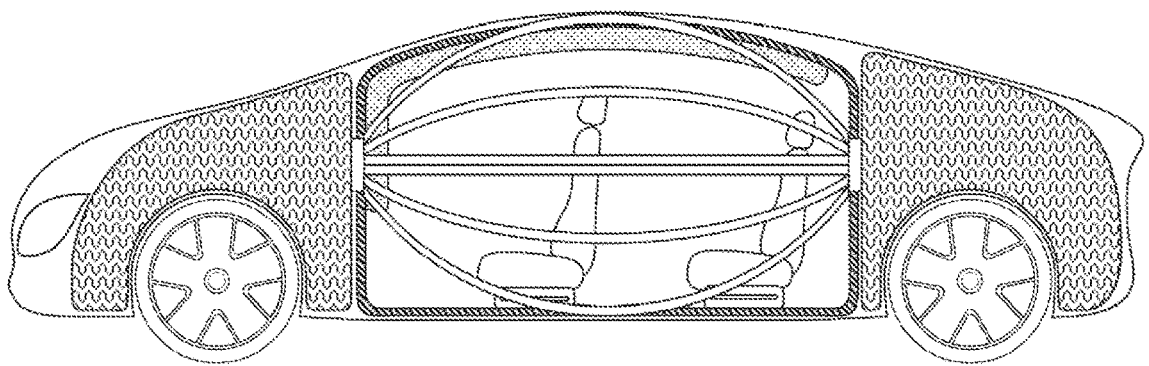
FIG. 44a, FIG. 44b, and FIG. 44c illustrate one embodiment of arches that move over front and rear pivots to open and close the door.
Figure 44B:
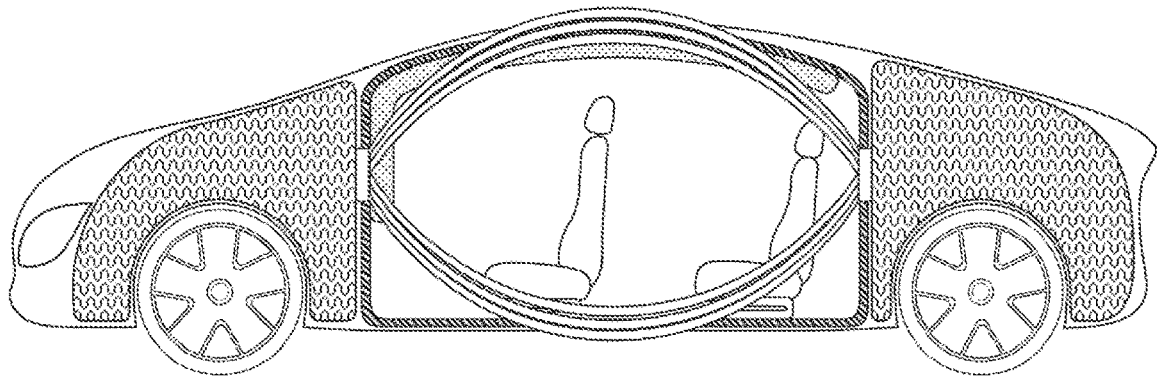
Figure 44C:
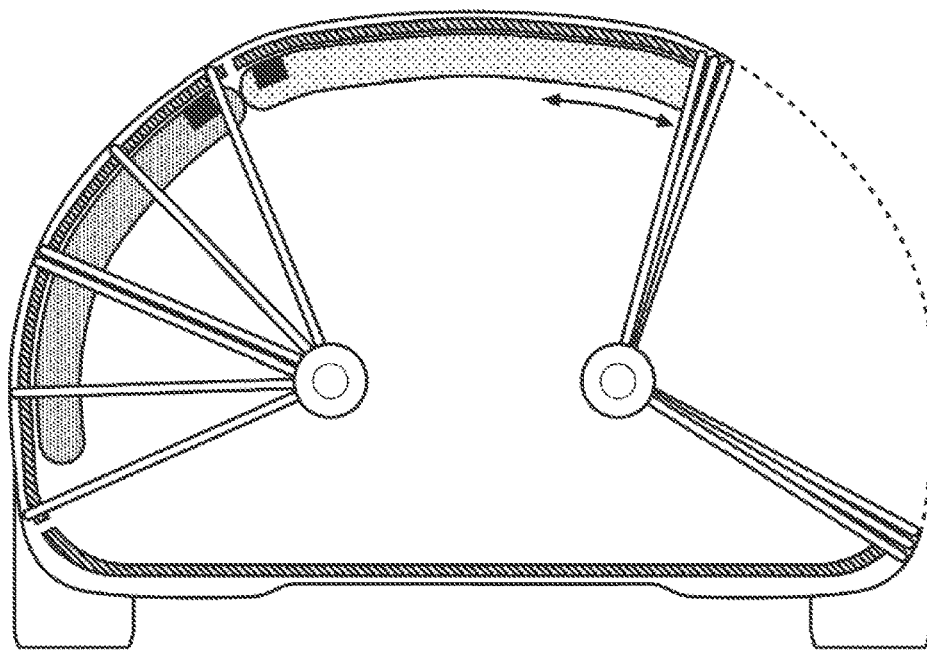

FIG. 44a, FIG. 44b, and FIG. 44c illustrate one embodiment of arches that move over front and rear pivots in order to open and close the door. FIG. 44c illustrates a front view of a closed right door and an open left door, wherein the SAEDP of the left door moves towards the roof when the door opens. In one embodiment, an autonomous on-road vehicle comprises: a compartment; arches that move over front and rear pivots in order to open and close a door, wherein at least a section of at least one of the arches is located at eye level of an occupant who sits in a front seat of the compartment during normal driving; a camera configured to take video of the outside environment; and a computer configured to generate, based on the video, a representation of the outside environment at eye level for the occupant.

Figure 45A:
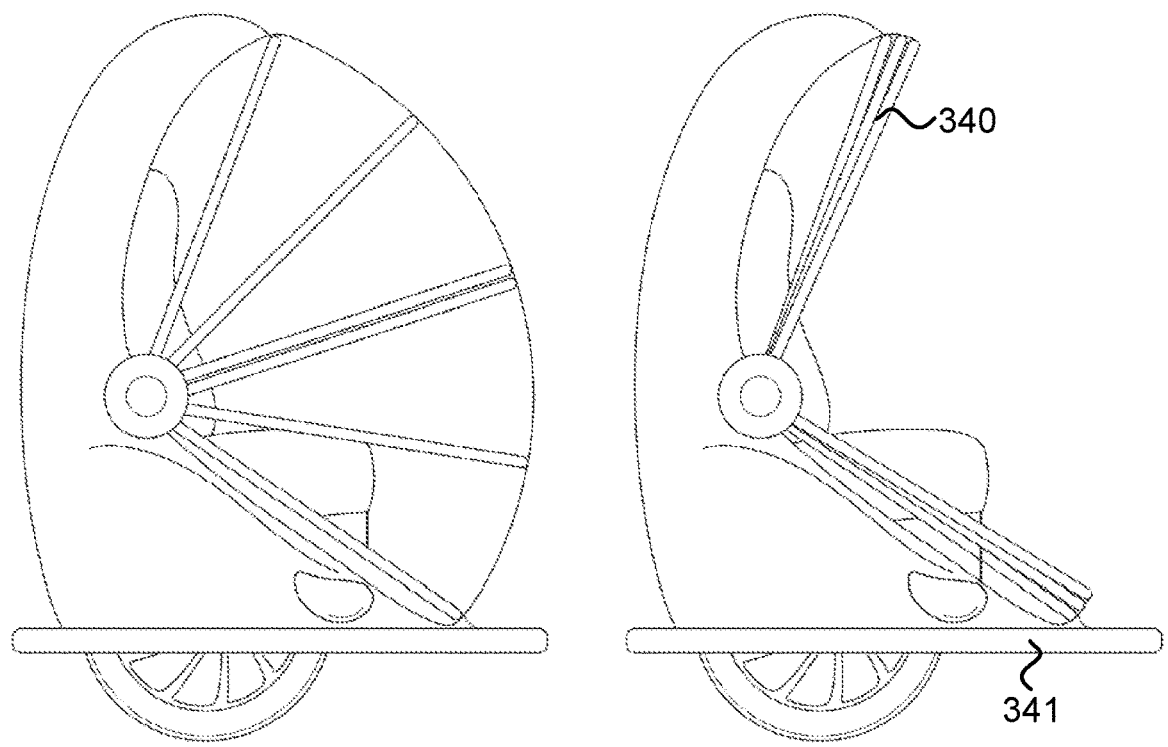
FIG. 45a and FIG. 45b illustrate one embodiment of arches that move over right and left pivots to open and close the front door in a two wheels vehicle.
Figure 45B:
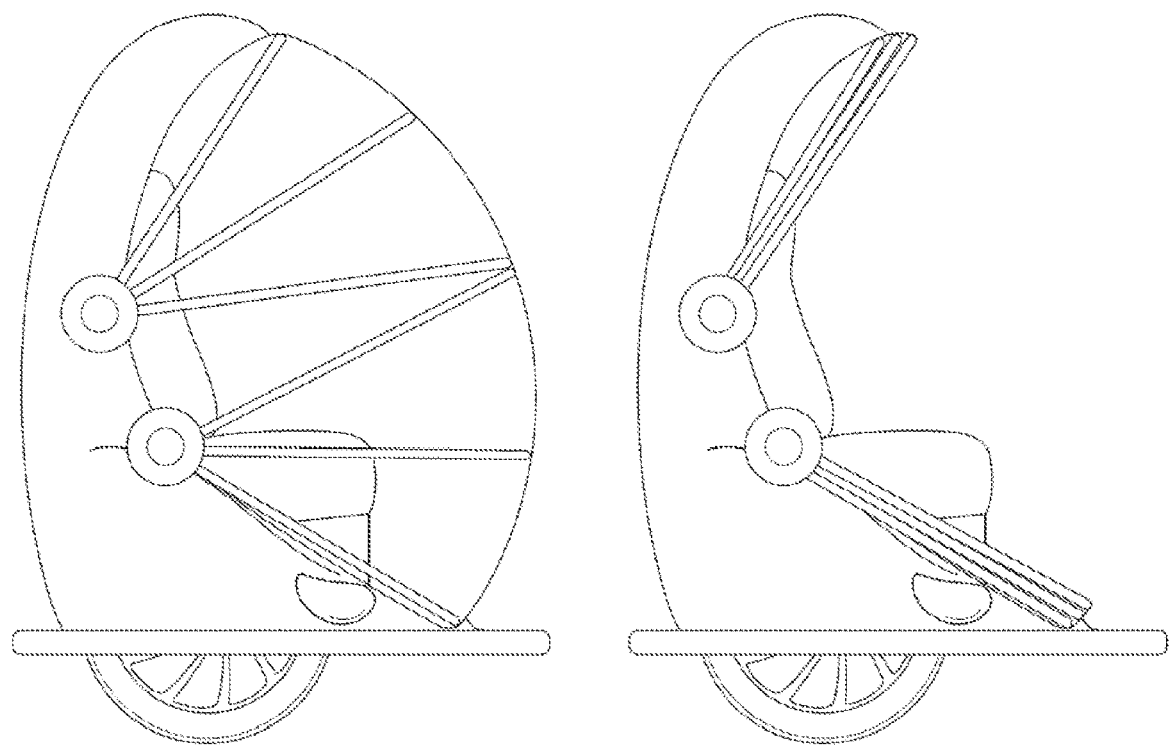

FIG. 45a and FIG. 45b illustrate one embodiment of arches 340 that move over right and left pivots in order to open and close the front door in a two wheels vehicle (that is also disclosed in this specification). Optionally, the two-wheeler has a stiff frame 341 located below the occupant's seat. The stiff frame 341 may provide at least one of the following benefits: (i) improve the safety during a low speed collision by projecting out of the compartment, (ii) the stiff frame may include a front bumper and/or a rear bumper to absorb some of the energy during a collision, (iii) enable the two-wheeler to connect to another vehicle through the stiff frame 341, and (iv) enable the two-wheeler to park safely on a carrier or another platform that moves the two-wheeler. FIG. 45b illustrates another embodiment of the two-wheeler, with arches that move over two right and two left pivots in order to open and close the front door. In one embodiment, an autonomous on-road vehicle comprises: a compartment; arches that move over at least one right pivot and at least one left pivot in order to open and close a front door, wherein at least a section of at least one of the arches is located at eye level of an occupant who sits in a front seat of the compartment during normal driving; a camera configured to take video of the outside environment; and a computer configured to generate, based on the video, a representation of the outside environment at eye level for the occupant. Optionally, the vehicle is a two-wheeler vehicle. Optionally, the vehicle also includes a stiff frame, located below the occupant's seat, and configured to provide at least one of the following benefits: (i) improve the safety during a low speed collision by projecting out of the compartment, (ii) include a front bumper and/or a rear bumper to absorb some of the energy during a collision, (iii) enable the vehicle to connect to another vehicle through the stiff frame, and (iv) enable the vehicle to park safely on a carrier or another platform configured to move the vehicle.

Figure 46A:
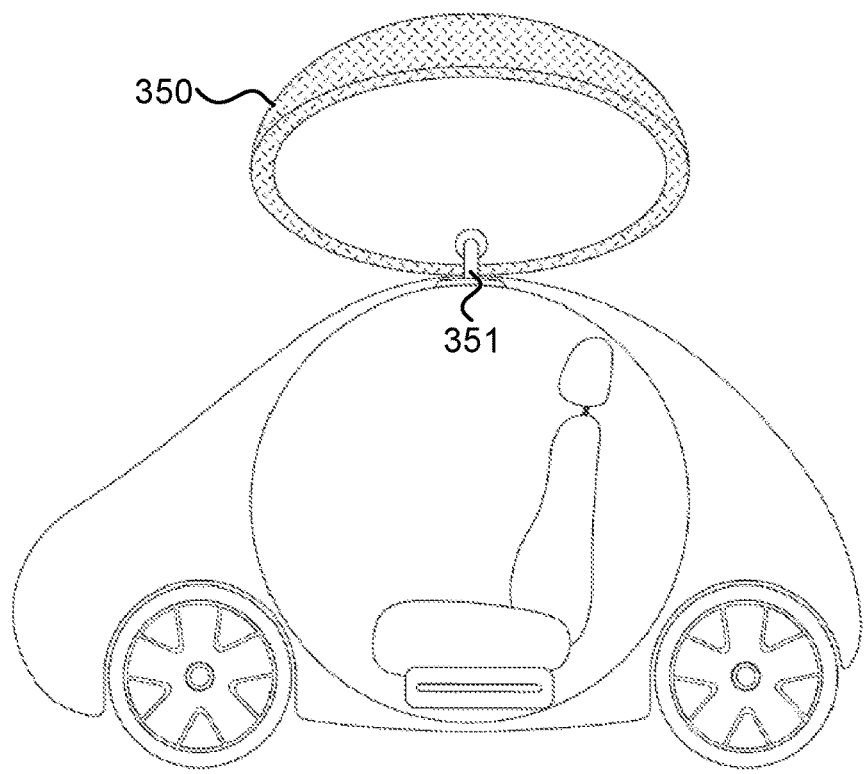
FIG. 46a and FIG. 46b illustrate one embodiment of a sphere door.
Figure 46B:
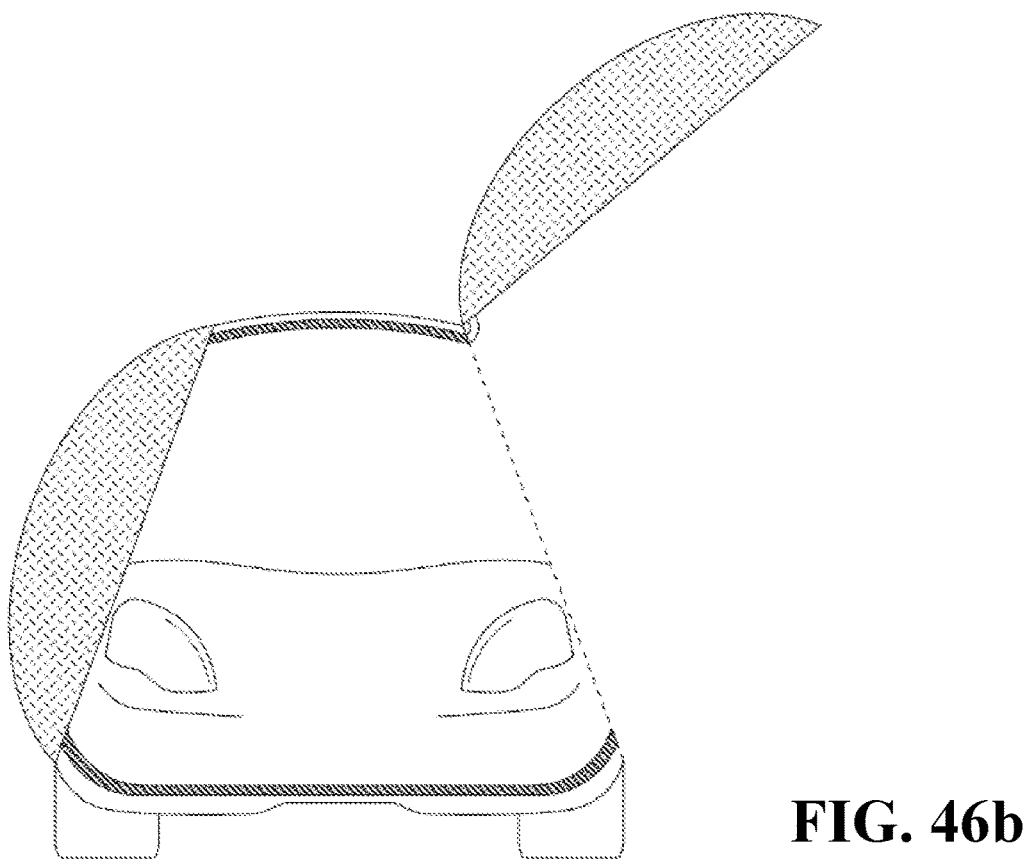

FIG. 46a illustrates one embodiment of a sphere door 350 that moves over a mechanical arm 351 in order to open and close the door. FIG. 46b illustrates a front view of a closed right door and an open left door. In one embodiment, an autonomous on-road vehicle comprises: a compartment; arches that move over front and rear pivots in order to open and close a door, wherein at least a section of at least one of the arches is located at eye level of an occupant who sits in a front seat of the compartment during normal driving; a camera configured to take video of the outside environment; and a computer configured to generate, based on the video, a representation of the outside environment at eye level for the occupant.

In one embodiment, an autonomous on-road vehicle, comprising: a nontransparent powering panel, located at eye level in front of an occupant who sits in a front seat of the vehicle during normal driving, having height and width exceeding 30×40 cm, captures at least 10×10 degrees of the occupant's forward field of view from the horizon to at least 10° below the horizon; a camera configured to take video of the outside environment in front of the occupant; and a computer configured to generate, based on the video, a representation of the outside environment in front of the occupant at eye level. Optionally, the nontransparent powering panel comprises a solar panel configured to receive and convert solar energy into electricity. The solar panels may use any suitable technology, such as described in one or more of the following patents and patent applications about vehicle solar panels: US20070125417, U.S. Pat. Nos. 8,120,308, 9,278,617. Optionally, the nontransparent powering panel is configured to store energy and to serve as a battery for the vehicle; wherein the nontransparent powering panel comprises at least one of: carbon fibers, nano structured batteries, and supercapacitors.

Current crumple zone technologies are not combined today with power storage because the current common practice is to reduce the size of the batteries as much as possible. However, building the batteries to have energy absorbing structures that act like a crumple zone may change the rules of the game. In addition, when the batteries can be located at eye level, larger structures can be used, while reducing the density of the batteries in order to enable them to act as a crumple zone. Optionally, the depth of the nontransparent powering panel, at eye level in front of the occupant, is at least 10 cm, 20 cm, 30 cm, 50 cm, 75 cm or 100 cm, and the nontransparent powering panel is built to have a deformable structure configured to dissipate some of the energy of a collision in a similar manner to a crumple zone. Optionally, the depth of the nontransparent powering panel, at eye level in front of the occupant, is at least 15 cm, and it is built to have a deformable structure configured to dissipate some of the energy of a front collision in a similar manner to a crumple zone designed for a front collision. Optionally, the powering panel further comprises a stiff element configured to support the deformable structure and to resist deformation during collision in order to reduce compartment intrusion; wherein the stiff element is located at eye level between the deformable structure and the occupant, and is coupled to the compartment. Optionally, the stiff element is also is configured to store energy. Optionally, the nontransparent powering panel is stiffer than automotive laminated glass having the same dimensions. Optionally, the nontransparent powering panel further comprises a second nontransparent powering panel, located at eye level behind the occupant and having height and width exceeding 30×40 cm; and further comprising a second camera configured to take a second video of the outside environment behind the occupant; wherein the computer is further configured to generate, based on the second video, a second representation of the outside environment behind the occupant at eye level. Optionally, the nontransparent powering panel and the second nontransparent powering panel comprise solar panels configured to receive and convert solar energy into electricity. Optionally, the nontransparent powering panel further comprises a second nontransparent powering panel, located at eye level to the left of the occupant and having height and width exceeding 30×30 cm; and further comprising a second camera configured to take a second video of the outside environment to the left of the occupant; wherein the computer is further configured to generate, based on the second video, a second representation of the outside environment to the left of the occupant at eye level. Optionally, the nontransparent powering panel and the second nontransparent powering panel are configured to store at least 5% of the energy stored in the vehicle's batteries. Optionally, the representation is generated from the point of view of the occupant, and further comprising a display configured to present the representation to the occupant. Optionally, the nontransparent powering panel further comprises a nontransparent Shock-Absorbing Energy Dissipation Padding (SAEDP) located at eye level between the nontransparent powering panel and the occupant; whereby the SAEDP is less stiff than a standard automotive glass window.

Various embodiments described herein include a processor and/or a computer. For example, the autonomous-driving control system may be implemented using a computer and generation of a representation of the outside environment is done using a processor or a computer. The following are some examples of various types of computers and/or processors that may be utilized in some of the embodiments described herein.

FIG. 35 and FIG. 36 are schematic illustrations of possible embodiments for computers (400, 410) that are able to realize one or more of the embodiments discussed herein. The computer (400, 410) may be implemented in various ways, such as, but not limited to, a server, a client, a personal computer, a network device, a handheld device (e.g., a smartphone), and/or any other computer form capable of executing a set of computer instructions.

The computer 400 includes one or more of the following components: processor 401, memory 402, computer readable medium 403, user interface 404, communication interface 405, and bus 406. In one example, the processor 401 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406.

The computer 410 includes one or more of the following components: processor 411, memory 412, and communication interface 413. In one example, the processor 411 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 412 may include one or more of the following memory components: CPU cache, main memory, read-only memory (ROM), dynamic random access memory (DRAM) such as synchronous DRAM (SDRAM), flash memory, static random access memory (SRAM), and/or a data storage device Still continuing the examples, the communication interface (405,413) may include one or more components for connecting to one or more of the following: an inter-vehicle network, Ethernet, intranet, the Internet, a fiber communication network, a wired communication network, and/or a wireless communication network. Optionally, the communication interface (405,413) is used to connect with the network 408. Additionally or alternatively, the communication interface 405 may be used to connect to other networks and/or other communication interfaces. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, an electronic pen, a gesture based input device that may be active or passive, and/or a brain-computer interface.

It is to be noted that when a processor (computer) is disclosed in one embodiment, the scope of the embodiment is intended to also cover the use of multiple processors (computers). Additionally, in some embodiments, a processor and/or computer disclosed in an embodiment may be part of the vehicle, while in other embodiments, the processor and/or computer may be separate of the vehicle. For example, the processor and/or computer may be in a device carried by the occupant and/or remote of the vehicle (e.g., a server).

As used herein, references to "one embodiment" (and its variations) mean that the feature being referred to may be included in at least one embodiment of the invention. Moreover, separate references to "one embodiment", "some embodiments", "another embodiment", "still another embodiment", etc., may refer to the same embodiment, may illustrate different aspects of an embodiment, and/or may refer to different embodiments.

Some embodiments may be described using the verb "indicating", the adjective "indicative", and/or using variations thereof. Herein, sentences in the form of "X is indicative of Y" mean that X includes information correlated with Y, up to the case where X equals Y. Additionally, sentences in the form of "provide/receive an indication indicating whether X happened" refer herein to any indication method, including but not limited to: sending/receiving a signal when X happened and not sending/receiving a signal when X did not happen, not sending/receiving a signal when X happened and sending/receiving a signal when X did not happen, and/or sending/receiving a first signal when X happened and sending/receiving a second signal X did not happen.

Herein, "most" of something is defined herein as above 51% of the something (including 100% of the something). A "portion" of something refers herein to 0.1% to 100% of the something (including 100% of the something). Sentences of the form "a portion of an area" refer herein to 0.1% to 100% percent of the area.

As used herein, the terms "comprises," "comprising," "includes," "including," "has," "having", or any other variation thereof, indicate an open claim language that does not exclude additional limitations. The "a" or "an" is employed to describe one or more, and the singular also includes the plural unless it is obvious that it is meant otherwise.

Certain features of some of the embodiments, which may have been, for clarity, described in the context of separate embodiments, may also be provided in various combinations in a single embodiment. Conversely, various features of some of the embodiments, which may have been, for brevity, described in the context of a single embodiment, may also be provided separately or in any suitable sub-combination.

Embodiments described in conjunction with specific examples are presented by way of example, and not limitation Moreover, it is evident that many alternatives, modifications, and variations will be apparent to those skilled in the art. It is to be understood that other embodiments may be utilized and structural changes may be made without departing from the scope of the appended claims and their equivalents.

equivalents.

We claim:

1. An on-road protective vehicle (PV), comprising:
a chassis, wheels, an engine, a barrier fixed to the chassis, and an autonomous driving system;
the PV has an opening which enables a manned vehicle to enter a space that is protected by the barrier; and
the autonomous driving system is configured to drive the PV in cooperation with the manned vehicle that drives while it is located inside the space.

2. The PV of claim 1, further comprising an electromechanical interface configured to secure the manned vehicle to the PV while the manned vehicle is driving inside the space.

3. The PV of claim 2, wherein the electromechanical interface comprises a latch configured to connect the manned vehicle to the PV while the manned vehicle is driving inside the space.

4. The PV of claim 1, wherein the barrier comprises a crumple zone in at least in one of the following directions of the PV: the front, the rare, the right side, and the left side.

5. The PV of claim 1, wherein the barrier comprises a safety cage; the safety cage is configured to: open when the manned vehicles get into the space, then close in order to protect the manned vehicles while driving inside the space, and then open to enable the manned vehicles to get out of the space.

6. The PV of claim 1, wherein the barrier is configured to improve the survivability of the manned vehicle to a collision while the manned vehicle is located inside the space compared to the survivability of the manned vehicle to a collision while the manned vehicle is not located inside the space.

7. The PV of claim 1, wherein the barrier is located from the right and left sides of the manned vehicle while it is inside the space.

8. The PV of claim 1, wherein the barrier is located in front of the manned vehicle while it is inside the space.

9. The PV of claim 1, wherein the barrier is located in behind the manned vehicle while it is inside the space.

10. The PV of claim 1, wherein the space is configured to accommodate multiple manned vehicles, and further comprising driving the manned vehicles in convoy while the manned vehicles are inside the space.

11. The PV of claim 1, wherein the space is configured to accommodate multiple manned vehicles, and the autonomous driving system is configured to drive the PV in cooperation with the multiple manned vehicles while the manned vehicles are located inside the space.

12. The PV of claim 1, wherein the manned vehicle is authorized by law to self-drive in a residential neighborhoods, and is unauthorized by law to self-drive on a highway because it is not safe enough for highway speed.

13. The PV of claim 1, wherein the manned vehicles are small manned vehicles designed for urban drive below 90 km/h on a regular basis.

14. The PV of claim 1, wherein each manned vehicle has tare weight of less than 400 kg without batteries.

15. The PV of claim 1, further comprising a computer configured to coordinate a pick-up point where the manned vehicle is expected to get into the PV.

16. A method comprising:
opening an on-road protective vehicle (PV) to enable a manned vehicle to enter a space within the PV; wherein the PV comprises a chassis, wheels, an engine, a barrier that protects the space, and an autonomous driving system;
closing the PV while the manned vehicle is in the space; and
driving the PV in cooperation with the manned vehicle that is driving while it is located inside the space.

17. The method of claim 16, further comprising opening the PV to enable the manned vehicles to get out of the space.

18. The method of claim 16, wherein the space is configured to accommodate multiple manned vehicles, and further comprising driving the manned vehicles in convoy while the manned vehicles are inside the space.

19. A method comprising:
guiding a manned vehicle to enter a space within an on-road unmanned protective vehicle (PV); wherein the PV comprises a chassis, wheels, an engine, a barrier that protects the space, and an autonomous driving system;
driving the PV in cooperation with the manned vehicle that is driving while being located inside the space; and
guiding the manned vehicles to get out of the space.

20. The method of claim 19, further comprising driving the PV to a next pick-up point where another manned vehicle is expected to get into the PV.

* * * * *